US008683214B2

(12) United States Patent
Unagami et al.

(10) Patent No.: US 8,683,214 B2
(45) Date of Patent: Mar. 25, 2014

(54) METHOD AND DEVICE THAT VERIFIES APPLICATION PROGRAM MODULES

(75) Inventors: Yuji Unagami, Osaka (JP); Yuichi Futa, Osaka (JP); Natsume Matsuzaki, Osaka (JP); Hiroki Shizuya, Miyagi (JP); Masao Sakai, Miyagi (JP); Shuji Isobe, Miyagi (JP); Eisuke Koizumi, Miyagi (JP); Shingo Hasegawa, Miyagi (JP); Junya Iwazaki, Miyagi (JP)

(73) Assignee: Panasonic Corporation, Osaka (JP)

( * ) Notice: Subject to any disclaimer, the term of this patent is extended or adjusted under 35 U.S.C. 154(b) by 304 days.

(21) Appl. No.: 13/127,806

(22) PCT Filed: Sep. 16, 2010

(86) PCT No.: PCT/JP2010/005644
§ 371 (c)(1),
(2), (4) Date: May 5, 2011

(87) PCT Pub. No.: WO2011/033773
PCT Pub. Date: Mar. 24, 2011

(65) Prior Publication Data
US 2011/0246783 A1 Oct. 6, 2011

(30) Foreign Application Priority Data

Sep. 17, 2009 (JP) .................................. 2009-215972
Feb. 10, 2010 (JP) .................................. 2010-027611

(51) Int. Cl.
*G06F 21/00* (2013.01)
(52) U.S. Cl.
USPC .......................................................... 713/187
(58) Field of Classification Search
None
See application file for complete search history.

(56) References Cited

U.S. PATENT DOCUMENTS

| 5,390,247 | A * | 2/1995 | Fischer | .......................... 713/176 |
| 6,539,266 | B1 | 3/2003 | Ishikawa | |
| 7,756,873 | B2 * | 7/2010 | Gould et al. | ................... 707/737 |
| 2009/0328003 | A1 * | 12/2009 | Pensak et al. | ................. 717/124 |
| 2010/0180343 | A1 | 7/2010 | Maeda et al. | |
| 2010/0235588 | A1 | 9/2010 | Maeda et al. | |

FOREIGN PATENT DOCUMENTS

| JP | 2000-89671 | 3/2000 |
| JP | 3056732 | 6/2000 |
| JP | 2000-293370 | 10/2000 |
| WO | 2008/099682 | 8/2008 |
| WO | 2009/118800 | 10/2009 |

OTHER PUBLICATIONS

International Search Report issued Nov. 16, 2010 in International (PCT) Application No. PCT/JP2010/005644.

(Continued)

*Primary Examiner* — Gilberto Barron, Jr.
*Assistant Examiner* — Simon Kanaan
(74) *Attorney, Agent, or Firm* — Wenderoth, Lind & Ponack, L.L.P.

(57) ABSTRACT

The present invention aims to perform tamper detection on a protection control module without having detection modules come to know the key data and functions thereof. The detection modules of the present invention perform tamper detection by verifying whether or not the correspondence between the input and output data of the application decryption process performed by the protection control module is correct. Furthermore, the present invention offers improved security against leaks of the application output data by the detection modules by having a plurality of detection modules verify different data blocks.

21 Claims, 101 Drawing Sheets

(56) References Cited

OTHER PUBLICATIONS

"Gendai Ango" (Modern Cryptograhy) by Okamoto Tatsuaki and Yamamoto Hirosuke, Sangyotosho, pp. 171-173, 1997, together with verified partial translation.

ITU-T-REC-X.509-199708-S, Series X: Data Networks and Open System Communications, Information technology—Open Systems Interconnection—The Directory: Authentication framework, (Aug. 1997).

Franco P. Preparata et al., "On the Connection Assignment Problem of Diagnosable Systems", IEEE Transactions on Electronic Computers, vol. EC-16, No. 6, pp. 848-854, Dec. 1967.

* cited by examiner

FIG.13

| Block information | Judgment information | Identification information | Data | Verification values | Certificate |
|---|---|---|---|---|---|
| Block information 1 | Judgment information | Application 110 | Encrypted application 110 data | Verification value for block 1 of application 110 | Decryption process certificate |
| | | Application 111 | Encrypted application 111 data | Verification value for block 1 of application 111 | |
| | | Application 112 | Encrypted application 112 data | Verification value for block 1 of application 112 | |
| | | Application 113 | Encrypted application 113 data | Verification value for block 1 of application 113 | |
| | | Application 114 | Encrypted application 114 data | Verification value for block 1 of application 114 | |

| Block information | Judgment information | Identification information | Data | Verification values | Certificate |
|---|---|---|---|---|---|
| Block information 2 | Judgment information | Application 110 | Encrypted application 110 data | Verification value for block 2 of application 110 | Decryption process certificate |
| | | Application 111 | Encrypted application 111 data | Verification value for block 2 of application 111 | |
| | | Application 112 | Encrypted application 112 data | Verification value for block 2 of application 112 | |
| | | Application 113 | Encrypted application 113 data | Verification value for block 2 of application 113 | |
| | | Application 114 | Encrypted application 114 data | Verification value for block 2 of application 114 | |

| Block information | Judgment information | Identification information | Data | Verification values | Certificate |
|---|---|---|---|---|---|
| Block information 3 | Judgment information | Application 110 | Encrypted application 110 data | Verification value for block 3 of application 110 | Decryption process certificate |
| | | Application 111 | Encrypted application 111 data | Verification value for block 3 of application 111 | |
| | | Application 112 | Encrypted application 112 data | Verification value for block 3 of application 112 | |
| | | Application 113 | Encrypted application 113 data | Verification value for block 3 of application 113 | |
| | | Application 114 | Encrypted application 114 data | Verification value for block 3 of application 114 | |

Verification source data 1300

| | Identification information | Data | Certificate |
|---|---|---|---|
| Decryption sub-process 1 (1300a) | Application 110 | Encrypted application 110 data | Correspondence certificate |
| | Application 111 | Encrypted application 111 data | Correspondence certificate |
| | Application 112 | Encrypted application 112 data | Correspondence certificate |
| | Application 113 | Encrypted application 113 data | Correspondence certificate |
| | Application 114 | Encrypted application 114 data | Correspondence certificate |

| | Identification information | Data | Certificate |
|---|---|---|---|
| Decryption sub-process 2 (1300b) | Application 110 | Intermediate value 1 for application 110 | Correspondence certificate |
| | Application 111 | Intermediate value 1 for application 111 | Correspondence certificate |
| | Application 112 | Intermediate value 1 for application 112 | Correspondence certificate |
| | Application 113 | Intermediate value 1 for application 113 | Correspondence certificate |
| | Application 114 | Intermediate value 1 for application 114 | Correspondence certificate |

| | Identification information | Data | Certificate |
|---|---|---|---|
| Decryption sub-process 3 (1300c) | Application 110 | Intermediate value 2 for application 110 | Correspondence certificate |
| | Application 111 | Intermediate value 2 for application 111 | Correspondence certificate |
| | Application 112 | Intermediate value 2 for application 112 | Correspondence certificate |
| | Application 113 | Intermediate value 2 for application 113 | Correspondence certificate |
| | Application 114 | Intermediate value 2 for application 114 | Correspondence certificate |

FIG.83

Verification data for decryption sub-process 2 — 1302

| Decryption sub-process 2 | Identification information | Data | Certificate |
|---|---|---|---|
| | Application 110 | Intermediate value 1 for application 110 | Correspondence certificate |
| | Application 111 | Intermediate value 1 for application 111 | Correspondence certificate |
| | Application 112 | Intermediate value 1 for application 112 | Correspondence certificate |
| | Application 113 | Intermediate value 1 for application 113 | Correspondence certificate |
| | Application 114 | Intermediate value 1 for application 114 | Correspondence certificate |

FIG.84

Verification data for decryption sub-process 3 — 1303

| Decryption sub-process 3 | Identification information | Data | Certificate |
|---|---|---|---|
| | Application 110 | Intermediate value 2 for application 110 | Correspondence certificate |
| | Application 111 | Intermediate value 2 for application 111 | Correspondence certificate |
| | Application 112 | Intermediate value 2 for application 112 | Correspondence certificate |
| | Application 113 | Intermediate value 2 for application 113 | Correspondence certificate |
| | Application 114 | Intermediate value 2 for application 114 | Correspondence certificate |

FIG.85

| Identification information | Data | Verification data | Certificate |
|---|---|---|---|
| Application 110 | Encrypted application 110 data | Verification data for application 110 | Decryption process certificate |
| Application 111 | Encrypted application 111 data | Verification data for application 111 | |
| Application 112 | Encrypted application 112 data | Verification data for application 112 | |
| Application 113 | Encrypted application 113 data | Verification data for application 113 | |
| Application 114 | Encrypted application 114 data | Verification data for application 114 | |

| Identification information | Data | Certificate |
|---|---|---|
| ID 110 | Encrypted data for ID 110 | Correspondence certificate for ID 110 |
| ID 111 | Encrypted data for ID 111 | Correspondence certificate for ID 111 |
| ID 112 | Encrypted data for ID 112 | Correspondence certificate for ID 112 |
| ID 113 | Encrypted data for ID 113 | Correspondence certificate for ID 113 |
| ID 114 | Encrypted data for ID 114 | Correspondence certificate for ID 114 |

1500

METHOD AND DEVICE THAT VERIFIES APPLICATION PROGRAM MODULES

TECHNICAL FIELD

The present invention relates to technology for identifying modules that may potentially perform unauthorized operations.

BACKGROUND ART

In recent years, technology has been developed for protecting software applications (hereinafter simply applications) that have confidential data from being analyzed by malicious third-parties (hereinafter termed attackers) with software.

Technology for protecting applications with software includes verifying the presence of tampering by using hash values, as well as saving applications in encrypted form when not in use and decrypting applications loaded in memory only when in use via a decryption loading function and the like.

However, despite the use of such technology, the software that protects the applications (hereinafter termed protection control module) may itself be tampered with by attackers. Should the protection control module be tampered with, then the applications will, in turn, be attacked. Thus, detection modules are used to perform tamper detection on the protection control module and detect tampering therewith.

Such detection modules read all of the protection control module data and detect tampering therewith by calculating a MAC (Message Authentication Code) value.

CITATION LIST

Patent Literature

[Patent Literature 1] Japanese Patent No. 3056732[Patent Literature 2] International Patent Publication No. 2008/099682

Non-Patent Literature

[Non-Patent Literature 1] Tatsuako Okamoto, Hirosuke Yamamoto, "Gendai Angou" (Modern Cryptography), Sangyo Tosho (1997)
[Non-Patent Literature 2] ITU-T Recommendation X.509 (1997 E Information Technology—Open Systems Interconnection—The Directory: Authentication Framework, 1997
[Non-Patent Literature 3] F. Preparata, G. Metze and R. T. Chien, "On The Connection Assignment Problem of Diagnosable Systems", IEEE Trans. Electronic Computers, vol. 16, pp. 848-854, 1968.

SUMMARY OF INVENTION

Technical Problem

Nevertheless, if tampering occurs in a detection module for performing tamper detection on the protection control module and security is degraded thereby, the key data included in the protection control module as well as the functions of the module themselves are in danger of being illicitly used by the detection module. Should this occur, then the detection module may install unauthorized applications and use such applications to leak personal user information, content, and so on.

In view of the above-described problems, the present invention aims to provide an information processing device, a management device, an illegal module detection system, an illegal module detection method, a recording medium on which an illegal module detection system is recorded, a management method, and a recording medium on which a management program is recorded able to detect tampering in a protection control module without a detection module coming to know the key data and functions of the protection control module.

Solution to Problem

In order to achieve the above aims, the present invention provides an information processing device including: a protection control module operable to protect applications; and a plurality of detection modules, the protection control module comprising: a decrypter operable to take an application in encrypted form as input data, to decrypt the input data, and to output decryption results as output data; a splitter operable to split the output data into at least k blocks (where k≥2); and a distributor operable to distribute the k blocks among the detection modules, wherein each of the detection modules comprises a verifier operable to determine whether or not each block distributed thereto is correct by using (i) the distributed block, (ii) verification data generated according to the input data and a block value expected to result from normal operation of the decrypter, and (iii) the input data.

Effects of Invention

According to the present invention, each detection module verifies the application decryption process performed by the protection control module without using the data of the protection control module itself. As such, the detection modules can be prevented from leaking confidential data held thereby.

Also, according to the present invention, the detection modules perform verification on different data blocks, and thus, the detection module can be prevented from leaking the application data.

BRIEF DESCRIPTION OF DRAWINGS

FIG. 13 is a diagram showing the structure of verification data (certificate) 701 in block 1 pertaining to Embodiment 1.

FIG. 14 is a diagram showing the structure of verification data (certificate) 702 in block 2 pertaining to Embodiment 1.

FIG. 15 is a diagram showing the structure of verification data (certificate) 703 in block 3 pertaining to Embodiment 1.

FIG. 78 is a diagram showing the structure of verification source data 1300 pertaining to Embodiment 6.

FIG. 83 is a diagram showing the structure of verification data 1302 in decryption sub-process 2 pertaining to Embodiment 6.

FIG. 84 is a diagram showing the structure of verification data 1303 in decryption sub-process 3 pertaining to Embodiment 6.

FIG. 85 is a diagram showing the structure of the verification source 1400 pertaining to Embodiment 7.

FIG. 89 is a diagram showing the structure of verification data 1500 pertaining to Embodiment 9.

DESCRIPTION OF EMBODIMENTS

Figure 1:
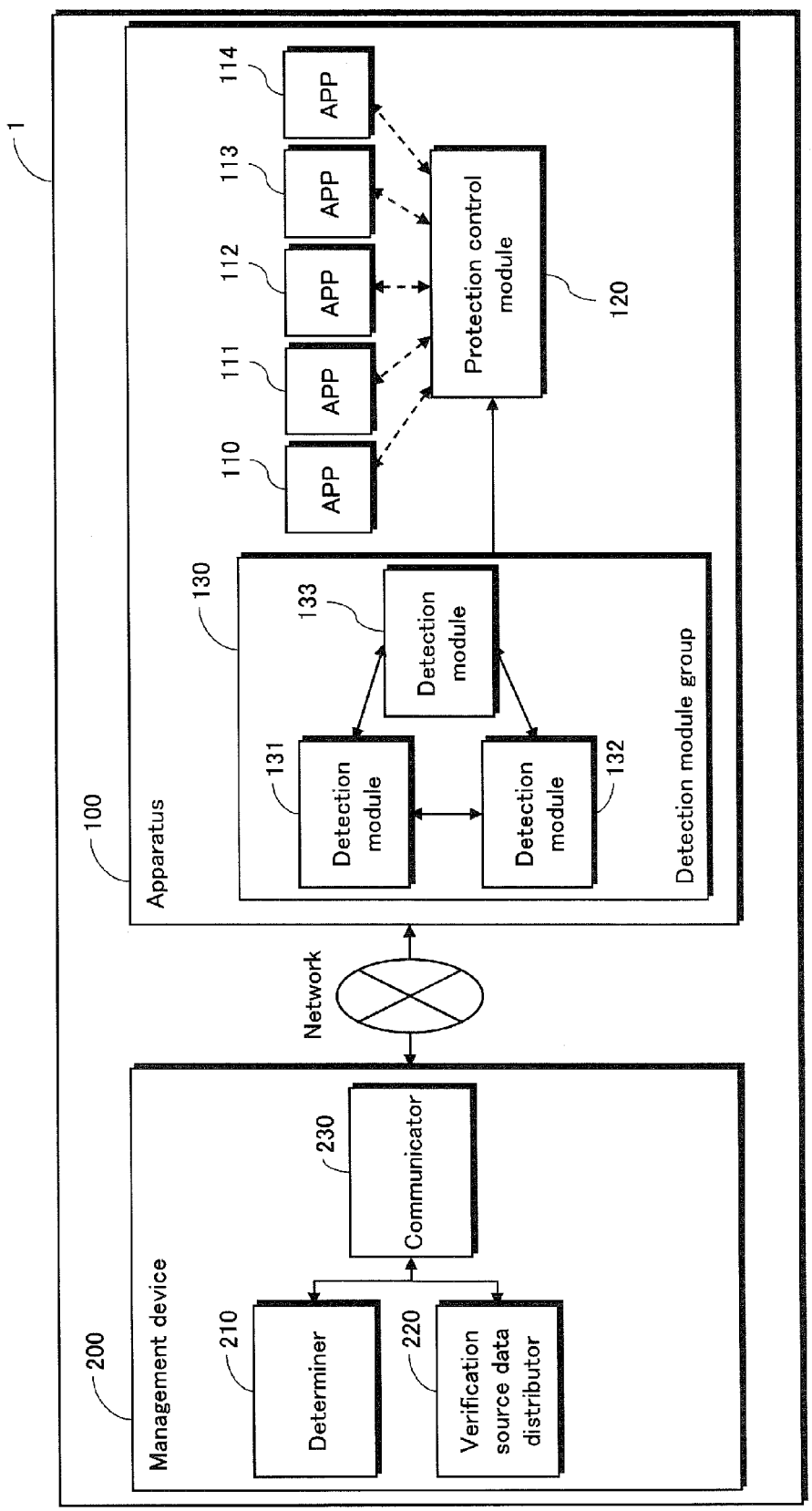
FIG. 1 is an overall configuration diagram of an illegal module detection system 1 pertaining to Embodiment 1.

An information processing device pertaining to a first aspect of the present invention includes: a protection control module operable to protect applications; and a plurality of detection modules, the protection control module comprising: a decrypter operable to take an application in encrypted form as input data, to decrypt the input data, and to output decryption results as output data; a splitter operable to split the output data into at least k blocks (where k≥2); and a distributor operable to distribute the k blocks among the detection modules, wherein each of the detection modules comprises a verifier operable to determine whether or not each block distributed thereto is correct by using (i) the distributed block, (ii) verification data generated according to the input data and a block value expected to result from normal operation of the decrypter, and (iii) the input data.

In an information processing device pertaining to a second aspect of the present invention, the protection control module holds therein block information indicating a method for splitting the output data, the splitter splits the output data with respect to the block information, and the splitter further transmits to each of the detection modules (i) verification data corresponding to each block distributed thereto, and (ii) the input data.

According to such a structure, the protection control module is able to generate data blocks for distribution among a plurality of detection modules.

In an information processing device pertaining to a third aspect of the present invention, each of the detection modules further comprises a verification confirmer operable to obtain the blocks distributed to other detection modules, and to confirm whether or not the verifier of the other detection modules have performed verification correctly according to judgment information pre-assigned thereto.

According to this structure, each of the detection modules can confirm whether all k of the data blocks generated from the output data have been verified, thus more accurately detecting any unauthorized operations by the protection control module.

In an information processing device pertaining to a fourth aspect of the present invention, each of the detection modules deletes each block distributed thereto after verification by the verifier, and confirms whether or not another detection module has deleted the blocks distributed thereto.

According to this structure, data blocks are not accumulated within the detection modules and thus, protection control module information, application information and the like can be prevented from leaking therefrom.

In an information processing device pertaining to a fifth aspect of the present invention, each of the detection modules comprises a mutual surveillance unit operable to perform tamper verification on the other detection module, and, if tampering is detected by the mutual surveillance unit, the detection module determines that the blocks have not been deleted by the other detection module, and if tampering is not detected, the detection module determines that the blocks have been deleted by the other detection module.

The detection modules are able to delete data blocks (with a deletion program). Thus, if the detection modules can be confirmed through mutual surveillance as not having been tampered with, the deletion program can be guaranteed to operate normally to delete the data blocks.

In an information processing device pertaining to a sixth aspect of the present invention, the splitter splits the output data into k blocks by dividing values of the output data by k divisors, the k divisors being co-prime, the block information indicates the number k and the k divisors, and the judgment information indicates the product of the k divisors.

According to this structure, the original output data can be recovered from the k data blocks by using the Chinese remainder theorem.

In an information processing device pertaining to a seventh aspect of the present invention, each of the detection modules further comprises a transmitter operable to transmit verification results to an external management device, and at least one of the detection modules comprises an updater operable to update the protection control module when the external management device determines that tampering has occurred in the protection control module.

According to this structure, an authorized external management device can use the verification process of each detection module to update the protection control module with a new protection control module if a determination has been made to the effect that tampering has occurred therein. Thus, the confidential data held by the applications can be protected from leaks.

An information processing device pertaining to an eighth aspect of the present invention includes: a protection control module operable to protect applications; and a plurality of detection modules, the protection control module comprising: a decrypter operable to execute a decryption process made up of k sub-processes on an application in encrypted form; and a distributor operable to distribute k pieces of verification target data that are the respective output data of the k sub-processes to the detection modules, wherein each of the detection modules comprises a verifier operable to determine whether or not the verification target data distributed thereto is correct by using (i) the distributed verification target data, (ii) input data for each of the sub-processes corresponding to the verification target data, and (iii) verification data generated according to the input data and output data expected to result from normal operation of the decrypter.

According to this structure, each of the detection modules verifies the application decryption process performed by the protection control module without using the data of the protection control module itself. As such, the detection modules can be prevented from leaking confidential data by the protection control module.

Also, according to such a structure, the detection modules perform verification on different sub-processes, and thus, the detection modules can be prevented from leaking the application data.

Also, according to such a structure, a compromised sub-process can be detected within the whole.

In an information processing device pertaining to a ninth aspect of the present invention, the protection control module comprises: plurality of applications; a verification source data holder holding k pieces of verification source data therein; and a verification data generator operable to generate k pieces of verification data from the k pieces of verification source data for distribution to the detection modules, the k pieces of verification source data include, for each of the applications, the following (i), (ii), and (iii) corresponding to each of the k sub-processes: (i) an application in encrypted form, (ii) a verification value indicating a correspondence between input data and output data for the sub-process as expected from normal operations of the decrypter, and (iii) a concatenated data verification value generated from the concatenated data of a plurality of verification values, and the verification data generator generates k pieces of verification data from the k pieces of verification source data by deleting therefrom verification values corresponding to an application being decrypted by the decrypter as well as the data of all other applications in encrypted form.

In an information processing device pertaining to a tenth aspect of the present invention, the verifier of each of the detection modules generates a verification value from the verification target data and from the data of the applications in encrypted form included in the received verification data, generates combined data by combining the verification value so generated and the verification values included in the received verification data, generates a combined data verification value from the combined data, and verifies whether or not there is a match between the combined data so generated and the combined data verification value included in the received verification data.

According to such a structure, the protection control module distributes verification data among the detection modules disclosing only the information pertaining to the application decrypted by the protection control module. Thus, unnecessary disclosure of information to the detection modules (e.g. information pertaining to other applications) can be prevented.

Each of the detection modules uses the received verification data to perform verification on the protection control module.

In an information processing device pertaining to an eleventh aspect of the present invention, each of the detection modules deletes the received verification data after verification by the verifier, and confirms whether or not another detection module has deleted the verification data received thereby.

According to this structure, verification data does not accumulate in the detection modules and thus, protection control module information, application information and the like can be prevented from leaking therefrom.

In an information processing device pertaining to a twelfth aspect of the present invention, each of the detection modules comprises a mutual surveillance unit operable to perform tamper verification on the other detection module, and if tampering is detected by the mutual surveillance unit, the detection module determines that the verification data have not been deleted by the other detection module, and if tampering is not detected, the detection module determines that the verification data have been deleted by the other detection module.

According to this structure, the detection modules are able to delete the verification data (with a deletion program). Thus, if the detection modules can be confirmed through mutual surveillance as not having been compromised, the deletion program can be guaranteed to operate normally to delete the verification data.

An information processing device pertaining to a thirteenth aspect of the present invention includes: a protection control module operable to protect applications; and a plurality of detection modules, the protection control module comprising: a processor operable to perform a predetermined process on input data and to output resulting output data; a challenge data receiver operable to receive challenge data from each of the detection modules; and a transmitter operable to transmit response data to each of the detection modules, the response data being the output data from the processor in response to the challenge data input thereto, each of the detection modules comprising: a holder that holds therein verification data showing, for each piece of challenge data, a correspondence between (i) the output data expected to result from normal operation of the processor when the piece of challenge data is input thereto and (ii) the challenge data; a challenge data transmitter operable to transmit one piece of challenge data to the protection control module, a response data receiver operable to receive the response data from the protection control module; and a verifier operable to verify the response data so received using the verification data, wherein at least two of the detection modules verify the protection control module according to an identical piece of response data.

In an information processing device pertaining to a fourteenth aspect of the present invention, the verification data include a plurality of pieces of challenge data, and the challenge data transmitter selects one piece of challenge data from the challenge data included in the verification data and transmits the selected piece of challenge data to the protection control module.

According to such a structure, each detection module verifies the process performed by the protection control module without using the data of the protection control module itself.

As such, the detection modules can be prevented from leaking confidential data held by the protection control module. Also, according to the present invention, each of the detection modules can be prevented from leaking the application data.

In an information processing device pertaining to a fifteenth aspect of the present invention, the protection control module generates ordering information indicating a processing order for the k sub-processes, and transmits the ordering information so generated to each of the detection modules, and the verifier of each of the detection modules verifies the verification target data according to the processing order indicated by the ordering information received thereby.

In an information processing device pertaining to a aspect Embodiment of the present invention, each of the detection modules comprises: a verification target data receiver operable to receive verification target data from the detection module that performs a verification process as part of the sub-process immediately preceding the sub-process verified thereby; and a verification target data transmitter operable, when verification by the verifier is successful, to identify the detection module that performs the verification process as part of the next sub-process with reference to the ordering information, and to transmit verification target data thereto, and the verifier performs the verification process using the verification target data received by the verification target data receiver.

In an information processing device pertaining to a seventeenth aspect of the present invention, each of the detection modules further comprises: an input data verifier operable to verify whether or not there is a match between the verification target data received by the receiver and the input data; and a notifier operable, when the verification target data and the input data do not match, to make an outside notification to this effect.

According to such a structure, the decrypter can verify whether or not the k sub-processes have been executed in the correct order.

Also, if the sub-processes have not been performed in the correct order, the protection control module can be deemed to have performed an unauthorized operation and the management device can be notified to such effect.

In an information processing device pertaining to an eighteenth aspect of the present invention, the verification data includes a digital signature of an external management device.

In an information processing device pertaining to a nineteenth aspect of the present invention, the verification data is a digital signature of an external management device for the input data and the output data expected to result from normal operation of the decrypter.

According to such a structure, the validity of the verification data can be guaranteed.

In an information processing device pertaining to a twentieth aspect of the present invention, each of the detection modules comprises a transmitter operable to transmit verification results to an external management device, and at least one of the detection modules comprises an update module operable, when the external management device determines that tampering has occurred in the protection control module, to update the protection control module.

According to this structure, an authorized external management device can use the verification process of each detection module to update the protection control module with a new protection control module if a determination has been made to the effect that tampering has occurred therein. Thus, the confidential data held by the applications can be protected from leaks.

A management device pertaining to a twenty-first aspect of the present invention is connected to an information processing device that verifies a plurality of data blocks, the information processing device having: a decrypter operable to decrypt data input thereto in encrypted form and output decryption results as output data, and a splitter operable to split the output data into the data blocks, the management device comprising: a verification source data generator operable to generate verification source data from the input data and from each data block expected to result from normal operation of the decrypter; and a transmitter operable to transmit the verification source data to the information processing device.

According to this structure, the information processing device uses verification source data generated by the management device and can thus verify the data blocks (or decryption process) so as to guarantee the validity thereof.

A management device pertaining to a twenty-second aspect of the present invention further comprises: a receiver operable to receive verification results for each of the data blocks from the information processing device; a determiner operable to determine, from the verification results so received, whether or not tampering has occurred in the decrypter; and an update instructor operable, when the determiner makes an affirmative determination, to instruct the information processing device to update the decrypter.

According to this structure, a decrypter in which tampering has occurred can be updated, thus preventing the information processing device from leaking confidential data.

A management device pertaining to a twenty-third aspect of the present invention is connected to an information processing device that verifies each of a plurality of sub-processes, the information processing device having a decrypter operable to decrypt data input thereto in encrypted form through the plurality of sub-processes, the management device comprising: a verification source data generator operable to generate verification source data from the input data for the sub-processes and from the output data expected to result from normal operation of the decrypter for each of the sub-processes; and a transmitter operable to transmit the verification source data so generated to the information processing device.

In a management device pertaining to a twenty-fourth aspect of the present invention, the decrypter of the information processing device decrypts a plurality of applications in encrypted form, and the verification source data generator generates a plurality of pieces of verification source data that include, for each of the applications, the following (i), (ii), and (iii) corresponding to each of the sub-processes: (i) an application in encrypted form, (ii) a verification value indicating a correspondence between input data and output data for the sub-process as expected from normal operations of the decrypter, and (iii) a combined data verification value generated from the combined data of a plurality of verification values.

A management device pertaining to a twenty-fifth aspect of the present invention comprises a challenge data generator operable to generate a plurality of pieces of challenge data; a verification data generator operable to generate verification data showing a correspondence between each piece of challenge data and output data expected to result from normal operation of a predetermined process taking the challenge data as input data; and a transmitter operable to transmit the challenge data and the verification data to the information processing device.

According to such a structure, the information processing device uses verification source data generated by the management device and can thus verify each decryption sub-process so as to guarantee the validity thereof.

Embodiments of the present invention are described below with reference to the drawings.

[Embodiment 1]

The following describes, as Embodiment 1, an illegal module detection system 1 to which are applied an information processing device and a management device pertaining to the present invention.

1. Illegal Module Detection System 1 Configuration

FIG. 1 shows the overall configuration of the illegal module detection system 1.

As shown in FIG. 1, the illegal module detection system 1 comprises an apparatus 100, which is the information processing device pertaining to the present invention, and a management device 200 which is the management device pertaining to the present invention. The apparatus 100 and the management device 200 are connected via a network.

(1) Apparatus 100 Configuration

The apparatus 100 provides various services to users via the network. For example, the apparatus 100 can be used to access a content distribution server and then purchase and play back music and video content therefrom, or to access a financial institution system for online banking (such as balance inquiries and transfers), and so on.

As shown in FIG. 1, the apparatus 100 includes application 110, application 111, application 112, application 113, application 114, a protection control module 120, and a detection module group 130.

Each of the applications 110, 111, 112, 113, and 114 consists of software that provides various functions to the user of the apparatus 100 via the network. Examples include software for purchasing music or video content from an undiagrammed content distribution server and playing back the content so purchased, software for accessing an undiagrammed financial institution system for balance inquires or money transfer, and so on.

Each application has confidential data, such as authentication keys used for authentication by the content distribution server or financial institution system. Confidential data must be protected from malicious third parties (hereinafter referred to as attackers) attempting to extract data from the applications for illegal use.

The protection control module 120 is a module that controls functions for protecting each application from analysis by attackers attempting to extract confidential data, such as authentication keys, therefrom. The functions for protecting the applications include: a decryption loading function that encrypts and saves an application when not in use and decrypts the application only at use time, a tamper detecting function that checks whether or not an application has been tampered with (hereinafter termed compromised), and an analytic tool detecting function that checks for activity by analytic tools such as debuggers.

The protection control module 120 controls the operation of these functions and checks whether or not each of the applications has been analyzed by attackers. When an attack is detected, the protection control module 120 stops the operation of the application where the attack was detected and prevents confidential data leaks through such processes as clearing the memory areas used by the application, particularly the memory areas where the confidential data was recorded (i.e. filling such memory areas with zeroes).

As shown in FIG. 1, the detection module group 130 is made up of three detection modules 131, 132, and 133.

The detection modules 131, 132, and 133 determine whether or not the encrypted content decryption by the protection control module 120 has been performed correctly in order to verify whether or not the protection control module 120 has been compromised.

In addition, detection modules 131, 132, and 133 perform mutual surveillance in order to prevent the detection modules themselves from being compromised and used in unauthorized ways by attackers. This mutual surveillance consists of the detection modules executing the tamper detection process on each other. Accordingly, the reliability of the apparatus 100 is improved as any attacks on a detection module included in the detection module group 130 can be detected.

Each detection module transmits the verification results concerning the protection control module 120 as well as the results of the inter-modular mutual surveillance process to the management device 200 via the network.

The following explanations of the applications 110, 111, 112, 113, and 114 may omit the reference signs when no particular application is designated.

Similarly, the reference signs may be omitted from the explanations when no particular one of the detection modules 131, 132, and 133 is designated.

(Protection Control Module 120 Configuration Details)

Figure 2:
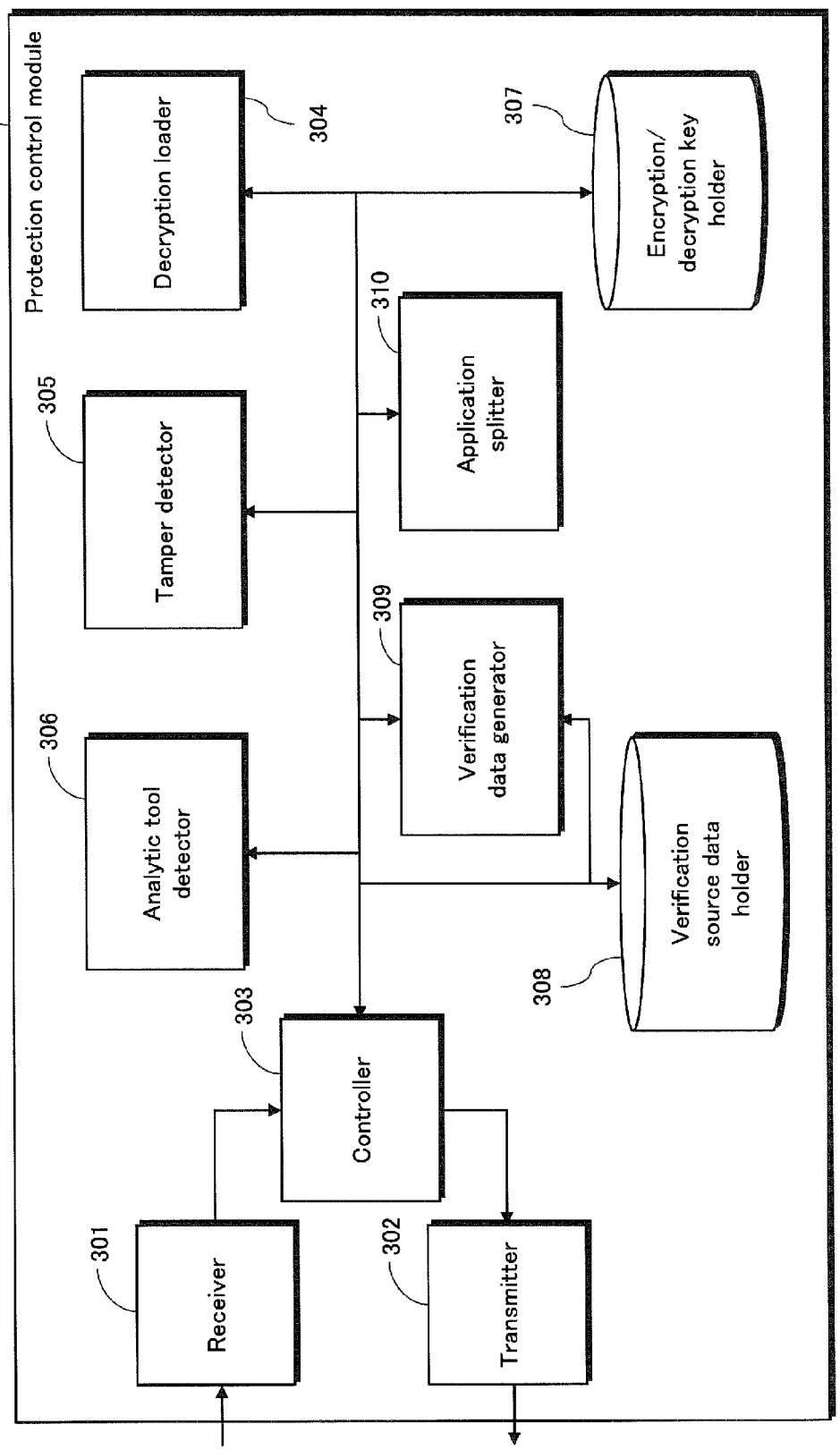
FIG. 2 is a block diagram of a protection control module 120 pertaining to Embodiment 1.

FIG. 2 is a functional block diagram showing the functional structure of the protection control module 120.

As shown, the protection control module 120 comprises a receiver 301, a transmitter 302, a controller 303, a decryption loader 304, a tamper detector 305, an analytic tool detector 306, an encryption/decryption key holder 307, a verification source data holder 308, a verification data generator 309, and an application splitter 310.

The receiver 301 receives distribution information and various requests from the detection modules.

The transmitter 302 transmits requests and the like to the detection modules.

The controller 303 controls the decryption loader 304, the tamper detector 305, and the analytic tool detector 306 to detect any attacks on the applications.

The decryption loader 304 uses an encryption/decryption key to decrypt an encrypted application 110, 111, 112, 113, or 114 and load same into memory at execution time. Also, if a context switch to another application is triggered during execution of the application 110, 111, 112, 113, or 114, the decryption loader 304 uses the encryption/decryption key to encrypt the data loaded into memory. The encrypted data are later decrypted when the context switch returns to the application 110, 111, 112, 113, or 114.

The tamper detector 305 detects whether or not tampering has occurred in each of the applications. The tamper detection process may be one of two methods, one of which involves the use of a tamper-detection certificate attached to each application while the other involves the comparison of MAC values.

The analytic tool detector 306 detects the installation or operation of analytic tools such as debuggers and the like. An illicit attacker could plausibly install and operate analytic tools in order to attack the applications. The detection method may involve searching for file names, investigating whether or not any special registers used by debuggers have been used, detecting interrupts set by debuggers, and other such methods.

The encryption/decryption key holder 307 holds the encryption/decryption key used to encrypt and decrypt the applications.

The verification source data holder 308 holds verification source data received from the management device 200. The structure of the verification source data will be described later.

The verification data generator 309 generates verification data from the verification source data held by the verification source data holder 308. The verification data generation process will be described later.

The application splitter 310 splits the data of each application decrypted by the decryption loader 304.

(Detection Module 131 Configuration Details)

The details of the detection modules 131, 132, and 133 are described next.

Figure 3:
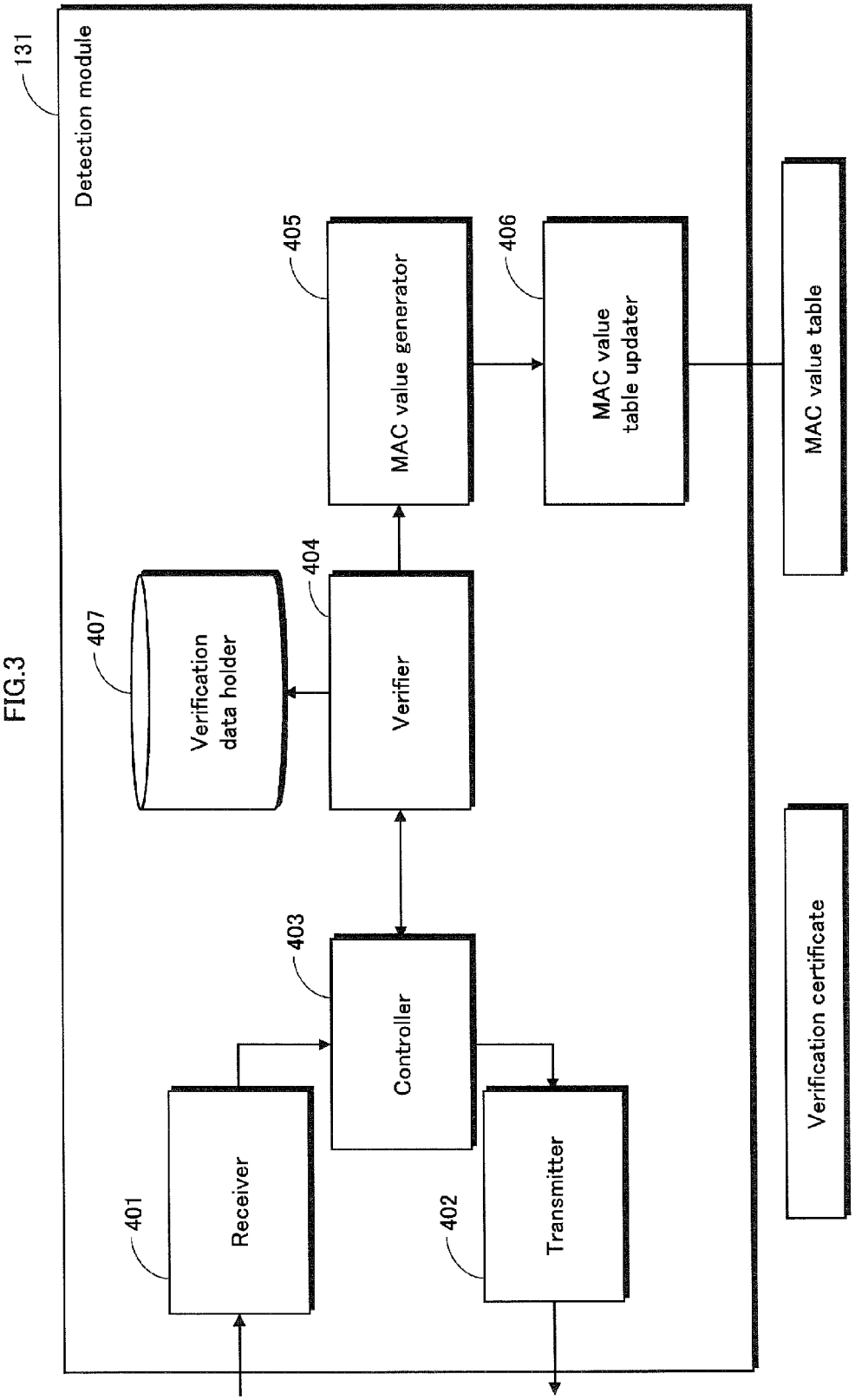
FIG. 3 is a block diagram of a detection module 131 pertaining to Embodiment 1.

FIG. 3 is a functional block diagram showing the functional structure of detection module 131. Detection modules 132 and 133 share the same configuration as detection module 131.

Detection module 131 comprises of a receiver 401, a transmitter 402, a controller 403, a verifier 404, a MAC value generator 405, a MAC value table updater 406, and a verification data holder 407.

The receiver 401 receives various instructions from the management device 200. Also, the receiver 401 receives other detection modules as required in order to perform mutual surveillance therewith. Furthermore, the receiver 401 receives the results of processes requested from other modules, protection control module 120 verification results from other detection modules, and the like.

The transmitter 402 transmits data, such as various process results, certificates, and the like, to the management device 200, the protection control module 120, and the other detection modules.

The controller 403 controls the verifier 404 according to the instructions received by the receiver 401 to perform verification on the protection control module 120 and on the other detection modules.

The verifier 404 uses the verification data held by the verification data holder 407 to verify whether the protection control module 120 is operating normally.

In addition, the verifier 404 uses certificates attached to each of the detection modules, MAC values pre-calculated for use in verification, and the like to verify whether or not the detection modules have been compromised. The timing and the target module of the tamper detection process performed by the verifier 404 are preemptively assigned by the management device 200. If instructed by the management device 200 to change such parameters as the tamper detection target module or the timing at which tamper detection is performed, the verifier 404 does so accordingly.

The MAC value generator 405 holds a verification key therein. When the verifier 404 uses MAC values for the tamper detection process, the MAC value generator 405 generates MAC values therefor using the verification key.

The MAC value table updater 406 updates a MAC value table that contains the MAC value of each module. The MAC value table contains module identifiers identifying the modules and a MAC value corresponding thereto. The MAC value generator 405 acquires the module on which the tamper detection process is to be performed and calculates the MAC value thereof. The verifier 404 performs tamper detection by comparing the MAC value so calculated with the MAC value of the target module as stored in the MAC value table.

The verification data holder 407 holds verification data for verifying whether or not the decryption loader 304 of the protection control module 120 is operating normally. The verification data are received by the protection control module 120.

The details of the signature scheme are explained in Non-Patent Literature 1. The details of certificates, as well as those of the distribution information, are explained in Non-Patent Literature 2. Also, the details of the distribution information are discussed in Non-Patent Literature 2.

(Apparatus 100 Hardware Configuration)

Figure 4:
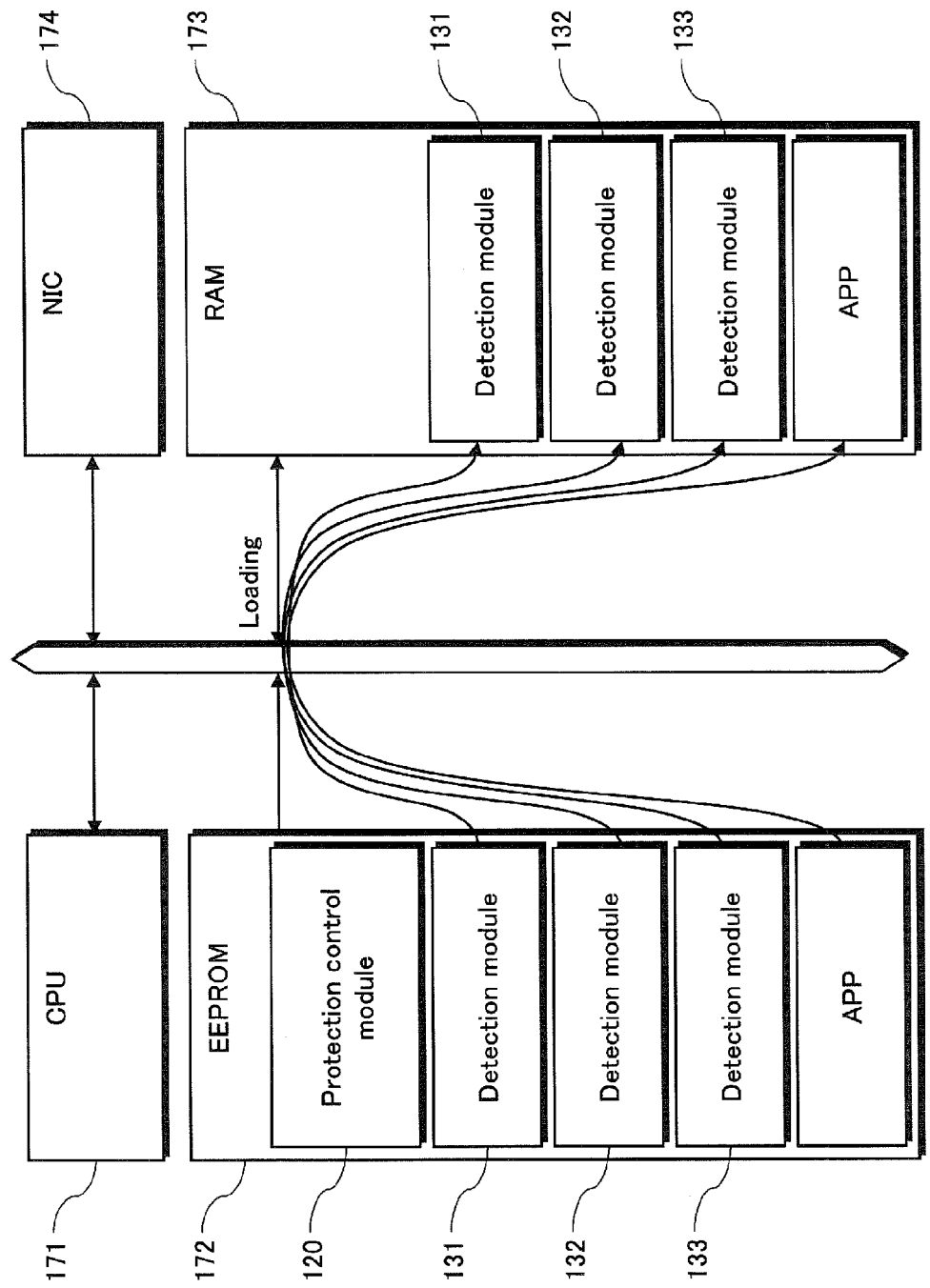
FIG. 4 is a hardware configuration diagram of an apparatus 100 pertaining to Embodiment 1.

The following describes the hardware configuration of the apparatus 100, with reference to FIG. 4.

As shown, the apparatus 100 includes a CPU (Central Processing Unit) 171, a non-volatile EEPROM (Electrically Erasable and Programmable Read-Only Memory) 172, RAM (Random Access Memory) 173, and a NIC (Network Interface Card) 174. The above are connected via a bus so as to communicate with one another.

The EEPROM 172 stores therein the protection control module 120, detection modules 131, 132, and 133, as well as the applications.

Each of the modules stored in the EEPROM 172 realizes all functions thereof in execution by the CPU 171. The specifics of each of the functions are described by computer programs.

The RAM 173 is used as the work area of the CPU 171. Each detection module and each of the applications are loaded into the RAM 173. The detection module operating in the RAM 173 is the target of the tamper detection process.

The NIC 174 is an expansion card for connecting to the network.

(Apparatus 100 Software Hierarchy)

Figure 5:
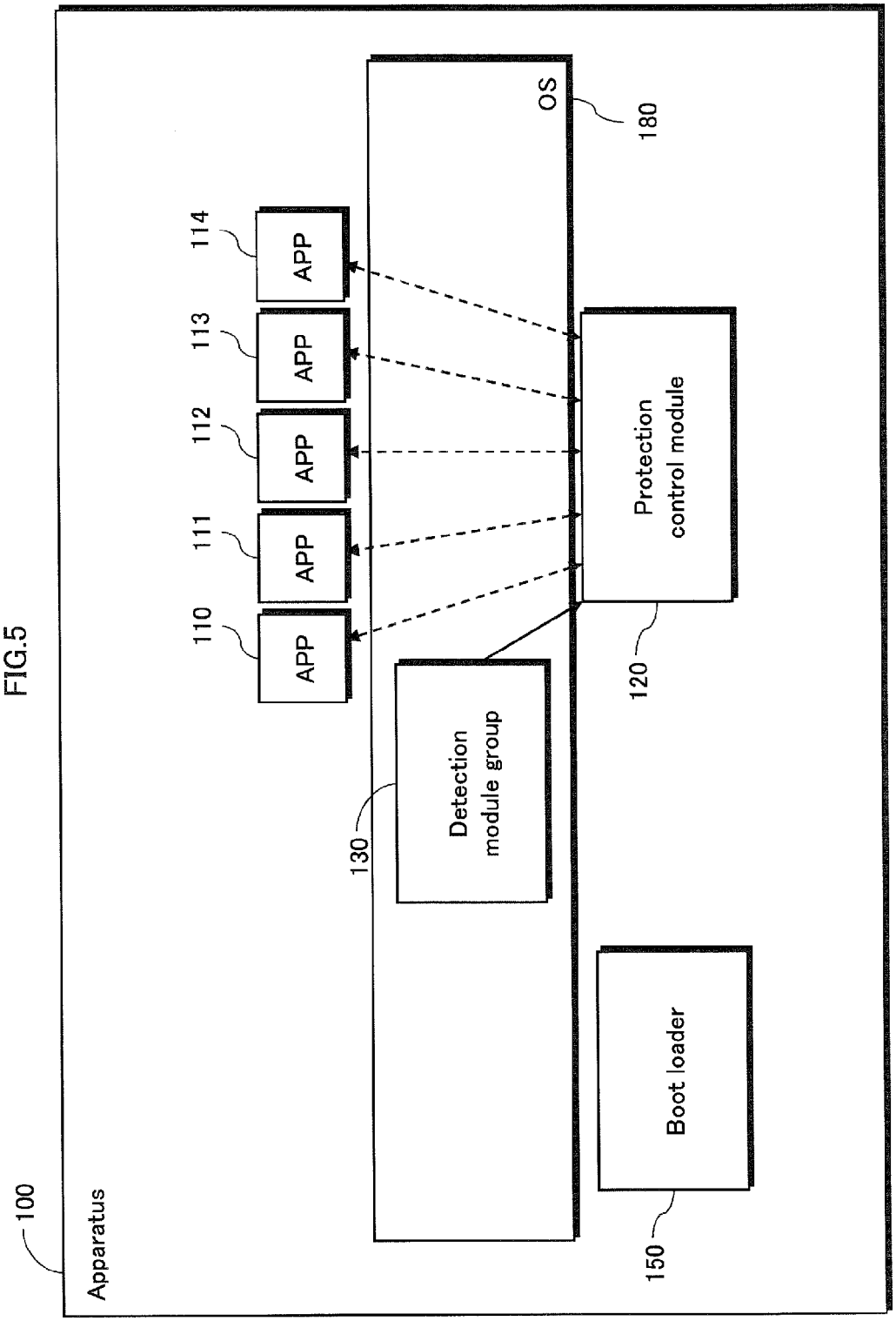
FIG. 5 is a software hierarchy diagram of the apparatus 100 pertaining to Embodiment 1.

The following describes the software hierarchy of the apparatus 100, with reference to FIG. 5.

As shown, the detection module group 130 is installed into an OS 180. Applications 110, 111, 112, 113, and 114 operate within the OS 180, while the protection control module 120 and a boot loader 150 are outside OS 180 control.

When the apparatus 100 is started up, the protection control module 120 and the detection module group 130 are run first, before any application is executed.

(2) Management Device 200 Configuration

Returning to FIG. 1, the configuration of the management device 200 is explained next.

The management device 200 generates the verification source data needed in order to verify whether or not the protection control module 120 is operating correctly, and then delivers these data to the apparatus 100. The management device 200 comprises a determiner 210, a verification source data distributor 220, and a communicator 230. The communicator 230 communicates with the apparatus 100 via the network. Secure communication channels, in which data are encrypted, may also be used for communication between the apparatus 100 and the management device 200.

Specifically, the management device 200 is a computer system that comprises a CPU, ROM, RAM, a hard disk unit, and so on. The management device 200 performs the above-described functions through operation by the CPU according to computer programs stored in ROM or on the hard disk unit.

(Determiner 210 Configuration Details)

Figure 6:
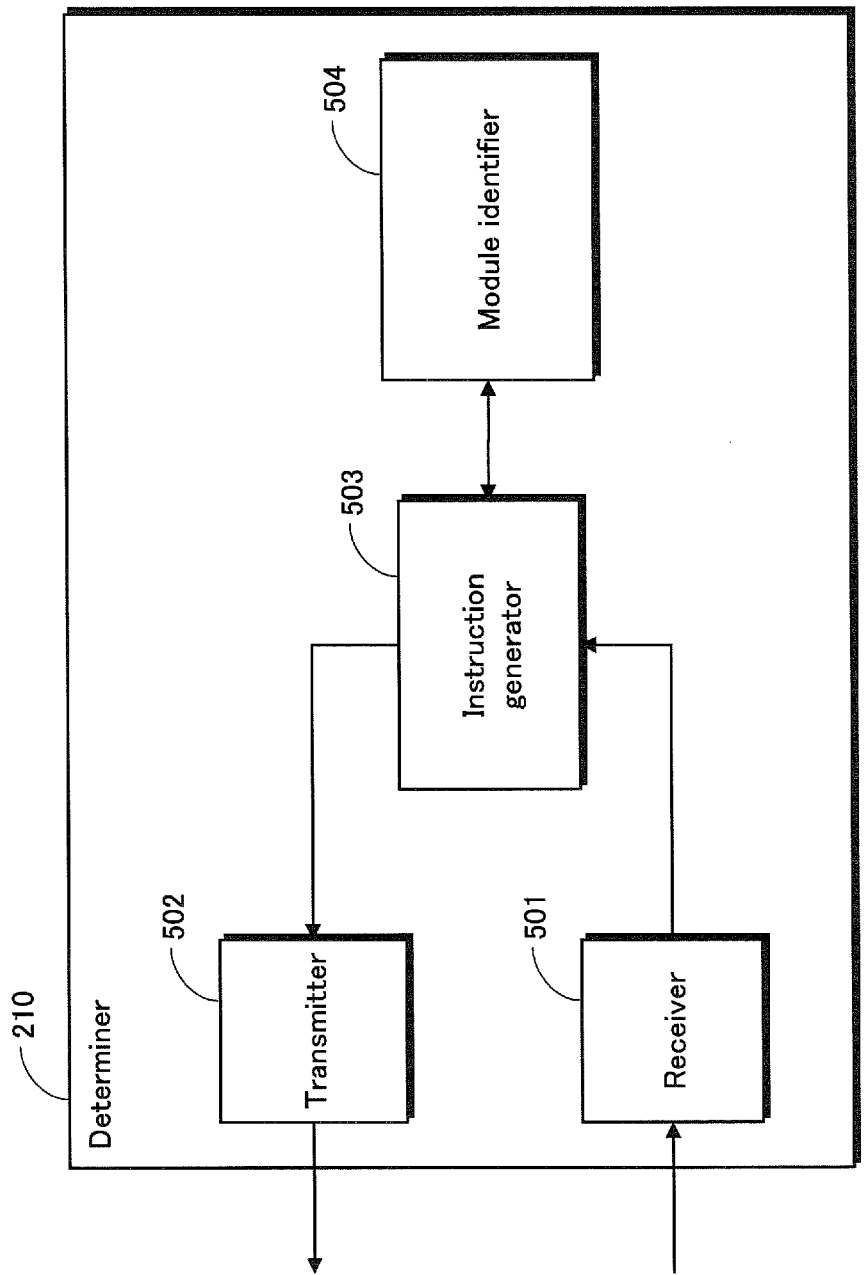
FIG. 6 is a block diagram of a determiner 210 pertaining to Embodiment 1.

FIG. 6 is a functional block diagram showing the functional structure of the determiner 210. As shown, the determiner 210 comprises a receiver 501, a transmitter 502, an instruction generator 503, and a module identifier 504.

The receiver 501 receives verification results and various requests from the detection modules and outputs these to the instruction generator 503. In addition, the receiver 501 notifies the instruction generator 503 upon receiving a process completion notification from the verification source data distributor 220.

The transmitter 502 transmits instructions generated by the instruction generator 503 to the verification source data distributor 220.

The instruction generator 503 outputs tamper detection results (hereinafter occasionally referred to as mutual surveillance results) received from the detection modules to the module identifier 504. The instruction generator 503 also acquires information from the module identifier 504 that identifies compromised detection modules, and then uses the information so acquired to generate instructions for the verification source data distributor 220. In addition, the instruction generator 503 generates instructions for the verification source data distributor 220 upon receiving a verification data generation request from the detection modules.

The module identifier 504 identifies any unauthorized detection modules by using the mutual surveillance results received from the detection modules. The module identifier 504 outputs information identifying unauthorized detection modules to the instruction generator 503.

For example, if two detection modules are deemed compromised (i.e. tampered with), the module identifier 504 identifies such detection modules as unauthorized.

(Verification Source Data Distributor 220 Configuration Details)

Figure 7:
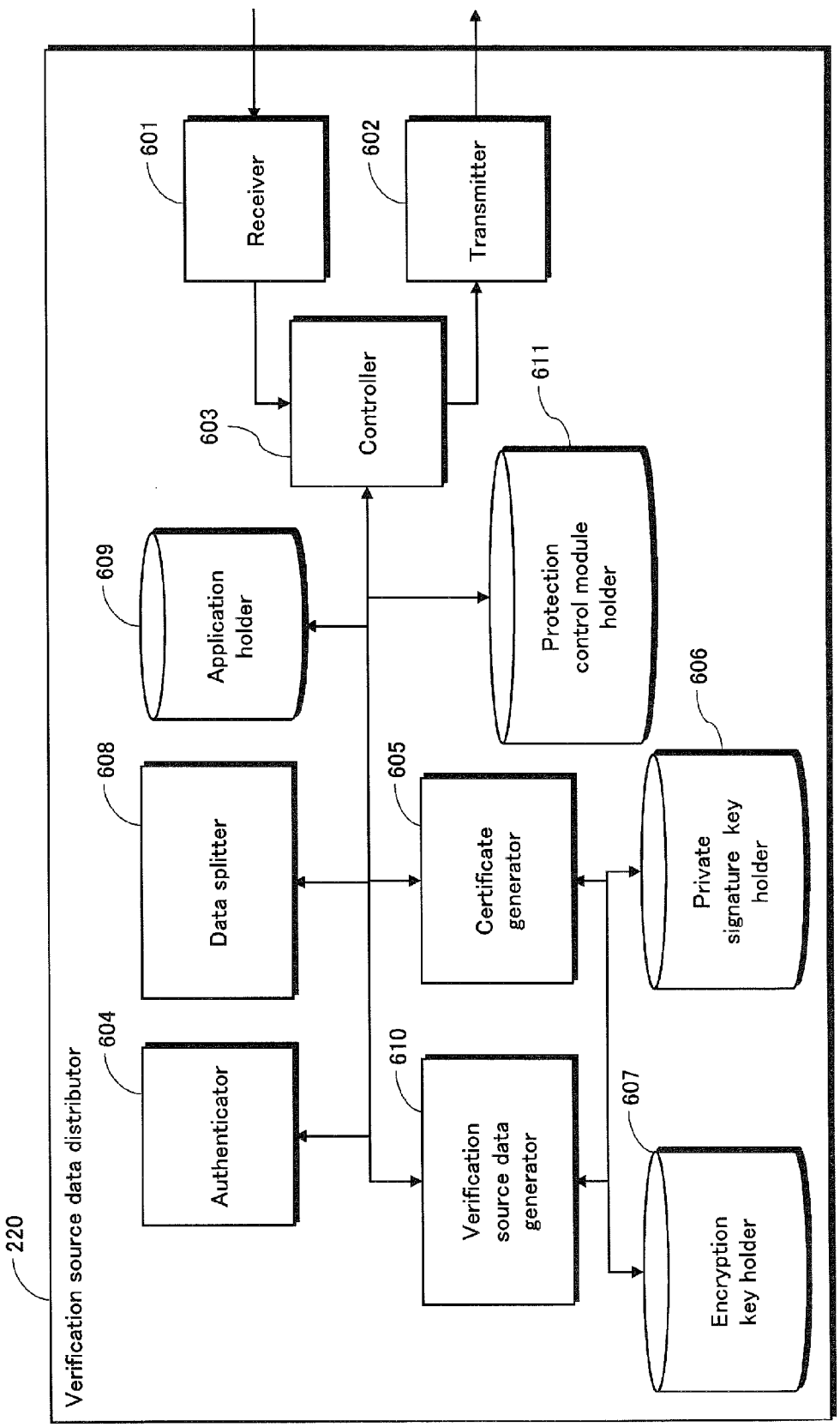
FIG. 7 is a block diagram of a verification source data distributor 220 pertaining to Embodiment 1.

FIG. 7 is a functional block diagram showing the functional structure of the verification source data distributor 220.

As shown, the verification source data distributor 220 comprises a receiver 601, a transmitter 602, a controller 603, an authenticator 604, a certificate generator 605, a private signature key holder 606, an encryption key holder 607, a data splitter 608, an application holder 609, a verification source data generator 610, and a protection control module holder 611.

The receiver 601 receives protection control module verification results from the detection modules, as well as intermodular mutual surveillance results.

The transmitter 602 transmits tamper verification requests for each application and for the protection control module 120, mutual surveillance requests for the detection module group 130, the required verification source data, and the like to the apparatus 100.

The controller 603 controls each component of the verification source data distributor 220.

The authenticator 604 performs mutual authentication with each of the detection modules and with the protection control module 120.

The certificate generator 605 uses the private signature key held by the private signature key holder 606 to generate signature data for the decryption loader 304 of the protection control module 120 to use in decrypting the encrypted applications.

The private signature key holder 606 holds therein the private signature key of the management device 200. This key is used by the certificate generator 605 to generate signature data.

The encryption key holder 607 holds an encryption key therein. This key is shared with the protection control module 120.

The data splitter 608 splits the data output by the decryption loader 304 of the protection control module 120 upon decrypting the encrypted applications (decrypted plain-text application data) into multiple blocks.

The application holder 609 holds therein each application installed on the apparatus 100.

The verification source data generator 610 generates verification source data from the encrypted application data input to the decryption loader 304 (input data) and from the plain-text application data output from normal operations of the decryption loader 304 as split into blocks by the data splitter 608. The verification source data generator 610 then transmits the verification source data so generated to the apparatus 100. The structure of the verification source data will be described later.

The protection control module holder 611 holds therein the protection control module 120 installed on the apparatus 100.

Figure 8:
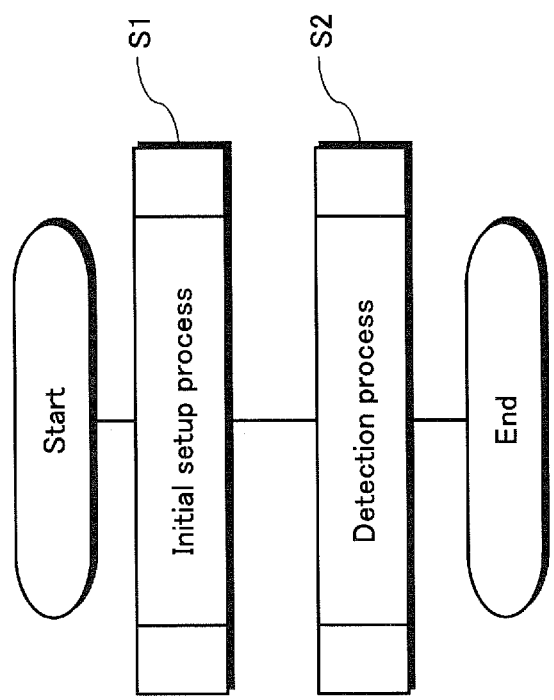
FIG. 8 is a flowchart showing the overall operations of the illegal module detection system 1 pertaining to Embodiment 1.

2. Illegal Module Detection System 1 Operations (1) Overall Operations Outline FIG. 8 is a flowchart showing an outline of the overall operations of the illegal module detection system 1.

First, an initial setup process is performed on the apparatus 100 upon factory assembly (step S1). The initial setup process involves loading all key data required to update the protection control module 120, as well as loading all data required after software updates (distribution information distributed using a private distribution method) and the like into each of the detection modules 131, 132, and 133.

Afterward, the apparatus 100 is shipped from the factory and provided to the user.

When the apparatus 100 is used, the protection control module 120 within the apparatus 100 protects the applications against attackers. Also, the detection modules 131, 132, and 133 perform the detection process on the protection control module 120 (step S2).

The illegal module detection system 1 also has the detection modules 131, 132, and 133 perform mutual surveillance in order to detect tampering. Mutual surveillance is regularly performed as part of the detection process in step S2.

(2) Initial Setup Operations

The initial setup process of step S1 is explained next.

Figure 9:
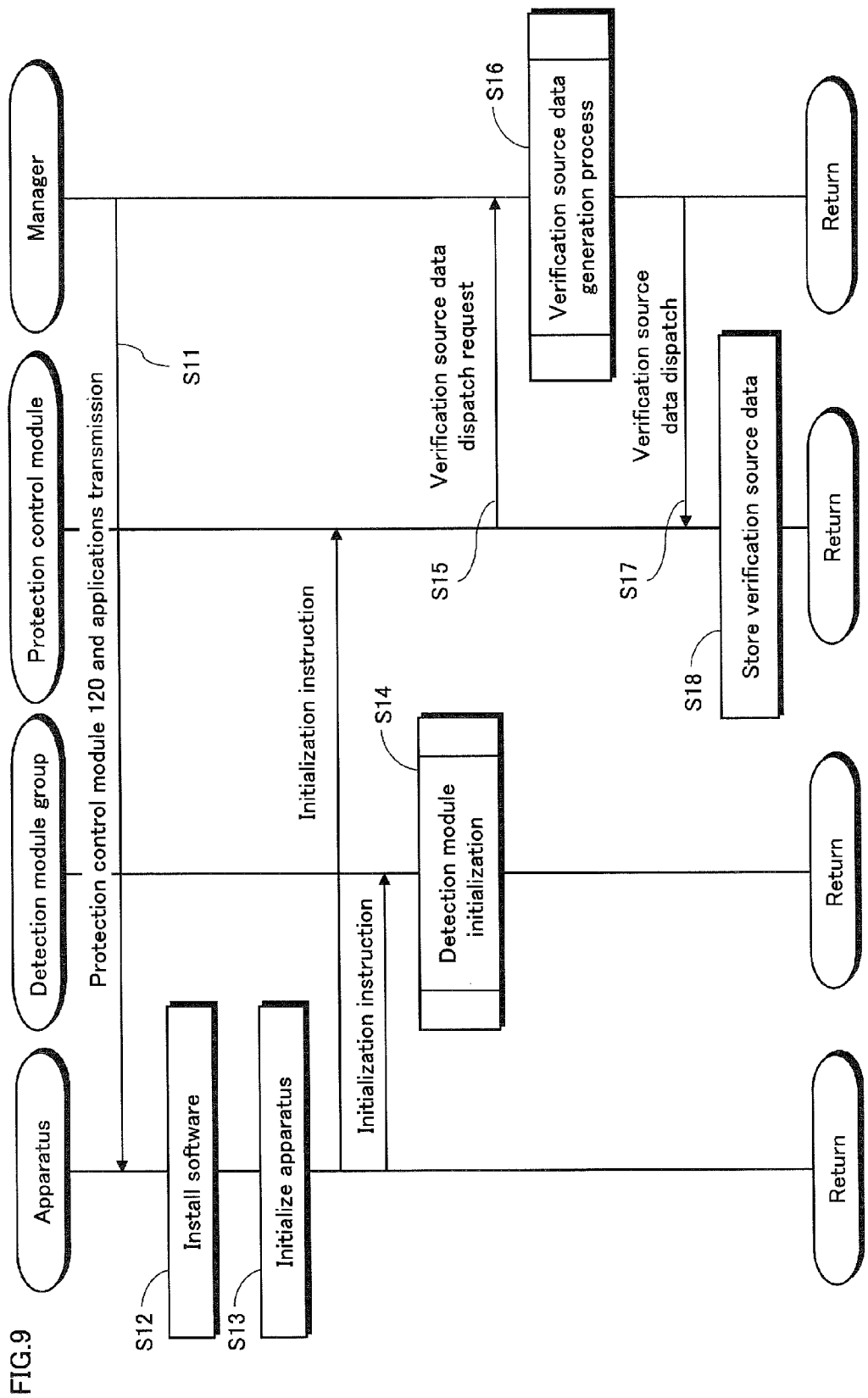
FIG. 9 is a sequence diagram showing the initial setup process pertaining to Embodiment 1.

FIG. 9 is a sequence diagram showing the initial setup process. In the following, the process performed individually by each detection module is described as performed by the detection module group 130.

When the apparatus 100 is manufactured, the management device 200 transmits thereto the protection control module 120 held by the protection control module holder 611 and each of the applications held by the application holder 609 (step S11).

The apparatus 100 installs the applications and protection control module 120 so received (step S12). In addition to the applications and the protection control module 120, the apparatus 100 also installs the detection modules 131, 132, and 133 and the software necessary for operations. The software so installed has a certificate attached thereto for verifying whether tampering has occurred (tamper detection certificate). The tamper detection certificate is signed with the private signature key of the management device 200.

Once software installation is complete, the apparatus 100 performs an initial setup process to test whether or not the software is operating properly (step S13).

The detection module group 130 initializes the detection modules (step S14).

The protection control module 120 requests dispatch of verification source data from the management device 200 (step S15). Upon receiving this request from the protection control module 120, the management device 200 generates the verification source data (step S16), and then transmits the verification source data to the protection control module 120 (step S17). The protection control module 120 then stores the verification source data received from the management device 200.

(3) Detection Module Initial Setup

The detection module initial setup process of step S14 is explained next.

Figure 10:
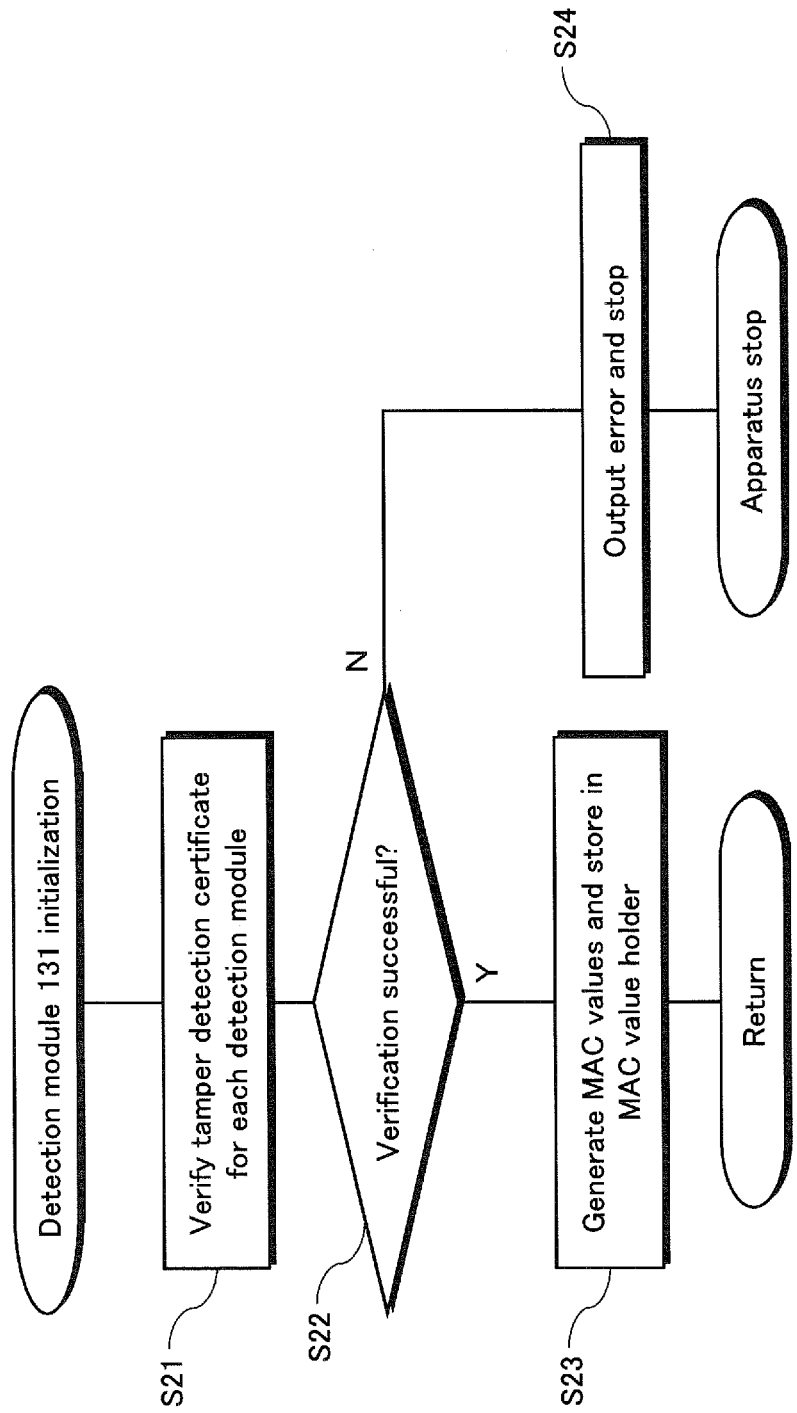
FIG. 10 is a flowchart of the initial setup for the detection modules pertaining to Embodiment 1.

FIG. 10 is a flowchart showing the initial setup process for the detection module 131.

Detection module 131 verifies the tamper detection certificate attached to another one of the detection modules which is the object of tamper detection (step S21).

Verification of the tamper detection certificate proceeds by generating a verification value from the detection module data, and then comparing the verification value so generated to the verification value written in the certificate. A hash value, a signature, or the like may also be used as the verification value.

If the generated verification value and the verification value in the tamper detection certificate are found to match (Y in step S22), then the detection module 131 generates MAC values for the other detection modules and for the protection control module 120, respectively, and stores these in the MAC value holder (step S23).

If the generated verification value and the verification value in the tamper detection certificate are found not to match (N in step S22), then an error is output and the process stops (step S24).

(4) Verification Source Data Generation Process

The verification source data generation process of step S16 is explained next.

Figure 11:
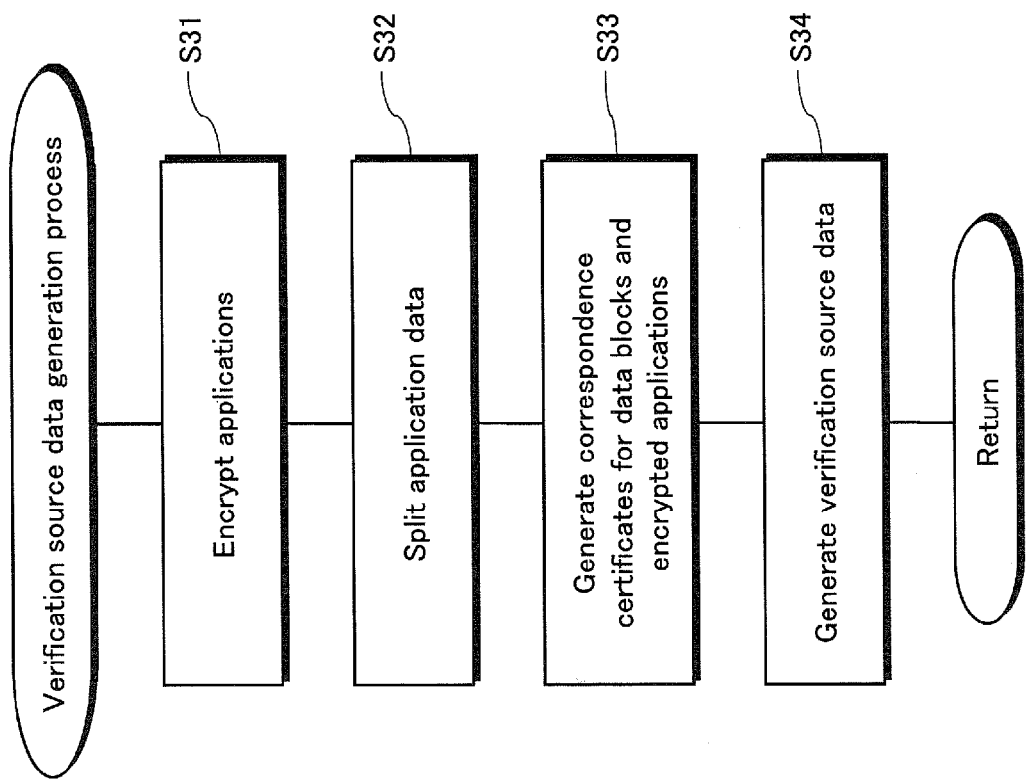
FIG. 11 is a flowchart showing the verification source data generation process pertaining to Embodiment 1.

FIG. 11 is a flowchart showing the verification source data generation process.

The verification source data generator 610 encrypts the applications held by the application holder 609 using the encryption key held by the encryption key holder 607 (step S31).

Figure 12:
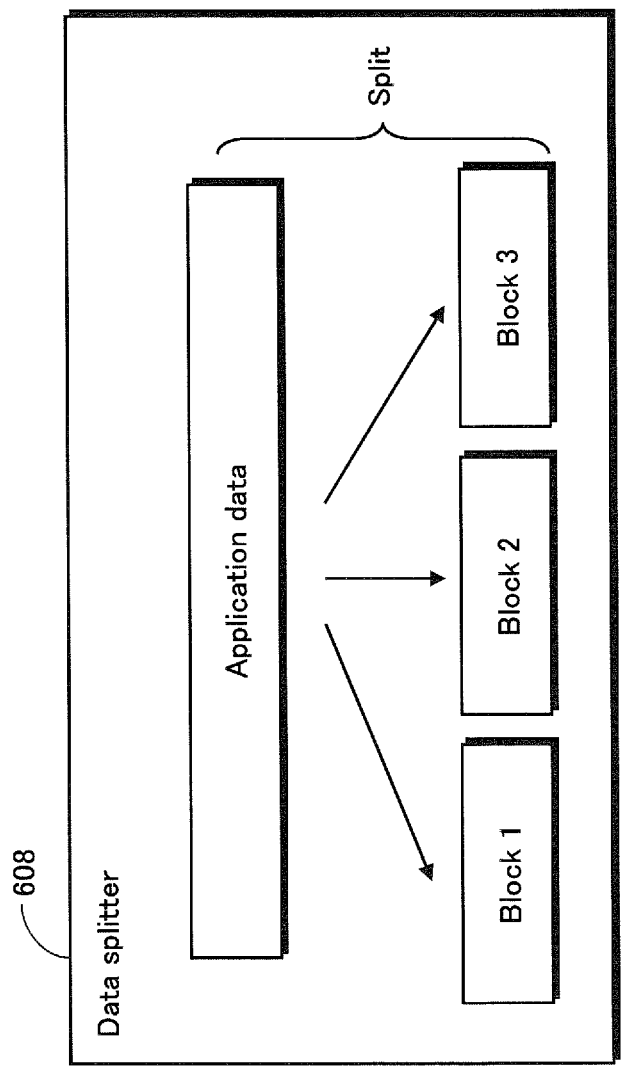
FIG. 12 is a diagram explaining the data blocks pertaining to Embodiment 1.

Meanwhile, the data splitter 608 splits the data of each application as shown in FIG. 12 (step S32).

The splitting method involves splitting application data loaded in memory into blocks that are either uniformly-sized or variably-sized. Alternatively, the application data may be split through division by a plurality of divisors. The Chinese remainder theorem may be used to ensure that the application data so split can be recovered. The Chinese remainder theorem is described on page 15 of Non-Patent Literature 1.

In the following example, the application data is split into three blocks.

The verification source data generator 610 generates certificates that show the correspondence between the encrypted application and each data block (block 1, block 2, and block 3) split by the data splitter 608 (step S33). In addition, the verification source data generator 610 generates verification source data including the certificates generated in step S33 (step S34).

The verification source data are described with reference to FIGS. 13, 14, and 15.

The certificate 701 illustrated in FIG. 13 shows the correspondence between the encrypted application and data block 1. The certificate 702 illustrated in FIG. 14 shows the correspondence between the encrypted application and data block 2. The certificate 703 illustrated in FIG. 15 shows the correspondence between the encrypted application and data block 3.

Each certificate is made up of block information, judgment information, and identification information, as well as encrypted application data and verification values corresponding thereto for every application, and finally a decryption process certificate for the block.

The block information indicates which portions of all data are included in a given block.

For example, if the application data has been split into three blocks of uniform size, then block information 1 indicates (3,1) or the like. This shows that the data in question belongs to the first of three blocks. Similarly, block information 2 is (3,2), and block information 3 is (3,3). Alternatively, if the application data is divided using three distinct divisors, then the block information indicates something like (3,17). This shows that there are three blocks in all and that the length value is 17.

The block information is not limited to these possibilities. Any information that serves to distinguish each of the data blocks from one another may be used.

The judgment information is used to judge whether or not verification has been performed on all of the data blocks. For example, if the application data has been split into three blocks of uniform size, then the number of blocks is indicated as "3". Accordingly, if three different blocks are found, it follows that all blocks have been verified. Alternatively, if the application data has been divided by the divisors 7, 11, and 17, then the multiplied value of 7, 11, and 17, i.e. "1309", is indicated. Thus, the Chinese remainder theorem is satisfied.

If the public-key encryption method RSA is used to encrypt and decrypt the applications, then in order to satisfy the Chinese remainder theorem, the judgment information should be set to a value greater than n, the value of public key RSA encryption (where n=pq, p and q being prime numbers). If the common-key encryption method AES is used, then the judgment information should be a value greater than 128 bits. RSA encryption is discussed on pages 110 through 113 of Non-Patent Literature 1.

The judgment information can be held by each of the detection modules instead of being included in the certificates. Alternatively, one detection module may hold the judgment information and transmit the judgment information to the other detection modules.

The verification values are hash values of data combining the encrypted application data and the block data. The data used to calculate these hash values may also include the application identification information, the protection control module 120 identification information, and the like.

The decryption process certificate is signature data generated using the private signature key of the management device 200 on a hash value calculated from the data of five combined verification values.

The verification source data include the three certificates illustrated in FIGS. 13, 14, and 15.

(5) Detection Process Operations

The detection process of step S2 is explained below.

Figure 16:
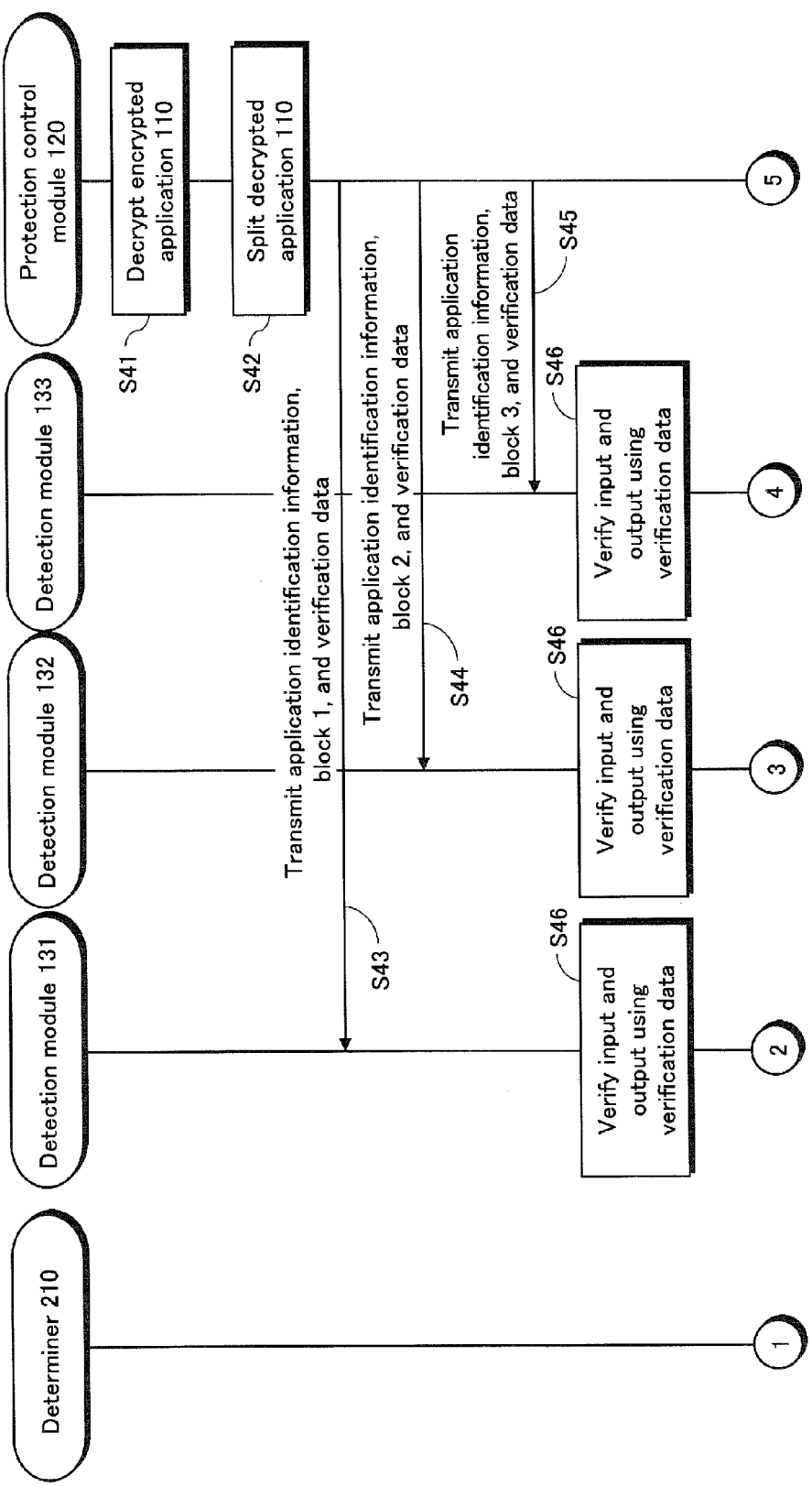
FIG. 16 is a sequence diagram of the detection process pertaining to Embodiment 1.
Figure 17:
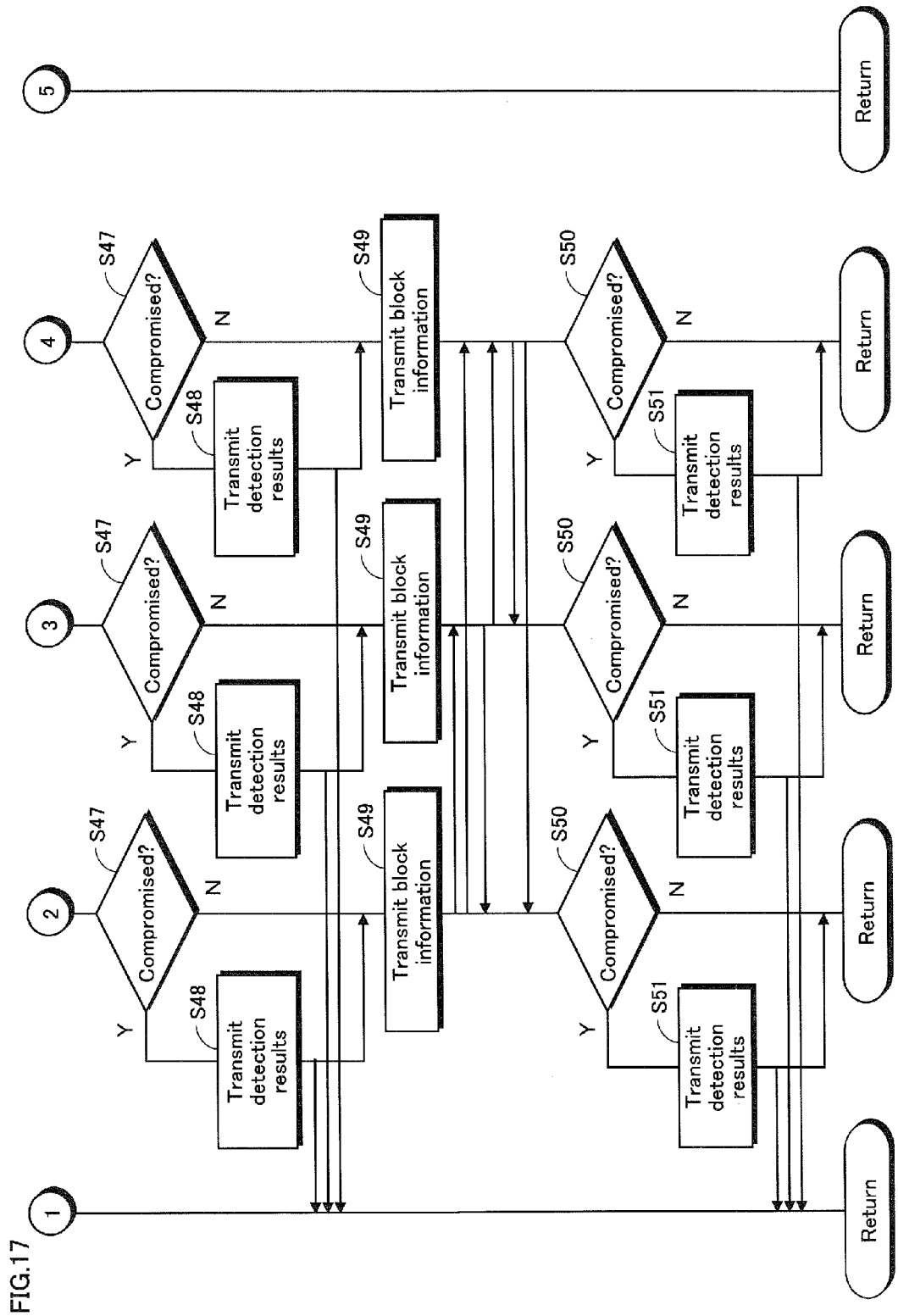
FIG. 17 is a sequence diagram of the detection process pertaining to Embodiment 1.

FIGS. 16 and 17 are sequence diagrams showing the detection process.

Upon receiving a command to execute application 110, the protection control module 120 decrypts encrypted application 110 with the decryption loader 304 (step S41).

Then, the application splitter 310 splits the decrypted application 110 according to the block information included in the verification source data held by the verification source data holder 308 (step S42). If the block information indicates three blocks, then the application is split into three. The following explanations describe an application split into three.

The protection control module 120 distributes the application identification information, the data blocks, and the verification data corresponding thereto to the detection modules. The verification data consist of the certificates shown in FIGS. 13 through 15. The verification data generator 309 selects a certificate corresponding to one of the blocks from the verification source data held by the verification source data holder 308 and takes the selected certificate as verification data.

At this point, the protection control module 120 transmits the application identification information, block 1, and the verification data (the certificate 701 from FIG. 13) to detection module 131 (step S43), transmits the application identification information, block 2, and the verification data (the certificate 702 from FIG. 14) to detection module 132 (step S44), and transmits the application identification information, block 3, and the verification data (the certificate 703 from FIG. 15) to detection module 133 (step S45).

Each detection module uses the verification data to verify whether or not the application has been decrypted correctly by the protection control module 120 (step S46).

Specifically, each detection module generates a verification value from the encrypted application data included in the verification data and from the received block. Then, each detection module compares the verification value so generated to the value included in the verification data and determines whether or not the two values match. In addition, each detection module verifies the signature of the decryption process certificate.

If the detection modules find that the verification values do not match, or that the signature is invalid, then the protection control module 120 is judged to have been compromised (Y in step S47) and this result is transmitted to the determiner 210 (step S48).

If the detection modules find that the verification values match and that the signature is valid, then the protection control module 120 is judged to be uncompromised (N in step S47) and the block information included in the verification data is transmitted to the other detection modules (step S49).

The detection modules then confirm whether or not all of the blocks transmitted from the protection control module 120 have been verified. The specifics are described below.

Detection module 131 transmits block information 1 to detection module 132 and to detection module 133. Block information 1 shows that the block in question is the first of three blocks.

Detection module 131 receives block information 2 from the detection module 132 and receives block information 3 from detection module 133. Detection module 131 sees that the application data is split into three by reference to the judgment information included in the verification data. Then, by checking the content of the received block information 2 and 3, detection module 131 can discover that the second and third data blocks have been verified by detection modules 132 and 133, respectively.

Thus, each detection module is able to confirm that all blocks transmitted from the protection control module 120 have been verified by another one of the detection modules.

If not all blocks have been verified, or if all blocks have been transmitted to a single detection module, then the protection control module 120 is judged as having performed an unauthorized operation and thus, as having been compromised (Y in step S50). This result is transmitted to the determiner 210 (step S51).

(6) Verification Source Data Update Operations

In the illegal module detection system 1, when a new application is added to the apparatus 100, the verification source data held by the protection control module 120 must be updated.

Figure 18:
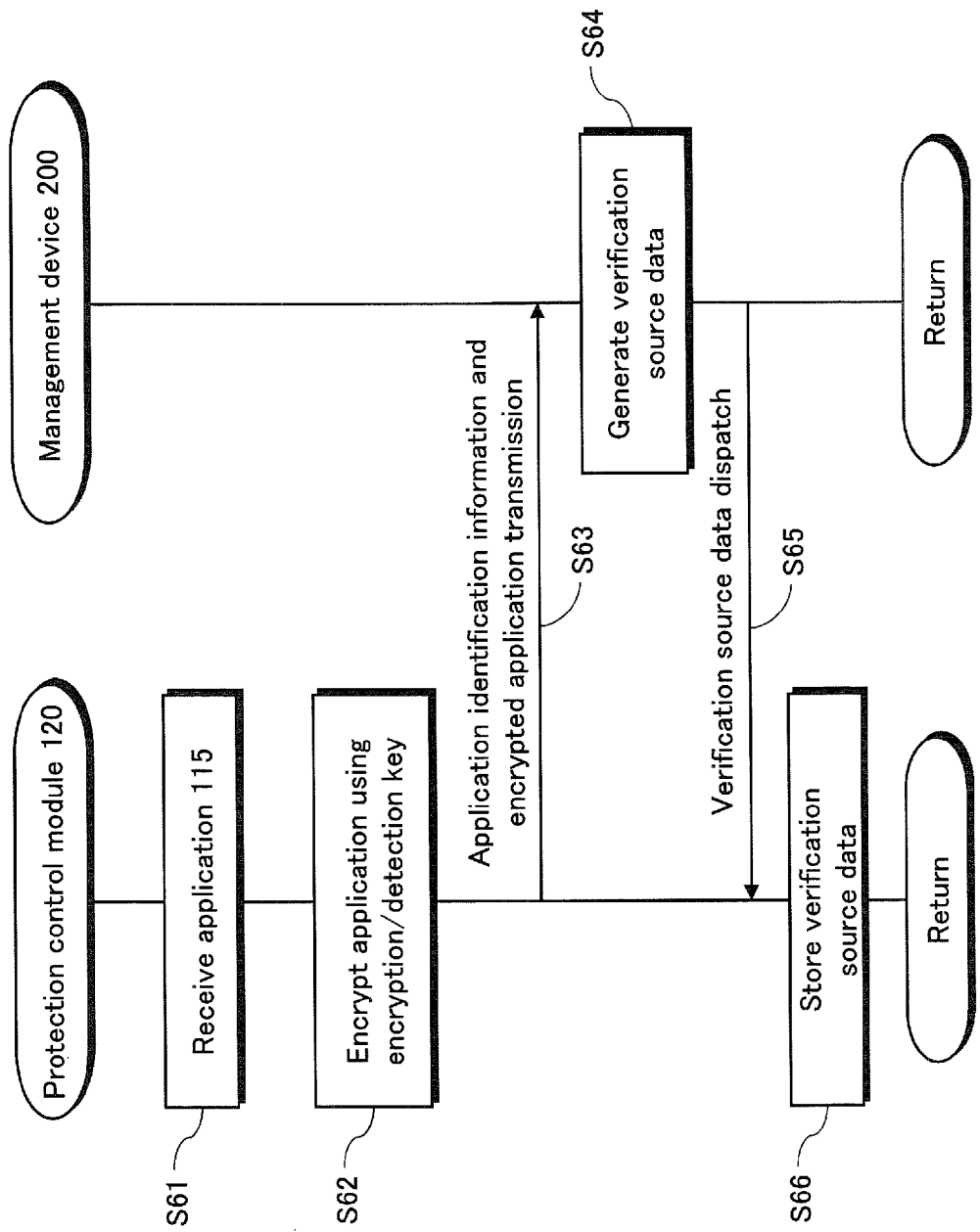
FIG. 18 is a sequence diagram of the verification source data update process pertaining to Embodiment 1.

The verification source data update process is explained through a specific example of the addition of a new application (hereinafter application 115) to the apparatus 100, described below with reference to the sequence diagram of FIG. 18.

Once the apparatus 100 downloads the new application 115, the protection control module 120 receives the application 115 (step S61). The protection control module 120 encrypts the application 115 using the encryption/decryption key held by the encryption/decryption key holder 307 (step S62). Then, the protection control module 120 transmits the identification information of the application 115, the encrypted application 115 itself, and a verification source data dispatch request to the management device 200 (step S63).

The management device 200 decrypts the encrypted application 115 with the encryption/decryption key of the protection control module 120 held by the protection control module holder 611. Then, the management device 200 generates new verification source data that includes the decrypted application 115 (step S64). Next, the management device 200 transmits the new verification source data to the protection control module 120 (step S65). Finally, the protection control module 120 receives and stores the new verification source data (step S66).

(7) Mutual Surveillance Process Operations

Figure 19:
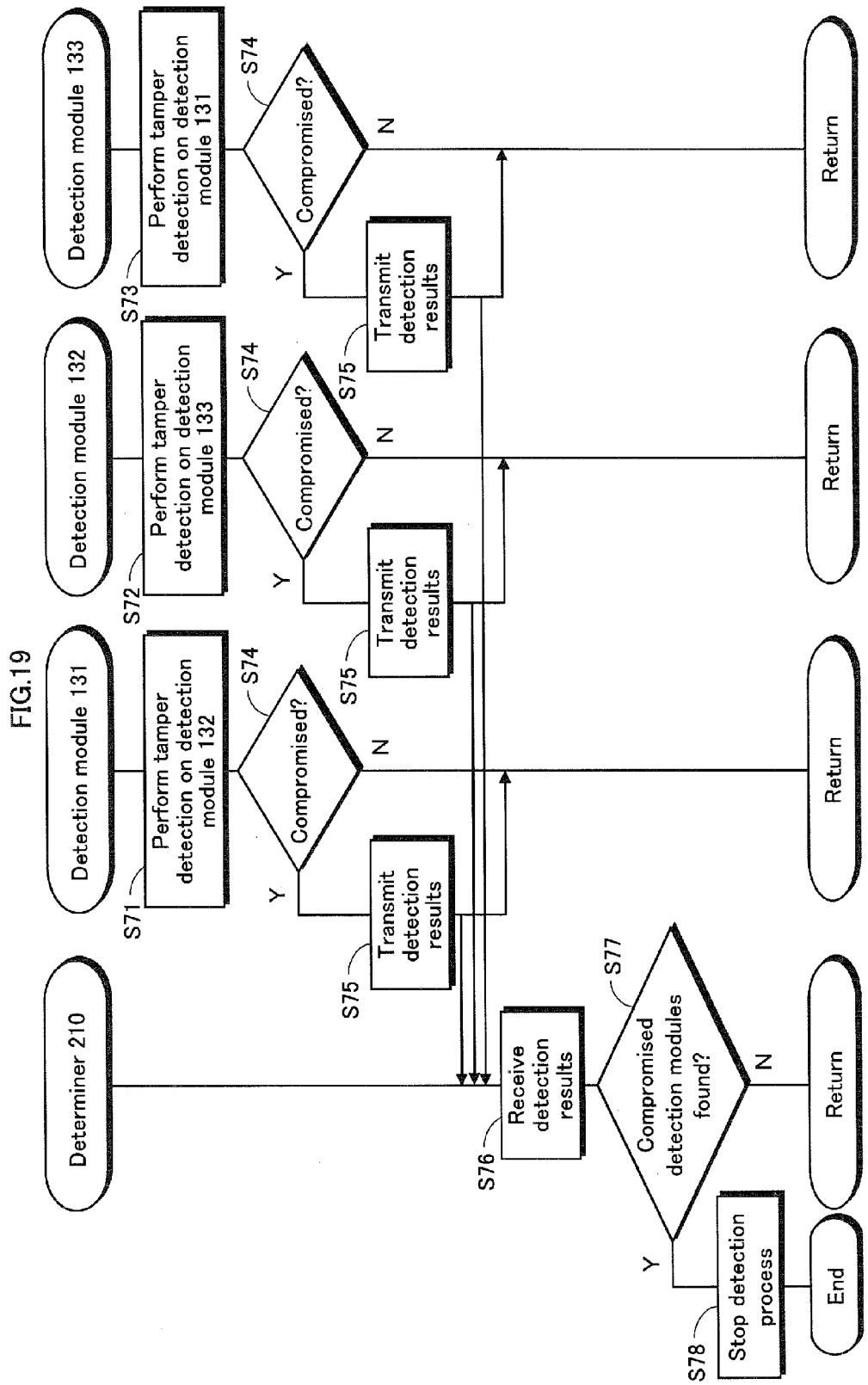
FIG. 19 is a sequence diagram of the mutual surveillance process pertaining to Embodiment 1.

Next, the mutual surveillance process by the detection module group 130 is explained using the sequence diagram of FIG. 19.

Detection module 131 performs the tamper detection process on detection module 132 (step S71), detection module 132 performs the tamper detection process on detection module 133 (step S72), and detection module 133 performs the tamper detection process on detection module 131 (step S73).

The tamper detection process of steps S71 through S73 is performed by calculating a MAC value for each detection module using the verification key and comparing the MAC values so calculated to the MAC values in the MAC value table. A hash value for each detection module may be used instead of the MAC values.

If any detection module detects tampering (Y in step S74), this result is transmitted to the determiner 210 (step S75).

The determiner 210 receives detection results from each detection module (step S76) and determines whether or not any of the detection modules have been compromised (step S77). If a compromised detection module is found (Y in step S77), then the determiner 210 notifies the apparatus 100 to stop the detection process (step S2) by the detection modules (step S78). If no compromised detection module is found (N in step S77), the process continues.

In this example, the determiner 210 uses the results of the mutual surveillance process to determine whether or not the detection modules have been compromised. However, the determiner 210 is not limited in this manner and may also determine that a given detection module has been compromised if the above-described block verification results are not transmitted thereby.

3. Embodiment 1 Effects

In Embodiment 1, the encrypted application decryption process performed by the protection control module 120 is verified. This makes possible the determination of whether or not the protection control module 120 has been compromised without using the encryption/decryption key held thereby.

Further, each detection module verifies the blocks, thus making verification possible without any of the detection modules coming to know all of the application data.

Accordingly, the information in the protection control module 120 and in the applications will not be leaked, even if a detection module is compromised and performs unauthorized operations. The security of the system is thus enhanced.

[Embodiment 2]

Embodiment 2 of the present invention is presently explained.

1. Outline

In Embodiment 1, each detection module collects application data blocks, leaving a possibility that the application data may be leaked. This point is addressed by Embodiment 2, in which the blocks and the verification data are deleted after block verification is complete, thus preventing application data leaks. Embodiment 2 also involves mutual confirmation of whether or not the blocks and the verification data have been deleted through mutual surveillance performed afterward.

2 Detection Process Operations

Figure 20:
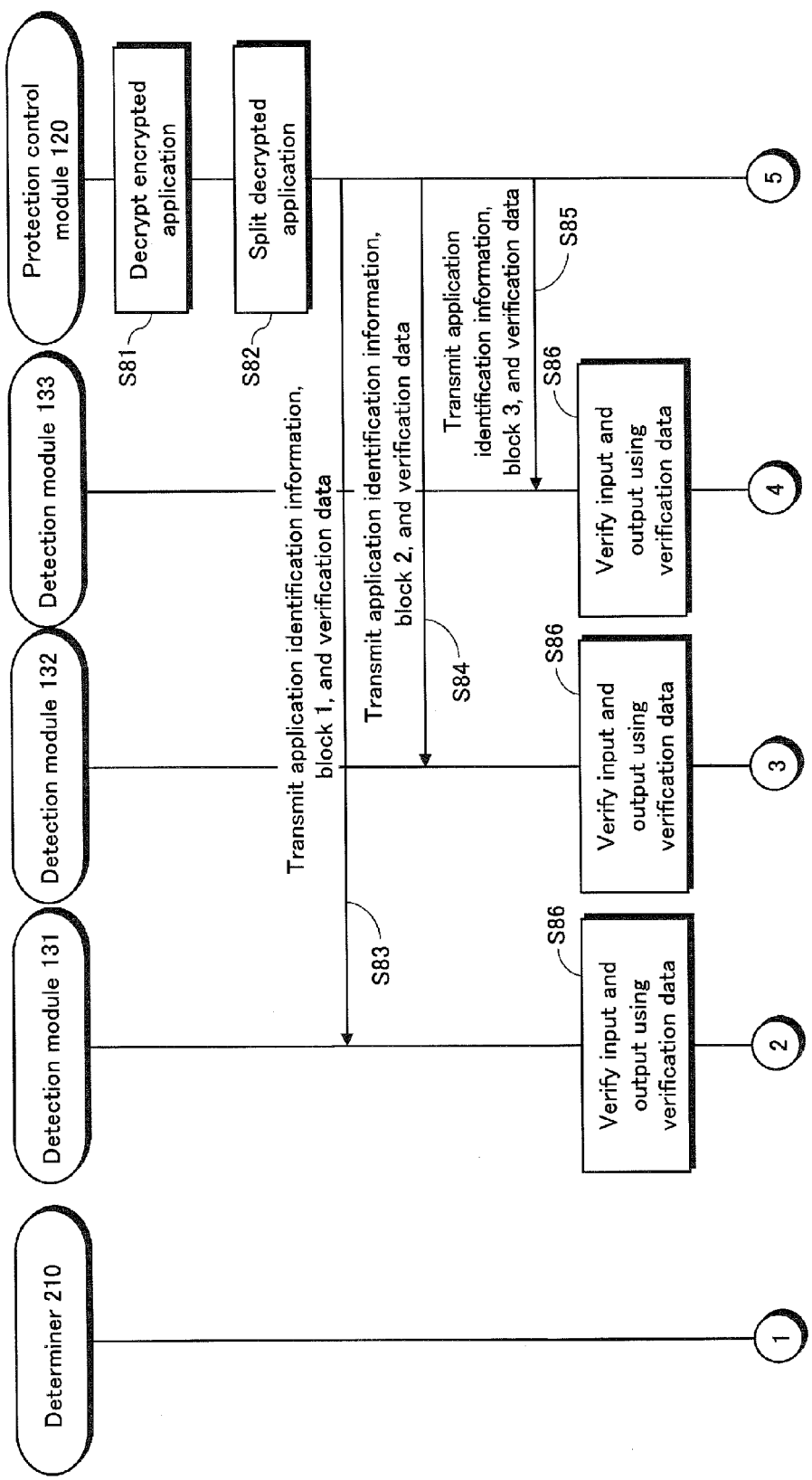
FIG. 20 is a sequence diagram of the detection process pertaining to Embodiment 2.
Figure 21:
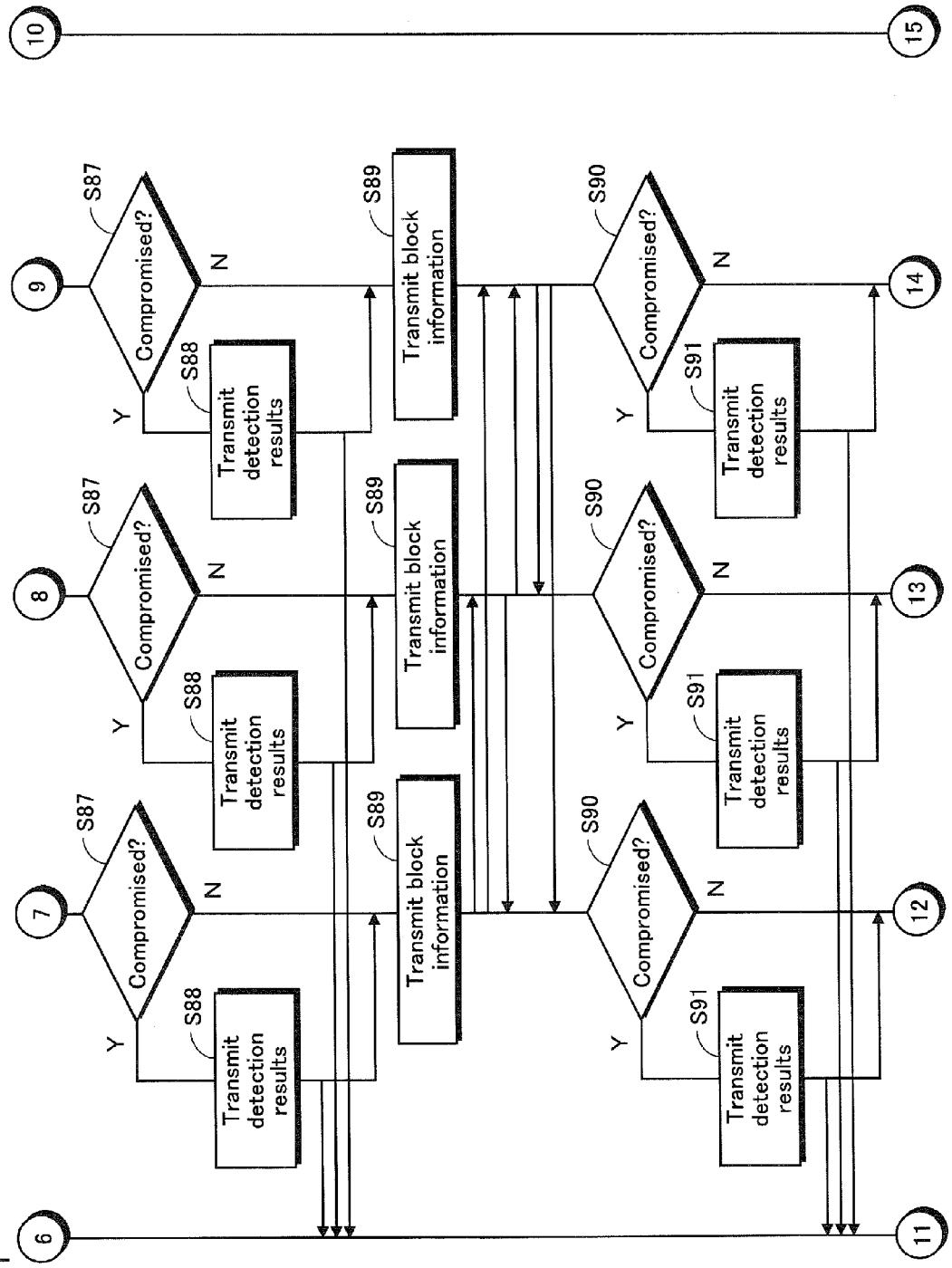
FIG. 21 is a sequence diagram of the detection process pertaining to Embodiment 2.

The detection process of Embodiment 2 is explained with reference to the sequence diagrams of FIGS. 20 through 22. The reference symbols of each component are identical to those used in Embodiment 1.

The operations of steps S81 through S91 are identical to those of steps S41 through S51 of Embodiment 1 and are therefore omitted.

Figure 22:
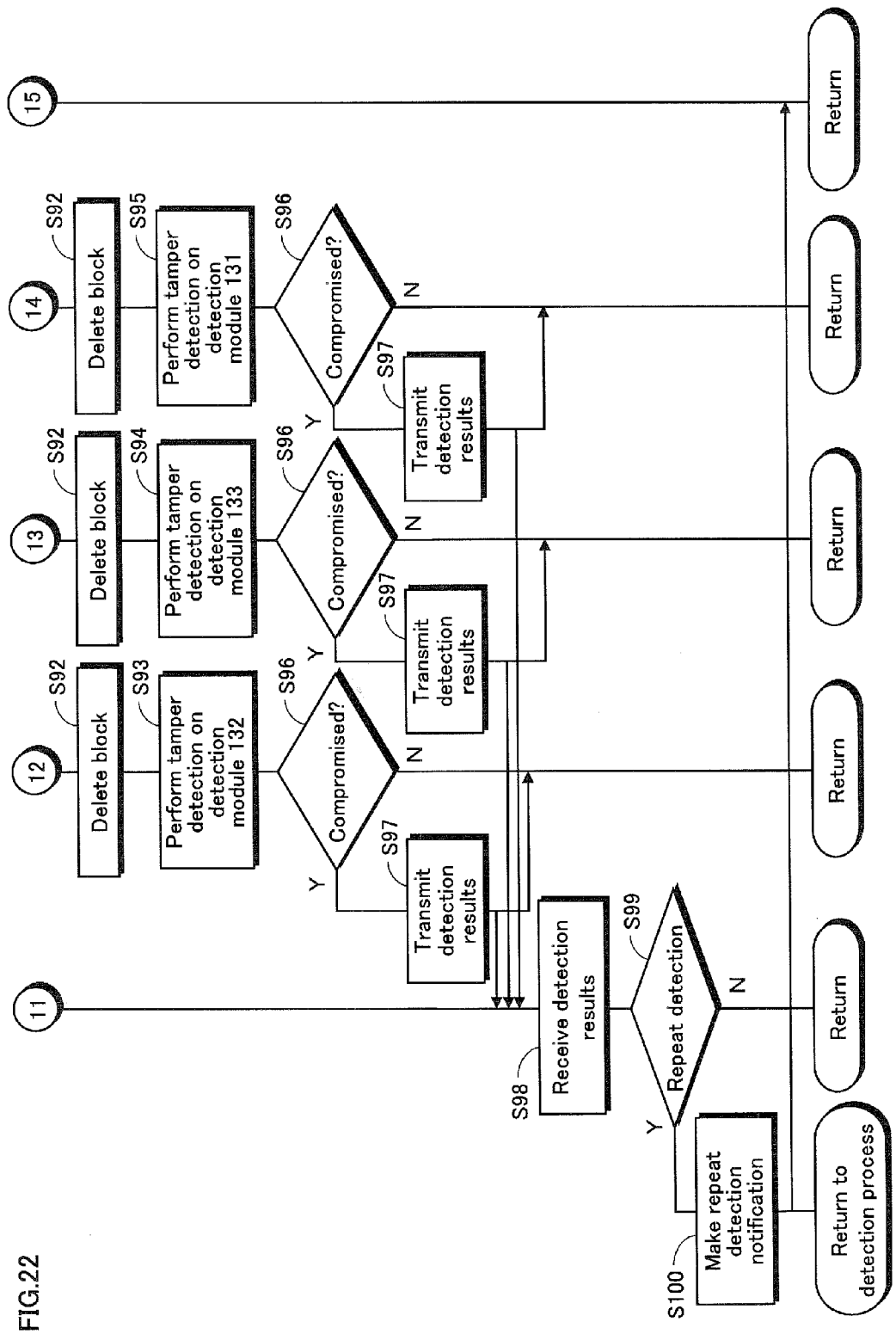
FIG. 22 is a sequence diagram of the detection process pertaining to Embodiment 2.

The following explanations begin at step S92 of FIG. 22.

Each of the detection modules deletes the received data block as well as the verification data held by the verification data holder 407 (step S92).

Then, the detection modules perform mutual tamper detection to confirm whether or not the blocks and the verification data have been deleted.

Specifically, detection module 131 performs the tamper detection process on detection module 132 (step S93), detection module 132 performs the tamper detection process on detection module 133 (step S94), and detection module 133 performs the tamper detection process on detection module 131 (step S95). The tamper detection process by each detection module is identical to the mutual surveillance tamper detection process.

If any detection module detects tampering (Y in step S96), this result is transmitted to the determiner 210 (step S97). The determiner 210 receives the detection results from each detection module (step S98) and determines whether or not tampering has occurred in any detection module.

If a detection module is found to have been compromised, then the determiner 210 considers the detection process by the protection control module 120 to have been performed improperly and calls for detection to performed anew (Y in step S99). The protection control module 120 is notified to this effect (step S100).

If no detection module is deemed compromised, then the determiner 210 determines that the blocks and the verification data have been deleted.

3. Embodiment 2 Effects

In Embodiment 2, deletion of the blocks and of the verification data is performed and confirmed. Thus, even if one of the detection modules performs an unauthorized operation, only one block can be leaked. Further data blocks, as well as the complete application data, can be prevented from leaking.

[Embodiment 3]

Embodiment 3 of the present invention is here described as a software update system.

1. Outline

The software update system of Embodiment 3 updates a compromised protection control module, whenever found, with a new protection control module.

2. Structure (1) Protection Control Module 120a Configuration Details

Figure 23:
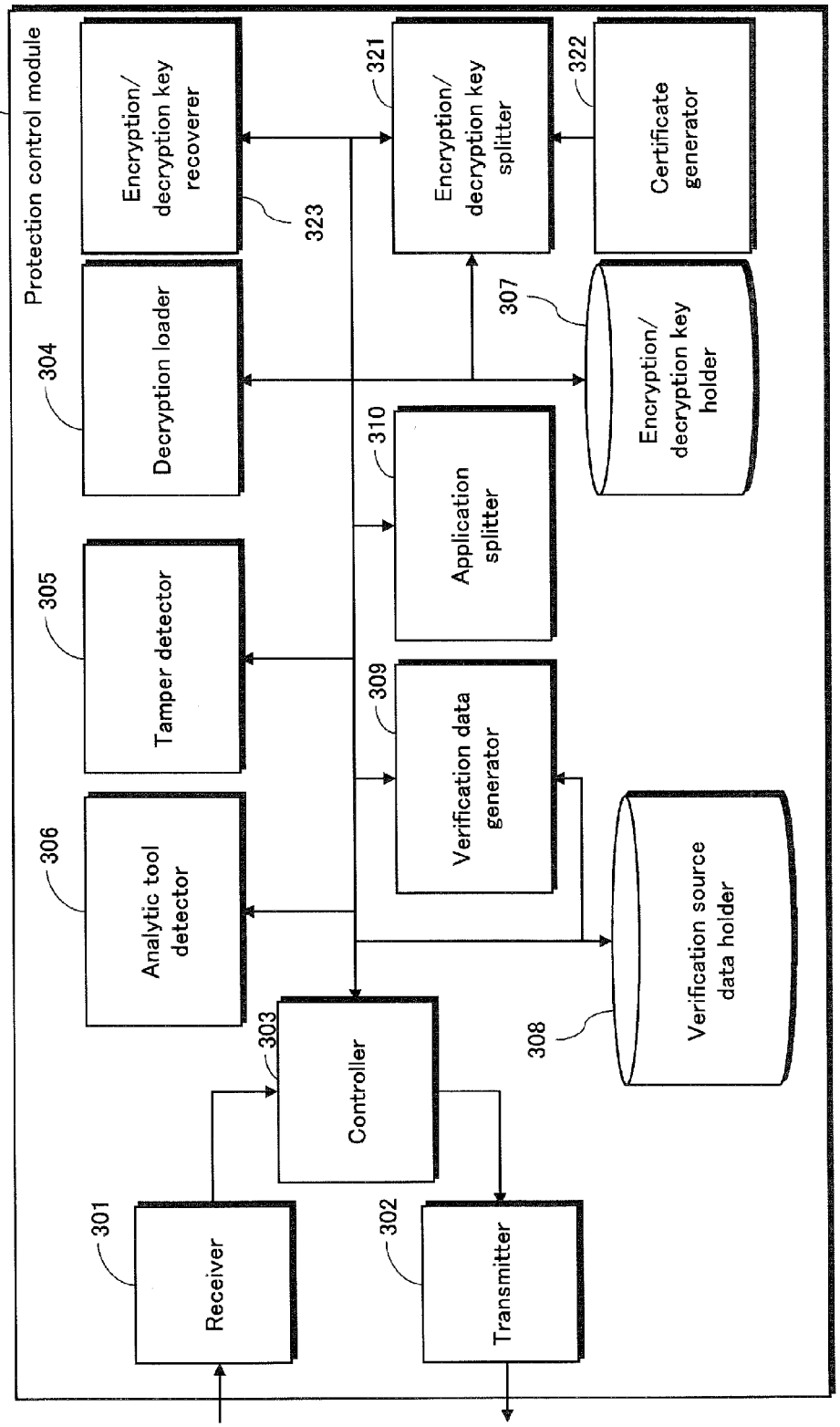
FIG. 23 is a block diagram of a protection control module 120*a* pertaining to Embodiment 3.

FIG. 23 is a functional block diagram showing the functional structure of a protection control module 120a pertaining to Embodiment 3.

The protection control module 120a comprises the components of the protection control module 120 (see FIG. 2) pertaining to Embodiment 1 and additionally includes an encryption/decryption key splitter 321, a certificate generator 322, and an encryption/decryption key recoverer 323.

The encryption/decryption key splitter 321 uses a secret sharing scheme to generate distribution information from the encryption/decryption key at initial setup time and at subsequent-round preparation time.

The certificate generator 322 holds the protection control module 120a private signature key. Using the private signature key, the certificate generator 322 generates a certificate used when the encryption/decryption key is restored from the distribution information to verify whether or not recovery has been performed correctly.

The encryption/decryption key recoverer 323 obtains, from each update module, the distribution information that has been delivered thereto according to arrangement information. The encryption/decryption key recoverer 323 also recovers the encryption/decryption key from the distribution information so obtained and transmits the recovered key to the decryption loader 304.

(2) Detection Module Configuration Details

Figure 24:
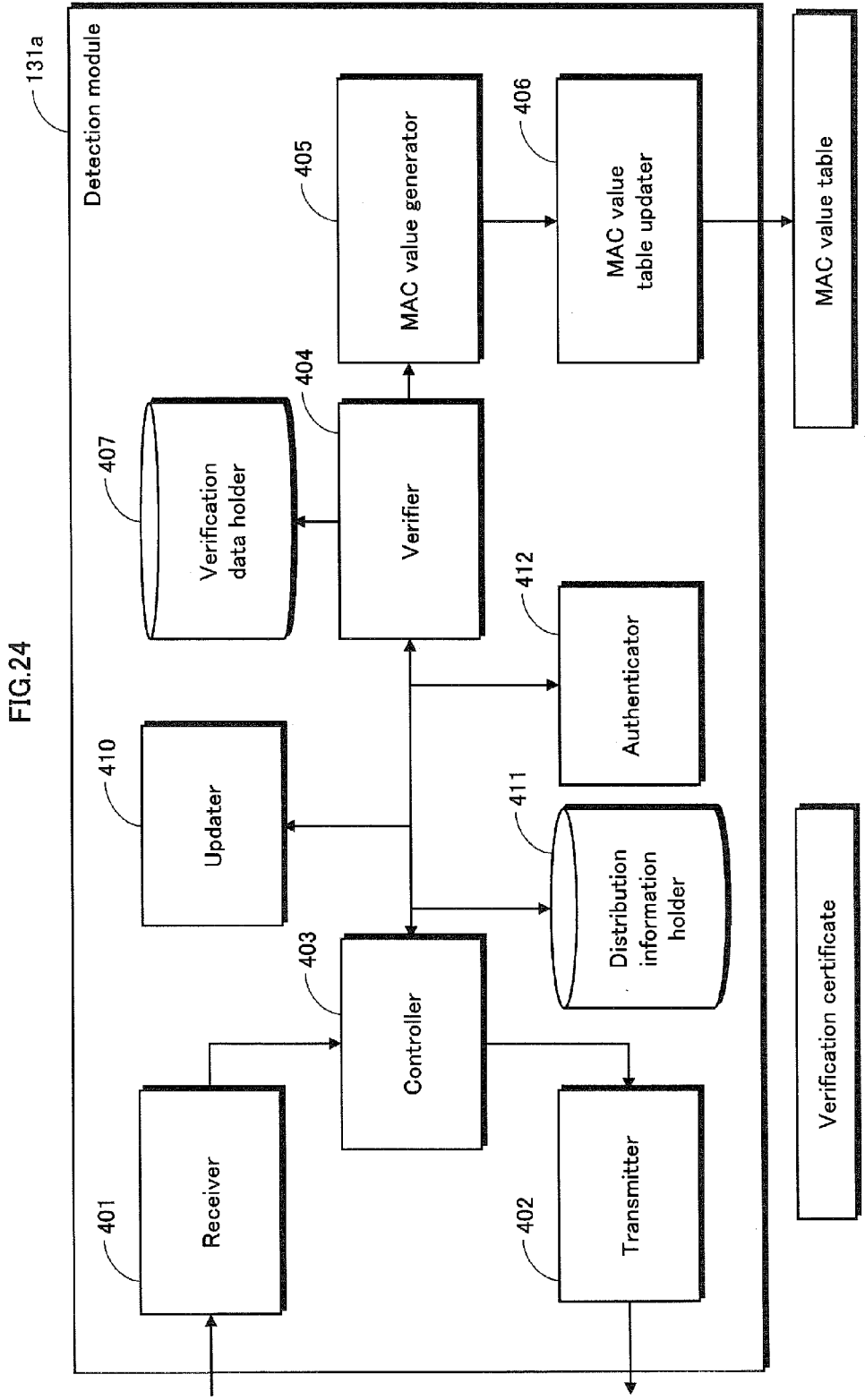
FIG. 24 is a block diagram of a detection module 131*a* pertaining to Embodiment 3.

FIG. 24 is a functional block diagram showing the functional structure of detection module 131a pertaining to Embodiment 3.

Detection module 131a includes all the components of detection module 131 (FIG. 3) pertaining to Embodiment 1 with the addition of an updater 410 and a distribution information holder 411.

The updater 410 collaborates with the management device 200 to update the software (all applications, the protection control module 120a, and all detection modules) of the apparatus 100.

The distribution information holder 411 holds therein the distribution information, which is generated from the encryption/decryption key used by the protection control module 120a for encrypting and decrypting the applications, as well as arrangement information delivered therewith by the protection control module 120a. The arrangement information describes which portion of the distribution information was delivered to which of the detection modules.

The authenticator 412 holds therein a pair of authentication keys (a private authentication key and a public authentication key) and performs authentication with the other modules.

(3) Verification Source Data Distributor 220 Configuration Details

Figure 25:
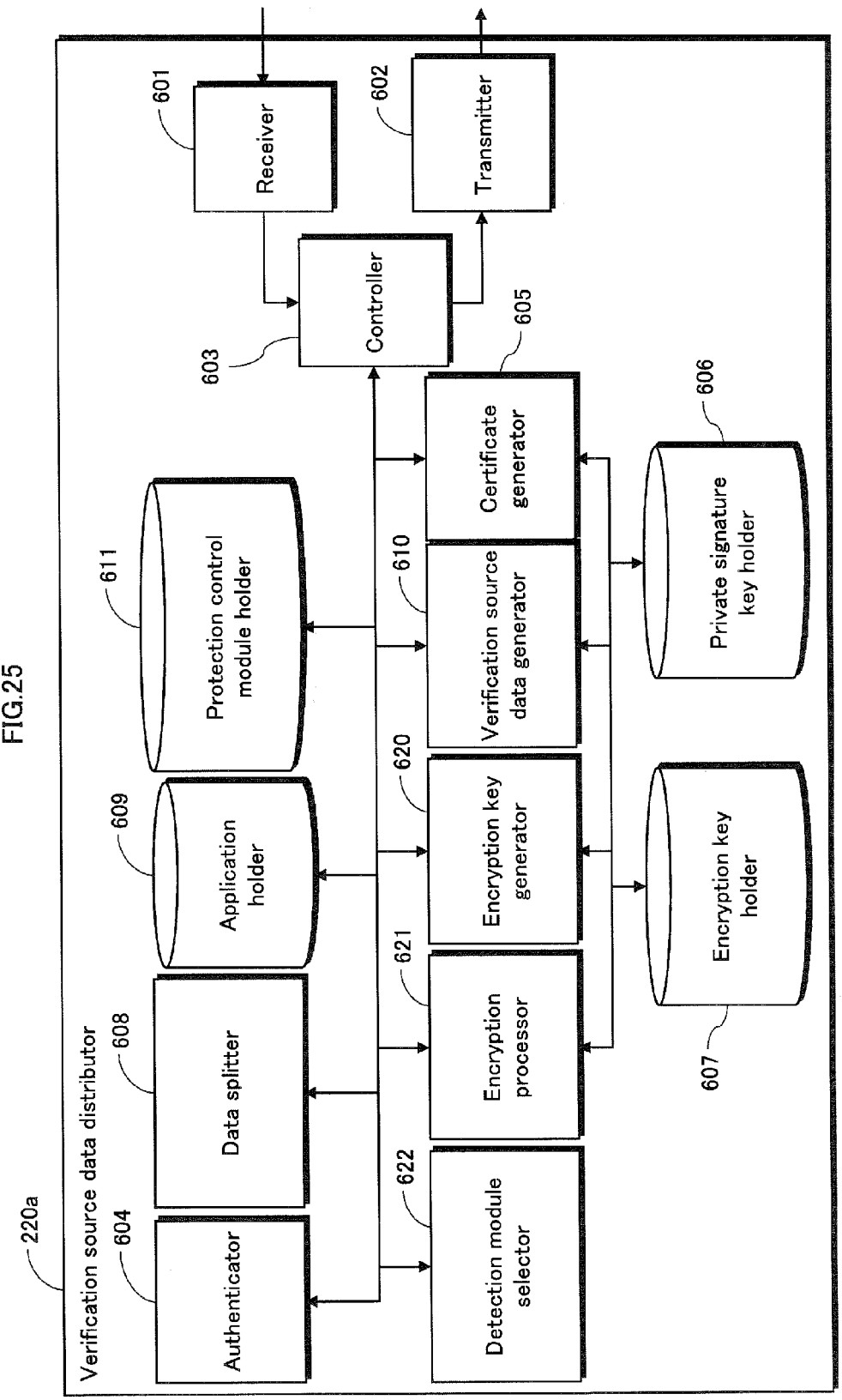
FIG. 25 is a block diagram of a verification source data distributor 220*a* pertaining to Embodiment 3.

FIG. 25 is a functional block diagram showing the functional structure of the verification source data distributor 220a pertaining to Embodiment 3.

The verification source data distributor 220a includes all the components of the verification source data distributor 220 pertaining to Embodiment 1 (FIG. 7) with the addition of an encryption key generator 620, an encryption processor 621, and a detection module selector 622.

The encryption key generator 620 generates an encryption key that is used when update software is transmitted to one of the detection modules.

The encryption processor 621 uses the encryption key generated by the encryption key generator 620 to encrypt the update software. The encryption processor 621 also uses the detection module-exclusive key of the detection module selected by the detection module selector 622 to encrypt the aforementioned encryption key.

When the protection control module 120a is updated, the detection module selector 622 selects a detection module that will be used therefor.

3. Operations

The operations of the software update system pertaining to Embodiment 3 are described below.

(1) Overall Operations Outline

Figure 26:
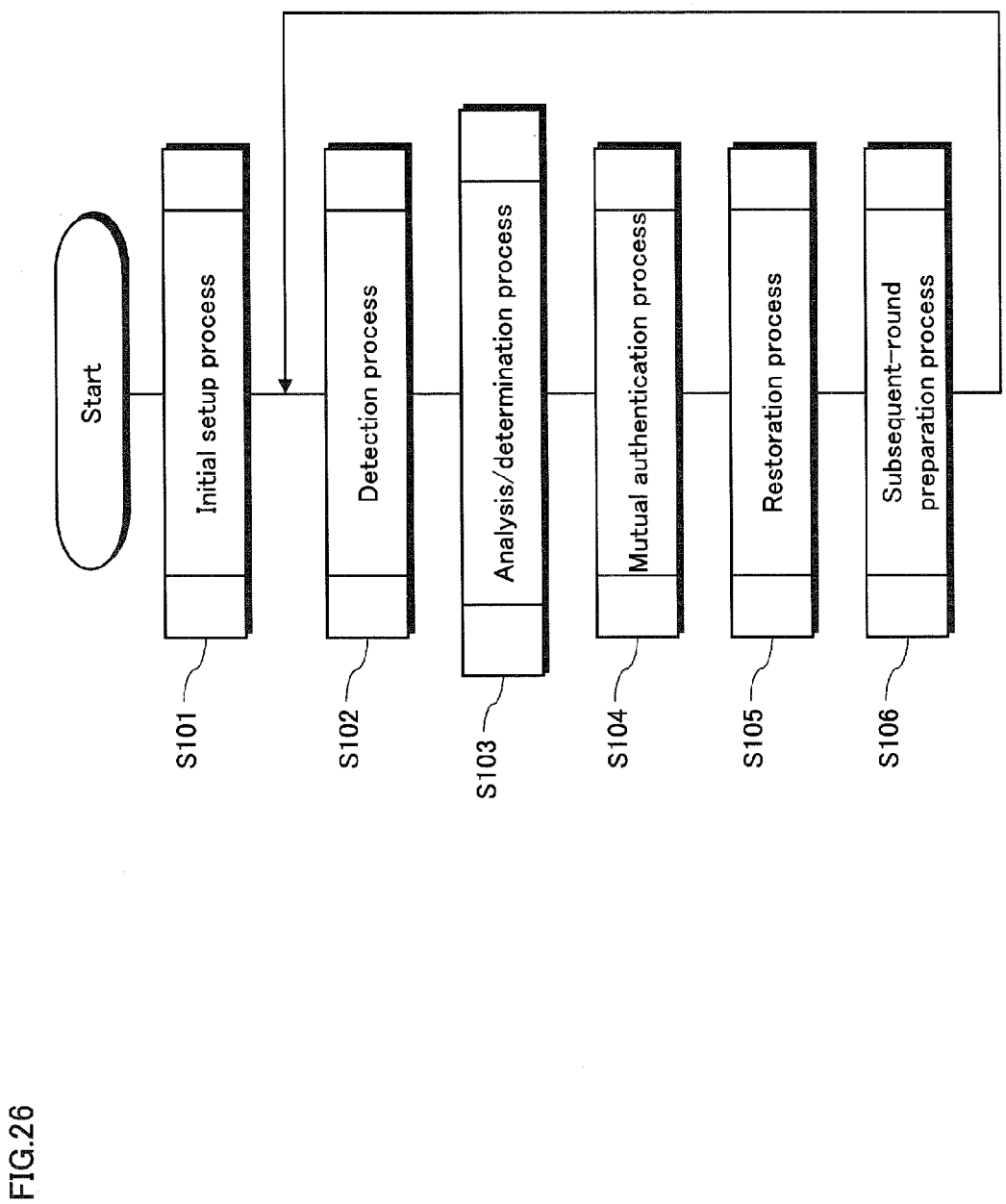
FIG. 26 is a flowchart showing the overall operations of the illegal module detection system pertaining to Embodiment 3.

FIG. 26 is a flowchart showing the overall operations of the software update system.

First, the software update system performs an initial setup process (step S101). Afterward, a verification process is performed by each of the detection modules on the protection control module 120a along with a detection process which determines whether or not the protection control module 120a has been compromised (step S102)

Next, if tampering is detected in the protection control module 120a during step S102, the software update system performs an analysis/determination process that analyses the protection control module 120a and determines whether or not an update is required (step S103).

Then, the software update system has the detection modules and the verification source data distributor 220a perform mutual authentication to confirm whether or not all of the above have authorized software (step S104).

Next, the software update system performs a restoration process (step S105). The restoration process consists of installing the update protection control module onto the apparatus 100 after the mutual tamper detection process has been performed by the detection modules, and then using the distribution information embedded in each detection module to update the protection control module of the apparatus 100.

Afterward, the software update system prepares for the next time the protection control module will need an update by generating the key data and distribution information required therefor and embedding these into each detection module in a subsequent-round preparation process (step S106). Then, the software update system returns to the detection process of step S102 and continues the process.

(2) Initial Setup Operations

The initial setup operations of step S101 are explained below with reference to the sequence diagrams of FIGS. 27 and 28. The operations of steps S111 through S113 are identical to those previously explained for Embodiment 1 and are therefore omitted.

The protection control module 120a generates distribution information from the encryption/decryption key using the secret sharing scheme (step S114). In addition, the protection control module 120a uses the private signature key to generate an encryption/decryption key certificate (step S115). The protection control module 120a then transmits the generated distribution information and encryption/decryption key certificate to the detection modules (step S116).

The protection control module 120a transmits distribution information bundles to each of the detection modules such that the detection modules 131, 132, and 133 each come to hold a different bundle. Furthermore, the protection control module 120a transmits arrangement information to the detection modules that shows the distribution information transmitted to each of the detection modules. The arrangement information transmitted to each detection module is identical.

The method used to generate the distribution information from the encryption/decryption key by using a secret sharing scheme and the method used to transmit the distribution information to the detection modules are described in detail on pages 47 through 49 of Patent Literature 2 and are thus omitted.

Upon receiving the distribution information, arrangement information, and encryption/decryption key certificate from the protection control module 120a, the detection module group performs a detection module initial setup process (step S117).

Steps S118 through S121 of the protection control module 120a initial setup process are identical to those described in Embodiment 1 and are thus omitted.

(3) Detection Module Initial Setup Process

The step S117 detection module initial setup process is explained next with reference to the flowchart shown in FIG. 29.

Detection module 131a receives the distribution information, the arrangement information, and the encryption/decryption key certificate from the protection control module 120a and stores these in the distribution information holder 411 (step S131). Subsequent operations are identical to those described in Embodiment 1 and are thus omitted.

(4) Detection Process Operations

The detection process (step S102) of Embodiment 3 is identical to that of Embodiments 1 and 2 and is thus omitted.

(5) Analysis/Determination Process

Figure 30:
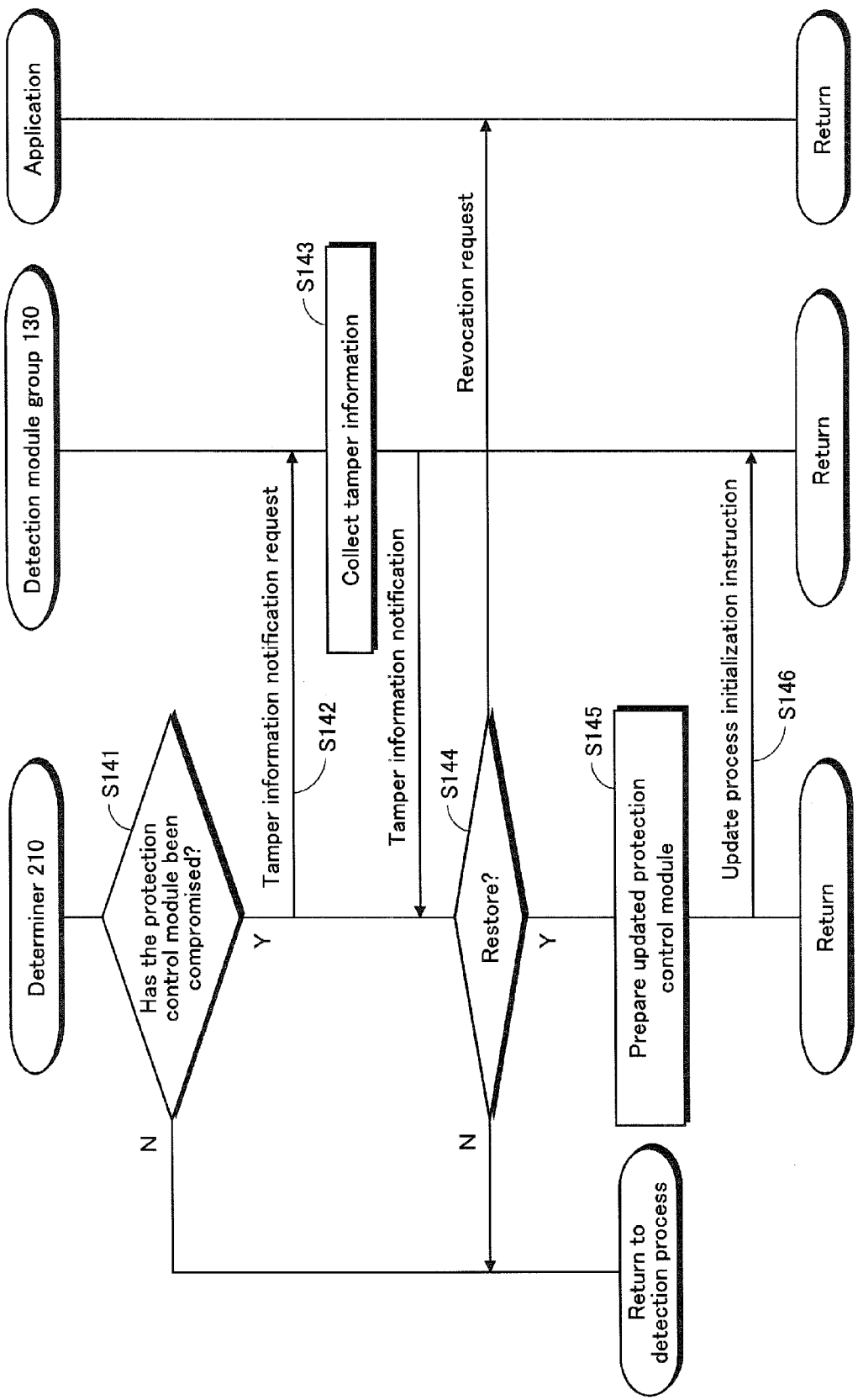
FIG. 30 is a sequence diagram of the analysis/determination process pertaining to Embodiment 3.

The analysis/determination process of step S103 is described below with reference to the sequence diagram shown in FIG. 30. In FIG. 30, the process performed individually by each detection module is described as performed by the detection module group 130.

During the detection process, upon receiving the tamper detection results for the protection control module from each detection module, the determiner 210 determines whether or not the protection control module 120a has been compromised according to the results so received (step S141).

The determination method may, for example, be such that the protection control module 120a is judged to have been compromised if a predetermined number of detection modules detect tampering therein, and judged not to have been compromised if tampering is detected by less than the predetermined number of detection modules. The predetermined number may be more than half of the detection modules included in the detection module group 130. Alternatively, the presence of tampering in the protection control module 120a may be determined using the data blocks and the verification data upon reception thereof from each detection module.

If the protection control module 120a is deemed compromised (Y in step S141), then in order to determine whether or not restoration thereof is necessary, the determiner 210 requests notification of tamper information from the detection module group 130, which shows the portion of the protection control module 120a that has been compromised.

Upon request for the tamper information notification, the detection module group 130 collects tamper information (step S143) and notifies the determiner 210 thereof.

According to the tampering information, the determiner 210 determines whether to restore the protection control module 120a, to revoke the apparatus 100, or to do nothing (step S144).

If the protection control module 120a is to be restored (Y in step S144), then the determiner 210 prepares an updated protection control module (step S145) and instructs the detection module group 130 to begin the update process (step S146).

Otherwise, if the apparatus 100 is to be revoked, a request to such effect is sent to the servers providing services to each application. If nothing is to be done (N in step S144), then the detection process is resumed.

If the protection control module 120a is deemed not to be compromised in step S141 (N in step S141), then the detection process resumes.

(6) Mutual Authentication Process

Moving on, the mutual authentication process of step S104 is explained with reference to the sequence diagrams of FIGS. 31 and 32.

Upon determining, in the analysis/determination process, that the protection control module 120a is to be restored, the determiner 210 instructs the verification source data distributor 220a to restore the protection control module 120a.

After instructing the detection modules to begin the update process, the verification source data distributor 220a performs mutual authentication one-on-one with each detection module. Thus, the apparatus 100 is prevented from connecting to any unauthorized servers and the management device 200 is prevented from connecting to an illicit apparatus. During the mutual authentication process, the verification source data distributor 220a uses a private signature key and a public signature key, whereas each of the update modules uses a pair of authentication keys (a private authentication key and a public authentication key).

Figure 31:
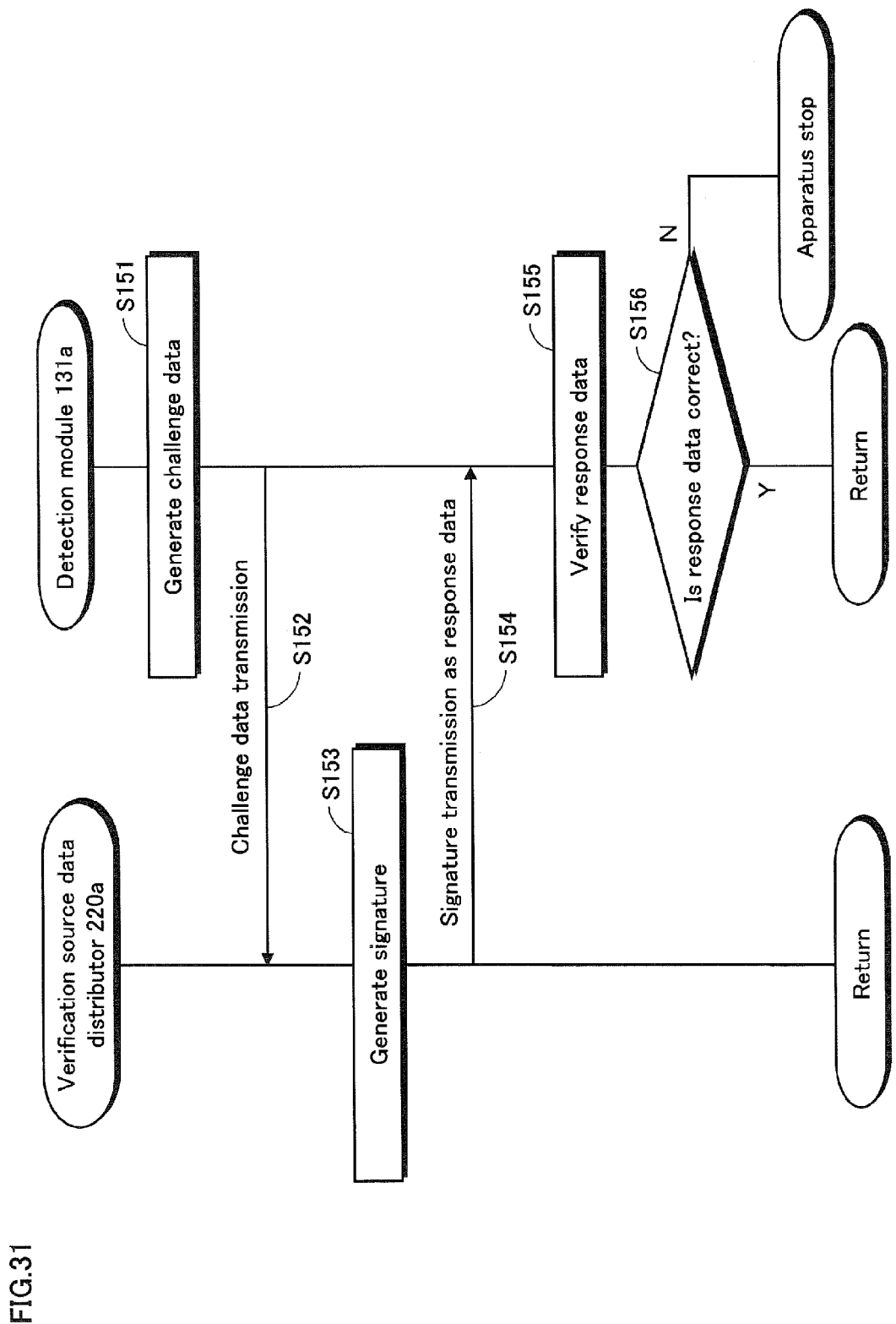
FIG. 31 is a sequence diagram of the mutual authentication process pertaining to Embodiment 3.

FIG. 31 is a sequence diagram of detection module 131a authenticating the verification source data distributor 220a. Detection modules 132a and 133a operate similarly to detection module 131a as shown in FIG. 31, also authenticating the verification source data distributor 220a.

Detection module 131a uses a random number generator to generate random numbers (challenge data) (step S151) and then transmits the challenge data so generated to the verification source data distributor 220a (step S152). At this point, a detection module ID for identifying detection module 131a is transmitted along with the challenge data.

The verification source data distributor 220a uses the private signature key on the received challenge data to generate signature data (step S153), and then returns the signature data so generated to detection module 131a as response data (step S154).

Upon receiving the response data from the verification source data distributor 220a, detection module 131a uses the public signature key to verify whether or not the response data matches the signature data of the challenge data (step S155).

If the verification results are such that the response data is correct and the verification source data distributor 220a is legitimate (Y in step S156), then detection module 131a continues the process. If the response data is incorrect and the verification source data distributor 220a is an unauthorized module (N in step S156), then detection module 131a outputs an error and stops the process.

Next, the verification source data distributor 220a authenticates detection modules 131a, 132a, and 133a.

Figure 32:
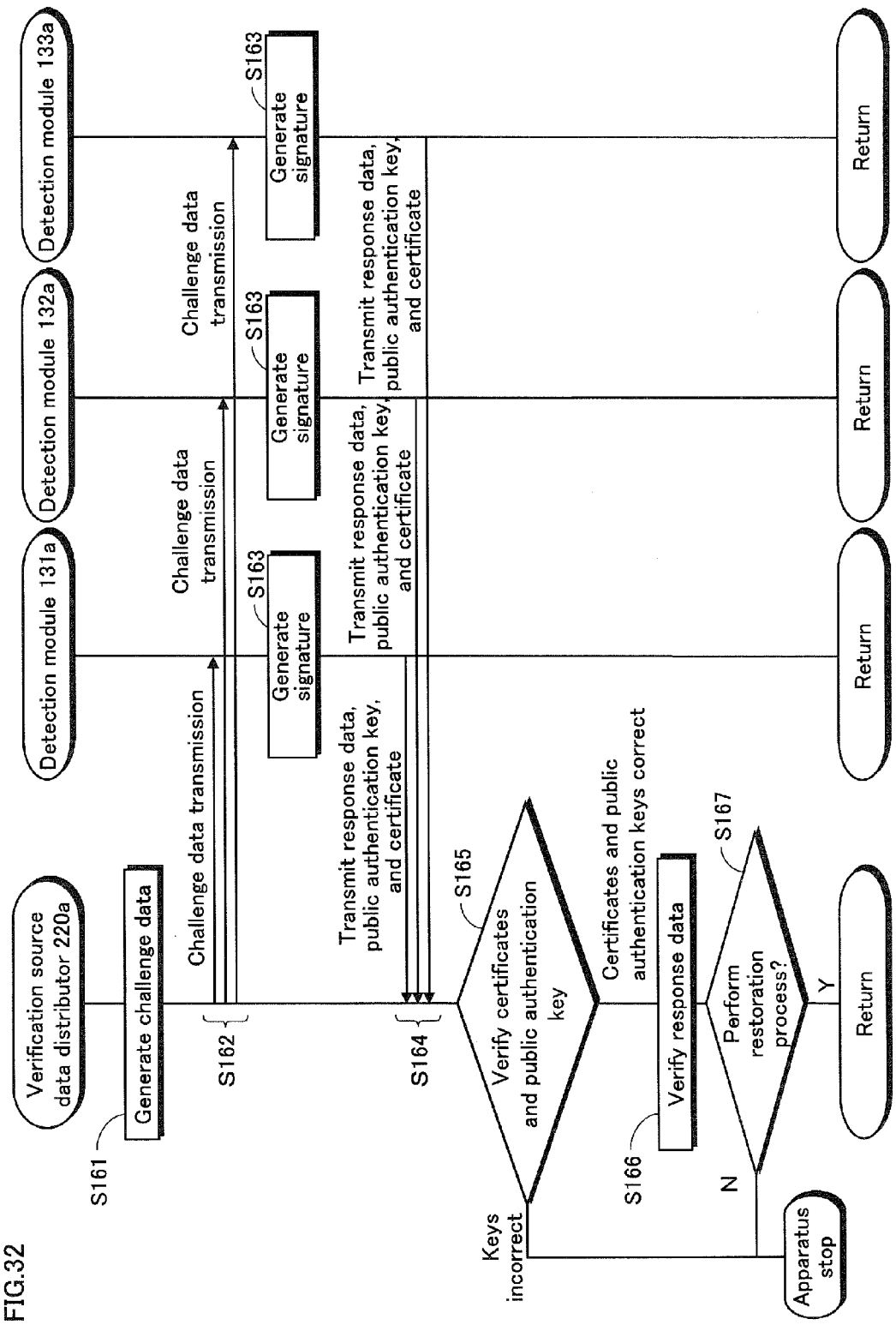
FIG. 32 is a sequence diagram of the mutual authentication process pertaining to Embodiment 3.

FIG. 32 is a sequence diagram of the verification source data distributor 220a authenticating the detection modules.

The verification source data distributor 220a uses the random number generator to generate different random numbers (challenge data) for each detection module that has transmitted challenge data (step S161), and then transmits the challenge data so generated to each detection module, individually (step S162).

Each detection module uses the private authentication key thereof on the received challenge data to generate signature data (step S163), then returns the signature data so generated to the verification source data distributor 220a as response data.

At this point, each detection module transmits the public authentication key and authentication key certificate along with the response data to the verification source data distributor 220a (step S164).

The verification source data distributor 220a receives the response data, public authentication key, and authentication key certificate from each of the detection modules. The verification source data distributor 220a verifies whether or not the authentication key certificate is the certificate originally issued thereby, and furthermore, uses the authentication key certificate to verify the validity of the public authentication key (step S165).

If the authentication key certificate and the public authentication key are invalid (N in step S165), then the verification source data distributor 220a stops the process.

If the authentication key certificate and the public authentication key are valid, then the verification source data distributor 220a uses the public authentication key to verify whether or not the received response data match the signature data of the challenge data (step S166).

Next, the verification source data distributor 220a determines whether the number of detection modules that have returned correct response data (i.e. valid detection modules) is greater than the predetermined number required for the restoration process (step S167).

If the number of valid detection modules is less than the number required for the restoration process (N in step 167), then the verification source data distributor 220a ends the process as restoration cannot be executed. If the number of valid update modules is sufficient for the restoration process (Y in step S167), then the mutual authentication process ends and the restoration process begins.

Further, the verification source data distributor 220a creates an authentication list during the mutual authentication process containing all module IDs belonging to detection modules confirmed to be valid. During the subsequent restoration process, only detection modules with IDs included on the authentication list will be used.

(7) Restoration Process Operations

Subsequently, the restoration process of step S105 is explained in detail with reference to FIGS. 33 through 37. The restoration process involves updating the compromised protection control module 120a with a new updated protection control module if the above-described mutual authentication process succeeds.

Figure 33:
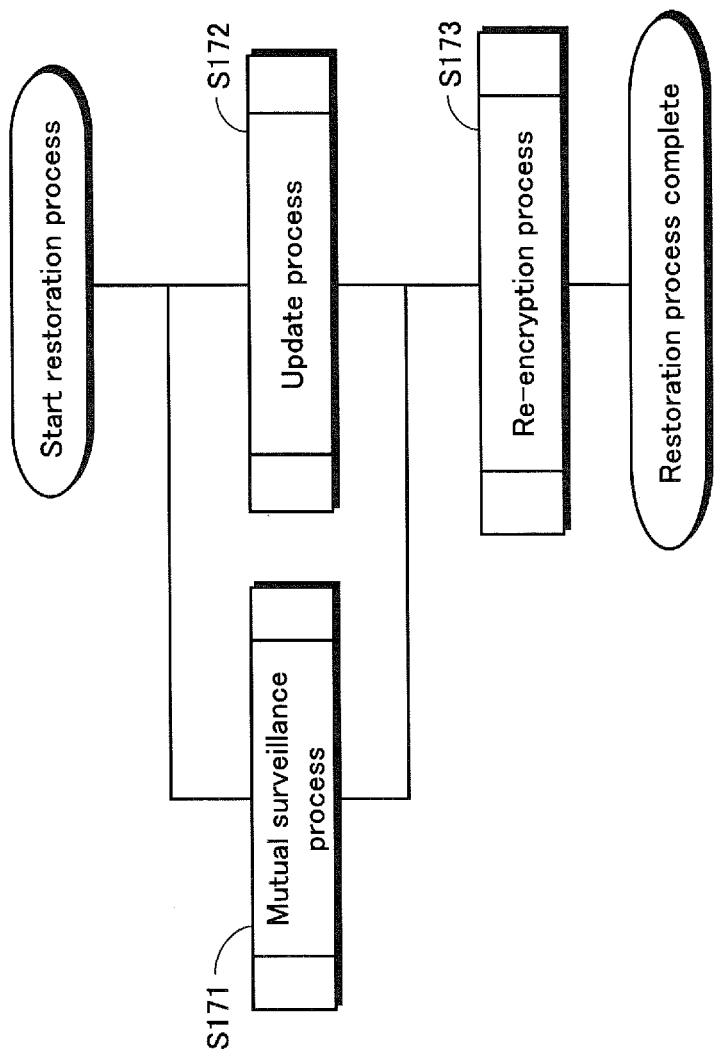
FIG. 33 is a flowchart of the restoration process pertaining to Embodiment 3.

FIG. 33 is a flowchart showing the restoration process.

Firstly, the detection modules perform mutual surveillance (step S171). The mutual surveillance process involves tamper detection executed by each of the detection modules on the other detection modules.

In addition, the protection control module 120a is updated using the updated protection control module (step S172).

Then, the encrypted applications 110, 111, 112, 113, and 114 are re-encrypted (step S173).

(8) Mutual Surveillance Process

Figure 34:
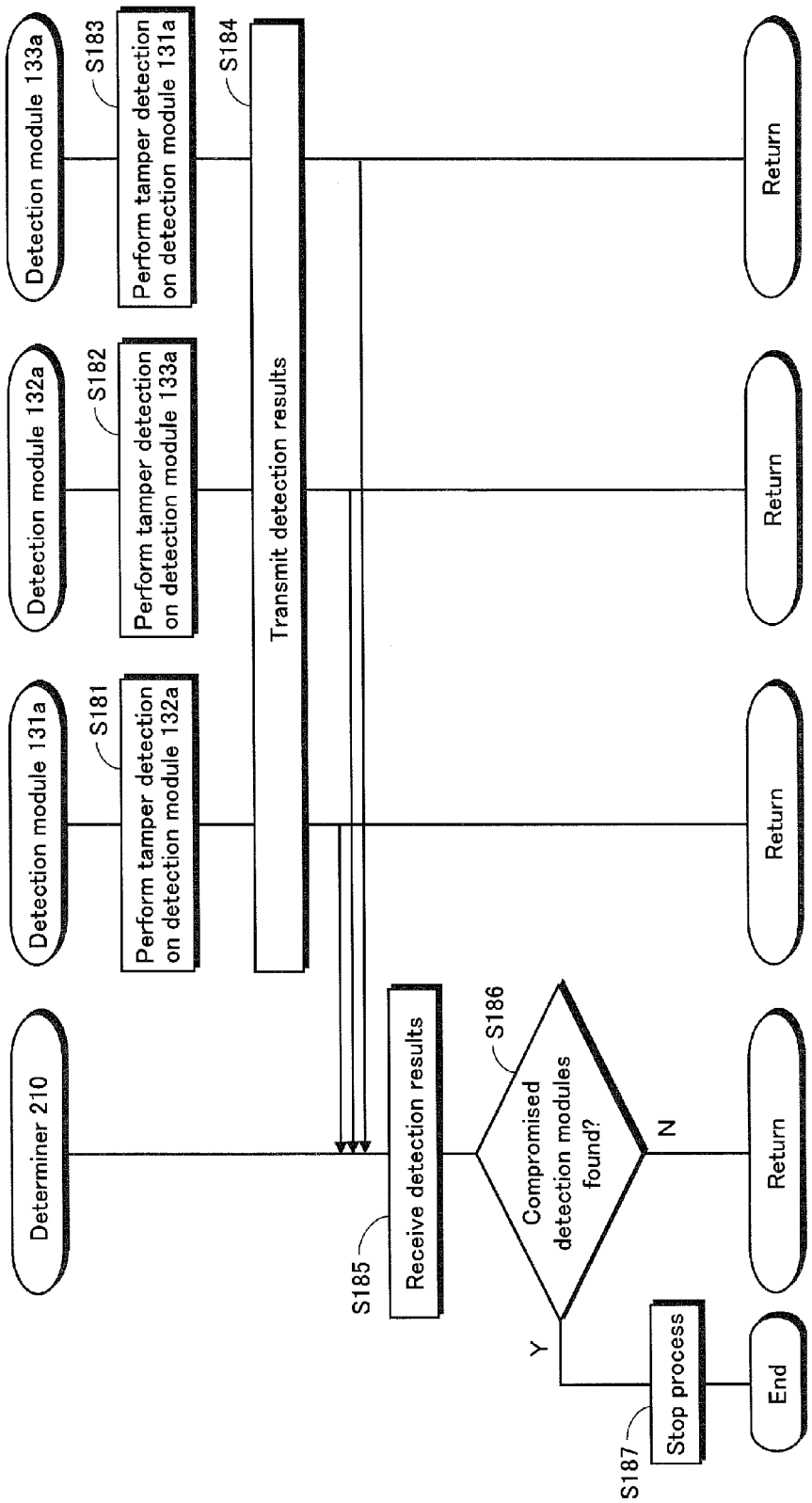
FIG. 34 is a sequence diagram of the mutual surveillance process pertaining to Embodiment 3.

FIG. 34 is a sequence diagram showing the details of the mutual surveillance process of step S171.

The mutual surveillance process of Embodiment 3 is nearly identical to that of Embodiment 1, differing in that, in Embodiment 3, the detection modules constantly transmits tamper detection results to the determiner 210 (step S184).

Also, in the mutual surveillance process of Embodiment 3, the restoration process stops at step S187 if any compromised detection modules are found.

(9) Update Process

Next, the update process of step S172 is explained in detail with reference to the sequence diagrams of FIGS. 35 and 36.

Firstly, the certificate generator 605 of the verification source data distributor 220a generates an update verification certificate using the private signature key (step S191). The update verification certificate exists so that the detection modules can confirm whether or not the new protection control module has been installed correctly. The verification source data distributor 220*a* transmits the certificate so generated to the detection modules (step S192).

Then, the encryption key generator 620 of the verification source data distributor 220*a* generates two encryption keys (a first key and a second key) which are used to multiply encrypt the new protection control module (step S193). The encryption processor 621 encrypts the new protection control module using the second key, thereby generating a new encrypted protection control module (step S194). The encryption processor 621 then further encrypts the new encrypted protection control module using the first key, thus generating a multiply-encrypted new protection control module (step S195).

The verification source data distributor 220*a* selects one valid detection module from the detection module group 130 (step S196) and notifies the determiner 210 of the ID of the selected module. In this example, detection module 131*a* is selected.

The verification source data distributor 220*a* transmits the multiply-encrypted new protection control module to the selected detection module 131*a* (step S197) and additionally transmits the first key thereto (step S198).

Detection module 131*a* receives the multiply-encrypted new protection control module and the first key. Detection module 131 uses the first key to decrypt the multiply-encrypted new protection control module and thus acquires the new encrypted protection control module (step S199). Then, once decryption is complete, the verification source data distributor 220*a* is notified to such effect (step S200).

Upon receiving notification that decryption is complete, the verification source data distributor 220*a* selects a valid detection module other than the detection module selected in step S196 from the detection module group 130 (step S201). In this example, detection module 132*a* is selected.

The verification source data distributor 220*a* transmits the second key to the selected detection module 132*a* (step S202). Thus, by controlling the time at which the verification source data distributor 220*a* transmits the key that decrypts the multiply-encrypted new protection control module to the detection module group 130, difficulties can be imposed on attackers in obtaining an unencrypted new protection control module.

The verification source data distributor 220*a* also requests that detection module 131*a* transmit the new encrypted protection control module obtained in step S199 to detection module 132*a* (step S203).

Upon receiving the request from the verification source data distributor 220*a*, detection module 131*a* transmits the new encrypted protection control module to detection module 132*a* (step S204).

Detection module 132*a* receives the second key from the verification source data distributor 220*a* and receives the encrypted new protection control module from detection module 131*a*. Then, detection module 132*a* decrypts the encrypted new protection control module using the second key, thus acquiring the new protection control module (step S205).

Detection module 132*a* overwrites and updates the protection control module 120*a* with the new protection control module acquired in step S205 (step S206). Then, detection module 132*a* notifies the other detection modules that the update is complete (step S207).

Afterward, each detection module confirms that the protection control module update is indeed complete. Unlike the verification described in Patent Literature 3, Embodiment 3 confirms update completion by executing a decryption process on the new protection control module after the update process itself.

Each detection module uses previously-received verification data for confirmation. Such data consist of a verification value and encrypted random numbers. The encrypted random numbers are data generated by encrypting random numbers with the encryption key of the new protection control module. In contrast to the random numbers and the encrypted random numbers, the verification value is signature data generated using the private signature key.

Each of the detection modules transmits the respective encrypted random numbers of the verification data thereof to the updated protection control module (step S208). The protection control module decrypts the received encrypted random numbers (step S209) and transmits the decrypted data acquired therefrom to the respective detection modules (step S210).

Upon receiving the decrypted data from the protection control module, each detection module uses the verification value within the verification data to verify the received data (step S211). Each detection module notifies the verification source data distributor 220*a* of the verification results (step S212).

Upon receiving the verification results transmitted from the detection modules, the verification source data distributor 220*a* judges therefrom whether or not the protection control module was updated correctly (step S213). If judgment is negative (N in step S213), then the verification source data distributor 220*a* stops the apparatus 100.

If judgment is affirmative (Y in step S213), then the verification source data distributor 220*a* notifies the detection modules that the update process is complete (step S214).

(10) Relationship of Mutual Surveillance Process to Update Process

The above-described mutual surveillance and update processes are executed in conjunction with one another.

The mutual surveillance process is executed regularly (i) when multiple keys are sent from the verification source data distributor 220*a* to one of the detection modules in the detection module group 130, and (ii) during the decryption process of the encrypted updated protection control module by the detection modules in the detection module group 130. The time interval of such regular execution may, for example, be shorter than the time until the updated protection control module is completely output via communication channels. If, for instance, the time required for complete output is one second, then surveillance may be executed at yet-shorter 500 ms intervals.

Figure 37:
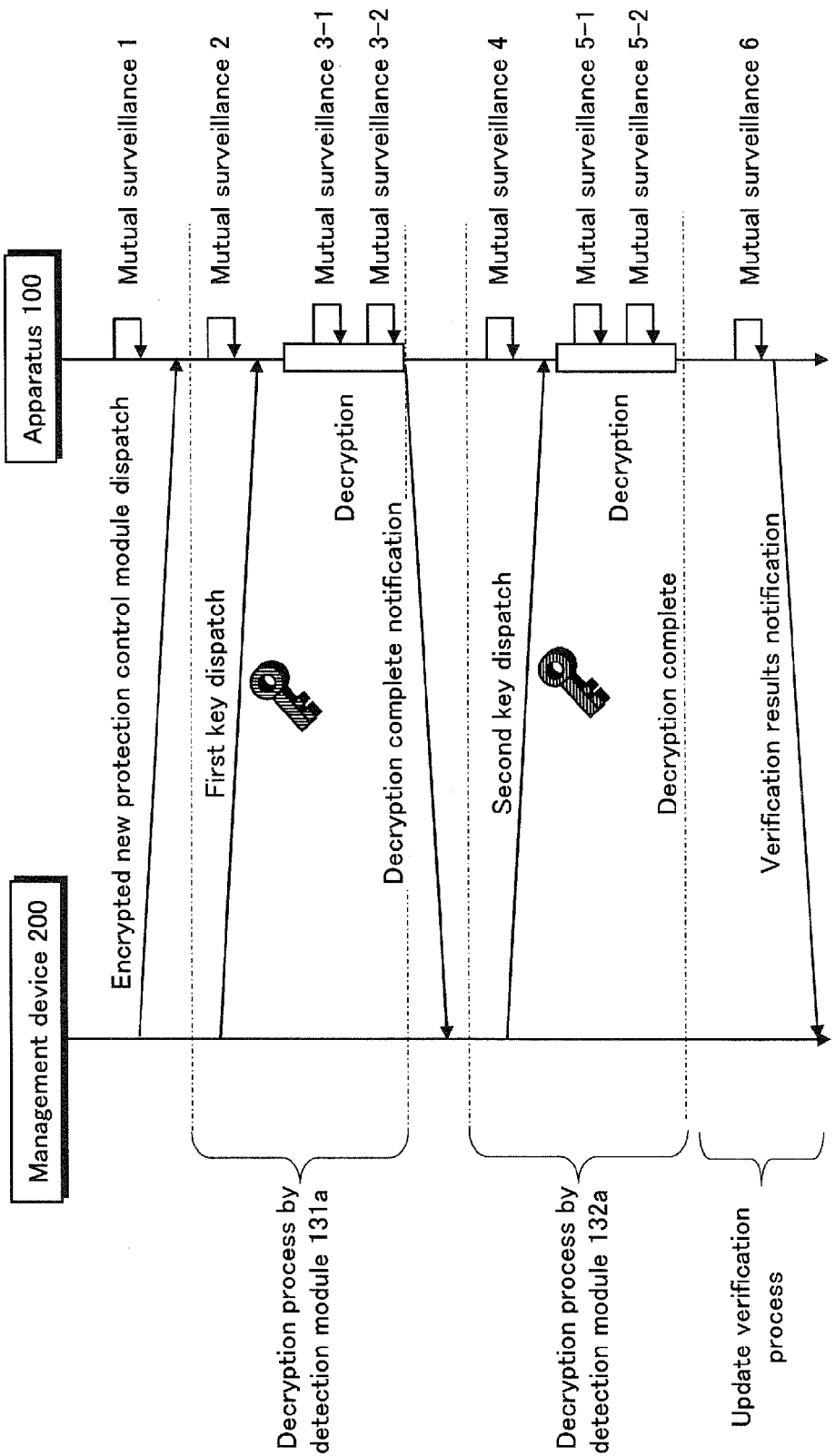
FIG. 37 is a diagram explaining the linked operations of the mutual surveillance process and the update process pertaining to Embodiment 3.

The relationship between the mutual surveillance and update processes is explained below with reference to FIG. 37.

First, before the multiply-encrypted new protection control module is dispatched from the management device 200, the apparatus 100 executes mutual surveillance (mutual surveillance 1). This is done to ensure that an illicit detection module is not selected in the update process.

Later, and before detection module 131*a* receives the first key transmitted by the management device 200, the apparatus 100 executes mutual surveillance (mutual surveillance 2) confirming that an illicit detection module is not selected when the apparatus 100 receives the first key.

Furthermore, once detection module 131*a* receives the first key, mutual surveillance is regularly executed by pausing the decryption process by detection module 131*a* while the multiply-encrypted new protection control module is being decrypted thereby with the first key (mutual surveillance 3-1 and 3-2). Accordingly, even if detection module 131*a*, 132*a*, or 133*a* is attacked during the decryption process, such an attack can be detected before the new encrypted protection control module is fully leaked, thus making leak prevention possible.

The subsequent process is as described above. To be precise, before detection module 132a receives the second key transmitted by the management device 200, the apparatus 100 executes mutual surveillance (mutual surveillance 4) confirming that an illicit detection module is not selected when the apparatus 100 receives the key.

In addition, once detection module 132a receives the first key, mutual surveillance is regularly executed by pausing the decryption process by detection module 132a while the new encrypted protection control module is being decrypted thereby with the second key (mutual surveillance 5-1 and 5-2). Finally, mutual surveillance is executed (mutual surveillance 6).

Accordingly, any attack on the decryption modules can be detected before the new protection control module is fully leaked, thus making leak prevention possible.

If, during the mutual surveillance processes, tampering is detected in any of the detection modules, the restoration process is stopped. Accordingly, the management device 200 can cancel the transmission of the first and second keys, and attackers will be unable to obtain the keys that decrypt the multiply-encrypted protection control module.

(11) Re-Encryption Process

Figure 38:
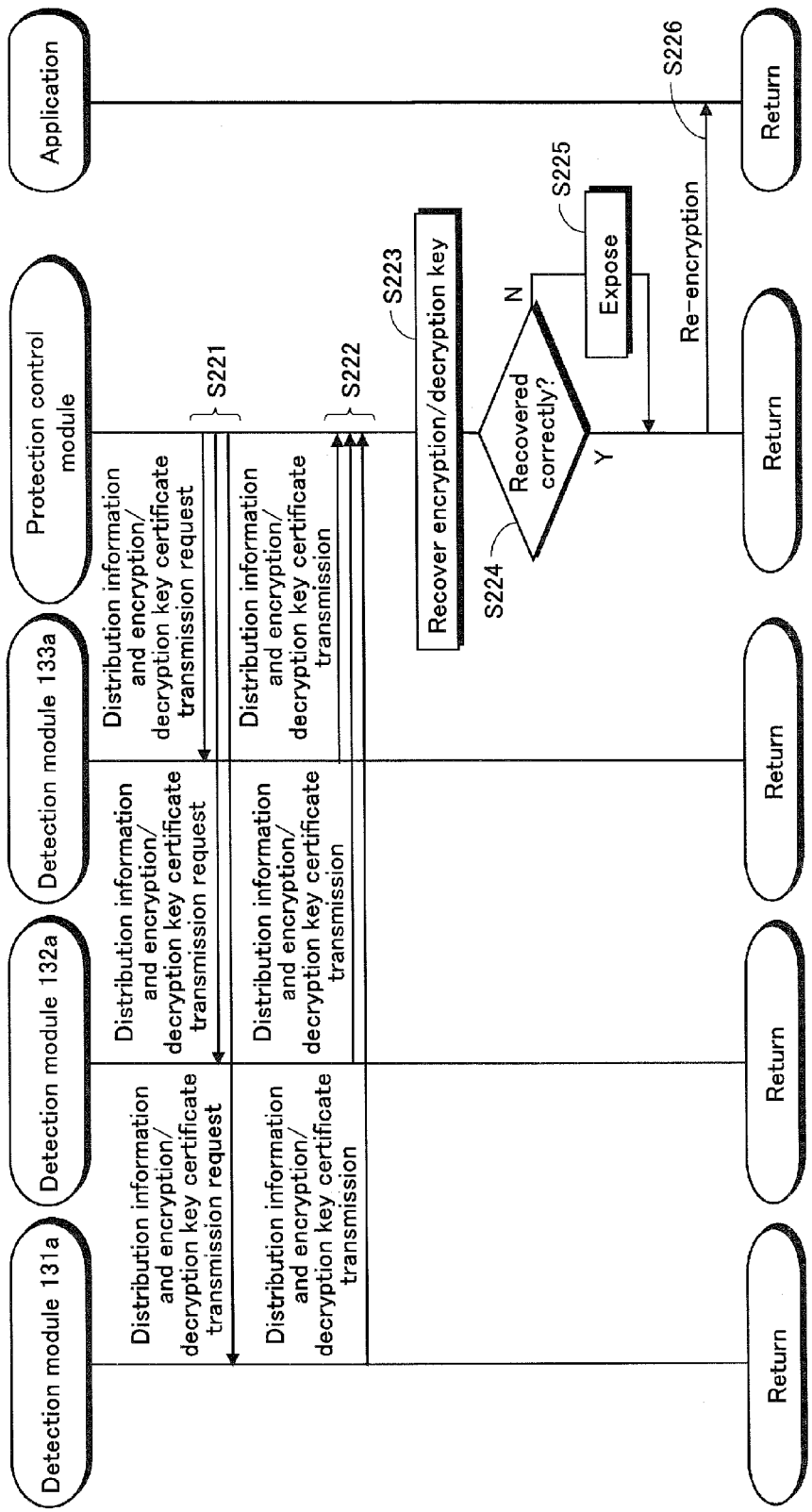
FIG. 38 is a sequence diagram of the re-encryption process pertaining to Embodiment 3.

Next, the re-encryption process of step S173 is explained in detail with reference to the sequence diagrams of FIG. 38.

Firstly, the updated protection control module requests transmission of the distribution information and the encryption/decryption key certificates respectively held by the detection modules 131a, 132a, and 133a (step S221).

Upon receiving such a request from the protection control module, each detection module transmits the distribution information and the encryption/decryption key certificate (step S222).

The protection control module receives the distribution information and the encryption/decryption key certificate from each update module, then recovers the encryption/decryption key used by the pre-update protection control module 120a (hereinafter called the old encryption/decryption key) from the received distribution information (step S223). In addition, the protection control module uses the encryption/decryption key certificates to verify whether or not the old encryption/decryption key has been recovered correctly (step S224).

If the old encryption/decryption key has not been recovered correctly (N in step S224), then the protection control module exposes the illicit detection module (by specifying which of the detection modules transmitted the illicit distribution information) (step S225). The management device 200 is notified of the illicit detection module so specified.

If the old encryption/decryption key has been recovered correctly (Y in step S224), then the protection control module generates a new encryption/decryption key. Then, the decryption loader decrypts the encrypted applications using the old encryption/decryption key and then re-encrypts the applications with the new encryption/decryption key (step S226).

The method by which the illicit detection module is specified in step S225 is described below. First, the protection control module collects a bundle of distribution information from each of the detection modules and adds identification information that identifies the detection modules thereto.

Afterward, this distribution information is placed into groups with the distribution information of the same values delivered at initial setup time. Then, the distribution information values in each group are compared, and distribution information bundles with the same values are further placed into a single sub-group. Subsequently, each sub-group is selected from the whole one at a time to generate all possible combinations.

The old encryption/decryption key is generated for each such combination and verification is performed to ensure that the old encryption/decryption key generated therefrom is valid. If verification succeeds, identification information indicating that the sub-group has successfully passed through verification is attached to the sub-group included in the combination.

For all combinations, after the old encryption/decryption key has been generated and verified, any distribution information included in a sub-group that has had such identification information attached thereto is removed.

Any remaining distribution information is an illicit value. As such, the detection module that transmitted the illicitly-valued distribution information can be specified through the identification information attached to such distribution information. The detection module specified by the identification information is specified as being an illicit detection module.

Further details of the old encryption/decryption key recovery process from the distribution information and of the illegal detection module specification process can be found on pages 50 through 52 of Patent Literature 2.

(12) Subsequent-Round Preparation Process

Figure 39:
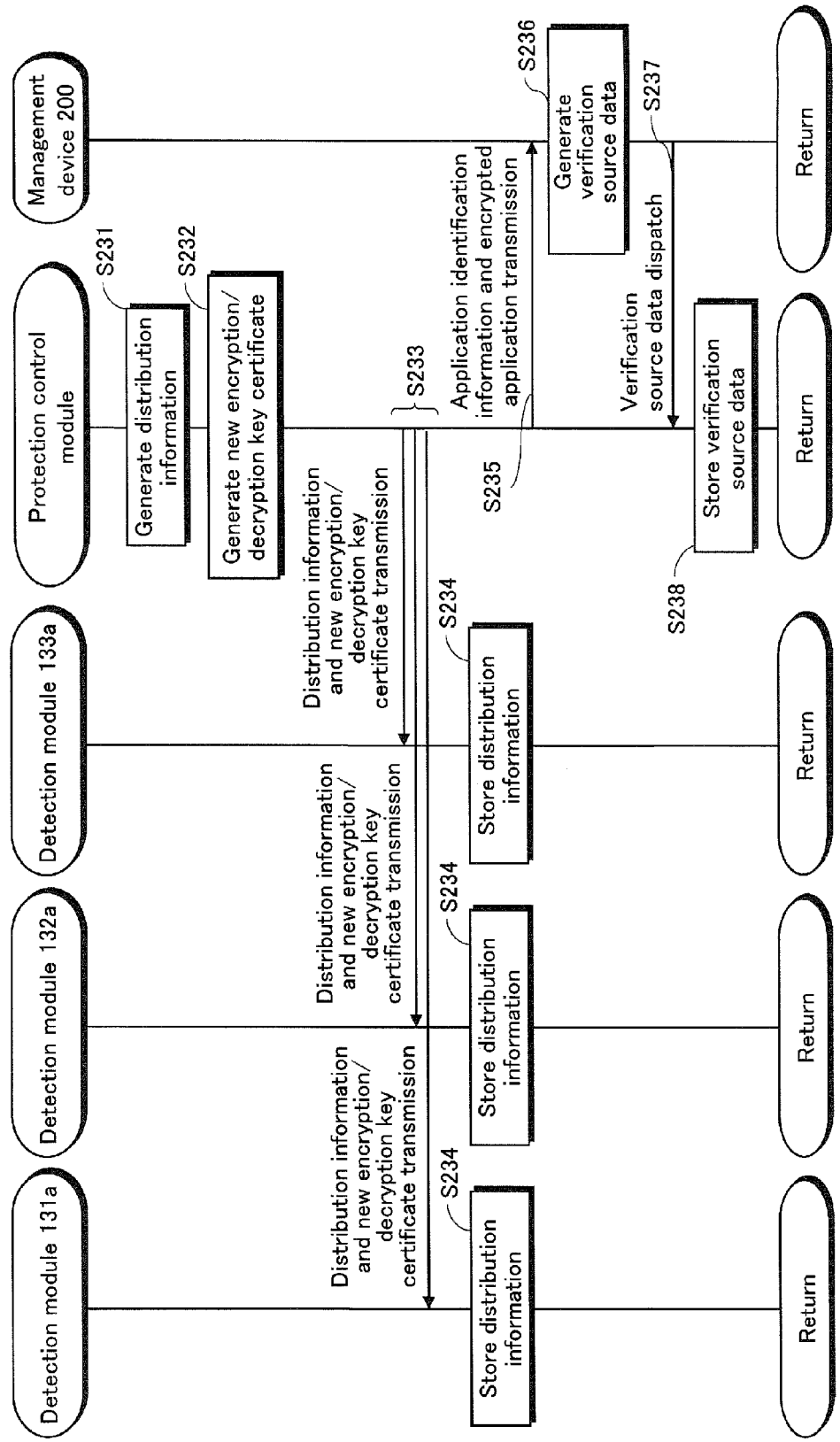
FIG. 39 is a sequence diagram of the subsequent-round preparation process pertaining to Embodiment 3.

Next, the subsequent round preparation process of step S106 is explained in detail with reference to the sequence diagram of FIG. 39. The subsequent-round preparation process takes place after the restoration process as preparation for the next restoration process. The specifics are described below.

First, the post-update protection control module generates distribution information from the new encryption/decryption key using the secret sharing scheme (step S231) and further generates a new encryption/decryption key certificate using the private signature key (step S232). Then, the protection control module transmits the distribution information and the encryption/decryption key certificate so generated to detection modules 131a, 132a, and 133a (step S233).

As in the initial setup process, the pieces of distribution information here generated match the detection modules in number such that each of the detection modules comes to hold a different pair of distribution information pieces. Identical new encryption/decryption key certificates are transmitted to all detection modules.

Detection modules 131a, 132a, and 133a each receive the distribution information and the new encryption/decryption key certificates from the protection control module and store these in the respective distribution information holders 411 thereof (step S234).

After the distribution information and the encryption/decryption key certificates have been transmitted to the detection modules in step S233, the protection control module transmits the application identification information, the encrypted applications, and a verification source data dispatch request to the management device 200 (step S235). Then, the management device 200 generates the verification source data (step S236).

The verification source data generation process in the subsequent-round preparation process is slightly different from that of the initial setup process.

The verification source data generation process within the subsequent-round preparation process involves using the new encryption/decryption key generated in the update process to decrypt the encrypted applications. After this point, the process of generating verification source data from the encrypted applications and the decrypted applications is substantially similar to the verification source data generation process performed in the initial setup process and is thus omitted.

The management device 200 transmits the verification source data so generated to the protection control module (step S237), which in turn stores the received verification source data therein (step S238).

4. Embodiment 3 Effects

In Embodiment 3, if tampering is detected in the protection control module 120a during the detection process, then the protection control module is updated, thus enhancing system security.

[Embodiment 4]

Embodiment 4 of the present invention is here described as an illegal module detection system 2. In Embodiment 4, a mechanism for updating a protection control module in which tampering has been detected with a new protection control module, as well as a mechanism for invalidating any update modules detected as being illicit are described in detail. Portions duplicated in Embodiments 1 through 3 are here omitted for simplicity.

1. Illegal Module Detection System 2 Structure

Figure 40:
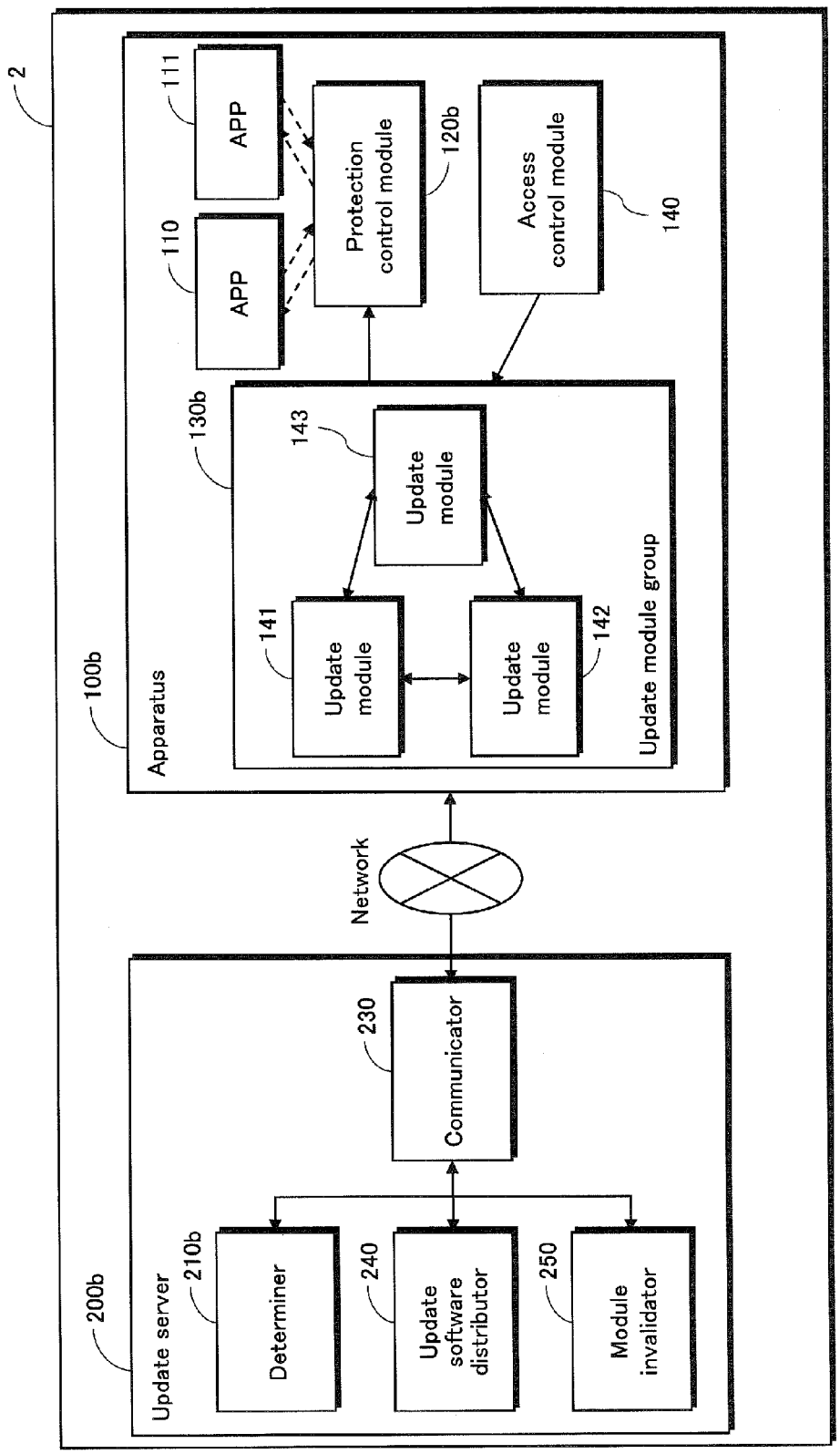
FIG. 40 is an overall configuration diagram of an illegal module detection system 2 pertaining to Embodiment 4.

FIG. 40 shows the overall configuration of the illegal module detection system 2. As shown, the illegal module detection system 2 comprises an apparatus 100b and an update server 200b. The apparatus 100b and the update server 200b are connected via a network.

Apparatus 100b Configuration

Much like the apparatus 100 of Embodiment 1, the apparatus 100b provides various services to users via the network.

The apparatus 100b includes application 110, application 111, a protection control module 120b, an update module group 130b, and an access control module 140. Application 110 and application 111, as well as the protection control module 120b, are broadly similar to those of the above-described Embodiments 1 through 3.

The update module group 130b is made up of a plurality of update modules. In Embodiment 4, the update module group 130b comprises three update modules, namely update module 141, update module 142, and update module 143.

Each update module detects the presence of tampering in the protection control module 120b. If the protection control module 120b is compromised, then each update module is able to download an updated protection control module from the update server 200 and update the compromised protection control module therewith.

The update modules 141, 142, and 143 may also be operable to update the applications 110 and 111.

In order to prevent the update modules from being tampered with by attackers and used illicitly, the update modules perform mutual tamper detection within the update module group 130b. The tamper detection results are transmitted to the update server 200. If a given update module is deemed compromised by the update server 200, the other, normal update modules receive an invalidation instruction from the update server 200 and invalidate the compromised update module.

Thus, even if attackers are able to tamper with some of the update modules included in the update module group 130, the attack can be detected and contained.

The access control module 140 holds therein access information necessary for the update modules to delete other update modules. This access information may be, for example, the address at which the module to be deleted can be found, a procedure describing the steps required for deletion, or similar. The access information is encrypted with an individual access information acquisition key for each respective module to be deleted.

(2) Update Module Configuration Details

The details of update modules 141, 142, and 143 are explained below.

Figure 41:
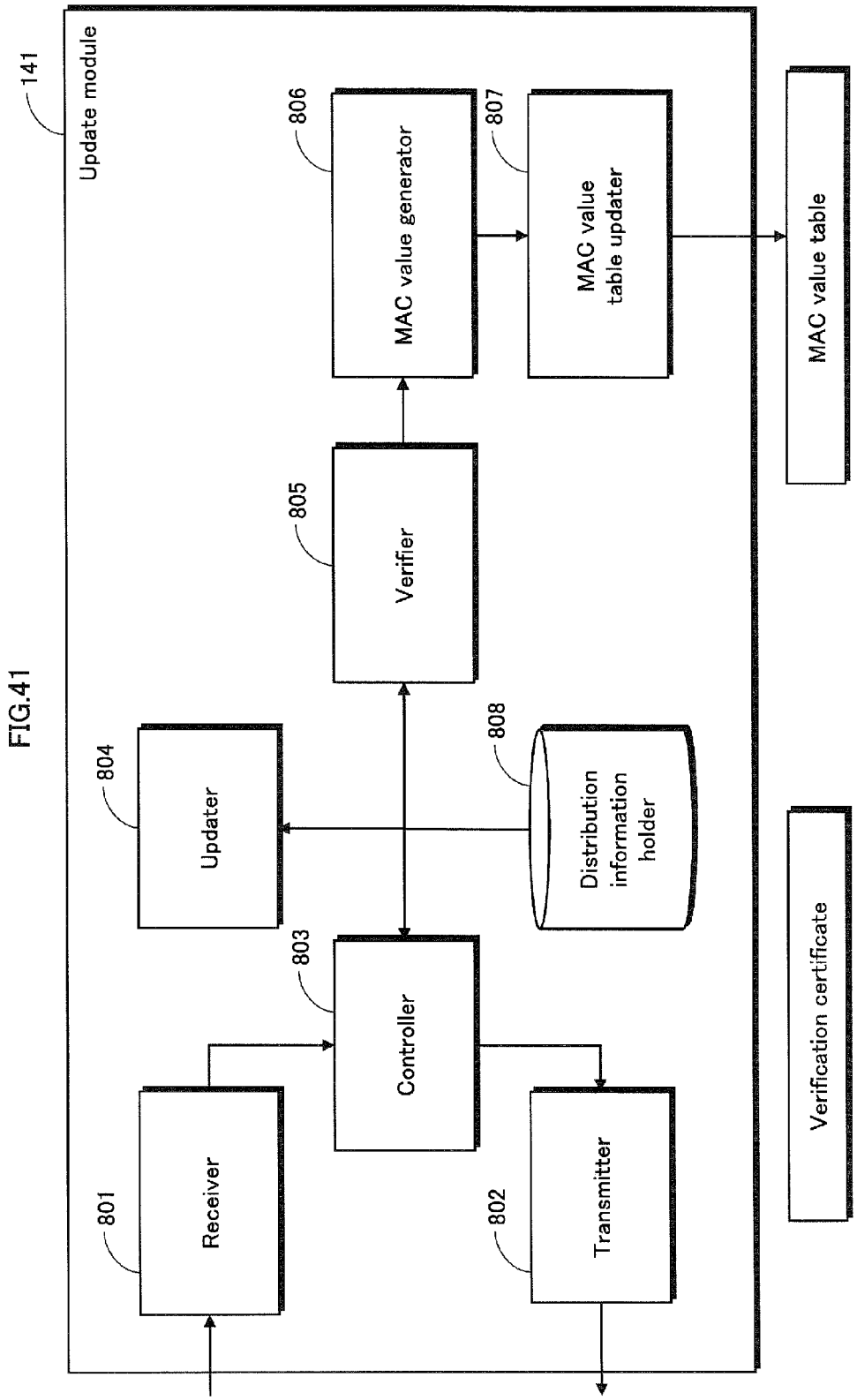
FIG. 41 is a block diagram of an update module 141 pertaining to Embodiment 4.

FIG. 41 is a functional block diagram showing the functional structure of update module 141. Update modules 142 and 143 share the same configuration as update module 141.

Update module 141 comprises a receiver 801, a transmitter 802, a controller 803, an updater 804, a verifier 805, a MAC value generator 806, a MAC value table updater 807, and a distribution information holder 808.

The components of update module 141 have identical functions to those of detection module 131a from Embodiment 3 (FIG. 24).

(Protection Control Module 120b Configuration Details)

Figure 42:
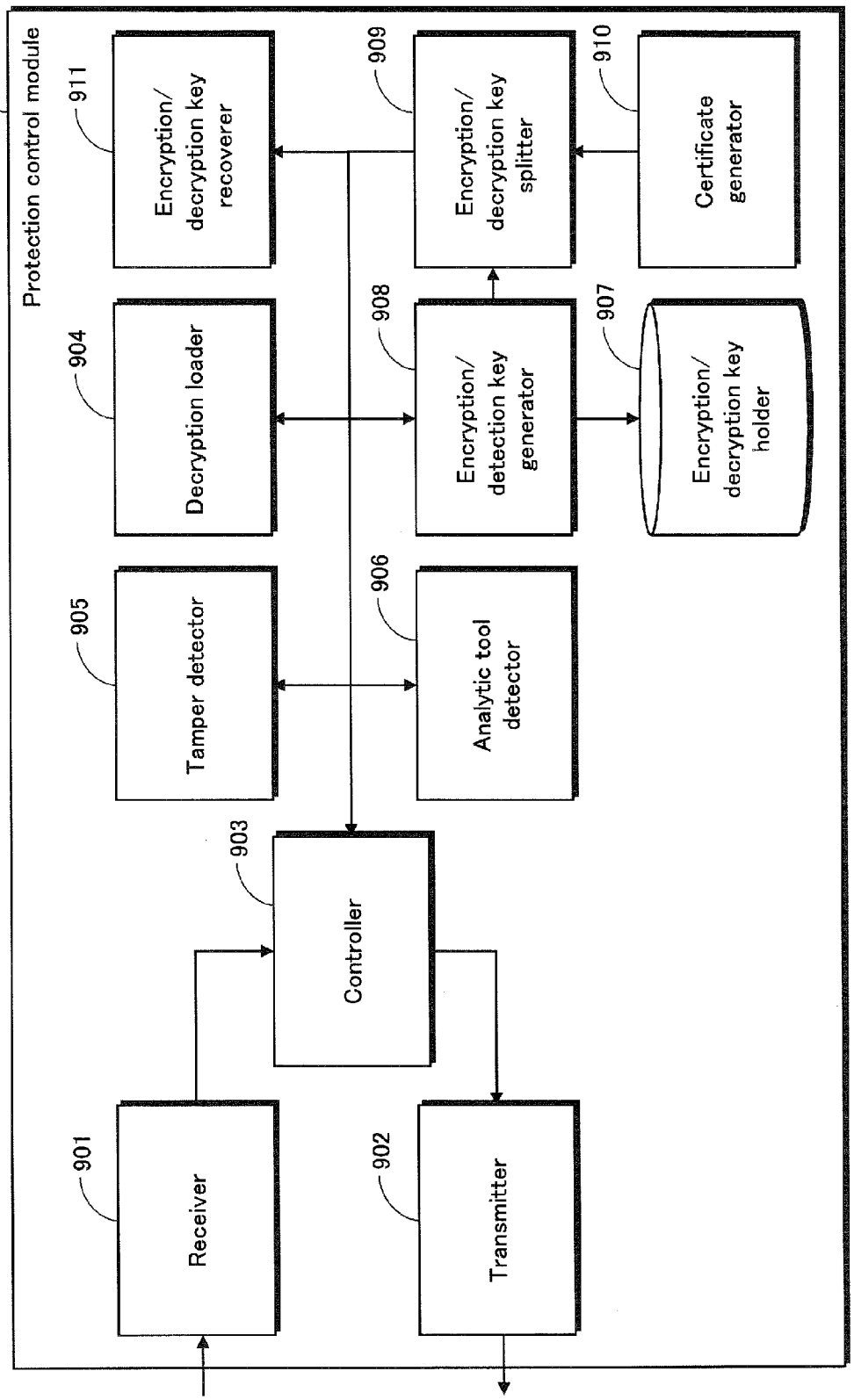
FIG. 42 is a block diagram of a protection control module 120*b* pertaining to Embodiment 4.

FIG. 42 is a functional block diagram of the protection control module 120b. As shown, the protection control module 120b comprises a receiver 901, a transmitter 902, a controller 903, a decryption loader 904, a tamper detector 905, an analytic tool detector 906, an encryption/decryption key holder 907, an encryption/decryption key generator 908, an encryption/decryption key splitter 909, a certificate generator 910, and an encryption/decryption key recoverer 911.

The components of the protection control module 120b have identical functions to those of the protection control module 120a from Embodiment 3 (FIG. 23). The encryption/decryption key generator 908, not featured in FIG. 23, generates an encryption/decryption key for encrypting and decrypting applications 110 and 111.

(Access Control Module 140 Configuration Details)

Figure 43:
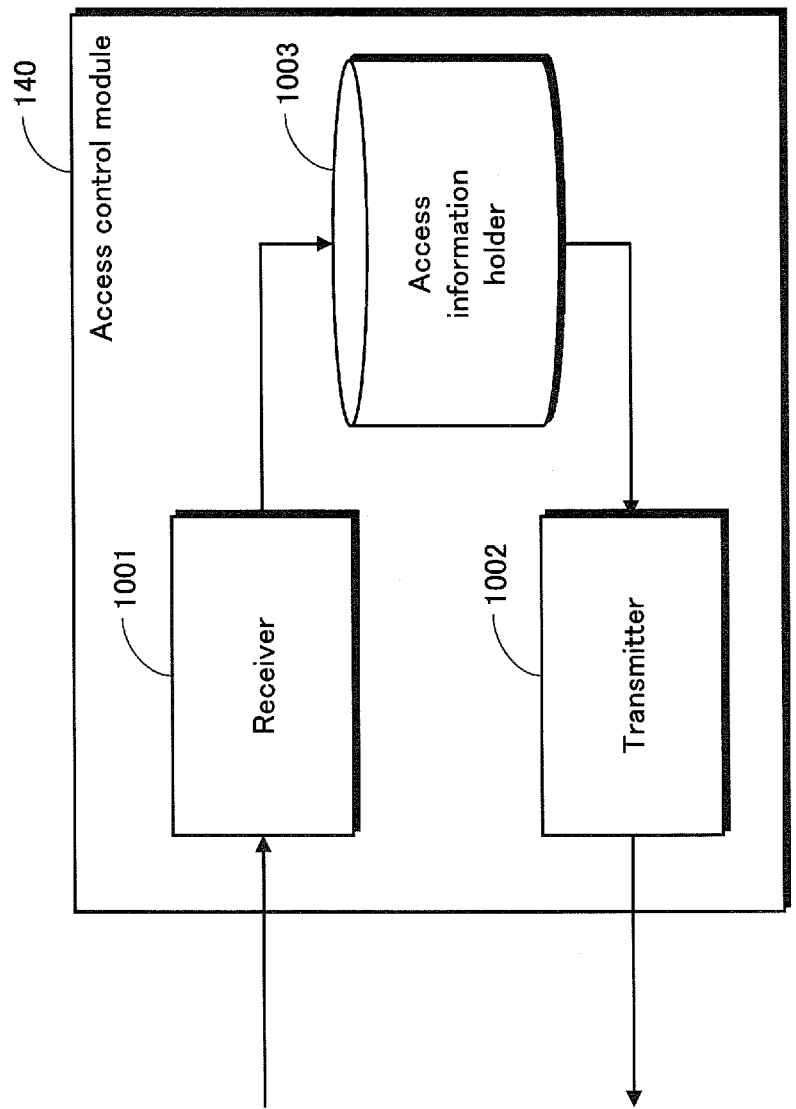
FIG. 43 is a block diagram of an access control module 140 pertaining to Embodiment 4.

FIG. 43 is a functional block diagram showing the functional structure of the access control module 140. As shown, the access control module 140 comprises a receiver 1001, a transmitter 1002, and an access information holder 1003.

The receiver 1001 receives acquisition requests from the update modules 141, 142, and 143 for access information required in order to delete a compromised update module.

In response to such access information acquisition requests, the transmitter 1002 transmits the access information to the update module making the request.

The access information holder 1003 holds therein the access information for deleting the update modules 141, 142, and 143.

Each piece of access information has an update module ID affixed thereto in order to identify the update module deletable thereby. In addition, each piece of access information is encrypted using the access information acquisition key.

Upon receiving an access information acquisition request from update module 141, 142, or 143, the access information holder 1003 transmits the access information to the requesting update module with the ID of the update module to be deleted attached thereto.

(Apparatus 100b Hardware Configuration)

Figure 44:
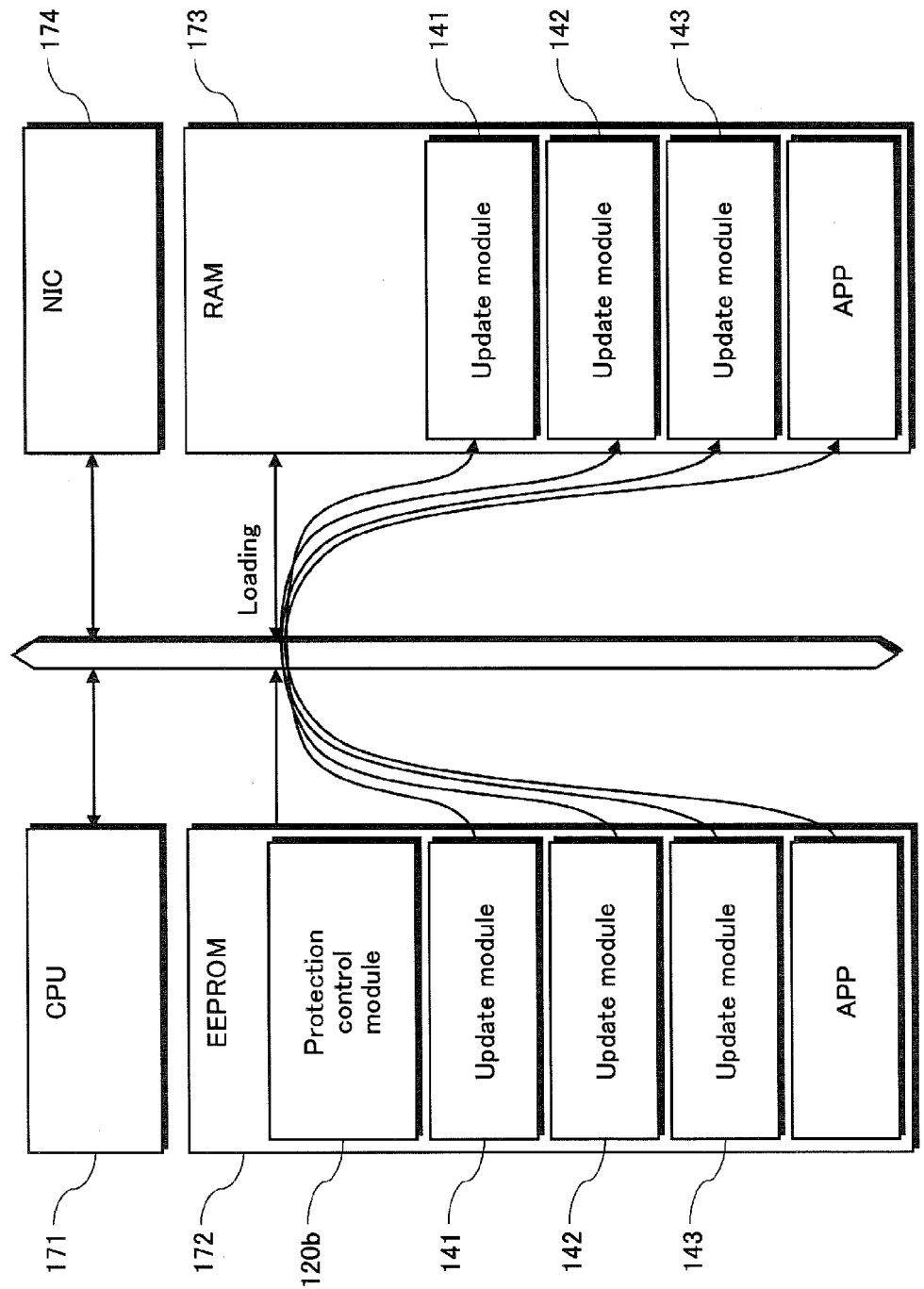
FIG. 44 is a hardware configuration diagram of an apparatus 100*b* pertaining to Embodiment 4.

The following describes the hardware configuration of the apparatus 100b with reference to FIG. 44.

As shown, the apparatus 100b includes a CPU 171, a non-volatile memory EEPROM 172, RAM 173, and a NIC 174. All of the above are connected via a bus so as to communicate with one another.

The EEPROM 172 contains therein the protection control module 120b, the update modules 141, 142, and 143, as well as the applications 110 and 111.

Each of the modules stored in the EEPROM 172 realizes all functions thereof in execution by the CPU 171. The specifics of each of the functions are described by computer programs.

The RAM 173 is used as the work area for the CPU 171. The update modules 141, 142, and 143, as well as the applications 110 and 111, are loaded into the RAM 173. The update modules operating in the RAM 173 are the target of the tamper detection and invalidation processes.

The NIC 174 is an expansion card for connecting to the network.

(Software Hierarchy)

Figure 45:
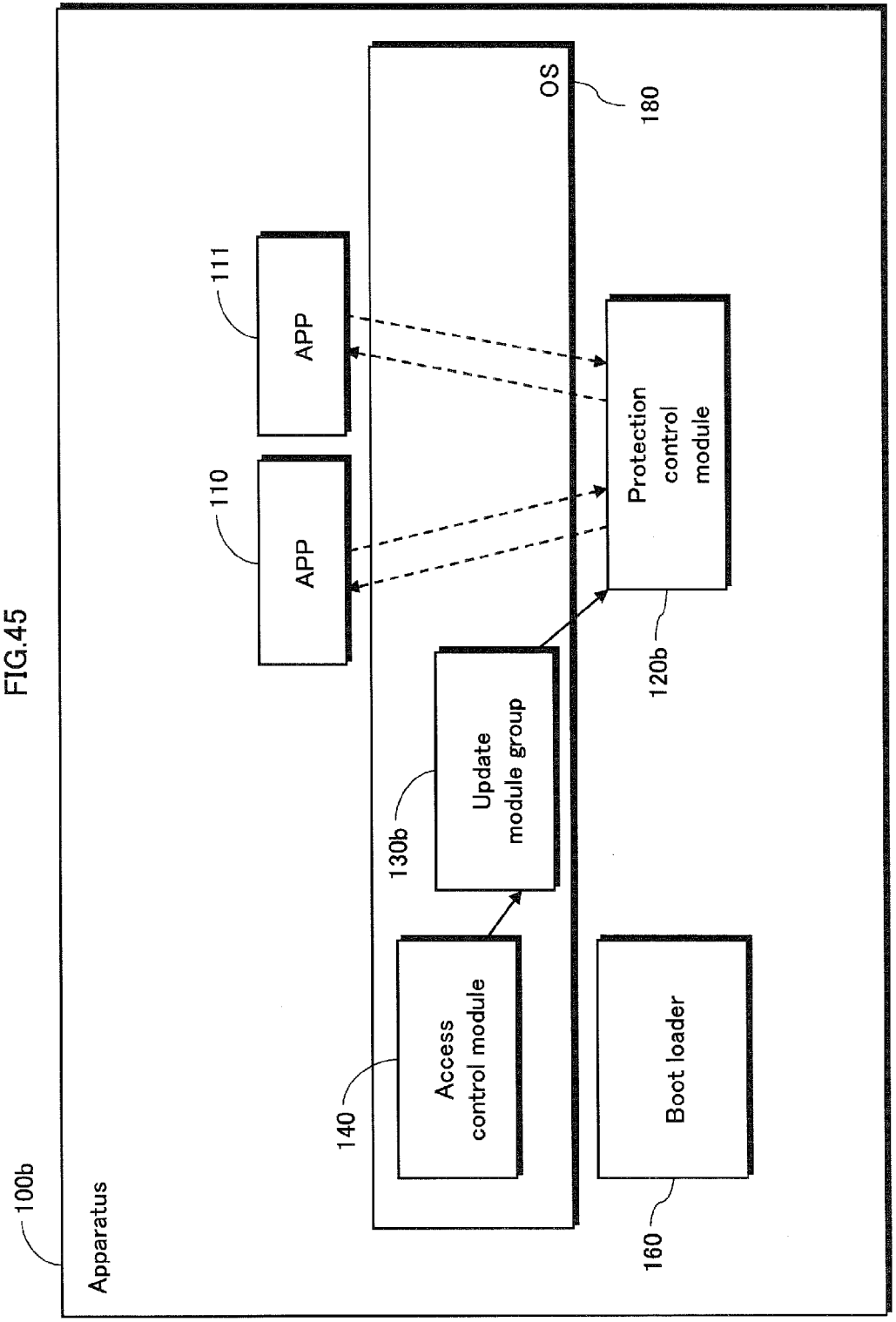
FIG. 45 is a software layer diagram of the apparatus 100*b* pertaining to Embodiment 4.

The following describes the software hierarchy of the apparatus 100b with reference to FIG. 45.

As shown, the access control module 140 and the update module group 130b are installed into an OS 180. Applications 110 and 111 operate within the OS 180, while the protection control module 120b and a boot loader 160 are outside OS 180 control.

When the apparatus 100b is started up, the protection control module 120b and the update module group 130b are started first before any applications are executed.

(2) Update Server 200b Configuration

Returning to FIG. 40, the update server 200b is explained next.

The update server 200b receives the tamper detection results from the update module group 130b of the apparatus 100b and functions accordingly as an illicit module specification device that specifies illicit update modules to be invalidated. Furthermore, the update server 200b additionally functions as a software delivery device that delivers software needed to update the software on the apparatus 100b (such as the protection control module 120b) thereto.

(Overall Structure)

As shown in FIG. 40, the update server 200b comprises a determiner 210b, a communicator 230, an update software distributor 240, and a module invalidator 250. The update server 200b is a computer system that comprises a CPU, ROM, RAM, a hard disk unit, and so on. The update server 200b performs the above-described functions through operation by the CPU according to computer programs stored in ROM or on the hard disk unit.

The determiner 210b receives the tamper detection results from the update module group 130b of the apparatus 100b and functions accordingly, specifying illicit update modules that must be invalidated.

The communicator 230 transmits and receives information to and from each component of the apparatus 100b and the update server 200b. For example, the communicator 230 transmits the tamper detection results received from the apparatus 100b to the determiner 210b. Communication between the apparatus 100b and the update server 200b may also be performed via encrypted data or the like, and may use secure channels.

When updating the protection control module 120b, the update software distributor 240 operates in concert with the update modules 141, 142, and 143 to safely transmit the updated software to the apparatus 100b.

The module invalidator 250 receives access information acquisition key requests from the update modules 141, 142, and 143, and then transmits the access information acquisition key to the requesting update module.

Next, each component of the update server 200b is described.

(Determiner 210b Configuration Details)

Figure 46:
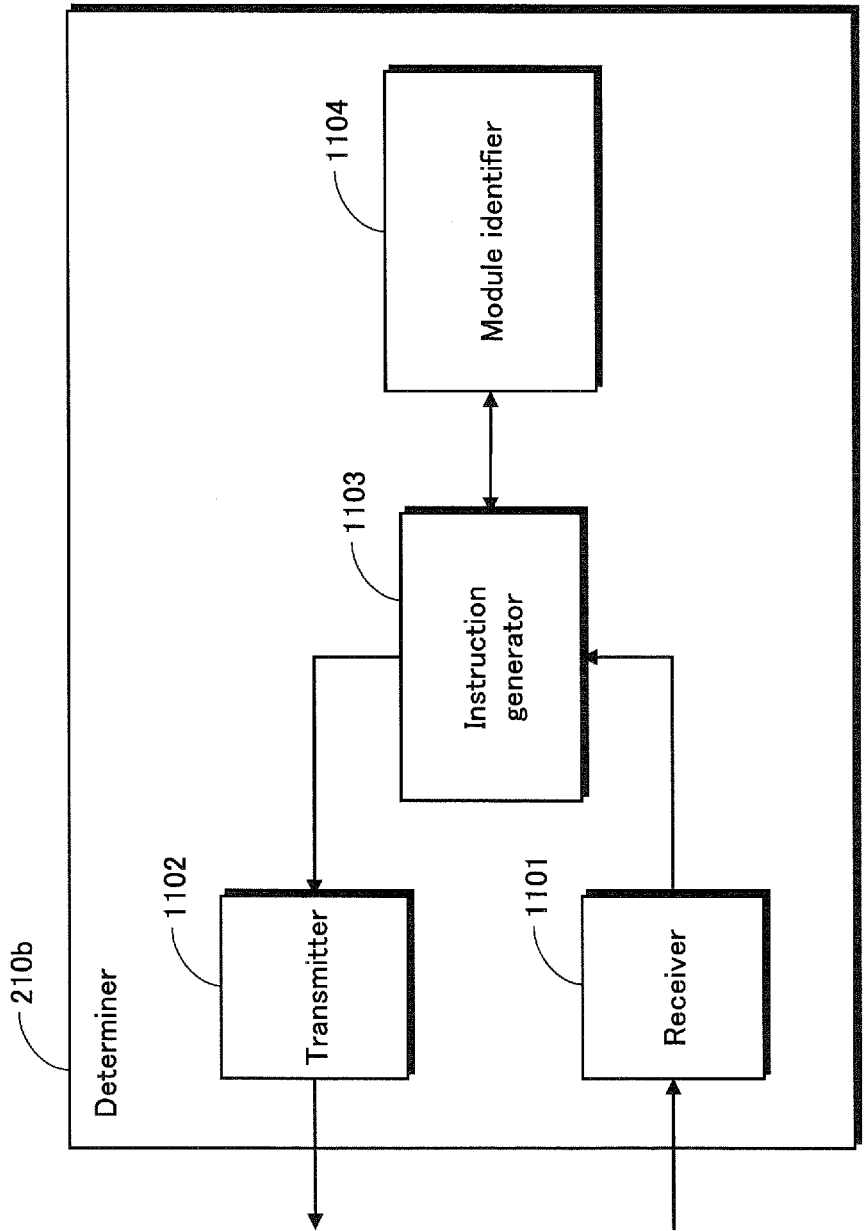
FIG. 46 is a block diagram of a determiner 210*b* pertaining to Embodiment 4.

FIG. 46 is a functional block diagram showing the functional structure of the determiner 210b.

As shown, the determiner 210b comprises a receiver 1101, a transmitter 1102, an instruction generator 1103, and a module specifier 1104.

The components of the determiner 210b have identical functions to those of the determiner 210 from Embodiment 1 (FIG. 6).

(Update Software Distributor 240 Configuration Details)

Figure 47:
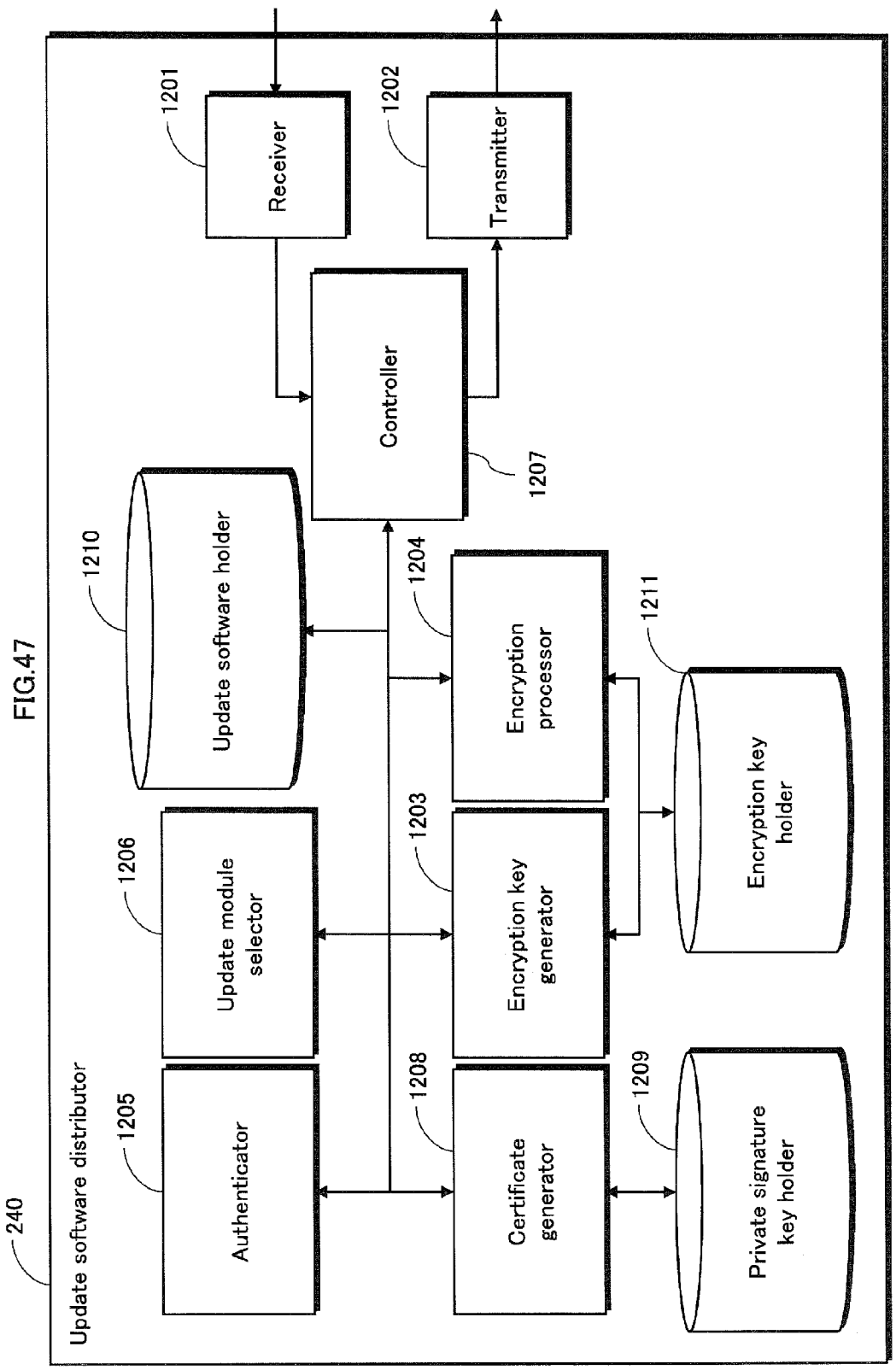
FIG. 47 is a block diagram of an update software distributor 240 pertaining to Embodiment 4.

FIG. 47 is a functional block diagram showing the functional structure of the update software distributor 240.

As shown, the update software distributor 240 comprises a receiver 1201, a transmitter 1202, an encryption key generator 1203, an encryption processor 1204, an authenticator 1205, an update module selector 1206, a controller 1207, a certificate generator 1208, a private signature key holder 1209, an update software holder 1210, and an encryption key holder 1211.

The components of the update software distributor 240 have identical functions to those of the verification source data distributor 220a from Embodiment 3 (FIG. 25). The update software holder 1210 olds therein an updated protection control module with which to update the protection control module 120b in case of an attack.

(Module Invalidator 250 Configuration Details)

Figure 48:
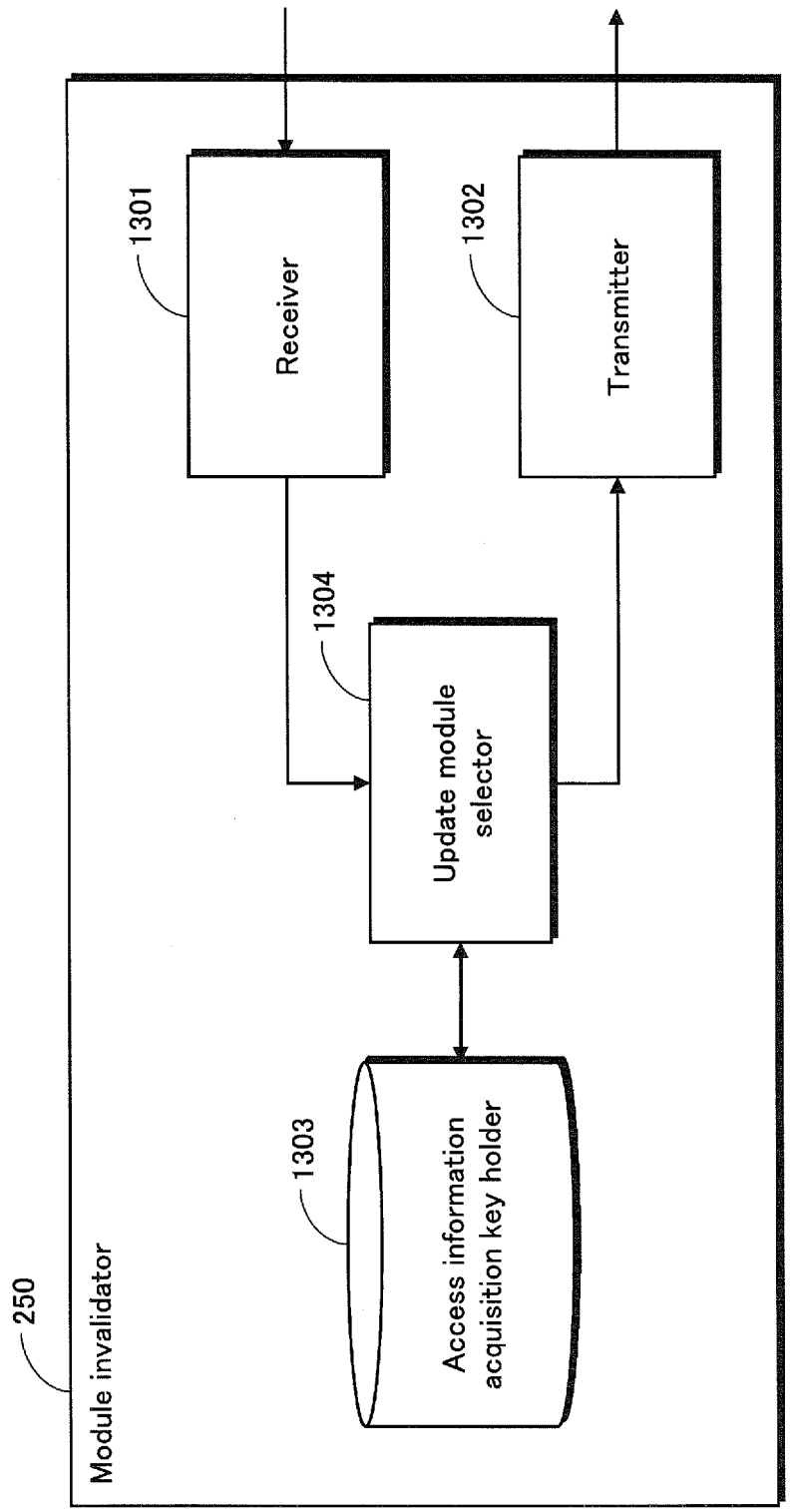
FIG. 48 is a block diagram of a module invalidator 250 pertaining to Embodiment 4.

FIG. 48 is a functional block diagram showing the functional structure of the module invalidator 250.

As shown, the module invalidator 250 comprises a receiver 1301, a transmitter 1302, an access information acquisition key holder 1303, and an update module selector 1304.

The receiver 1301 receives instructions from the determiner 210b to invalidate a compromised update module. In addition, the receiver 1301 receives acquisition requests for the access information acquisition key from the update modules 141, 142, and 143.

The transmitter 1302 transmits the access information acquisition key to the requesting update module in response to such requests.

The access information acquisition key holder 1303 holds therein the access information acquisition key that decrypts the access information held by the access control module 140.

The update module selector 1304 selects an update module to perform invalidation on the compromised update module, and then instructs the selected update module to such effect.

If an acquisition request for an access information acquisition key has been made by the update module selected by the update module selector 1304, then the transmitter 1302 attaches the ID of the update module that is to be deleted to the access information acquisition key and transmits the whole to the selected module.

2. Illegal Module Detection System 2 Operations

The operations of the illegal module detection system 2 are described below.

(1) Overall Operations Outline

Figure 49:
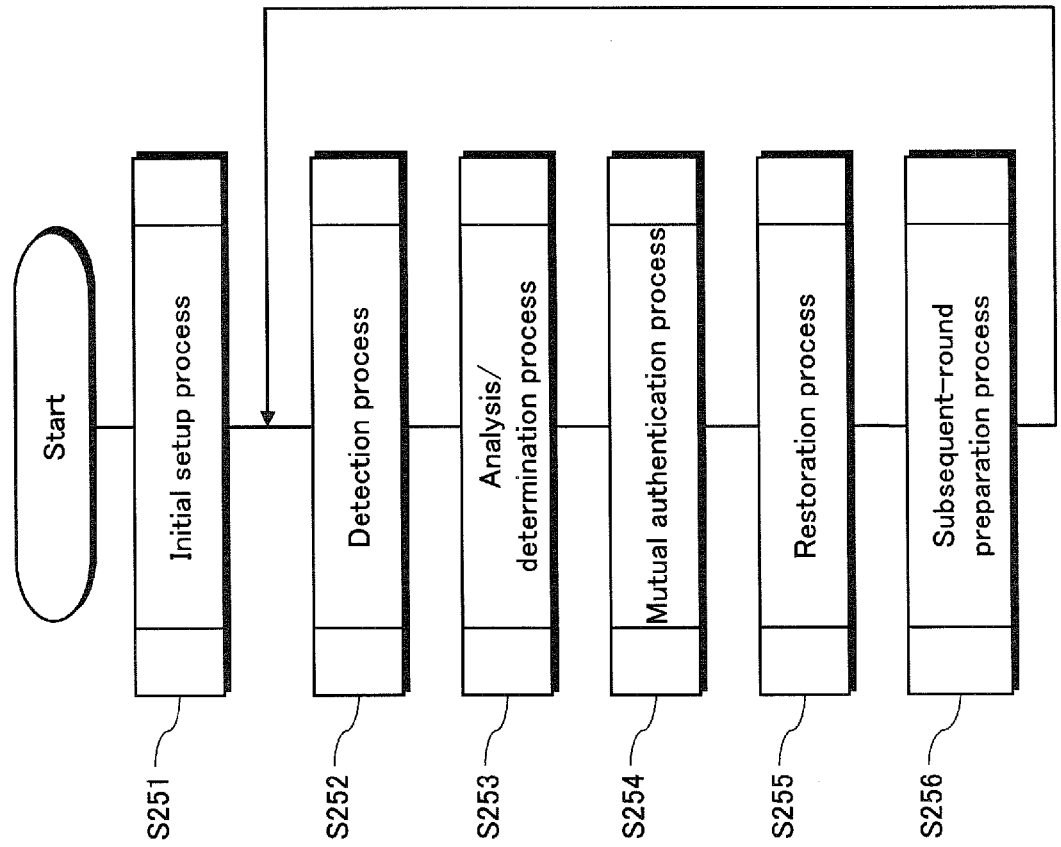
FIG. 49 is a flowchart showing the overall operations of the illegal module detection system 2 pertaining to Embodiment 4.

FIG. 49 is a flowchart showing the overall process flow of the illegal module detection system 2. The overall process for the illegal module detection system 2 is identical to that of Embodiment 2 (FIG. 26).

(2) Initial Setup Operations

Figure 51:
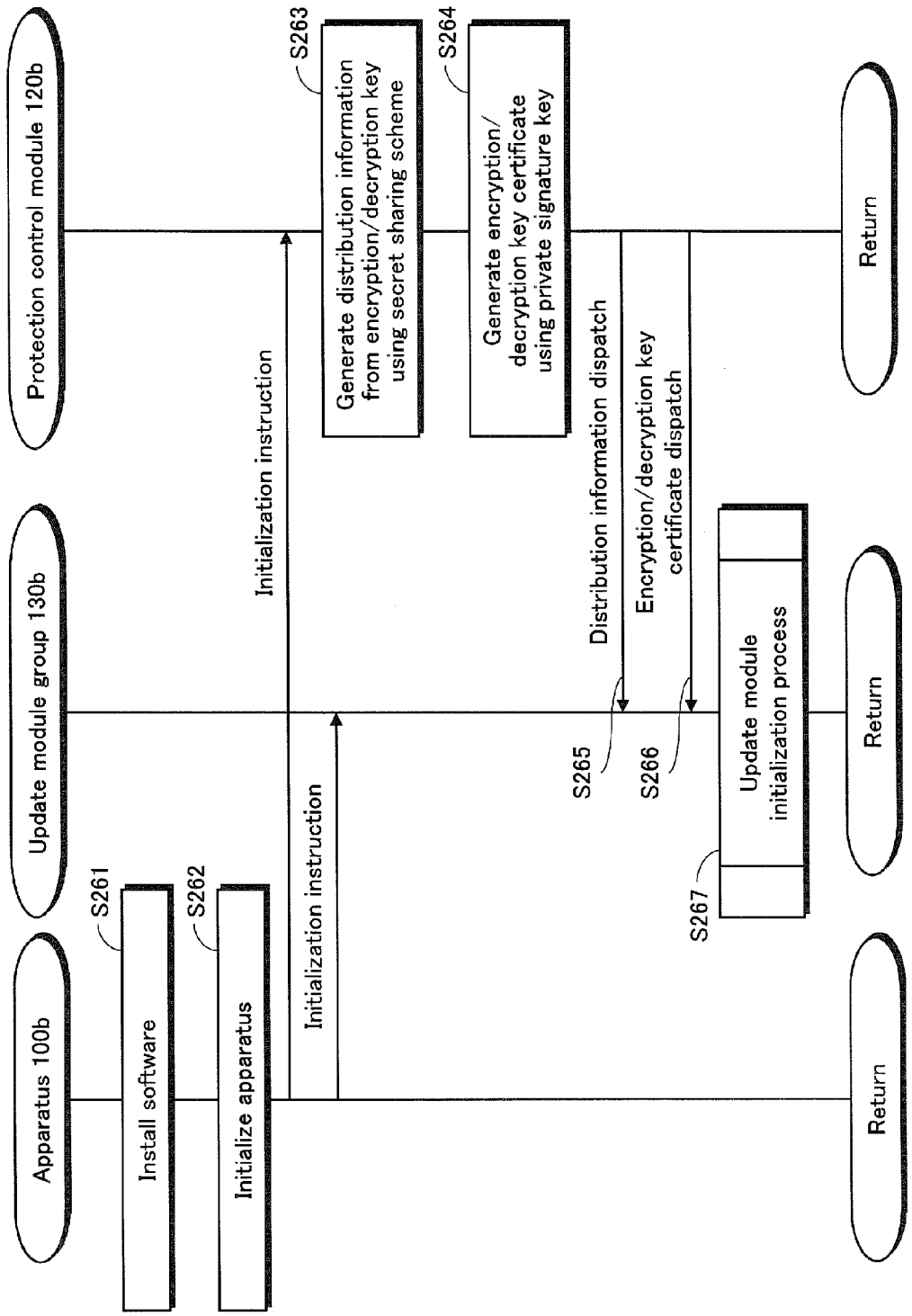
FIG. 51 is a sequence diagram showing the initial setup process pertaining to Embodiment 4.

FIG. 51 is a sequence diagram showing the initial setup process.

When the apparatus 100b is manufactured, the illegal module detection system 2 installs all of the software into the non-volatile memory thereof.

Figure 50:
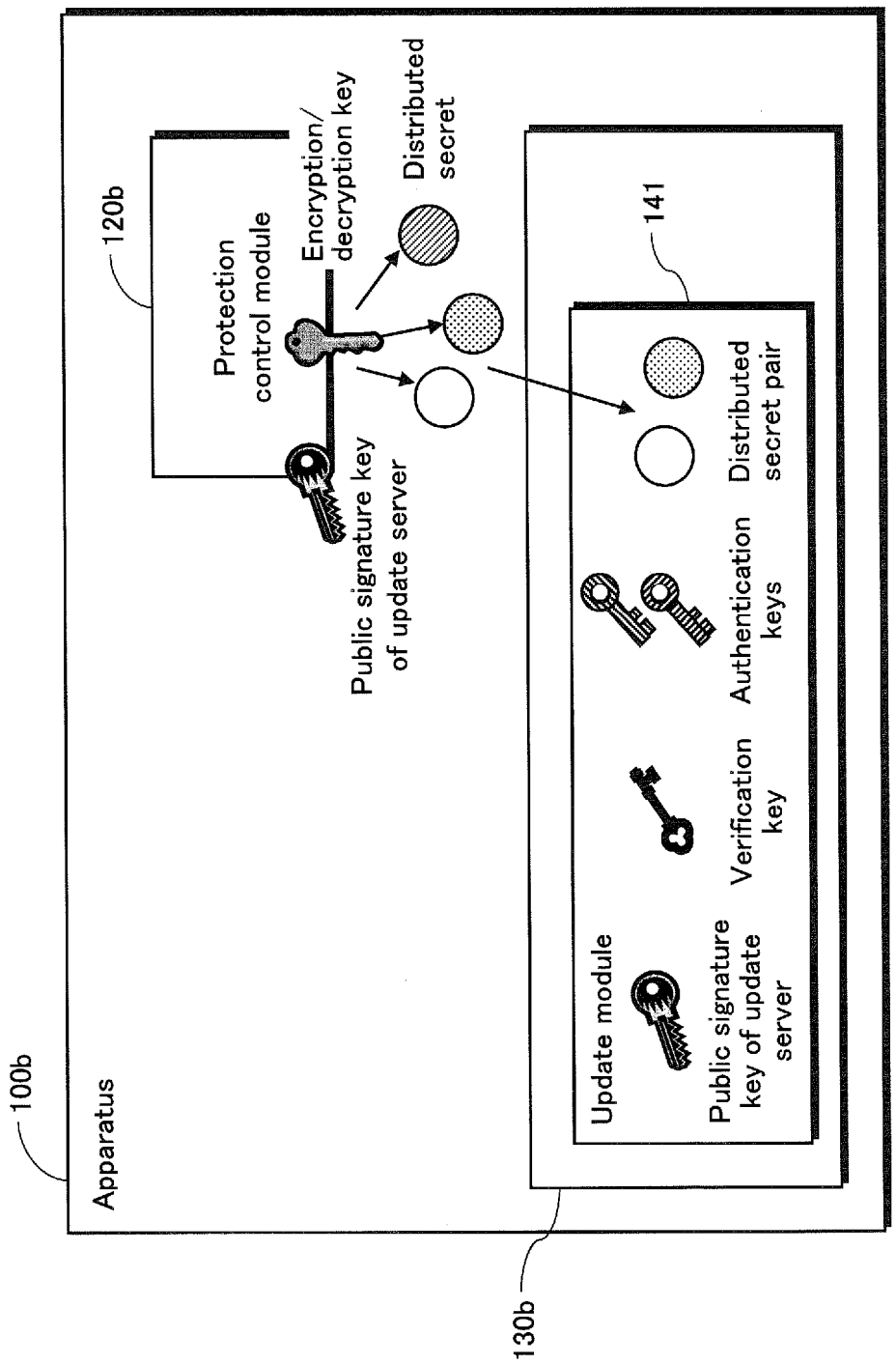
FIG. 50 is a diagram explaining the initial setup process pertaining to Embodiment 4.

The keys embedded into the apparatus 100b as part of the initial setup process are described below with reference to FIG. 50. FIG. 50 is a schematic diagram of the keys embedded into the apparatus 100b. Here, the update module group 130 includes update module 141 only. In reality, update modules 142 and 143 are also included therein, but are omitted.

As shown in FIG. 50, the encryption/decryption key is embedded into the protection control module 120b, whereas the public signature key, the verification key, and the pair of authentication keys are embedded into update module 141 (at this point in time, the distribution information bundle has not yet been embedded into the update module). Furthermore, update module IDs that identify each of the update modules are embedded into update module 141, which is installed in the apparatus 100b in this form.

The encryption/decryption key is used to encrypt and to decrypt applications 110 and 111. The applications are encrypted using the encryption/decryption key and stored in non-volatile memory in encrypted form. At execution time, the protection control module 120b decrypts the applications using the encryption/decryption key before execution thereof.

If the apparatus 100b is executing several applications through context switching, then decryption occurs at context-switching time by using the encryption/decryption key to encrypt or decrypt the data used by the applications. Thus, whenever the applications are executed, extraction of data therefrom by an analytic tool such as a debugger can be prevented.

The keys embedded into the update modules include a public signature key shared by all of the update modules. The verification key and the pair of authentication keys differ for each update module.

Figure 27:
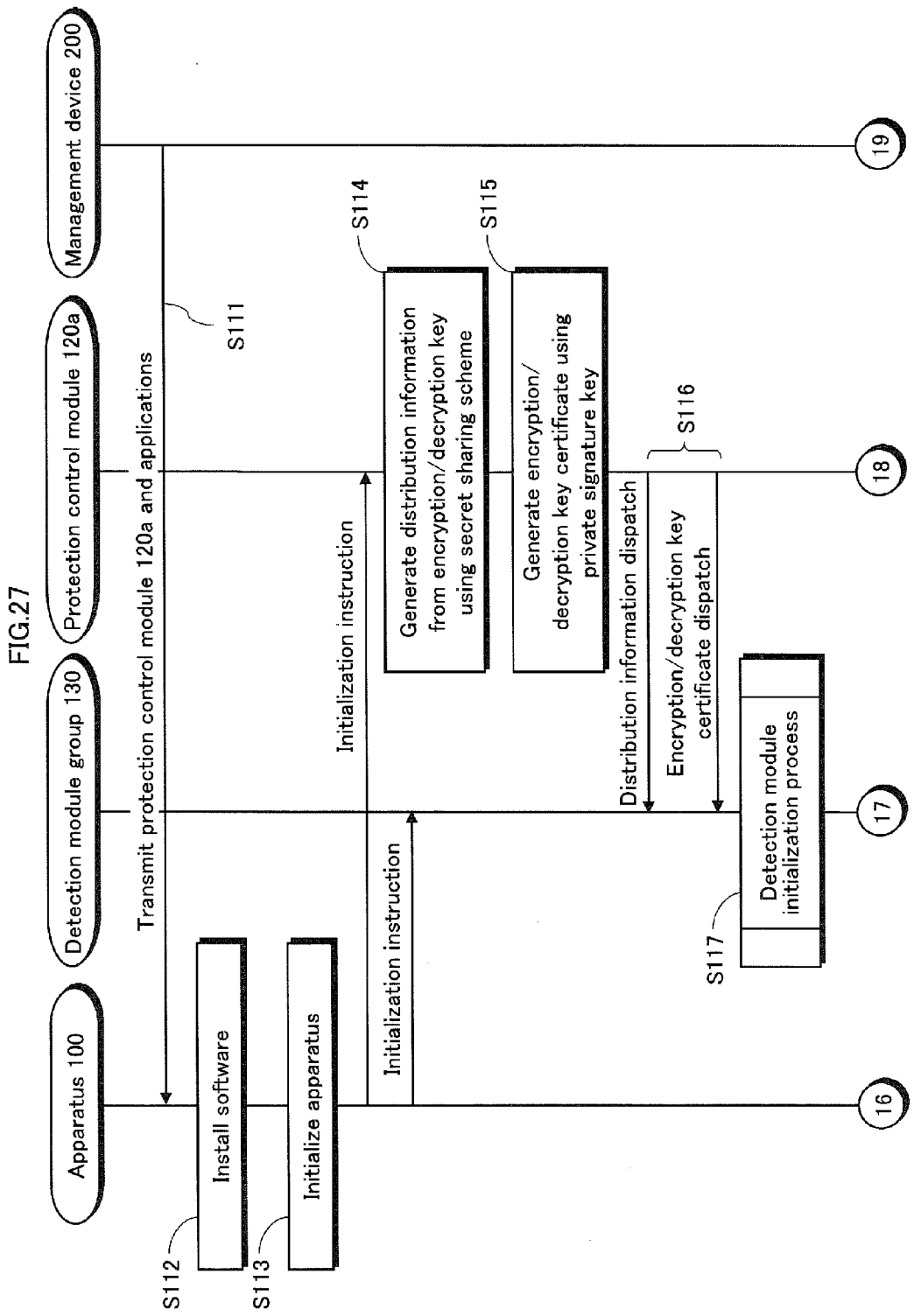
FIG. 27 is a sequence diagram showing the initial setup process pertaining to Embodiment 3.
Figure 28:
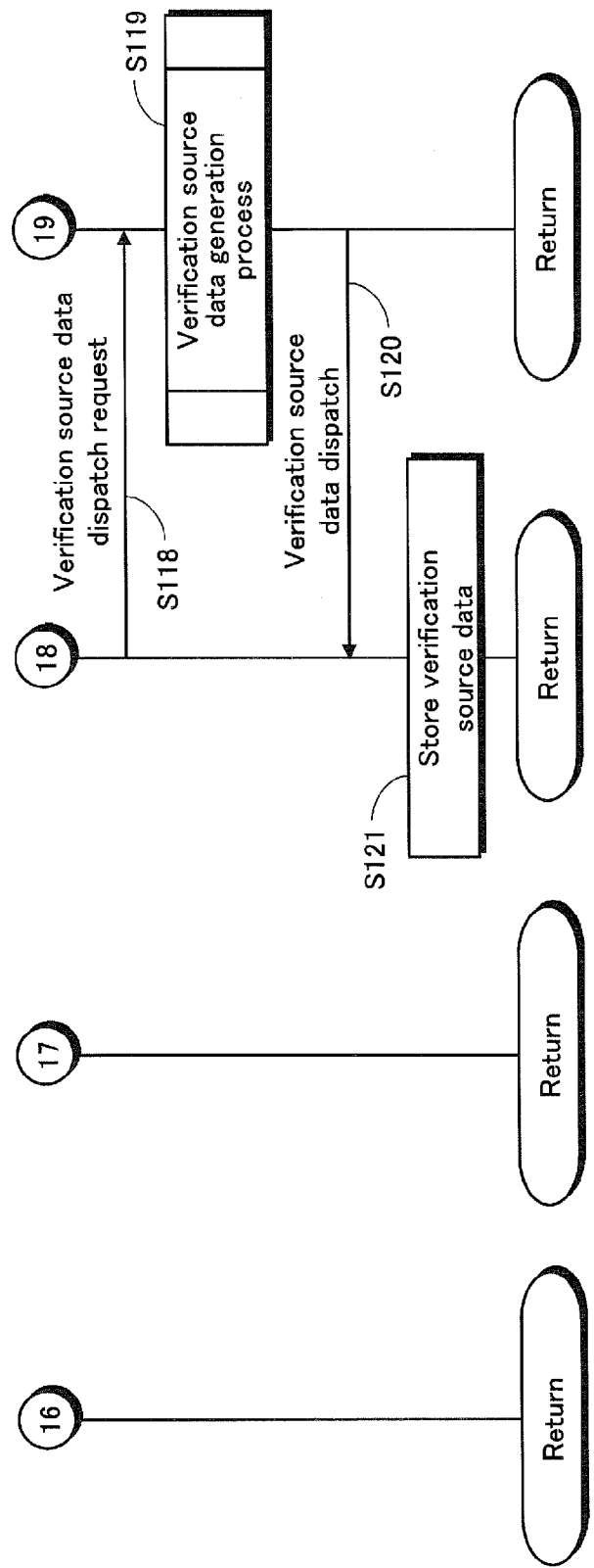
FIG. 28 is a sequence diagram showing the initial setup process pertaining to Embodiment 3.

The process of steps S261 through S267 is identical to that of steps S113 through S117 of Embodiment 3 (FIG. 27).

(3) Update Module Initial Setup Process

Figure 52:
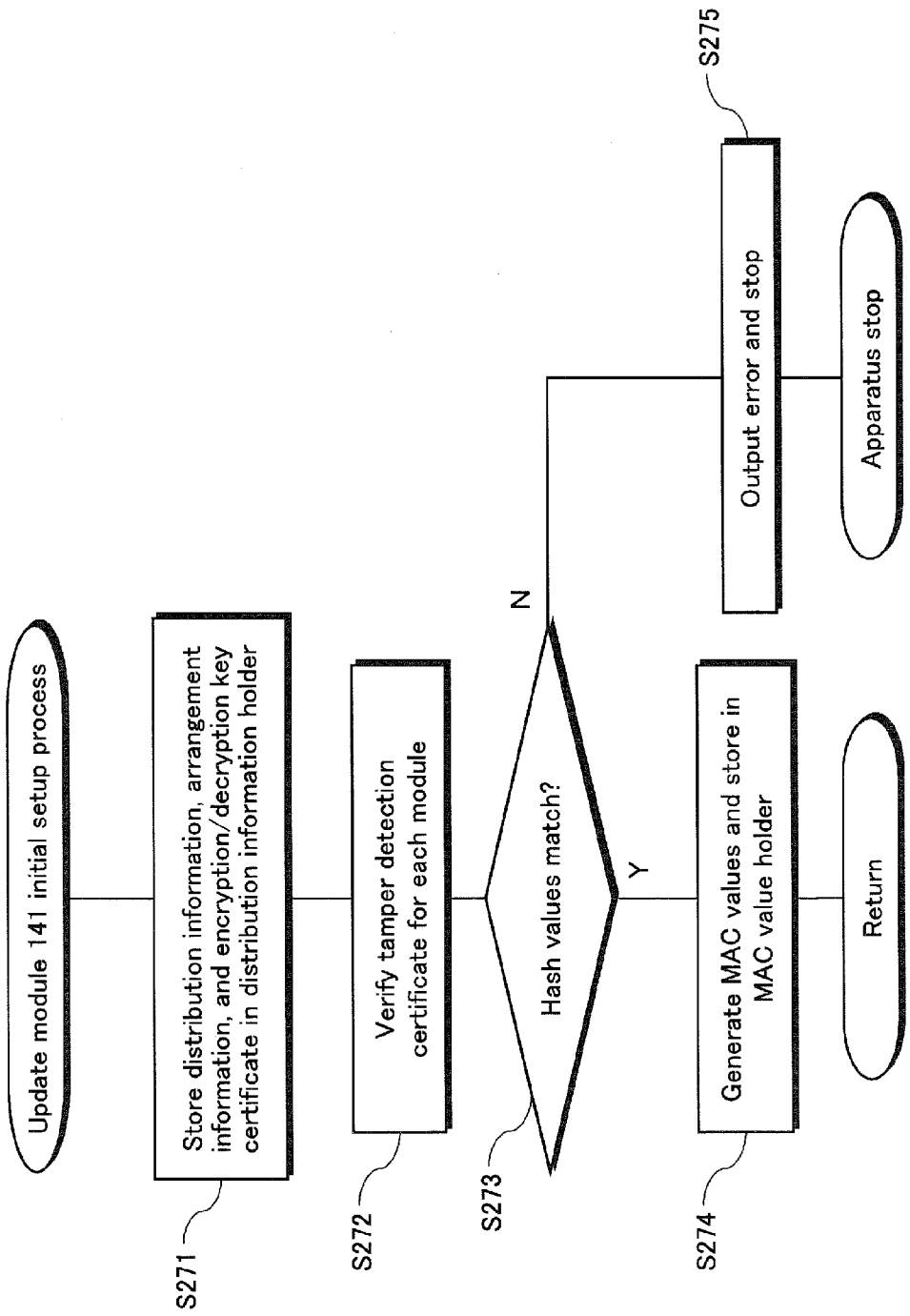
FIG. 52 is a flowchart of the initial setup process for the update modules pertaining to Embodiment 4.

FIG. 52 is a flowchart showing the update module initial setup process (step S267 from FIG. 51). Although FIG. 52 describes update module 141, the operations of update module 142 and 143 are essentially identical.

Figure 29:
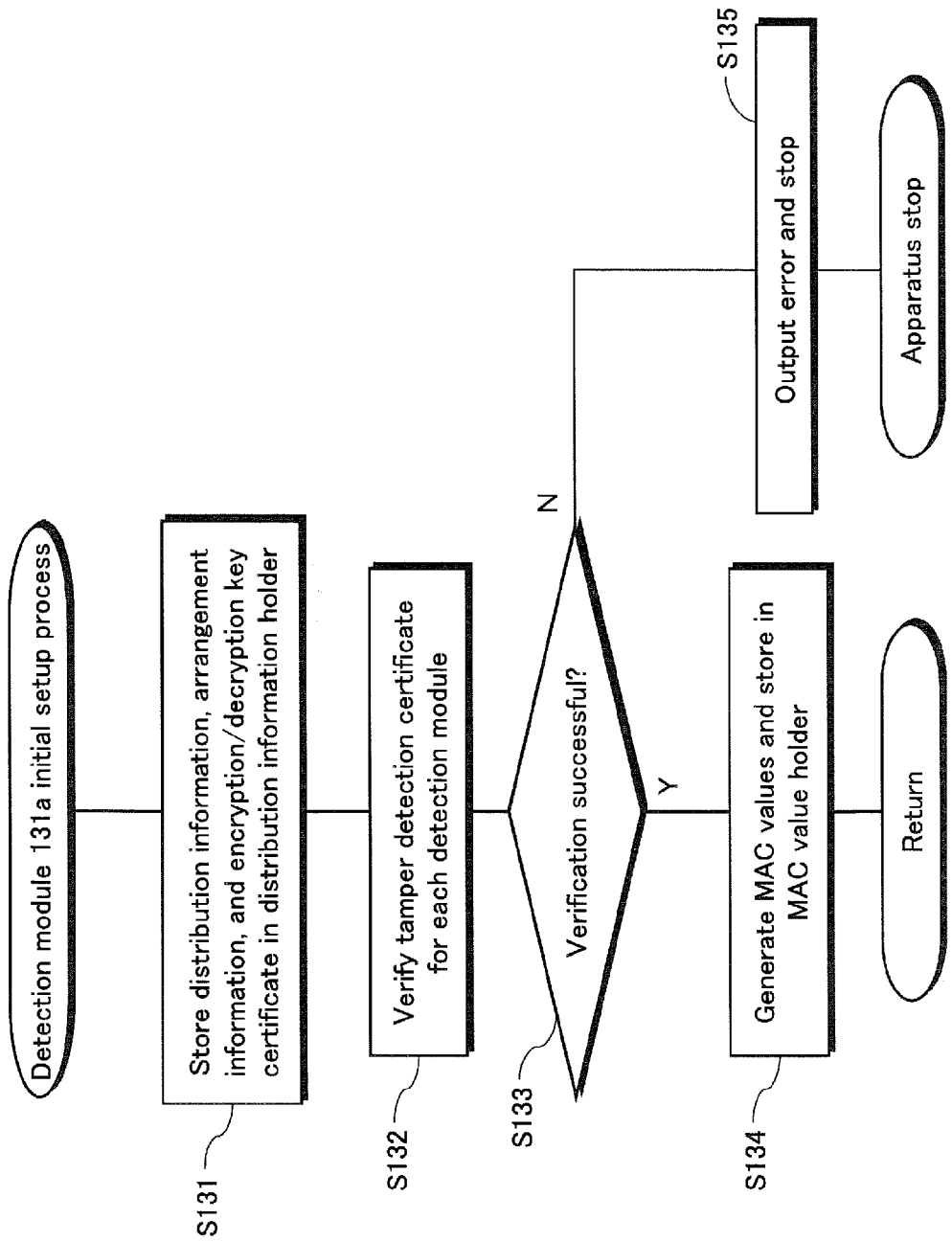
FIG. 29 is a flowchart of the initial setup for detection modules pertaining to Embodiment 3.

The update module initial setup process is identical to that of Embodiment 3 (FIG. 29).

(4) Detection Process Operations

The details of the detection process (step S252 from FIG. 49) performed by the illegal module detection system 2 is explained below with reference to the sequence diagram of FIG. 53.

After the initial setup process is complete, the apparatus 100b is shipped from the factory and sent to the user.

When an application is executed by the apparatus 100b, the protection control module 120b within controls the decryption loading function, the tamper detecting function, the analytic tool detecting function, and so on, in order to protect the application from attacks.

The detection process of Embodiment 4 is different from that of Embodiments 1 through 3.

First, each of the update modules performs tamper detection on the protection control module 120b (step S281). This tamper detection process is performed by using the verification key to calculate the MAC value of the protection control module 120b, and then comparing the MAC value so calculated to that held in the MAC value table.

If the MAC values match, then the protection control module 120b is judged to be uncompromised. However, if the MAC values do not match, then the protection control module 120b is judged to be compromised.

Figure 53:
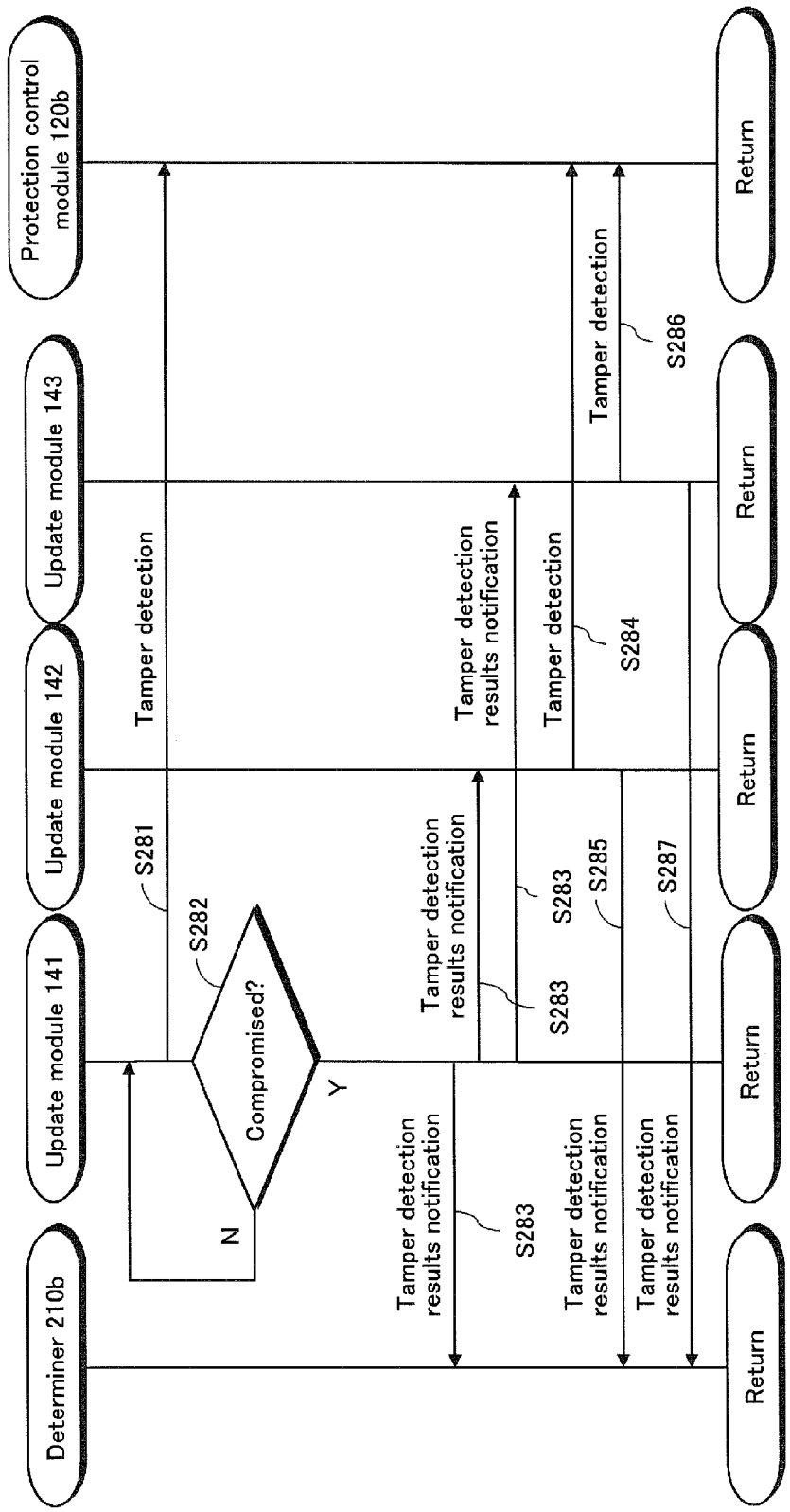
FIG. 53 is a sequence diagram of the detection process pertaining to Embodiment 4.

In order to simplify FIG. 53, only update module 141 is described as performing tamper detection on the protection control module 120. Of course, in reality, update modules 142 and 143 also perform the same process.

Judgment of whether or not the protection control module 120b has been compromised, i.e. of whether or not the MAC values match, is made (step S282). Then, if the protection control module 120b is judged to be compromised (Y in step S282), update module 141 notifies the determiner 210b of the update server 200b and the other update modules to such effect (step S283).

If the protection control module 120b is judged to not be compromised (N in step S282), then update module 141 resumes the tamper detection process without notifying the determiner 210b or the other update modules.

An update module receiving notification from another update module that the protection control module 120b has been compromised uses the verification key and MAC value to perform tamper detection thereon (steps S284 and S286). The determiner 210b and the other update modules are then notified of the tamper detection results (steps S285 and S287).

(5) Analysis/Determination Process

Figure 54:
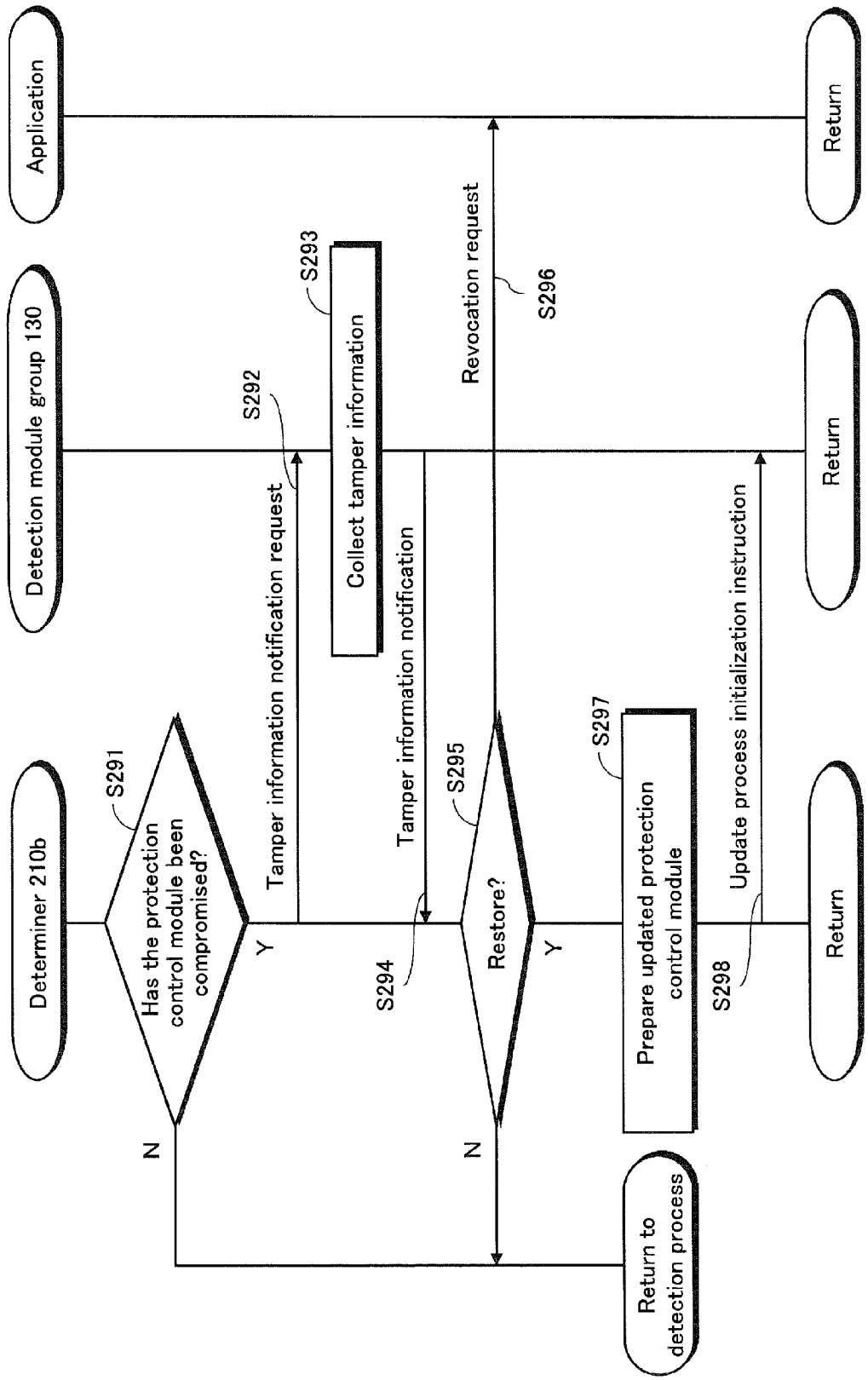
FIG. 54 is a sequence diagram of the analysis/determination process pertaining to Embodiment 4.

FIG. 54 is a sequence diagram showing the analysis/determination process (step S253 in FIG. 49). FIG. 54 illustrates the process performed individually by each update module 141, 142, and 143 as performed by the update module group 130b.

The analysis/determination process is identical to that of Embodiment 3 (FIG. 30).

(6) Mutual Authentication Process

Figure 55:
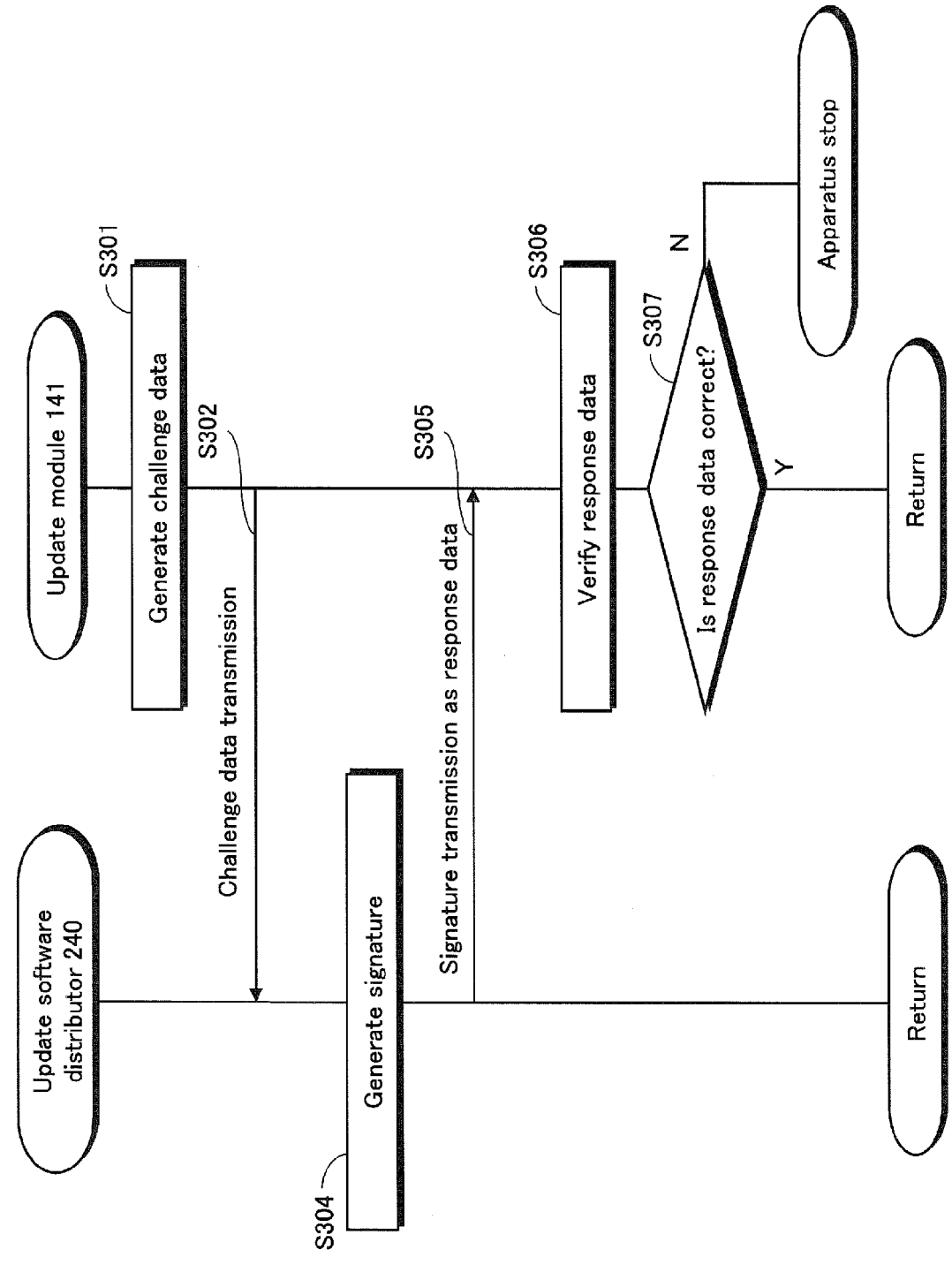
FIG. 55 is a sequence diagram of the mutual authentication process pertaining to Embodiment 4.
Figure 56:
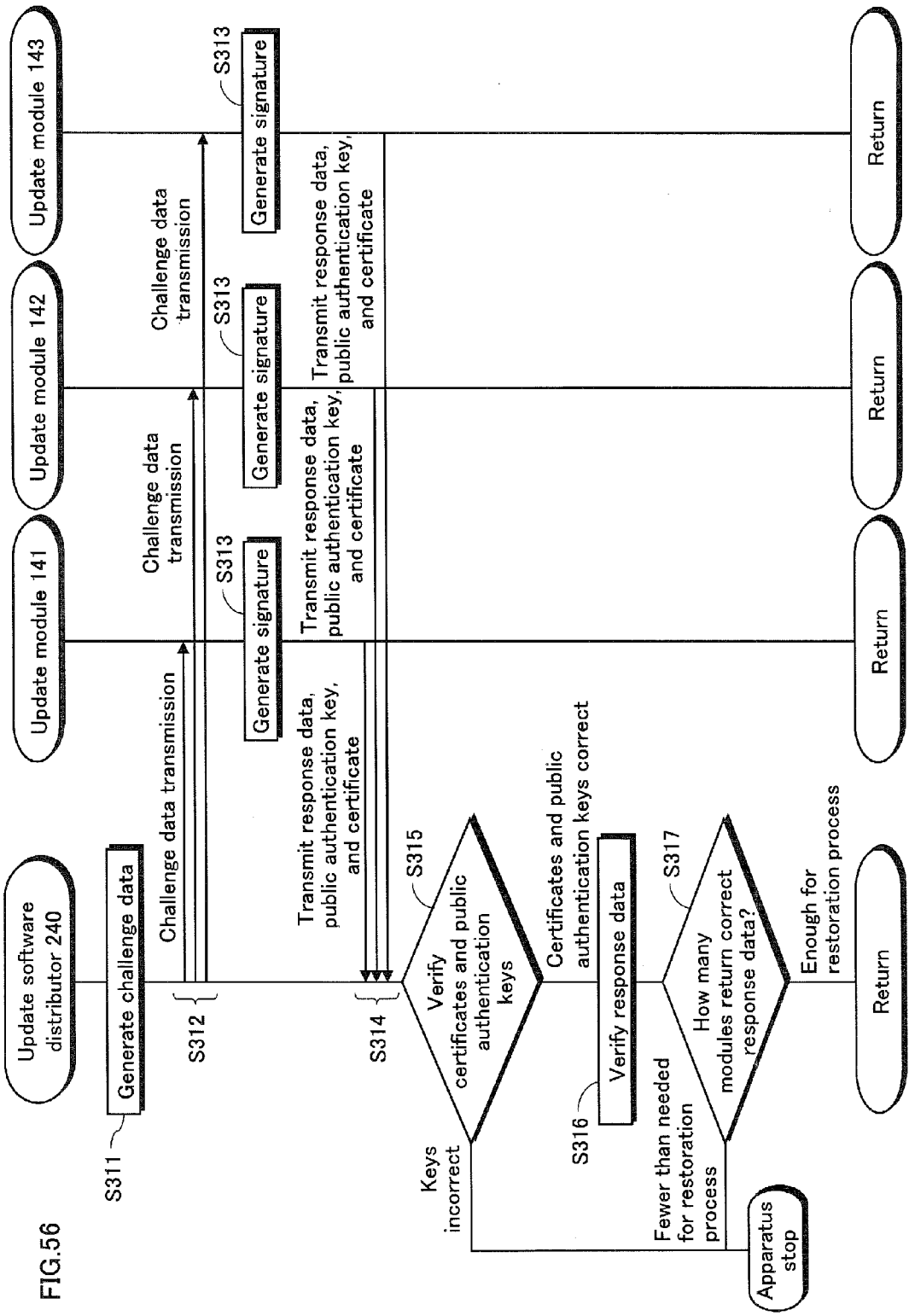
FIG. 56 is a sequence diagram of the mutual authentication process pertaining to Embodiment 4.

FIGS. 55 and 56 are sequence diagrams showing the operational flow of the mutual authentication process in the illegal module detection system 2.

As in Embodiment 3, during the analysis/determination process, if the determiner 210b determines that the protection control module 120 must be restored, then the determiner 210b instructs the update software distributor 240 to such effect. After instructing the update modules to begin the update process, the update software distributor 240 performs mutual authentication with each of the update modules one-on-one.

FIG. 55 shows the process of the update module 141 authenticating the update software distributor 240. Although only update module 141 is presently described, the other update modules operate identically.

The operations of update module 141 authenticating the update software distributor 240 are identical to those shown in FIG. 31 for Embodiment 3, where detection module 131a authenticates the verification source data distributor 220a.

Next, the update software distributor 240 authenticates update modules 141, 142, and 143. FIG. 56 shows the process of the update software distributor 220 authenticating the update modules.

The operations of the update software distributor 240 authenticating each of the update modules are identical to those shown in FIG. 32 for Embodiment 3, where the verification source data distributor 220a authenticates each of the update modules.

(7) Restoration Process Operations

Figure 57:
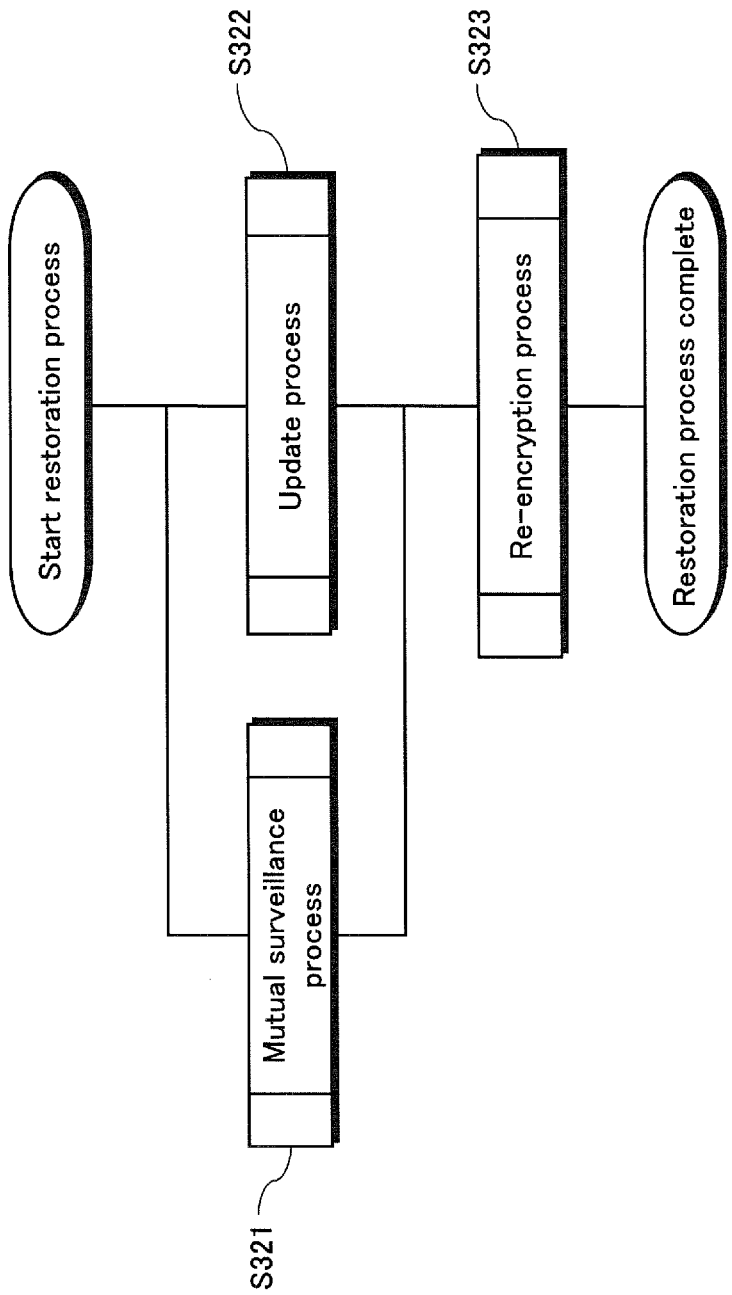
FIG. 57 is a flowchart of the restoration process pertaining to Embodiment 4.

FIG. 57 is a flowchart showing the illegal module detection system 2 restoration process (step S255 in FIG. 49). The restoration process involves updating the compromised protection control module 120b with a new updated protection control module if the mutual authentication succeeds.

Like that of Embodiment 3 (FIG. 33), the restoration process includes a mutual surveillance process (step S321), an update process (step S322), and a re-encryption process (step S323).

(8) Mutual Surveillance Process

Figure 58:
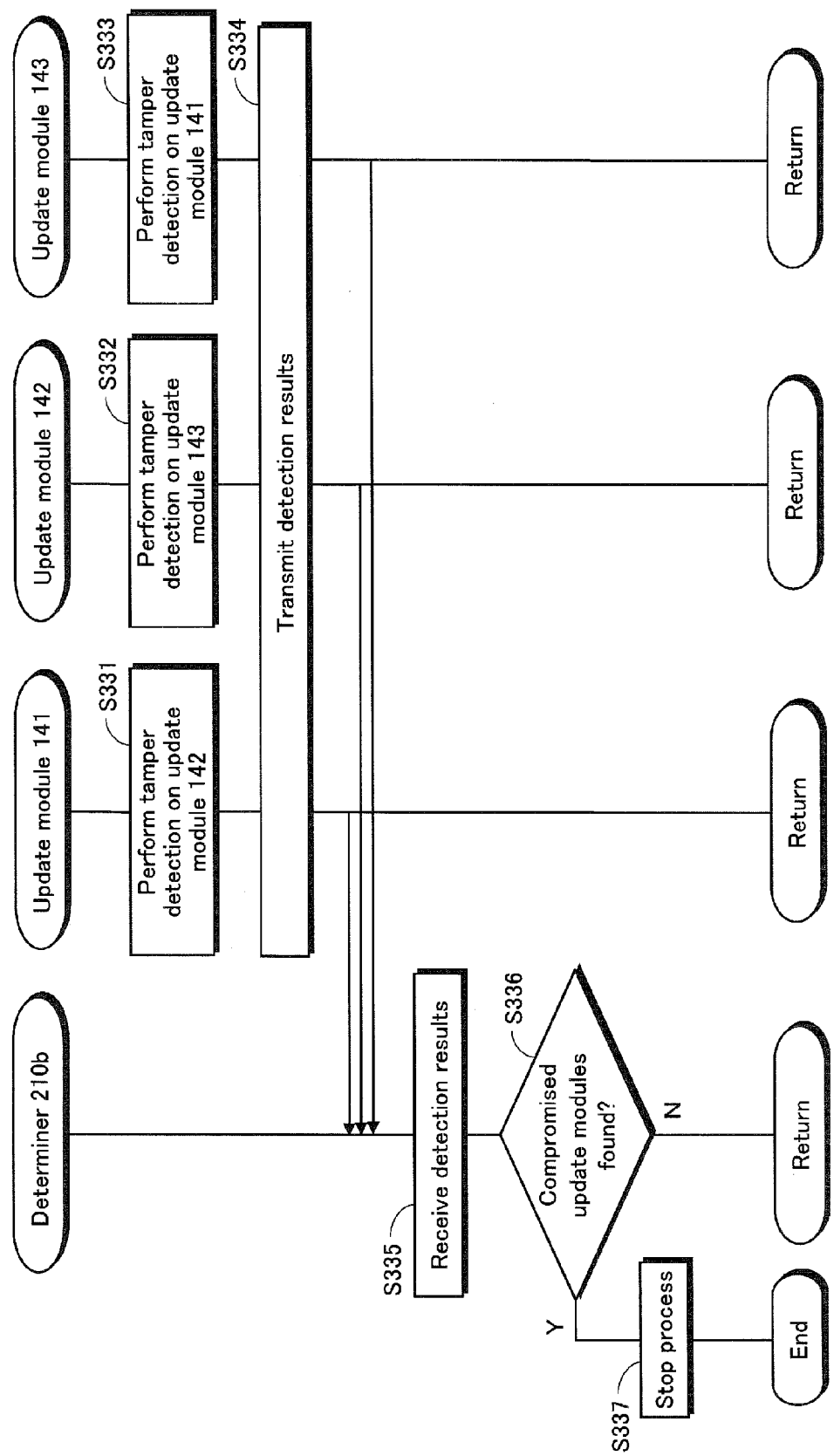
FIG. 58 is a sequence diagram of the mutual surveillance process pertaining to Embodiment 4.

FIG. 58 is a sequence diagram showing the mutual surveillance process (step S321 in FIG. 57).

The mutual surveillance process is a tamper detection process executed by update modules 141, 142, and 143 on other the update modules in the update module group 130b. During the mutual surveillance process, the update module on which each update module performs the tamper detection process follows a surveillance pattern held therein. The surveillance pattern contains information pertaining to the modules on which tamper detection is to be performed (such as module ID, location in memory, size, address, file name, and the like).

The mutual surveillance process of Embodiment 4 is identical to that of Embodiment 3 (FIG. 34).

(9) Update Process

Figure 59:
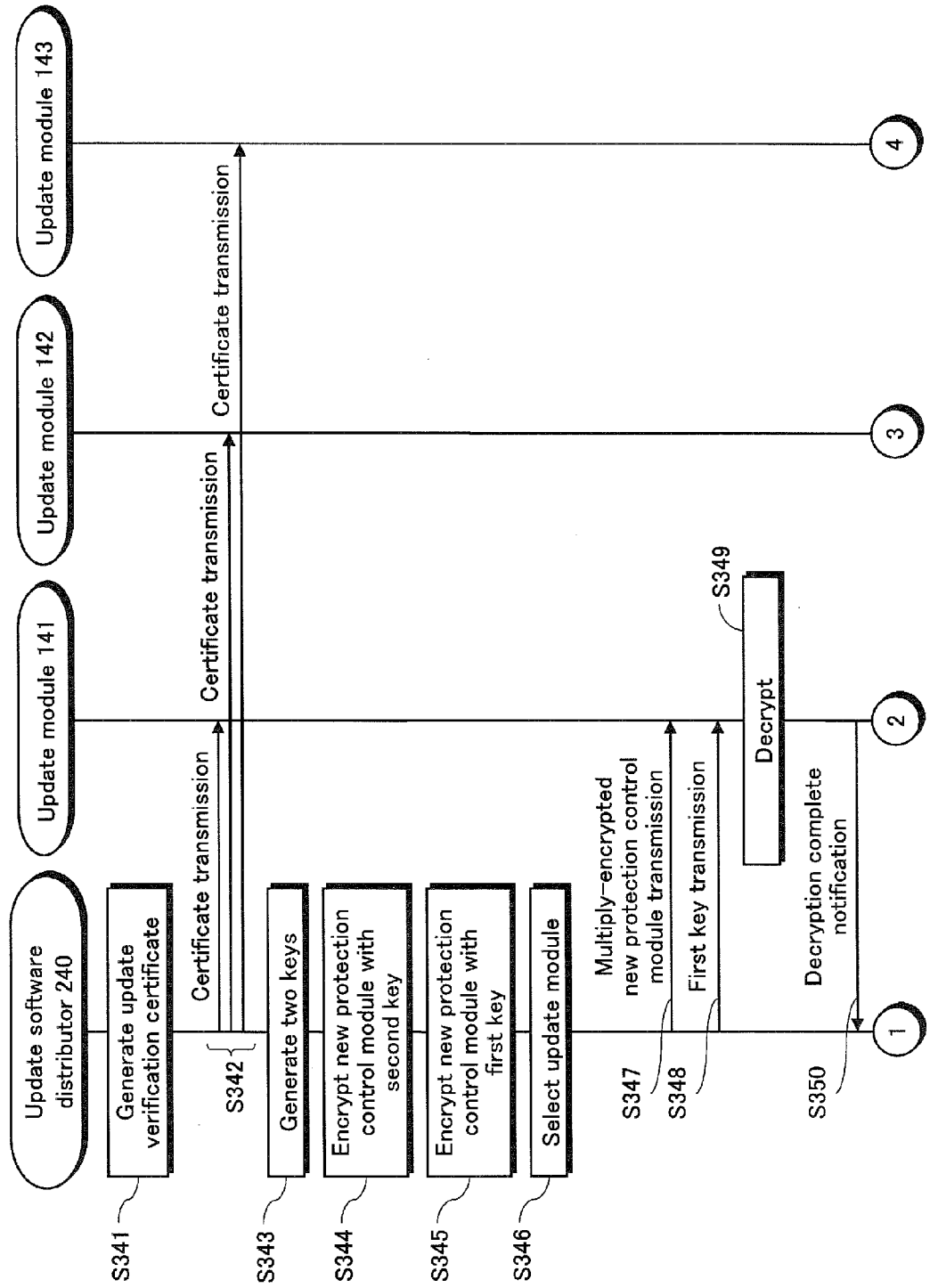
FIG. 59 is a sequence diagram of the update process pertaining to Embodiment 4.
Figure 60:
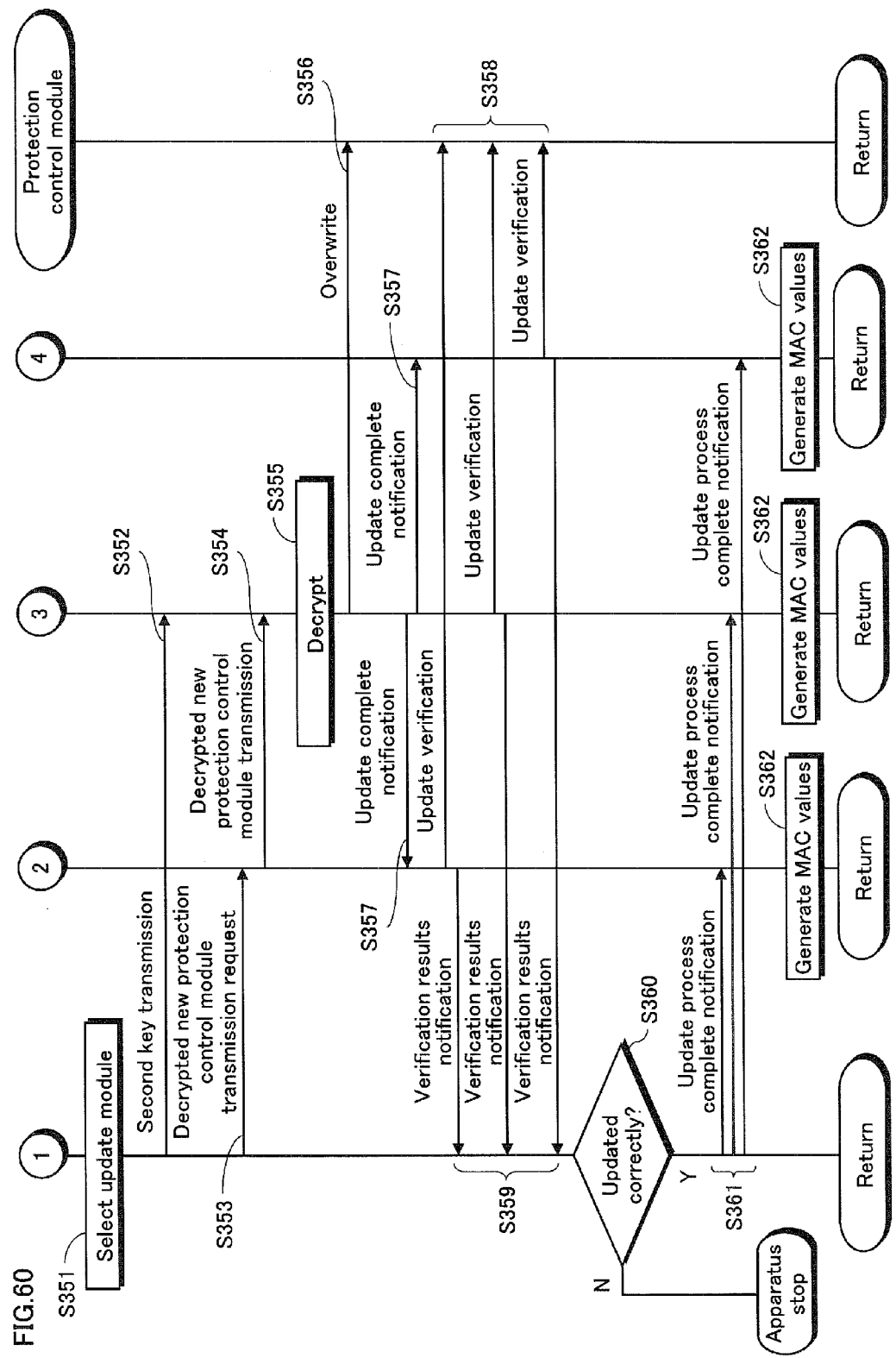
FIG. 60 is a sequence diagram of the update process pertaining to Embodiment 4.

Next, the update process (step S322 in FIG. 57) is explained in detail using the sequence diagrams of FIGS. 59 and 60.

Figure 35:
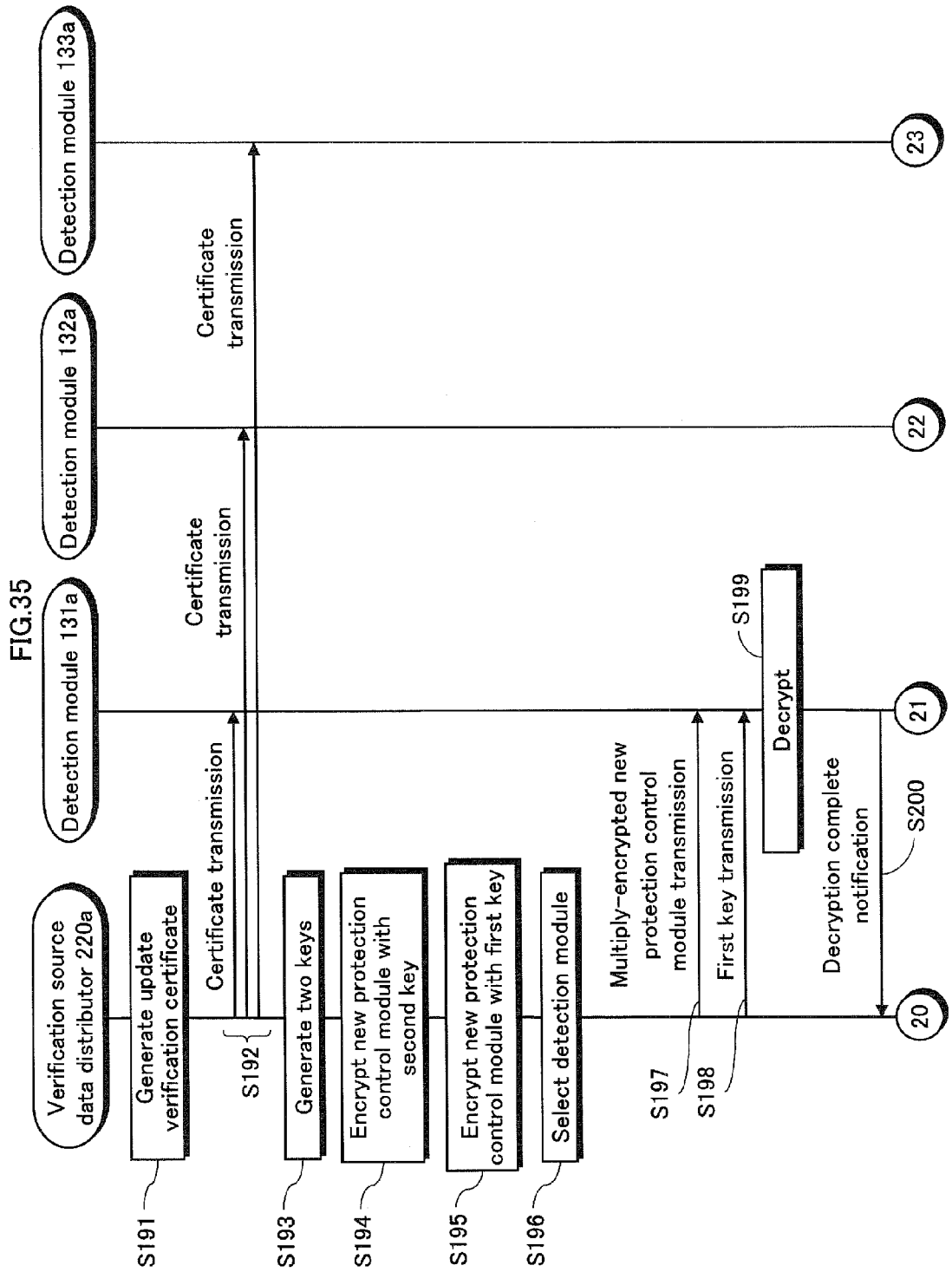
FIG. 35 is a sequence diagram of the update process pertaining to Embodiment 3.
Figure 36:
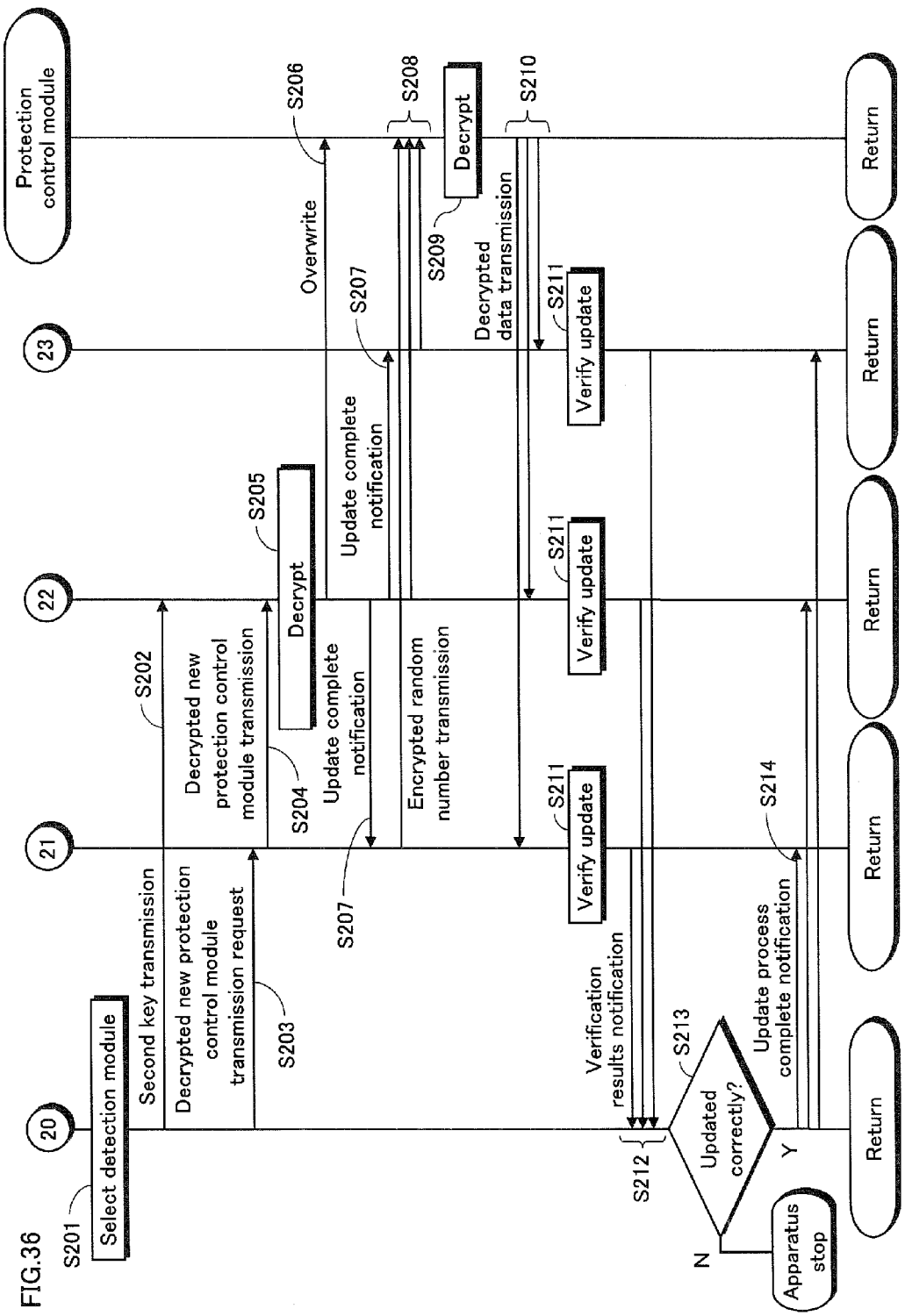
FIG. 36 is a sequence diagram of the update process pertaining to Embodiment 3.

Steps S341 through S357 are identical to steps S191 through S207 of Embodiment 3 (FIGS. 35 and 36).

Each of the update modules 141, 142, and 143 uses the previously-received update verification certificate to verify whether the protection control module has been updated correctly (step S358), then notifies the update software distributor 240 of the verification results (step S359).

Upon receiving the verification results transmitted by the update modules, the update software distributor 240 determines, from the verification results so received, whether the protection control module was updated correctly (step S360).

If this judgment is negative (N in step S360), then the update software distributor 240 stops the apparatus 100b.

If the judgment is affirmative (Y in step S360), then the update software distributor 240 notifies the update modules that the update process is complete (step S361).

Upon receiving notification that the update process is complete, each of the update modules generates a MAC value for the new protection control module (step S362), and then writes the MAC value so generated in a bundle with the protection control module ID into the MAC value table.

(10) Relationship of Mutual Surveillance Process to Update Process

The relationship between the mutual surveillance process and the update process in Embodiment 4 is such that the two are executed in conjunction with one another, much like those of Embodiment 3.

Figure 61:
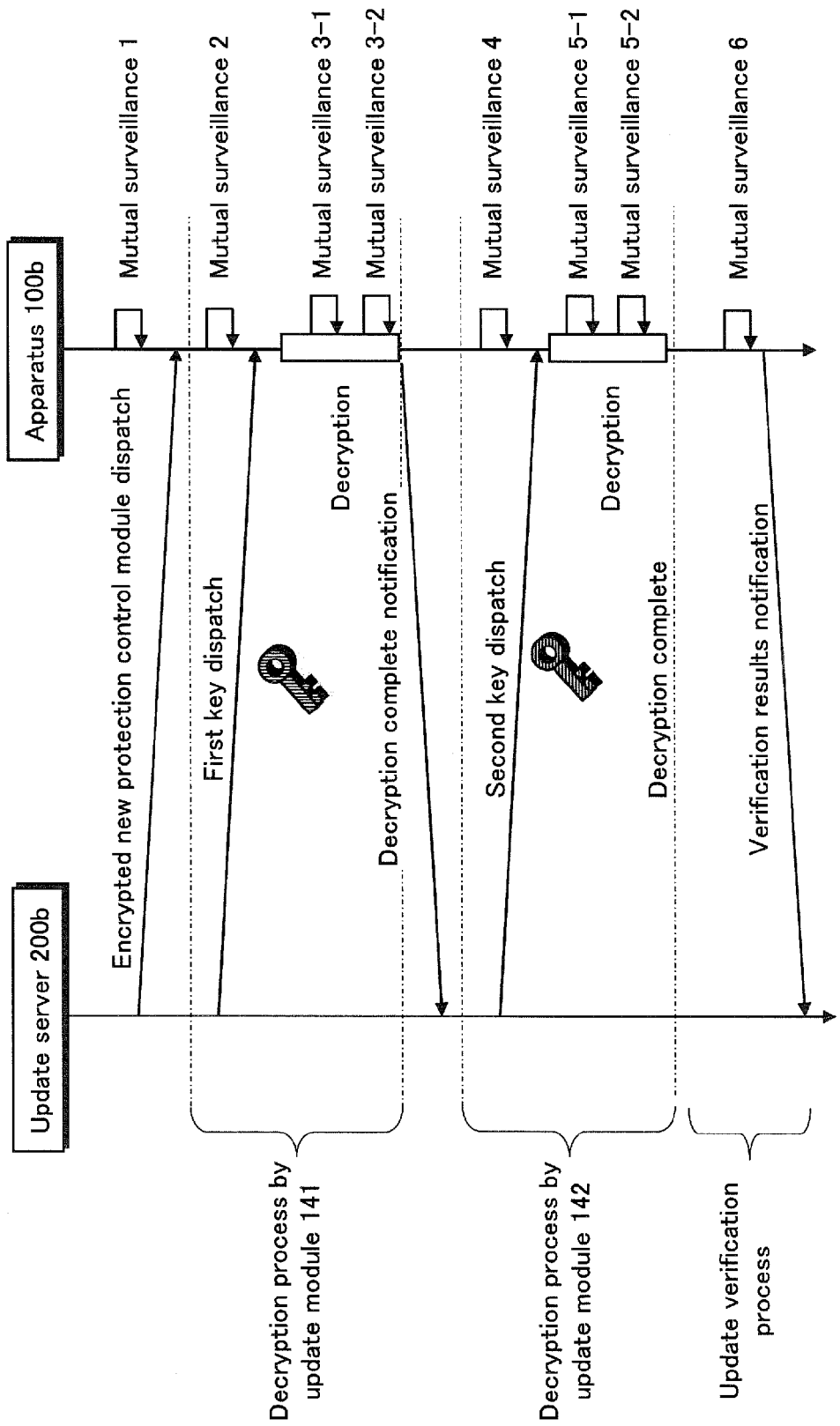
FIG. 61 is a diagram explaining the linked operations of the mutual surveillance process and the update process pertaining to Embodiment 4.

FIG. 61 is schematic diagram showing the coordinated operations of the mutual surveillance process and the update process. The details have already been described in Embodiment 3 (FIG. 37) and are thus omitted.

(11) Re-Encryption Process

Figure 62:
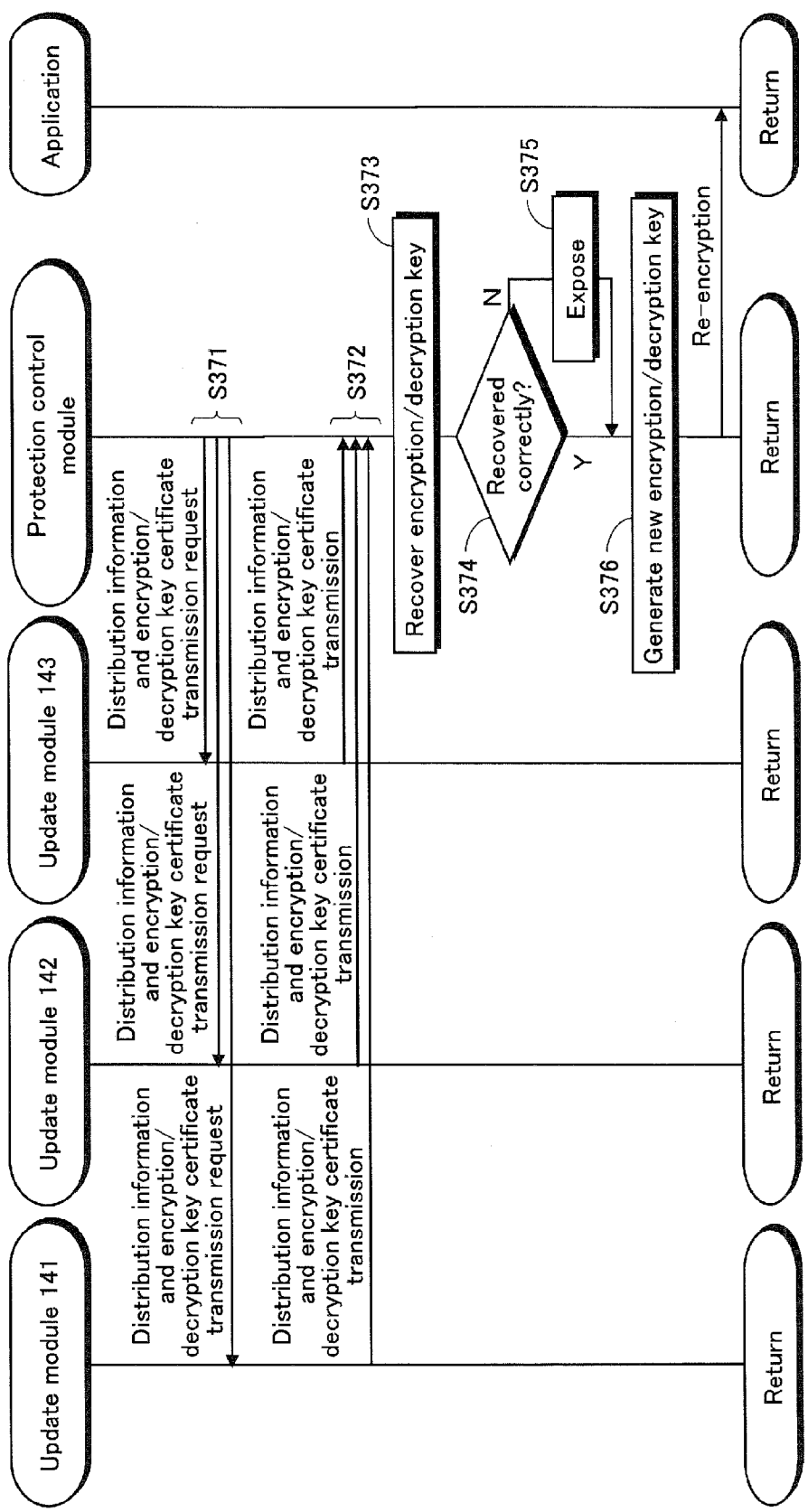
FIG. 62 is a sequence diagram of the re-encryption process pertaining to Embodiment 4.

FIG. 62 is a sequence diagram showing the re-encryption process (step S323 in FIG. 57). The re-encryption process of Embodiment 4 is identical to that of Embodiment 3 (FIG. 38).

(12) Subsequent-Round Preparation Process

Figure 63:
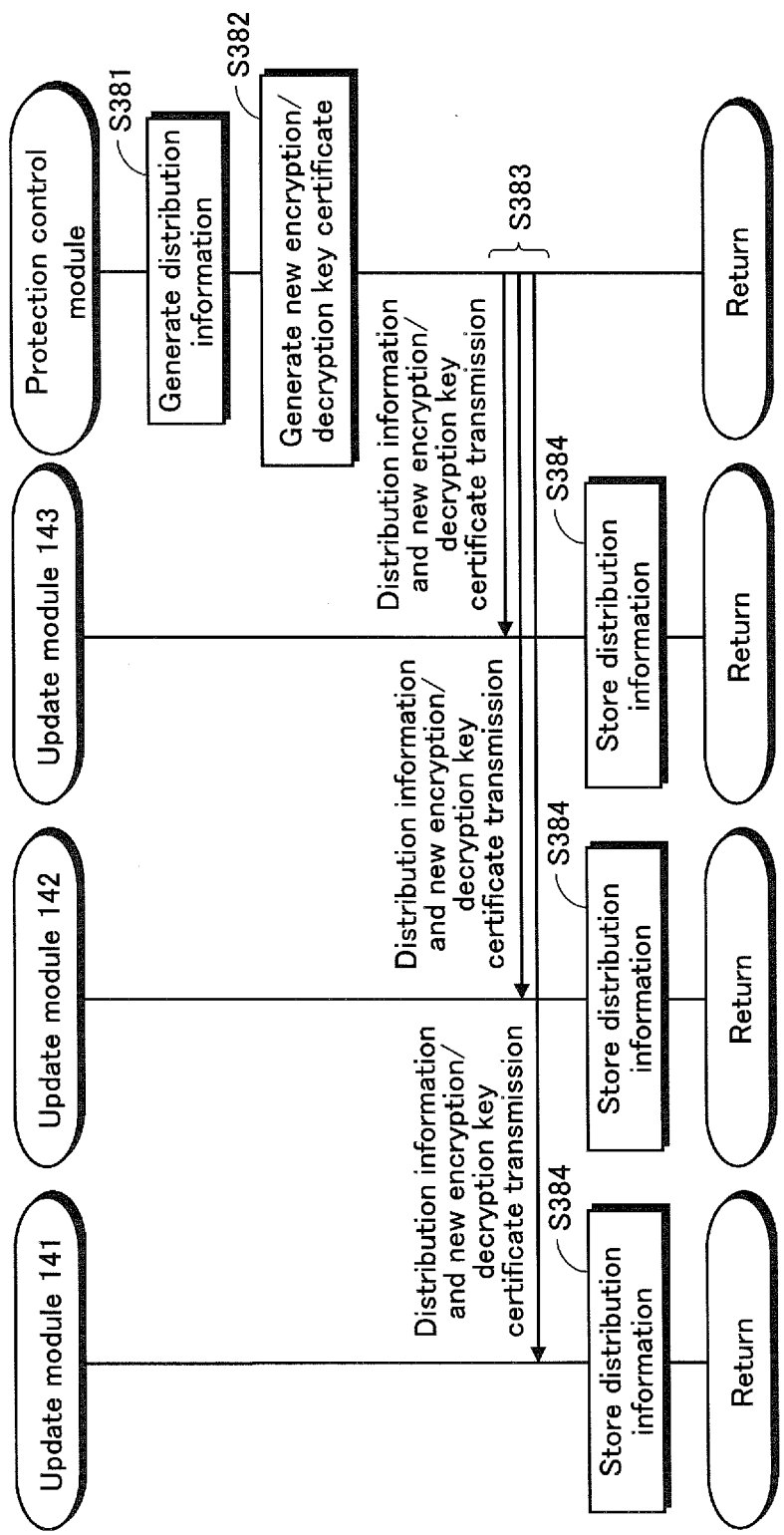
FIG. 63 is a sequence diagram of the subsequent-round preparation process pertaining to Embodiment 4.

FIG. 63 is a sequence diagram showing the subsequent-round preparation process (step S256 in FIG. 49). The subsequent-round preparation process takes place after the restoration process as preparation for the next restoration process.

First, the post-update protection control module generates distribution information from the new encryption/decryption key using the secret sharing scheme (step S381) and further generates a new encryption/decryption key certificate using the private signature key (step S382). Then, the protection control module transmits the distribution information and the encryption/decryption key certificate so generated to update modules 141, 142, and 143 (step S383).

As in the initial setup process, the pieces of distribution information here generated match the update modules in number such that each of the update modules comes to hold a different pair of distribution information pieces. Identical new encryption/decryption key certificates are transmitted to each of the update modules 141, 142, and 143.

The update modules 141, 142, and 143 receive the distribution information and new encryption/decryption key certificate from the protection control module and hold these therein (step S384).

(13) Invalidation Process

Figure 64:
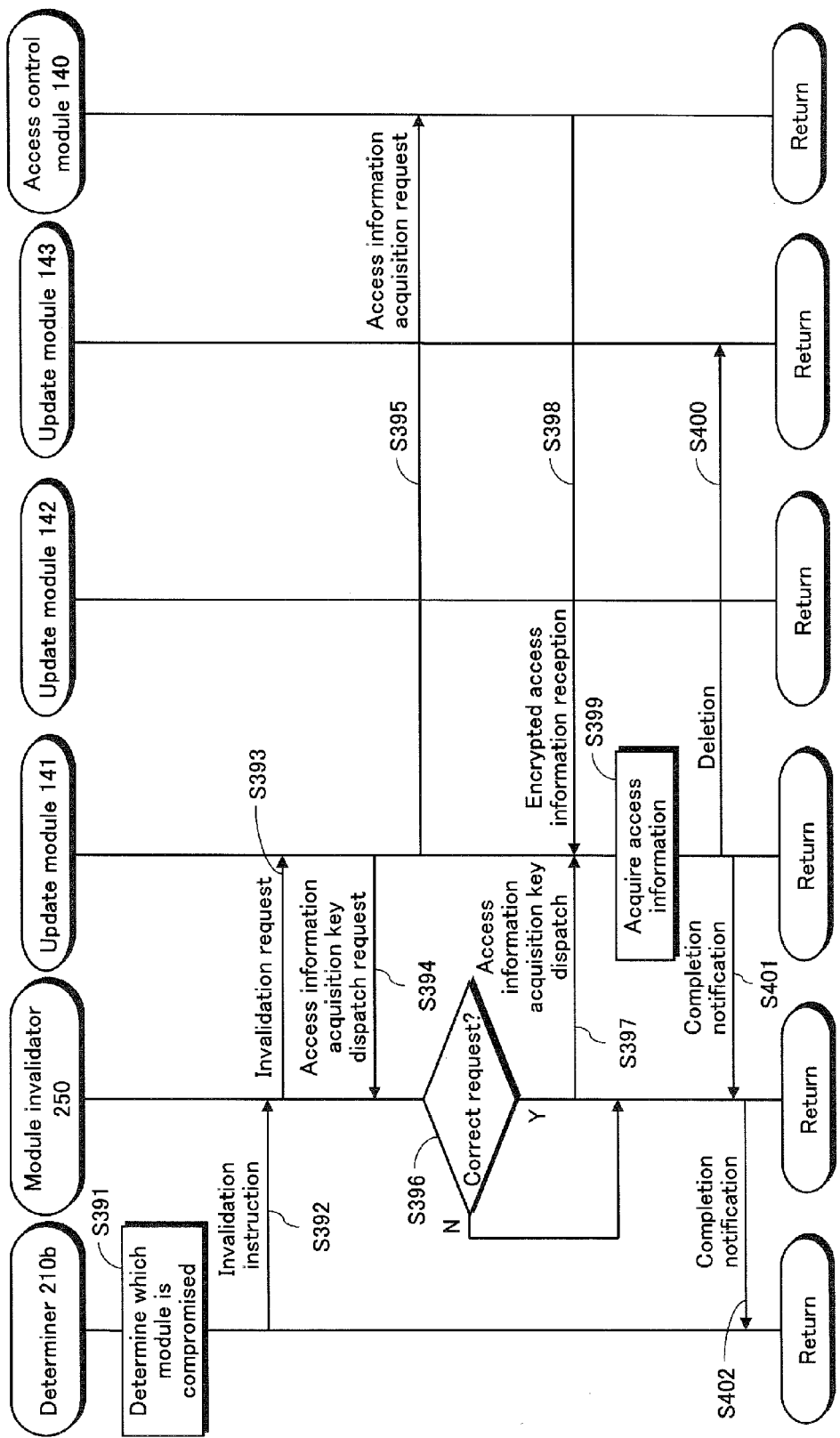
FIG. 64 is a sequence diagram of the invalidation process pertaining to Embodiment 4.

Next, the invalidation process is explained in detail with reference to the sequence diagram of FIG. 64.

The invalidation process invalidates any illicit (compromised) update modules found in the apparatus 100b whenever an update module fails authentication at mutual authentication time, a compromised update module is detected in the surveillance process during restoration, an illegal update module has been exposed in the re-encryption process during restoration, and in similar situations.

The details of the invalidation process are described below using an example in which update module 143 is compromised and has been respectively detected as such by update modules 141 and 142.

The determiner 210b determines which update module is compromised according to the mutual surveillance results received from update modules 141, 142, and 143 (step S391). This determination is made by, for instance, deeming any update modules determined as compromised by more than half of the other update modules to be illicit.

The determiner 210b outputs an invalidation instruction along with the ID of the compromised update module to the module invalidator 250 (step S392).

The module invalidator 250 requests that one of the update modules deemed uncompromised, i.e. update module 141 or 142 (this example uses update module 141), invalidate the compromised update module 143 (step S393).

Upon receiving the request to invalidate update module 143 from the module invalidator 250, update module 141 requests the dispatch of the required access information acquisition key from the module invalidator 250 (step S394). Update module 141 further requests acquisition of the required access information from the access control module 140 (step S395).

Upon receiving the access information acquisition key dispatch request, the module invalidator 250 confirms whether or not update module 141 is a valid, uncompromised module, and whether or not the requested access information acquisition key is the one required to invalidate the compromised update module 143 (step S396). This confirmation is performed using the update module information of which the module invalidator 250 was notified by the determiner 210b.

If the result of this confirmation is such that the request is from the compromised update module 143, or else that the request is an acquisition request for the access information acquisition key of uncompromised update module 141 or 142 (N in step S396), then the invalidation process is stopped.

If the confirmation results are unproblematic (Y in step S396), then the access information acquisition key needed to invalidate update module 143 is dispatched to the requesting update module 141 (step S397).

Update module 141 receives the access information acquisition key from the module invalidator 250 and also receives the encrypted access information from the access control module 140 (step S398). Update module 141 acquires the access information from the access information acquisition key and the encrypted access information (step S399). The access information so acquired is a specialized driver for deleting update module 143. Update module 141 uses this specialized driver to delete the compromised, illicit update module 143 (step S400).

Once the invalidation process is complete, update module 141 deletes the access information acquisition key, the encrypted access information, the access information itself, and the like, and then transmits a completion notification to the module invalidator 250 (step S401). Upon receiving the completion notification from update module 141, the module invalidator 250 transmits an invalidation completion notification to the determiner 210*b* (step S402).

If an update module holding distribution information is invalidated by the invalidation process, then the distribution information held thereby is also deleted. Thus, if an update module holding distribution information is to be invalidated, the deletion thereof must be taken into account for the invalidation process.

Pages 56 through 64 of Patent Literature 2 discuss the details of an invalidation method that takes this factor into account, known as a withdrawal process.

[Embodiment 5]

Embodiment 5 of the present invention is presently explained.

In Embodiment 4, MAC values were used to verify whether or not the protection control module had been compromised.

In contrast, Embodiment 5 uses verification data output by the protection control module at application execution time for the same purpose.

1. Configuration

The illegal module detection system pertaining to Embodiment comprises an apparatus 100*b* and an update server 200*b*, much like that of Embodiment 4. The following explanations center on the points of difference thereof from Embodiment 4.

(1) Protection Control Module 120*c* Configuration Details

Figure 65:
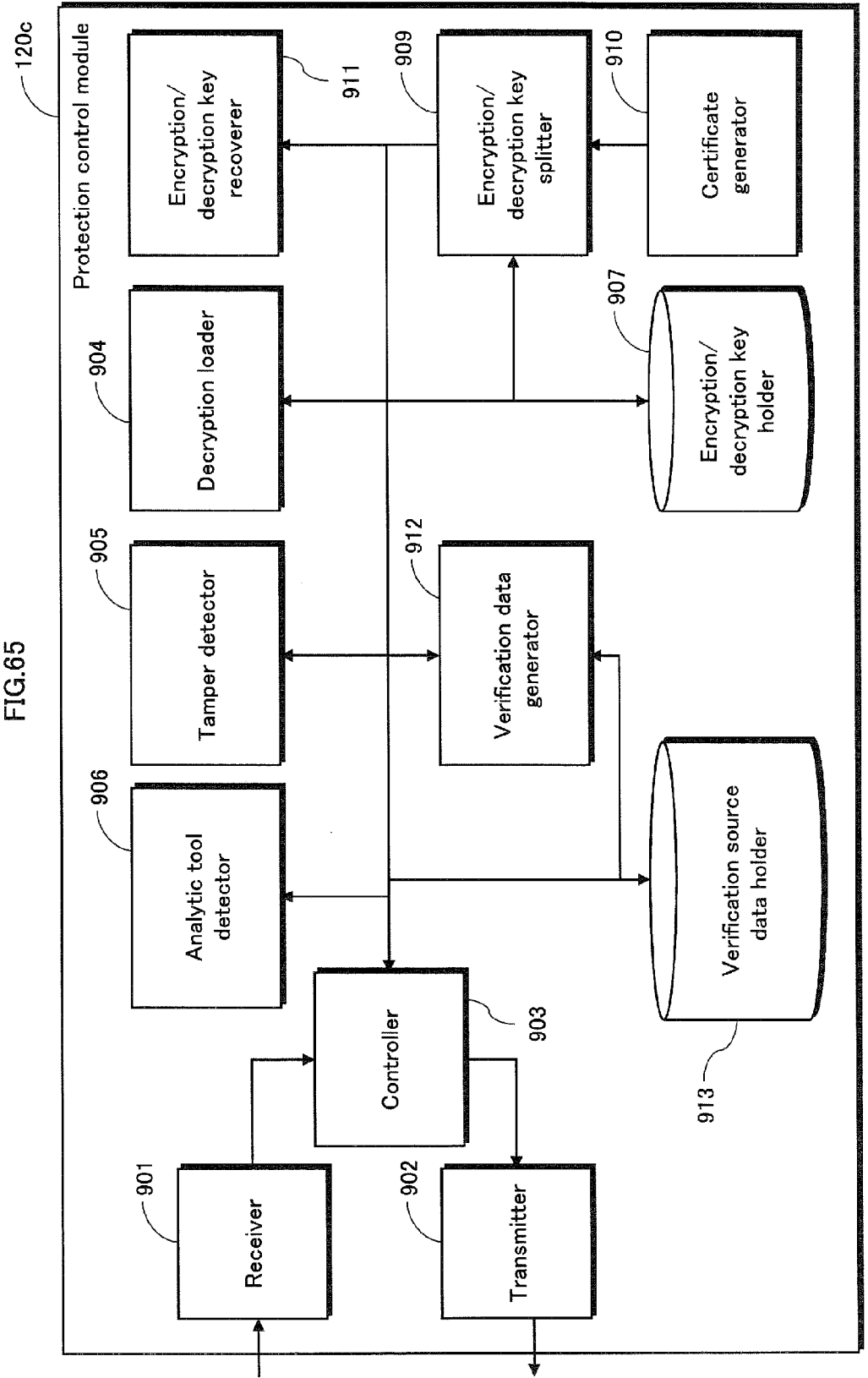
FIG. 65 is a block diagram of a protection control module 120*c* pertaining to Embodiment 5.

FIG. 65 is a functional block diagram showing the functional structure of the protection control module 120*c* pertaining to Embodiment 5. Components thereof that are identical to those of Embodiment 4 have the same reference numbers and are omitted.

Comparison with the protection control module 120*b* of Embodiment 4 reveals that the protection control module 120*c* does not include an encryption/decryption key generator 908. In addition, protection control module 120*c* comprises a verification data generator 912 and a verification source data holder 913 lacked by protection control module 120*b*.

The verification source data holder 913 holds therein verification source data received from the update server 200*b*.

The verification data generator 912 generates verification data from the verification source data held by the verification source data holder 913, then transmits the verification data so generated to the update modules.

(2) Update Module 141*c* Configuration

Figure 66:
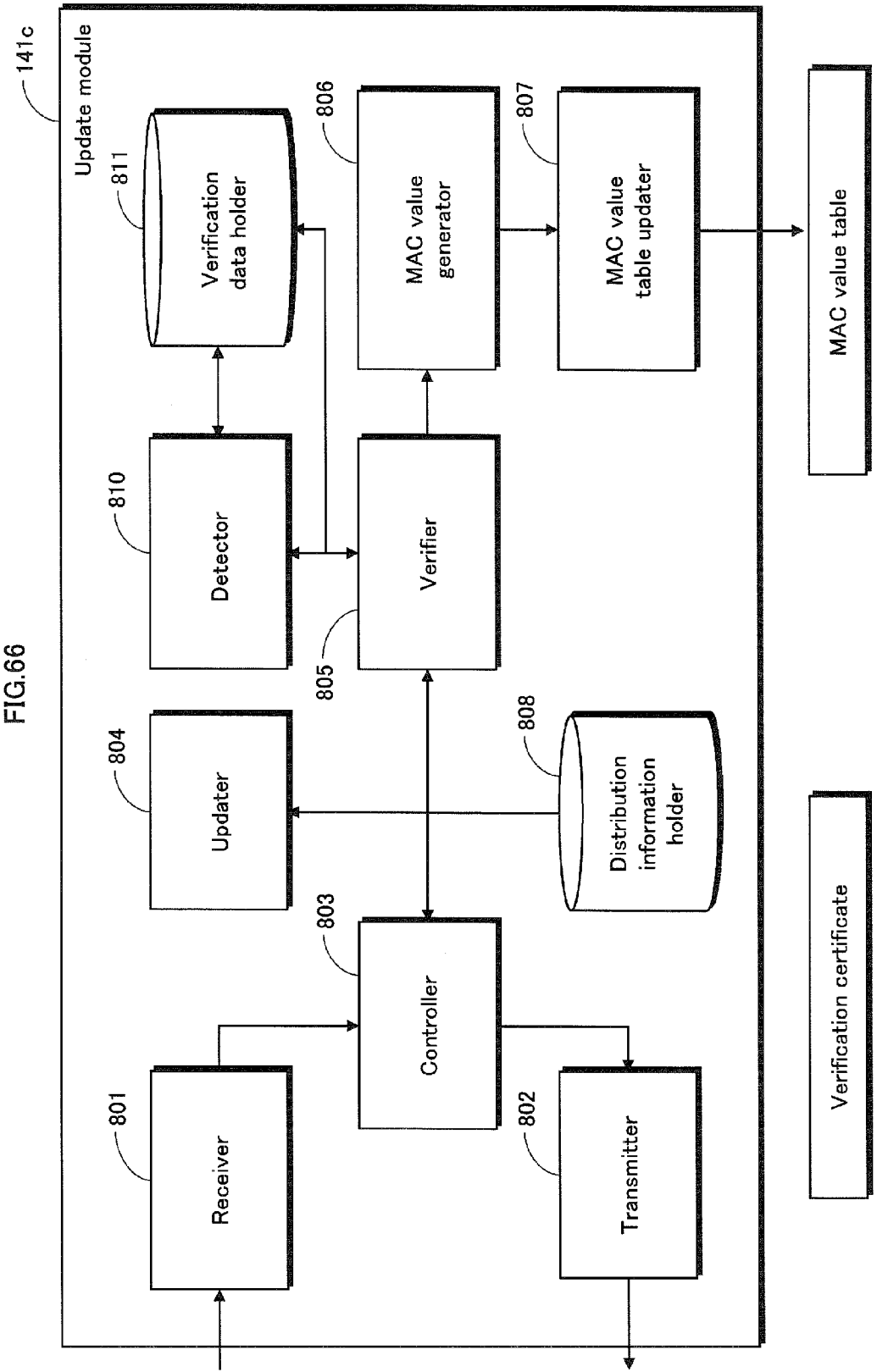
FIG. 66 is a block diagram of an update module 141*c* pertaining to Embodiment 5.

FIG. 66 is a functional block diagram showing the functional structure of update module 141*c* pertaining to Embodiment 5. Components thereof that are identical to those of Embodiment 4 have the same reference numbers and are omitted.

Comparison with update module 141 of Embodiment 4 reveals that update module 141 further comprises a detector 810 and a verification data holder 811.

The verifier 805 verifies whether the protection control module 120*c* and each of the update modules are operating normally. The verifier 805 uses pre-calculated MAC values and hash values to verify the update modules.

The verifier 805 uses the detector 810 to verify the protection control module 120*c*. Upon receiving the verification data from the protection control module 120*c*, the verifier 805 stores the verification data in the verification data holder 811. Also, upon receiving the application decryption process output data from the protection control module 120*c*, the verifier 805 in turn outputs the output data to the detector 810. The verifier 805 then receives verification results indicating whether or not the protection control module 120*c* is operating normally from the detector 810.

The detector 810 uses the output data received from the verifier 805 and the verification data stored by the verification data holder 811 to verify the signature included in the latter. By verifying the signature, the validity of the input/output correspondence of the application decryption process by the protection control module 120*c* is verified. The detector 810 then transmits the verification results to the verifier 805.

The verification data holder 811 stores therein the verification data received from the verifier 805.

(3) Update Software Distributor 240*c* Configuration

Figure 67:
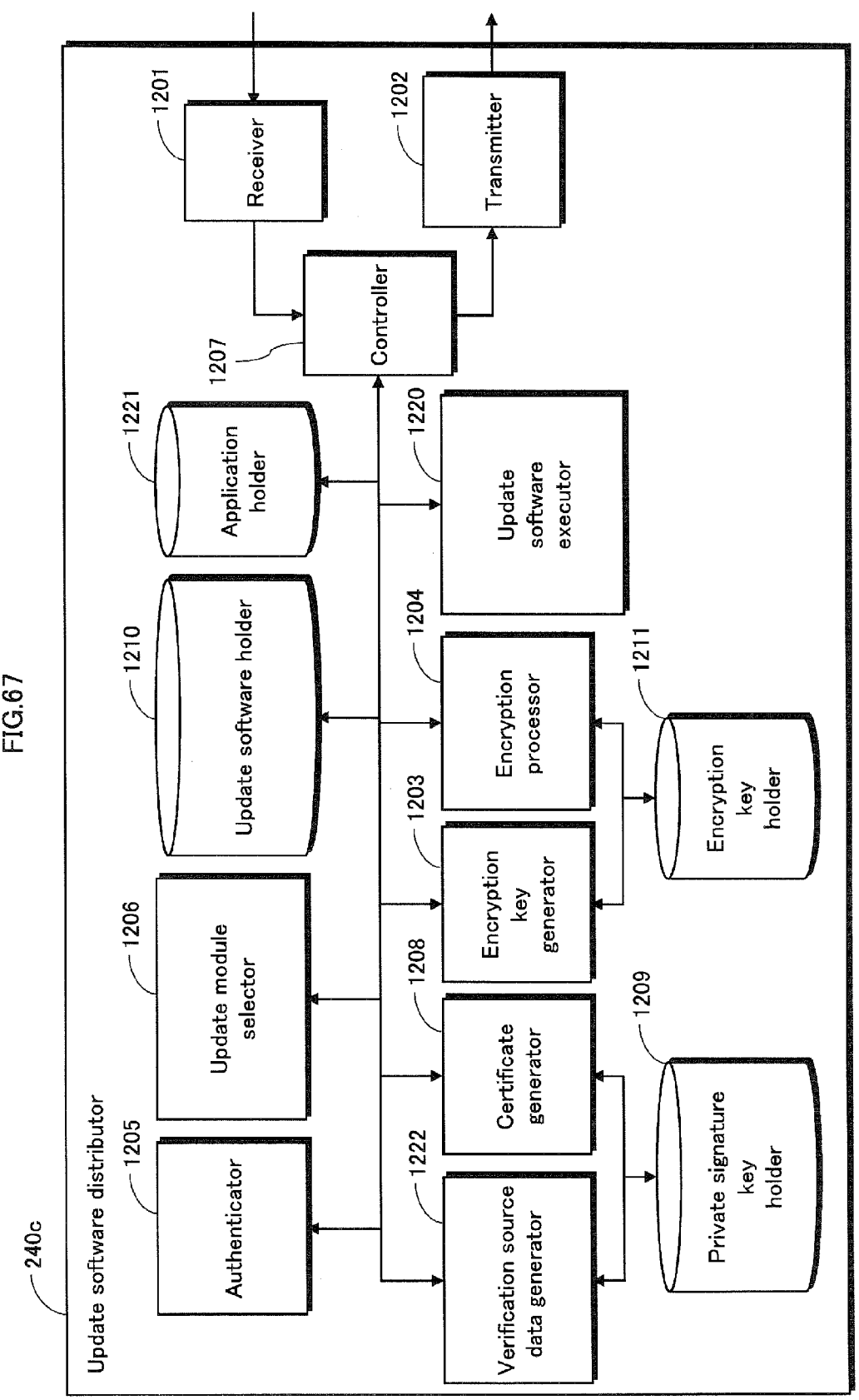
FIG. 67 is a block diagram of an update software distributor 240*c* pertaining to Embodiment 5.

FIG. 67 is a functional block diagram showing the functional structure of the update software distributor 240*c* pertaining to Embodiment 5. Components thereof that are identical to those of Embodiment 4 have the same reference numbers and are omitted.

Comparison with the update software distributor 240 of Embodiment 4 reveals that the update software distributor 240*c* further comprises an update software executor 1220, an application holder 1221, and a verification source data generator 1222.

The update software executor 1220 uses the updated protection control module held by the update software holder 1210 to execute the encrypted application and to acquire input and output data from the decryption process.

The application holder 1221 holds therein the applications installed on the apparatus 100*b*.

When the decryption loader 904 of the protection control module 120*c* is operating properly, the verification source data generator 1222 generates verification source data that guarantees the input/output correspondence of the encrypted application decryption process, and then transmits the verification source data so generated to the apparatus 100*b*. The details of the verification source data will be described later.

2. Operations (1) Initial Setup Operations

The operations of the initial setup process pertaining to Embodiment 5 are described below.

Figure 68:
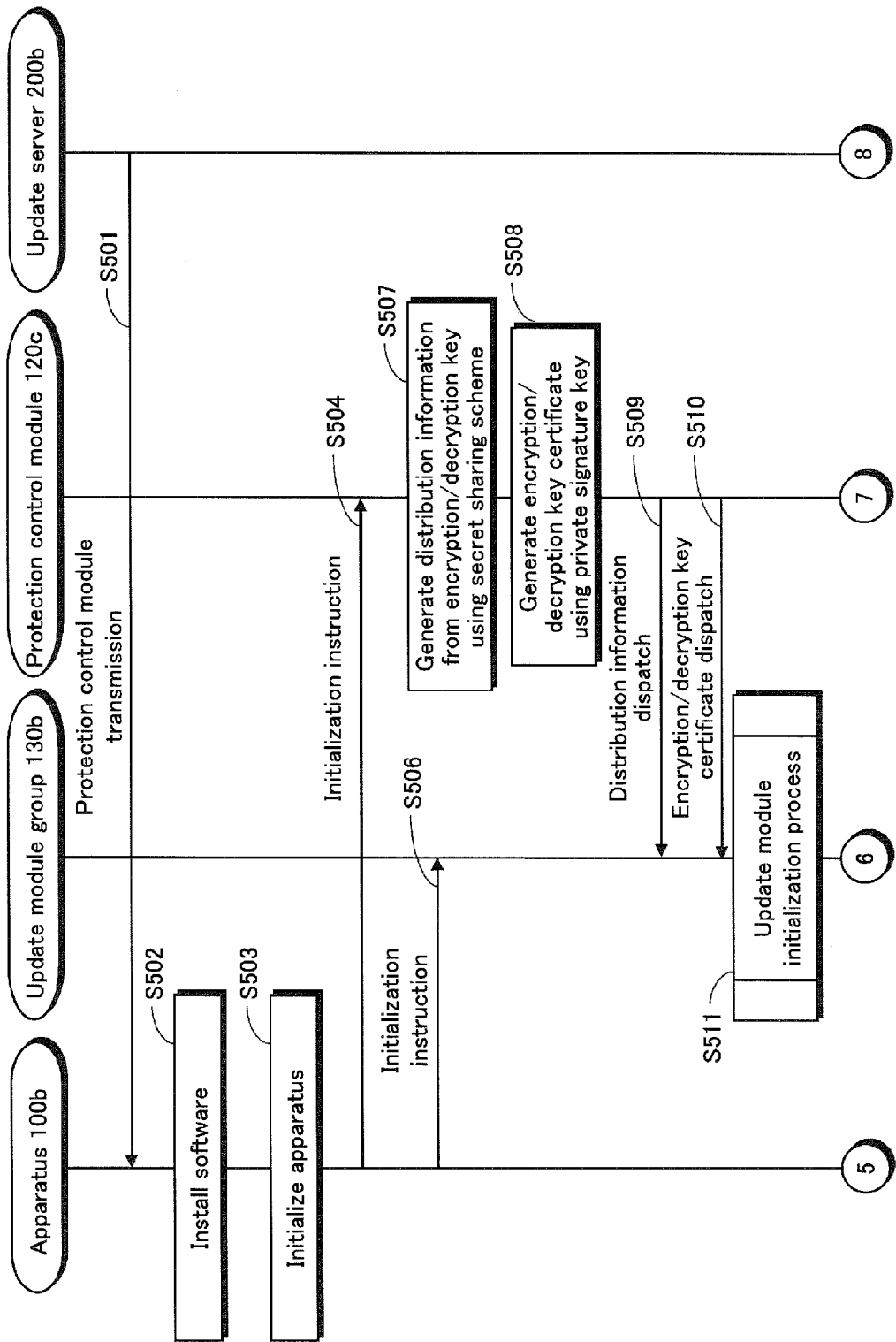
FIG. 68 is a sequence diagram showing the initial setup process pertaining to Embodiment 5.
Figure 69:
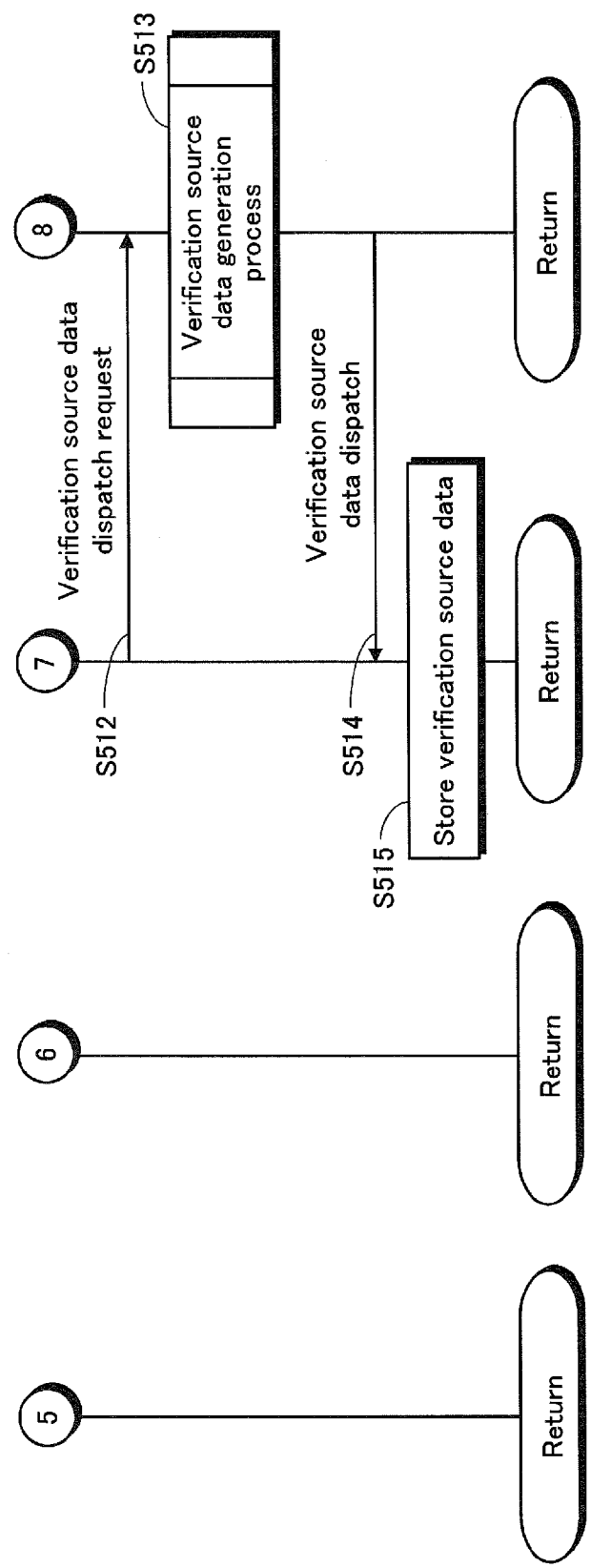
FIG. 69 is a sequence diagram showing the initial setup process pertaining to Embodiment 5.

FIGS. 68 and 69 are flowcharts showing the initial setup process. The following explanations focus on the points of difference from Embodiment 4.

First, the update server 200*b* transmits the protection control module 120*c* held by the update software holder 1210 to the apparatus 100*b* (step S501).

Steps S502 through S511 are identical to those of Embodiment 4.

Then, after transmitting the distribution information and the encryption/decryption key certificate to the update module group 130 in steps S509 and S510, the protection control module 120*c* makes a verification source data dispatch request to the update server 200*b* (step S512).

The update server 200*b* generates the verification source data (step S513). Subsequently, the update server 200*b* transmits the verification source data so generated to the protection control module 120*c* (step S514).

Finally, the protection control module 120 receives and stores the verification source data (step S515).

(2) Update Module Initial Setup Process

Figure 70:
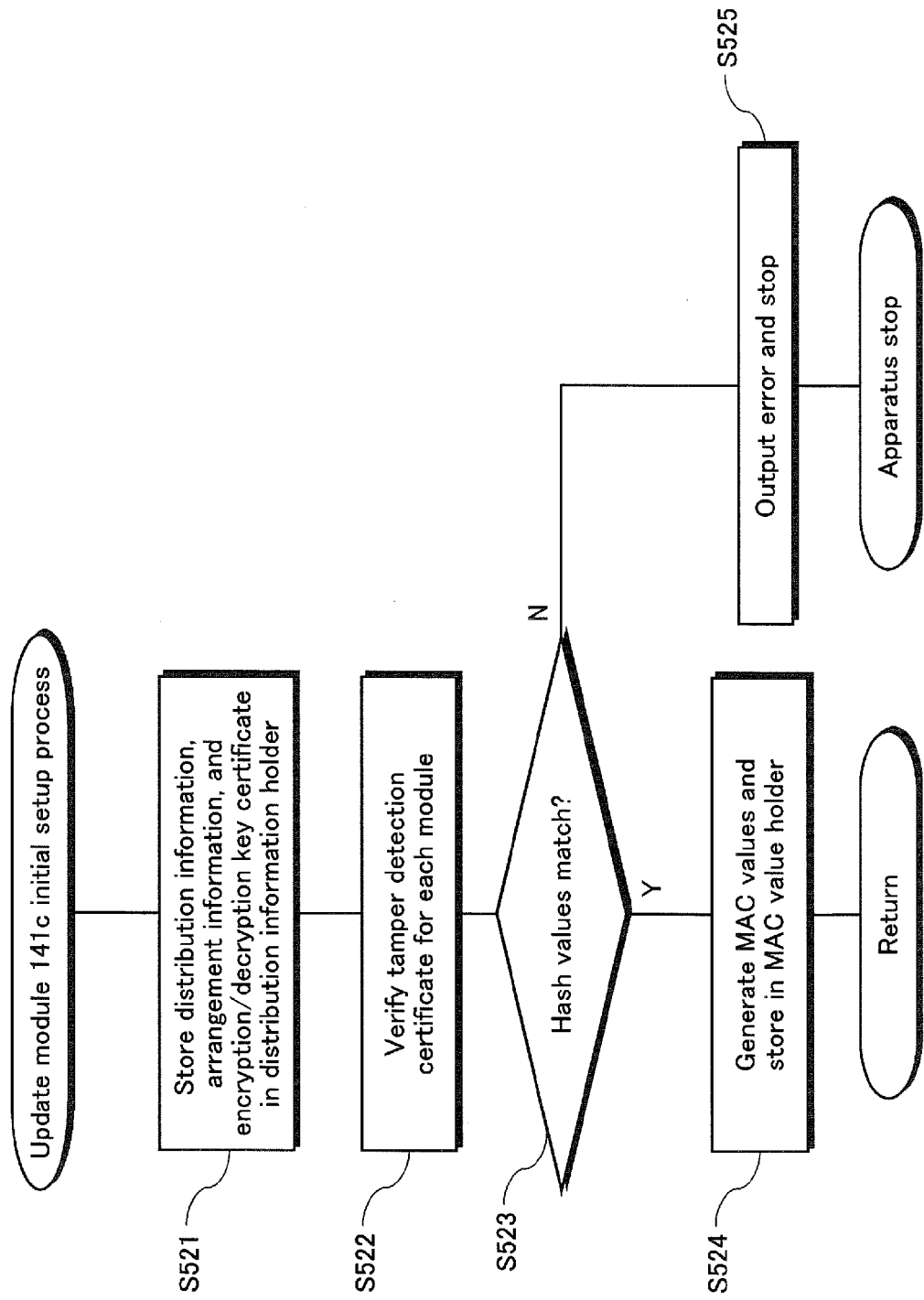
FIG. 70 is a flowchart of the initial setup process for the update modules pertaining to Embodiment 5.

FIG. 70 is a flowchart showing the initial setup process for the update modules.

During step S522, update module 141*c* verifies the tamper detection certificates of update module 142*c* and of update module 143*c*.

In Embodiment 5, MAC values are not used to verify the protection control module 120c tamper detection process. Therefore, in step S522, update module 141c does not verify the tamper detection certificate of the protection control module 120c.

(3) Verification Source Data Generation Process

Figure 71:
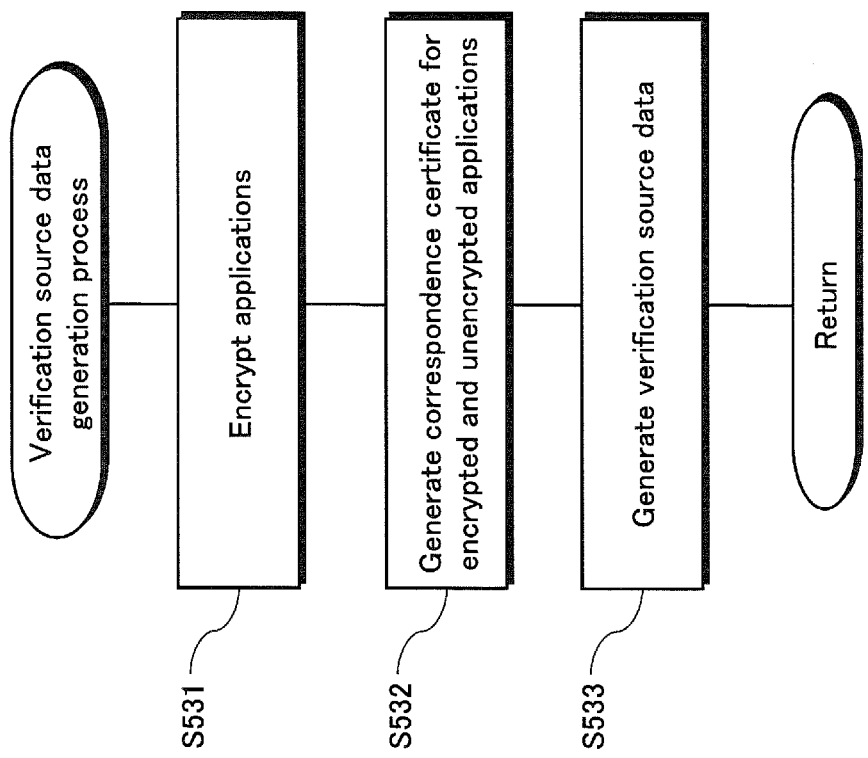
FIG. 71 is a flowchart showing the verification source data generation process pertaining to Embodiment 5.

FIG. 71 is a flowchart showing the verification source data generation process.

The verification source data generator 1222 encrypts the applications installed on the apparatus 100b with the encryption/decryption key from the protection control module 120c (step S531).

Next, the verification source data generator 1222 generates a certificate (correspondence certificate) (step S532).

This certificate is a signature generated using the private signature key in the private signature key holder 1209 of the update server 200 for the input and output data expected when the protection control module 120c is operating normally. The data input to the protection control module 120c are the encrypted applications, while the data output therefrom are the decrypted plain-text applications. The data that are the object of signature generation are not only the input and output data of the protection control module 120c but may also include the application identification information, or information indicating the content of the application (such as a DVD or BD playback application or an online banking application). Furthermore, the identification information of the protection control module 120c may also be included.

Finally, the verification source data generator 1222 generates verification source data that is made up of the application identification information, the encrypted application data, and the certificate (step S533).

Figure 72:
FIG. 72 is a diagram showing the structure of verification source data 1200 pertaining to Embodiment 5.

FIG. 72 shows the structure of the verification source data.

The verification source data 1200 comprises, for each of the applications, identification information, encrypted application data corresponding thereto, and a certificate.

(4) Detection Process Operations

Figure 73:
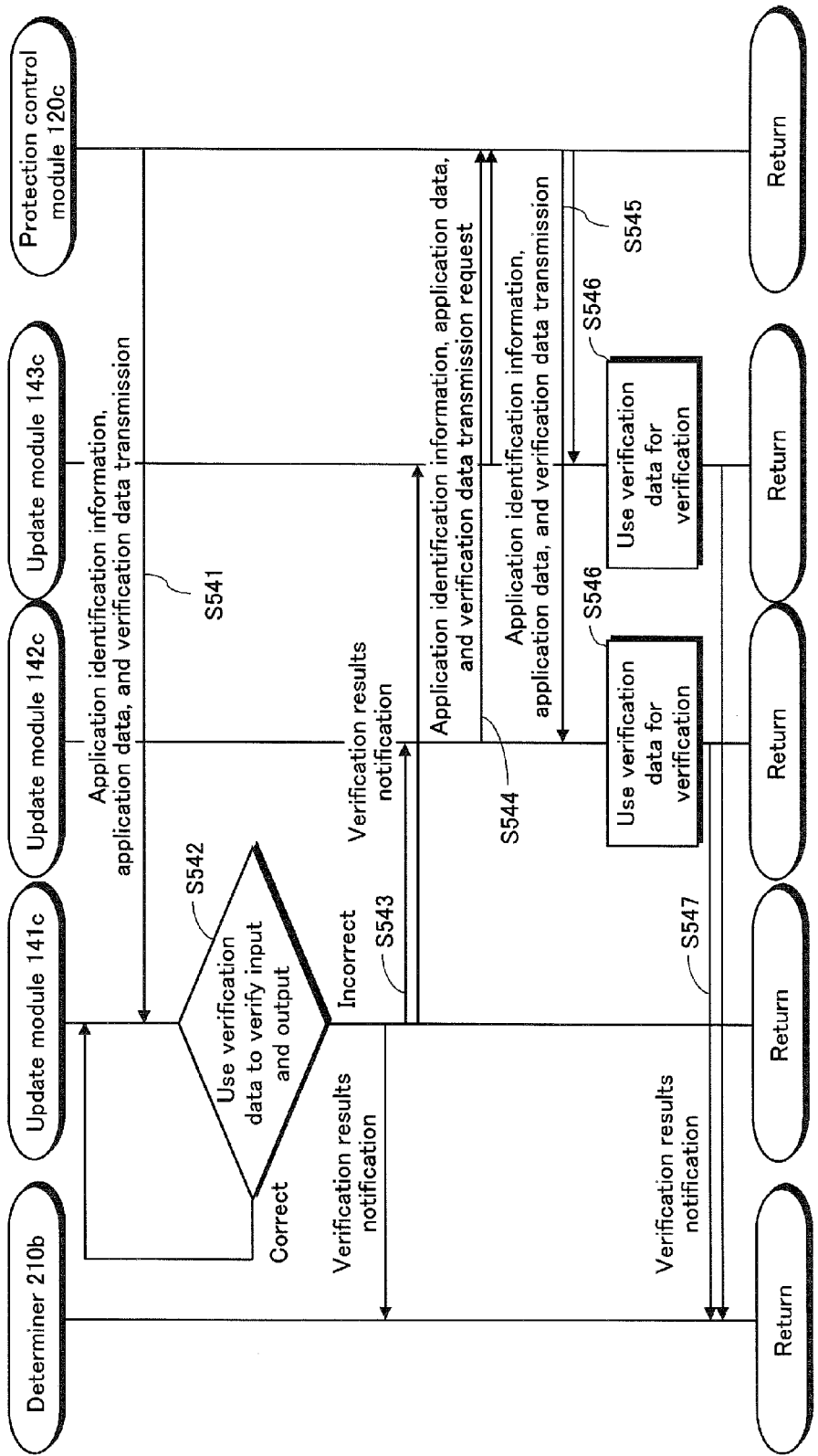
FIG. 73 is a sequence diagram of the detection process pertaining to Embodiment 5.

FIG. 73 is a sequence diagram showing the detection process.

The protection control module 120c encrypts and protects the applications. The detection process of Embodiment 5 is characterized in that verification of the protection control module 120c is performed at application execution time.

A specific example follows in which the protection control module 120c executes application 110. Verification of the protection control module 120c at the execution time of other applications proceeds in the same manner.

Upon receiving a command to execute application 110, the protection control module 120c transmits the verification data generated by the verification data generator 912, the identification information for application 110, and the decrypted application 110 itself to update module 141c (step S541). For the sake of simplicity, FIG. 73 shows only update module 141c verifying the protection control module 120c. However, update module 142c and 143c also perform the same process.

The subsequent process, which is fundamentally identical to that of update module 141c, is omitted for update modules 142c and 143c.

Update module 141c uses the verification data to verify whether or not the input/output correspondence for the application 110 decryption process by the protection control module 120c is correct (step S542). To this end, update module 141c uses the data of the encrypted application 110 included in the verification data (input data) and the received decryption results (output data).

If the input and output data for the decryption process by the protection control module 120c are incorrect (Incorrect in step S542), then update module 141c judges that the protection control module 120c is compromised and notifies the determiner 210b as well as the other update modules of these verification results (step S543).

If the input and output data for the decryption process by the protection control module 120c are correct (Correct in step S542), then update module 141c re-verifies the protection control module 120c at the next application execution time without notifying the determiner 210b and the other update modules.

If notified by update module 141c that the protection control module 120c has been compromised, update modules 142c and 143c request that the protection control module 120c transmit the application identification information, the decrypted application data, and the verification data (step S544).

Upon receiving the transmission request from update modules 142c and 143c, the protection control module 120c transmits the application identification information, the decrypted application data, and the verification data (step S545).

Update modules 142c and 143c respectively verify whether or not the input/output correspondence for the application 110 decryption process by the protection control module 120c is correct according to the received application identification information, decrypted application data, and verification data (step S546). Subsequently, update modules 142c and 143c transmit the verification results to the determiner 210b (step S547). Finally, the determiner 210b receives the verification results.

(5) Update Process

In Embodiment 5, when the protection control module 120c is to be updated with a new protection control module, the encryption/decryption key holder thereof is installed onto the apparatus 100b while holding a new encryption/decryption key generated by the update software distributor 240c.

(6) Re-Encryption Process

Figure 74:
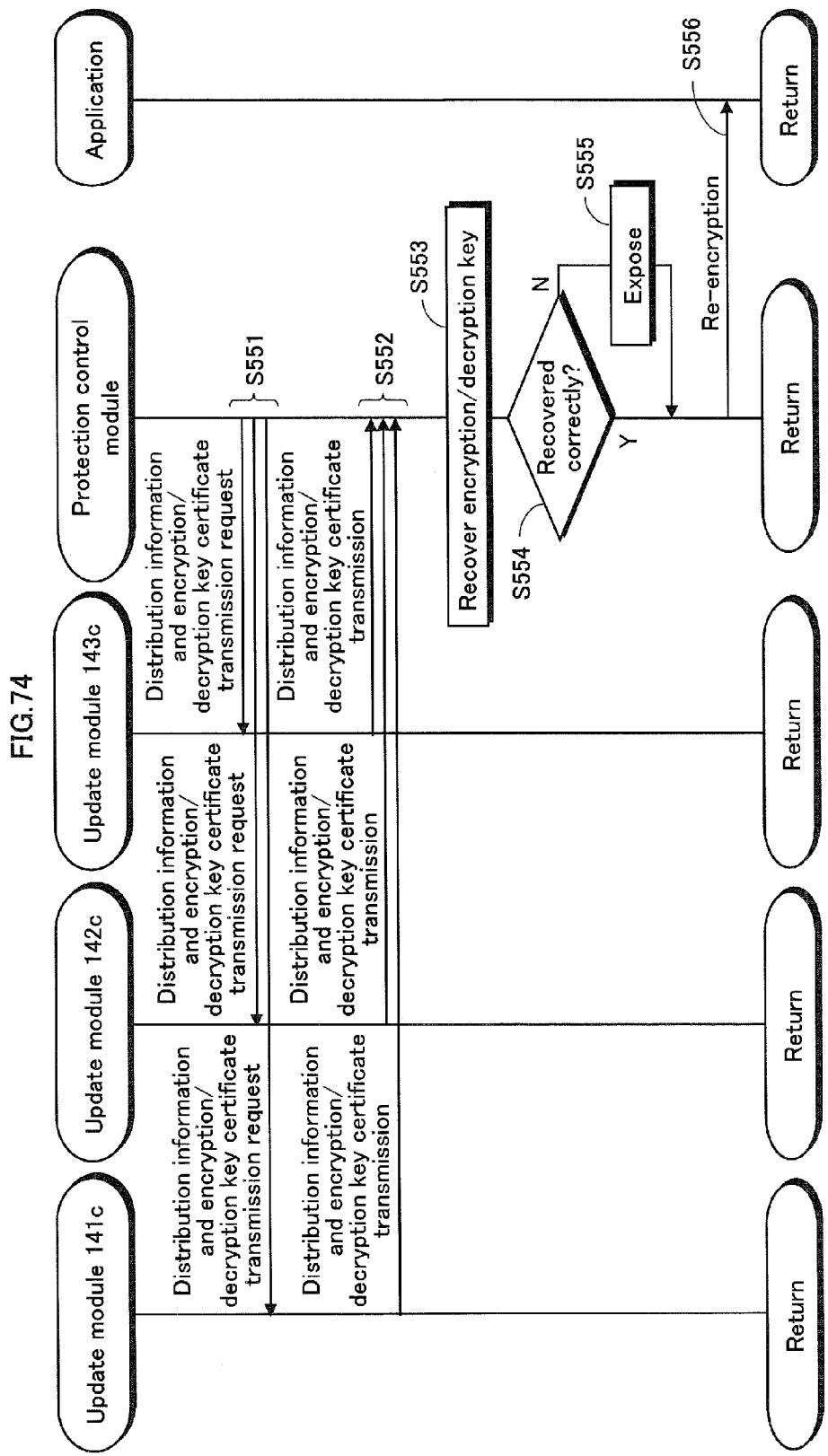
FIG. 74 is a sequence diagram of the re-encryption process pertaining to Embodiment 5.

FIG. 74 is a sequence diagram showing the re-encryption process.

In Embodiment 5, the encryption/decryption key holder of the new protection control module already holds a new encryption/decryption key therein. Thus, the re-encryption process shown in FIG. 74 does not involve generation of a new encryption/decryption key as in step S376 of Embodiment 4 (FIG. 62).

The protection control module recovers the old encryption/decryption key and uses this key to decrypt the encrypted applications, then uses the new encryption/decryption key already held thereby to re-encrypt the applications (step S556).

(7) Subsequent-Round Preparation Process

Figure 75:
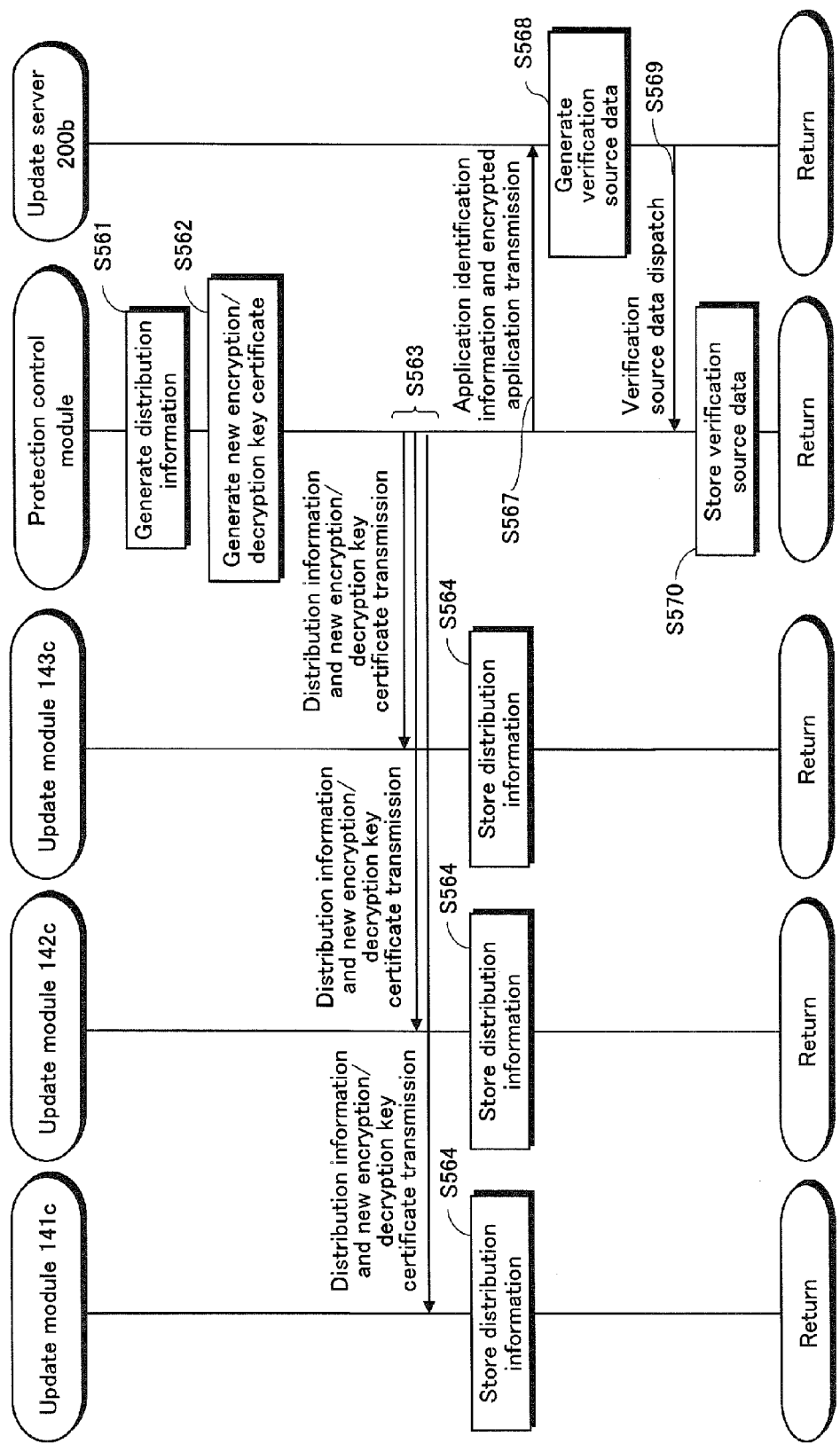
FIG. 75 is a sequence diagram of the subsequent-round preparation process pertaining to Embodiment 5.

FIG. 75 is a sequence diagram showing the subsequent-round preparation process.

After transmitting the distribution information and the encryption/decryption key certificate to the update modules in step S563, the protection control module 120c transmits a dispatch request for the application identification information, the encrypted application, and the verification source data to the update server 200b (step S567). Afterward, the update server 200b generates the verification source data (step S568).

The verification source data generation process in the subsequent-round preparation process is slightly different from that of the initial setup process.

The update server 200b uses the new encryption/decryption key generated in the update process to decrypt the received encrypted applications. Then, a certificate (correspondence certificate) is generated for each encrypted application and for each decrypted application. This certificate is a signature generated using the private signature key of the update server 200*b*. The structure of the verification source data is identical to that shown in FIG. 72.

The update server 200*b* then transmits the verification source data so generated to the protection control module (step S569). Finally, the protection control module receives and stores the verification source data (step S570).

(8) Verification Source Data Update Process

Figure 76:
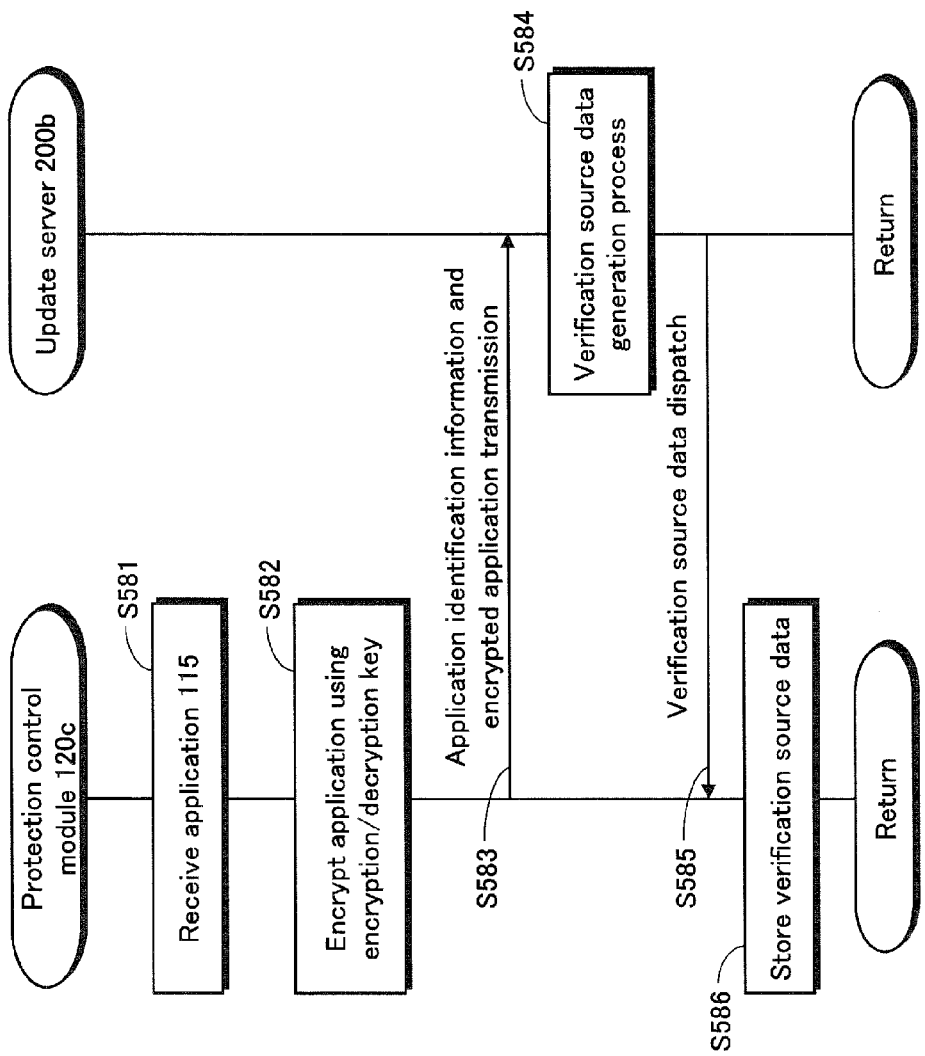
FIG. 76 is a sequence diagram of the verification source data update process pertaining to Embodiment 5.

FIG. 76 is a sequence diagram showing the verification source data update process.

When an application is added to the apparatus 100*b*, verification source data must also be added. The following example describes a new application (application 115) being added to the apparatus 100*b*.

When the user adds an application to the apparatus 100*b*, the protection control module 120*c* within the apparatus 100*b* receives the downloaded application 115 (step S581). Next, the protection control module 120*c* uses the encryption/decryption key to encrypt the application 115 so received (step S582). The protection control module 120*c* then transmits the application identification information, the encrypted application, and a verification source data dispatch request to the update server 200*b* (step S583).

The update server 200*b* generates the verification source data (step S584).

The verification source data generation process within the verification source data update process proceeds in the same manner as that of the above-described subsequent-round preparation process.

The update server 200*b* uses the new encryption/decryption key generated in the update process to decrypt the received encrypted application. The update server 200*b* then generates a certificate (correspondence certificate) for the encrypted application and the decrypted application. This certificate is a signature generated using the private signature key of the update server 200*b*. The structure of the verification source data is identical to that shown in FIG. 72.

The update server 200*b* transmits the verification source data so generated to the protection control module 120*c* (step S585). Finally, the protection control module 120 stores the received verification source data in the verification source data holder 420 (step S586).

3. Embodiment 5 Effects

In Embodiment 5, the presence of tampering in the protection control module 120*c* is verified through verification of whether or not the protection control module 120*c* correctly executes the application decryption process.

As such, each update module can verify the protection control module 120*c* without knowledge of the data thereof. Therefore, supposing that an update module were to perform unauthorized operations, the data of the protection control module 120*c* can nevertheless be prevented from leaking, which in turn provides an additional layer of system security.

[Embodiment 6]

Embodiment 6 of the present invention is presently explained. The following explanations use the same reference numbers as Embodiment 5.

1. Outline

Embodiment 6 is characterized in that the application decryption process performed by the protection control module 120*c* is divided into a plurality of processes, and tampering is detected in the protection control module 120*c* through verification of the input/output correspondence for each such process.

Figure 77:
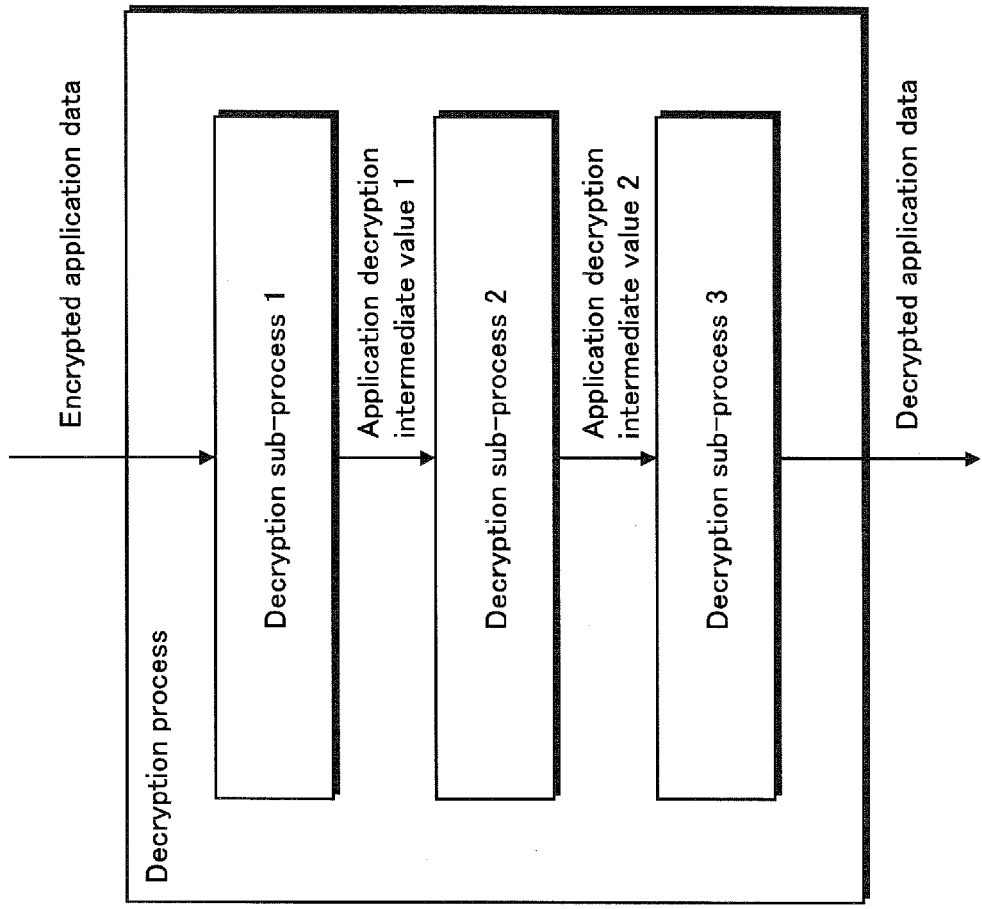
FIG. 77 is a diagram explaining the specifics of splitting the decryption process into a plurality of decryption sub-processes pertaining to Embodiment 6.

FIG. 77 shows the outline of the decryption process by the protection control module 120*c* as divided into a plurality of sub-processes. In Embodiment 6, as an example, the decryption process is divided into three sub-processes, namely decryption sub-process 1, decryption sub-process 2, and decryption sub-process 3.

Each update module uses the verification data generated in each decryption sub-process to verify the input/output correspondence thereof. With regard to security, having each of the three update modules verify a different one of the decryption sub-processes is preferable to having a single update module verify all three decryption sub-processes.

2. Configuration

The following explanations describe structural differences from Embodiment 5.

In Embodiment 6, the structure of the verification source data generated by the verification source data generator 1222 is different.

FIG. 78 shows the structure of the verification source data for Embodiment 6.

The verification source data 1300 includes data 1300*a* pertaining to decryption sub-process 1, data 1300*b* pertaining to decryption sub-process 2, and data 1300*c* pertaining to decryption sub-process 3.

Data 1300*a* includes a correspondence certificate generated from, for all of the applications 110 through 114, identification information, encrypted application data corresponding thereto, and the encrypted data of the application itself, as well as from an intermediate value 1 which consists of the data output of decryption sub-process 1.

Data 1300*b* includes a correspondence certificate generated from, for all of the applications 110 through 114, identification information, the data of intermediate value 1 corresponding thereto, and an intermediate value 2 which consists of intermediate value 1 and the data output of decryption sub-process 2.

Data 1300*c* includes a correspondence certificate generated from, for all of the applications 110 through 114, identification information, the data of intermediate value 2 corresponding thereto, and the data of the decrypted application, which consists of intermediate value 2 and the data output of decryption sub-process 3.

The update software executor 1220 acquires intermediate value 1, intermediate value 2, and the decrypted application data by decrypting the application.

Each of the correspondence certificates is generated using the private signature key of the update server 200*b* for the input data and output data of each decryption sub-process when the protection control module 120*c* is operating normally.

The correspondence certificate for decryption sub-process 1 is a signature generated using the private signature key of the update server 200*b* for the input data input as such for each encrypted application, and for the output data from normal operations of the protection control module 120*c*.

The correspondence certificate for decryption sub-process 2 is a signature generated using the private signature key of the update server 200*b* for the input data input as such for the intermediate value 1 of each application, and for the output data from normal operations of the protection control module 120*c*.

The correspondence certificate for decryption sub-process 3 is a signature generated using the private signature key of the update server 200*b* for the input data input as such for the intermediate value 2 of each application, and for the output data from normal operations of the protection control module 120*c*.

3. Operations (1) Initial Setup Operations

The initial setup process of Embodiment 6 is identical to that of Embodiment 5 (FIGS. 68 and 69). In Embodiment 6, as shown in FIG. 77, the protection control module 120c transmitted from the update server 200b to the apparatus 100b during step S501 includes a decryption program that decrypts the encrypted applications in three decryption sub-processes.

The details of the verification source data generation process from step S513 will be described later.

(2) Verification Source Data Generation Process

Figure 79:
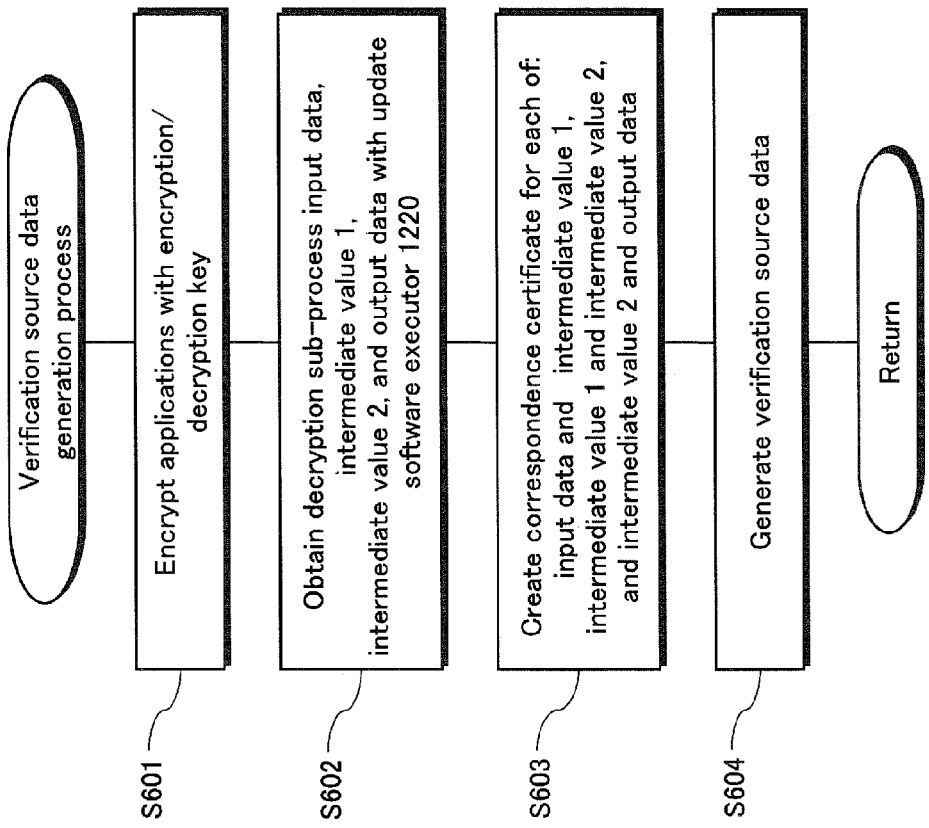
FIG. 79 is a flowchart showing the verification source data generation process pertaining to Embodiment 6.

FIG. 79 is a flowchart showing the verification source data generation process pertaining to Embodiment 6.

The verification source data generator 1222 encrypts the applications held in the application holder 1221 with the encryption/decryption key of the protection control module 120c (step S601).

Next, the update software executor 1220 executes the protection control module 120c decryption process, thus decrypting the encrypted applications and acquiring intermediate values, i.e. the data output of each decryption sub-process, as well as the decrypted applications (step S602).

Subsequently, the certificate generator 1208 uses the private signature key held by the private signature key holder 1209 to generate a certificate (correspondence certificate) for the combinations of (a) the encrypted application data and intermediate value 1, (b), intermediate value 1 and intermediate value 2, and (c) intermediate value 2 an the decrypted application data (step S603).

Finally, the verification source data generator 1222 generates verification source data made up of the application identification information, the input data corresponding to each decryption sub-process, and the correspondence certificates (step S604).

(3) Detection Process Operations

Figure 80:
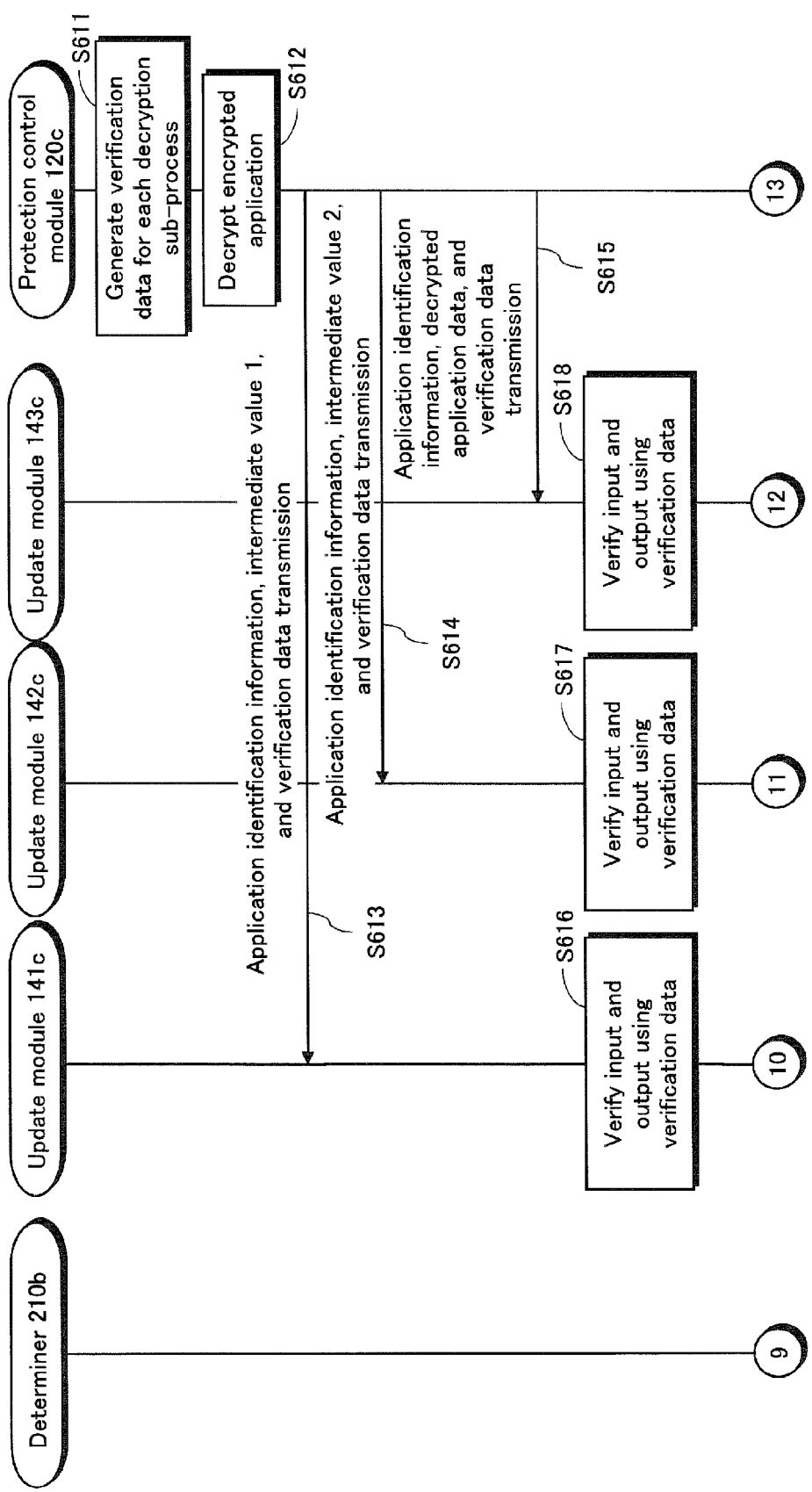
FIG. 80 is a sequence diagram of the detection process pertaining to Embodiment 6.
Figure 81:
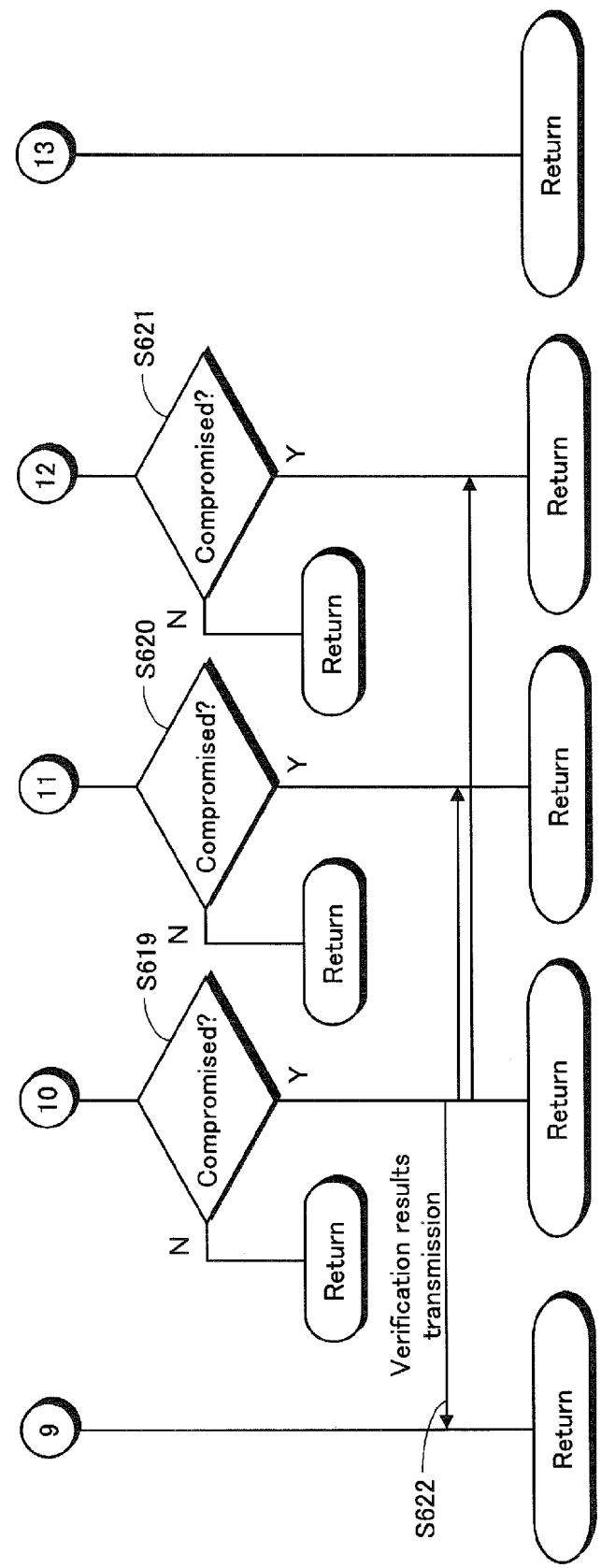
FIG. 81 is a sequence diagram of the detection process pertaining to Embodiment 6.

FIGS. 80 and 81 are sequence diagrams showing the detection process pertaining to Embodiment 6.

The following explanations deal with a specific example where the detection process is performed on the protection control module 120c when the apparatus 100b executes application 110.

Upon receiving a command to execute application 110, the protection control module 120c generates verification data from the verification source data (FIG. 78) held by the verification source data holder 913 (step S611).

Figure 82:
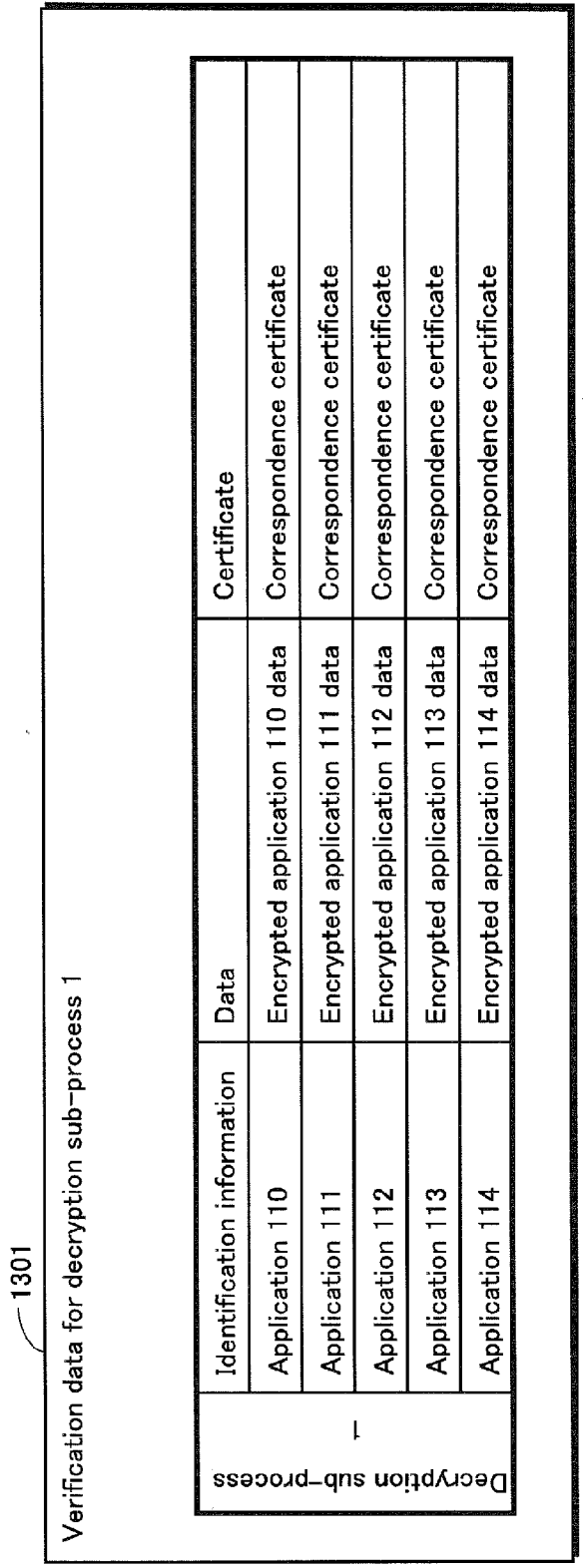
FIG. 82 is a diagram showing the structure of verification data 1301 in decryption sub-process 1 pertaining to Embodiment 6.

The verification data generator 912 generates verification data 1301 for decryption sub-process 1 as shown in FIG. 82, verification data 1302 for decryption sub-process 2 as shown in FIG. 83, and verification data 1303 for decryption sub-process 3 as shown in FIG. 84.

After generating the verification data, the protection control module 120c decrypts the encrypted application 110 (step S612).

The protection control module 120c selects one of the update modules (in this example, update module 141c) and transmits thereto the application 110 identification information, intermediate value 1, and the verification data for decryption sub-process 1 (step S613).

The protection control module 120c selects one of the update modules other than the previously-selected update module (in this example, update module 142c) and transmits thereto the application 110 identification information, intermediate value 2, and the verification data for decryption sub-process 2 (step S614).

The protection control module 120c further selects one of the update modules other than the previously-selected two update modules (in this example, update module 143c) and transmits thereto the application 110 identification information, the decrypted application data, and the verification data for decryption sub-process 3 (step S615).

Then, each of the update modules uses the verification data so received to verify whether or not the input/output correspondence of the decryption sub-processes is correct (steps S616, S617, and S618).

If any of the update modules judges the input/output of the decryption sub-processes to be incorrect, then the protection control module 120 is in turn judged to be compromised (Y in step S619, S620, or S621). The determiner 210b and the other update modules are notified of these verification results (step S622). FIG. 81 shows the verification results notification made by update module 141c only. However, update modules 142c and 143c also make the same notification.

If the input and output of the decryption sub-processes are correct, and the update modules judge that the protection control module 120c is not compromised (N in steps S619, S620, and S621), then the update modules re-verify the protection control module 120c when the next application is executed without notifying the determiner 210b or the other update modules.

(4) Subsequent-Round Preparation Process

The subsequent-round preparation process of Embodiment 6 is identical to that of Embodiment 5 (FIG. 75). However, in Embodiment 6, the verification source data generated by the update server 200b is the verification source data 1300 shown in FIG. 78.

(5) Verification Source Data Update Process

The verification source data update process of Embodiment 6 is identical to that of Embodiment 5 (FIG. 76). However, during the verification source data generation process within the verification source data update process of Embodiment 6, the update software executor 1220 acquires intermediate value 1, intermediate value 2, and the decrypted application data from the encrypted application data. Also, the verification source data generator 1222 generates the verification source data 1300 shown in FIG. 78 according to the data so acquired.

4. Embodiment 6 Effects

In Embodiment 6, the decryption process executed by the protection control module 120c is divided into sub-processes and verification of the input/output data correspondence is performed for each sub-process. Therefore, supposing that an update module were to perform unauthorized operations, the decryption process performed by the protection control module 120c can nevertheless be prevented from leaking. Furthermore, the compromised portion of the decryption process by the protection control module 120c can be discovered.

[Embodiment 7]

Embodiment 7 of the present invention is presently explained. The following explanations use the same reference symbols as Embodiment 5.

1. Configuration

In Embodiment 7, the structure of the verification source data generated by the verification source data generator 1222 is different from that of Embodiment 5.

FIG. 85 shows the structure of the verification source data for Embodiment 7.

The verification source data 1400 comprises identification information for each application, encrypted application data and verification values corresponding thereto, as well as a decryption process certificate.

The encrypted application data are generated by the update software executor 1220 executing the protection control module 120*c* and encrypting each application held by the application holder 1221 using the encryption/decryption key thereof.

The verification value is a hash value combining the encrypted application data as input, and the output data consisting of the decryption results obtained when the protection control module 120*c* is operating properly. A signature may be used as the verification value instead of the hash value. In addition, the data that are added together for the hash value are not only the input/output data but may also include the application identification information, information indicating the content of the application (such as a DVD or BD playback application or an online banking application), and so on. Furthermore, the identification information of the protection control module 120*c* may also be included.

The decryption process certificate is generated as follows. First, the verification value of each application 110, 111, 112, 113, and 114 are all combined, and a hash value is calculated from this combined value. Next, a signature is generated for the hash value so calculated using the private signature key of the update server 200*b*. The signature so generated is the decryption process certificate.

The verification data generated by the verification data generator 912 of the protection control module 120*c* in Embodiment 7 differ from Embodiment 5. The verification data generator 912 generates verification data from the verification source data (verification source date 1400 from FIG. 85) held by the verification source data holder 913, then transmits the data so generated to the update modules.

The following explanations describe a specific example in which the verification data generator 912 generates the verification data at application 110 execution time.

Figure 86:
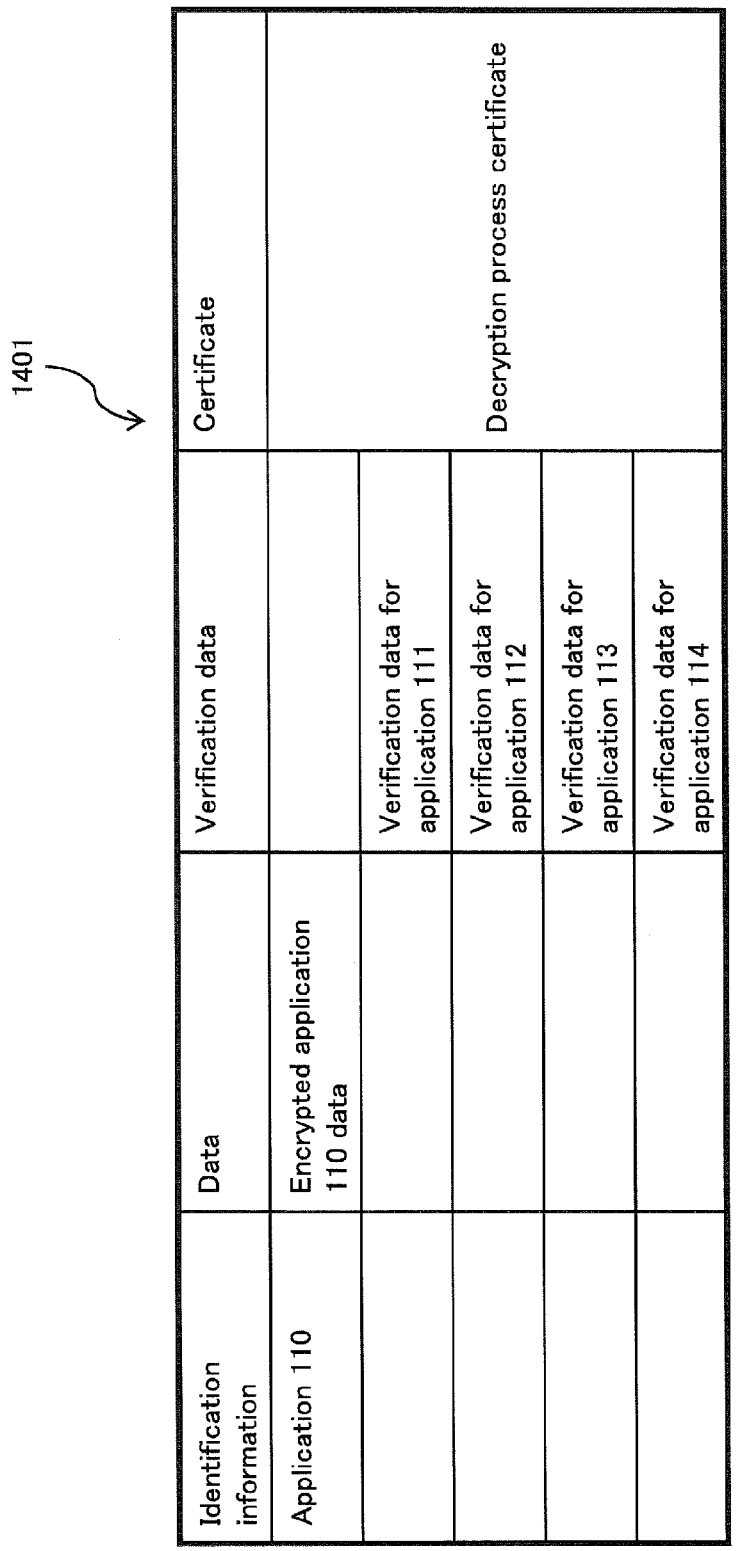
FIG. 86 is a diagram showing the structure of verification data 1401 pertaining to Embodiment 7.

FIG. 86 shows the structure of the verification data generated by the verification data generator 912 at application 110 execution time.

The verification data generator 912 generates the verification data 1401 from the verification source data 1400 by deleting the identification information and the encrypted application data of the other applications, namely applications 111, 112, 113, and 114, as well as the verification value for application 110.

The verification data generator 912 generates verification data for the other applications using the same method. To be exact, the verification data generator 912 generates the verification data from the verification source data 1400 by deleting the identification information and encrypted application data of applications other than the executed application, as well as the verification value of the executed application.

2. Operations
(Detection Process)

The detection process of Embodiment 7 is mostly similar to that of Embodiment 5 (FIG. 73).

The verification method of step S542 is different for Embodiment 7.

In step S542, update module 141*c* calculates a hash value from the encrypted application data included in the verification data and from the received decrypted application data. Next, update module 141*c* further calculates a hash value from data combining the previously-calculated hash value and the verification values included in the verification data for the other applications. Finally, update module 141*c* uses the decryption process certificate included in the verification data and the hash value so calculated to verify whether or not the input and output of the application decryption process are correct.

3. Embodiment 7 Effects

The verification data of Embodiment 7 solely disclose information pertaining to the application decrypted by the protection control module 120*c*. Accordingly, even if an update module were to perform unauthorized operations, information concerning other applications will not be leaked through the verification data thereof.

Furthermore, in Embodiment 7, the verification source data are made up of encrypted application data, verification values (hash values) and decryption process certificates (signature for the hash value generated from combined hash values). Thus, the decryption process performed by the protection control module 120*c* can be verified.

[Embodiment 8]

Embodiment 8 of the present invention is presently explained. The following explanations use the same reference symbols as Embodiment 5.

1. Outline

Embodiment 8 is characterized in that the verification data used for the detection process by each update module are deleted after verification. In addition, the update modules perform a mutual tamper detection process to confirm that the verification data has been deleted. The structure of each device is identical to Embodiment 5.

2. Operations
(Detection Process)

Figure 87:
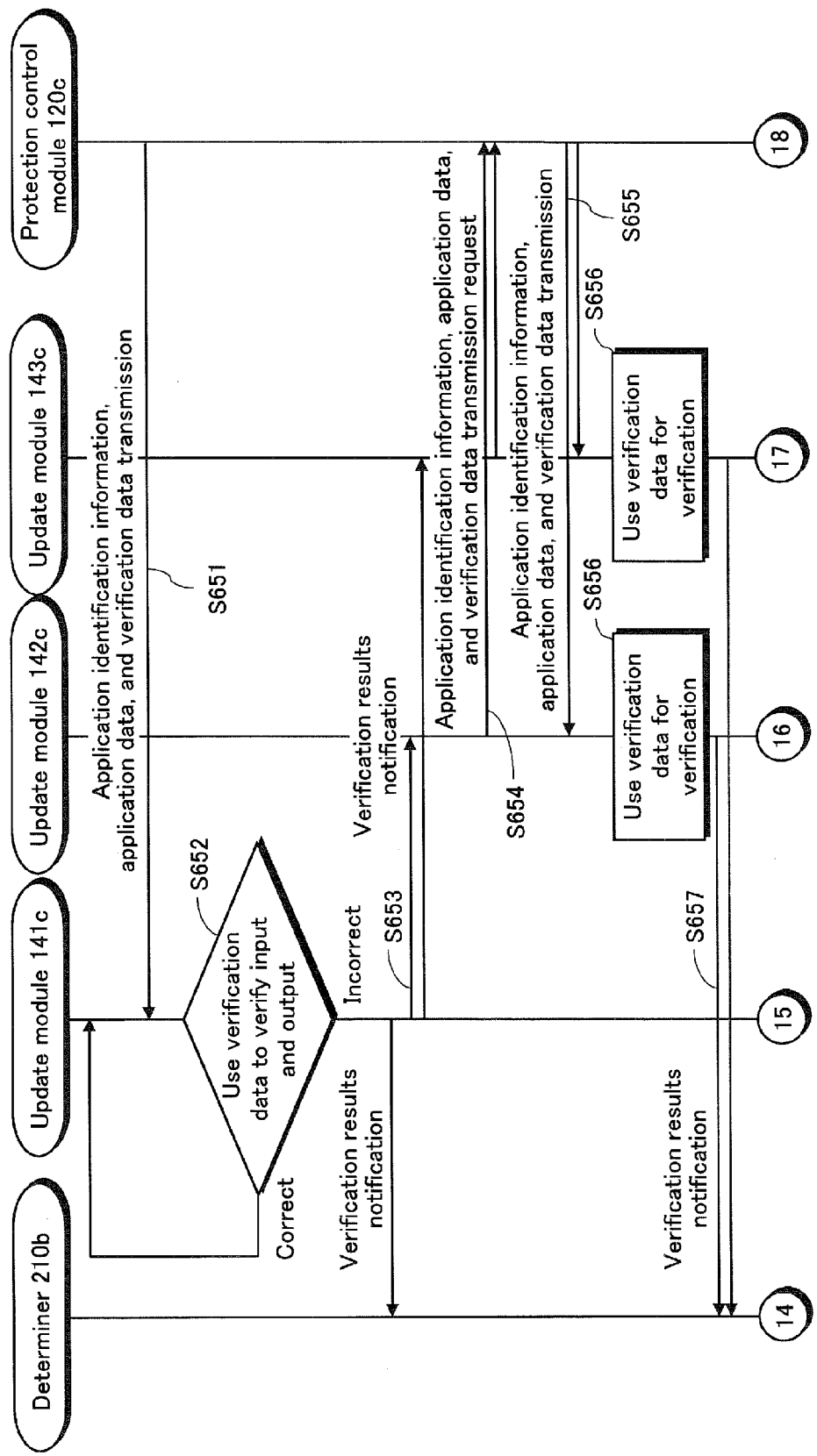
FIG. 87 is a sequence diagram of the detection process pertaining to Embodiment 8.
Figure 88:
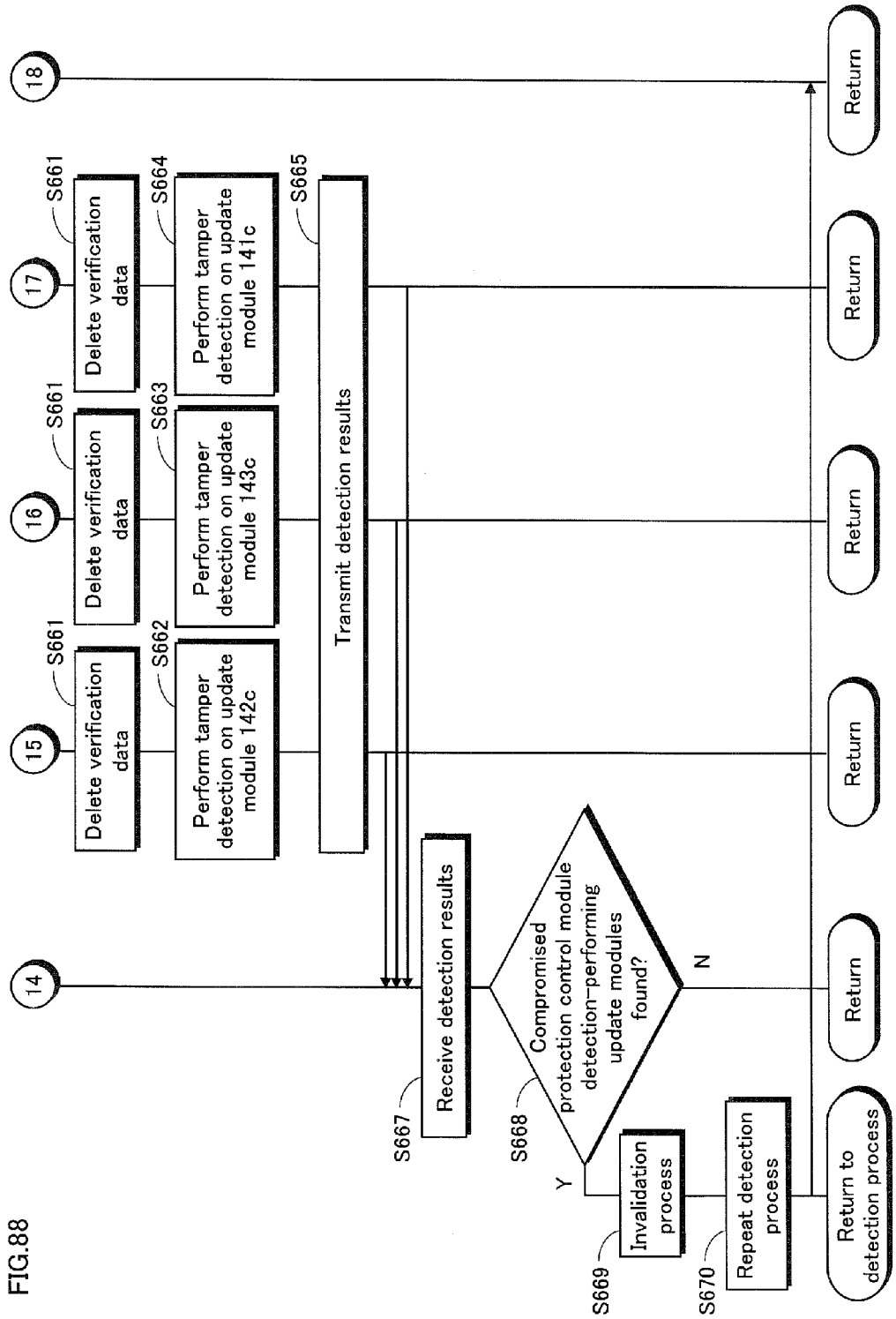
FIG. 88 is a sequence diagram of the detection process pertaining to Embodiment 8.

FIGS. 87 and 88 are sequence diagrams showing the detection process pertaining to Embodiment 8.

Steps S651 through S657 from FIG. 87 are identical to those of Embodiment 5 (FIG. 73). The following explanations begin at step S661 from FIG. 88.

Each update module deletes the verification data held by the verification data holder 811 thereof (step S661). Subsequently, the update modules perform a mutual tamper detection process to confirm whether or not the verification data has been deleted.

Update module 141*c* performs tamper detection on update module 142*c* (step S662), update module 142*c* performs tamper detection on update module 143*c* (step S663), and update module 143*c* performs tamper detection on update module 141*c* (step S664).

The tamper detection process involves calculating a MAC value for each update module using the verification key, then comparing the MAC value held by the MAC value table to the MAC value so calculated. Alternatively, instead of using MAC values, the process may involve calculating a hash value for each update module, then comparing a hash value written in the certificate preemptively attached to the update modules to the hash values so calculated.

Each update module transmits the tamper detection results to the determiner 210*b* (step S665).

The determiner 210*b* receives the tamper detection results from the update modules (step S667), then judges whether or not the update modules performing the detection process of the protection control module 120*c* are compromised (step S668).

If an update module is judged as compromised (Y in step S668), then the determiner 210*b* determines that the detection process of the protection control module 120*c* was not performed correctly and invalidates the compromised update module (step S669). Afterward, the determiner 210*b* notifies the protection control module 120*c* that the detection process will be re-performed (step S670).

If no update modules are judged as compromised (N in step S668), then the verification data deletion of step S661 is deemed to have been performed correctly.

3. Embodiment 8 Effects

Embodiment 8 can prevent accumulation of verification data in the update modules by having the update modules mutually confirm the deletion of the verification data used thereby. Accordingly, even if one update module were to perform unauthorized operations, the verification data of, at most, only one application can be leaked. As such, the further verification data can be prevented from leaking.

[Embodiment 9]

Embodiment 9 of the present invention is presently explained. The following explanations use the same reference numbers as Embodiment 5.

1. Outline

Embodiment 9 is characterized in that the detection process of protection control module uses verification data preemptively received from the update server 200b, without using any application data.

2. Configuration

The verification data for Embodiment 9 are explained with reference to FIG. 89.

The verification data 1500 include, for each of five pieces of data generated by the update server 200b, identification information identifying each piece of data, encrypted data indicating the identification information, as well as a certificate (correspondence certificate) generated for the encrypted data and decryption data.

This correspondence certificate is a signature generated using the private signature key of the update server 200b for the input data input as such, and for the output data from normal operations of the protection control module 120c.

3. Operations (1) Initial Setup Operations

Figure 90:
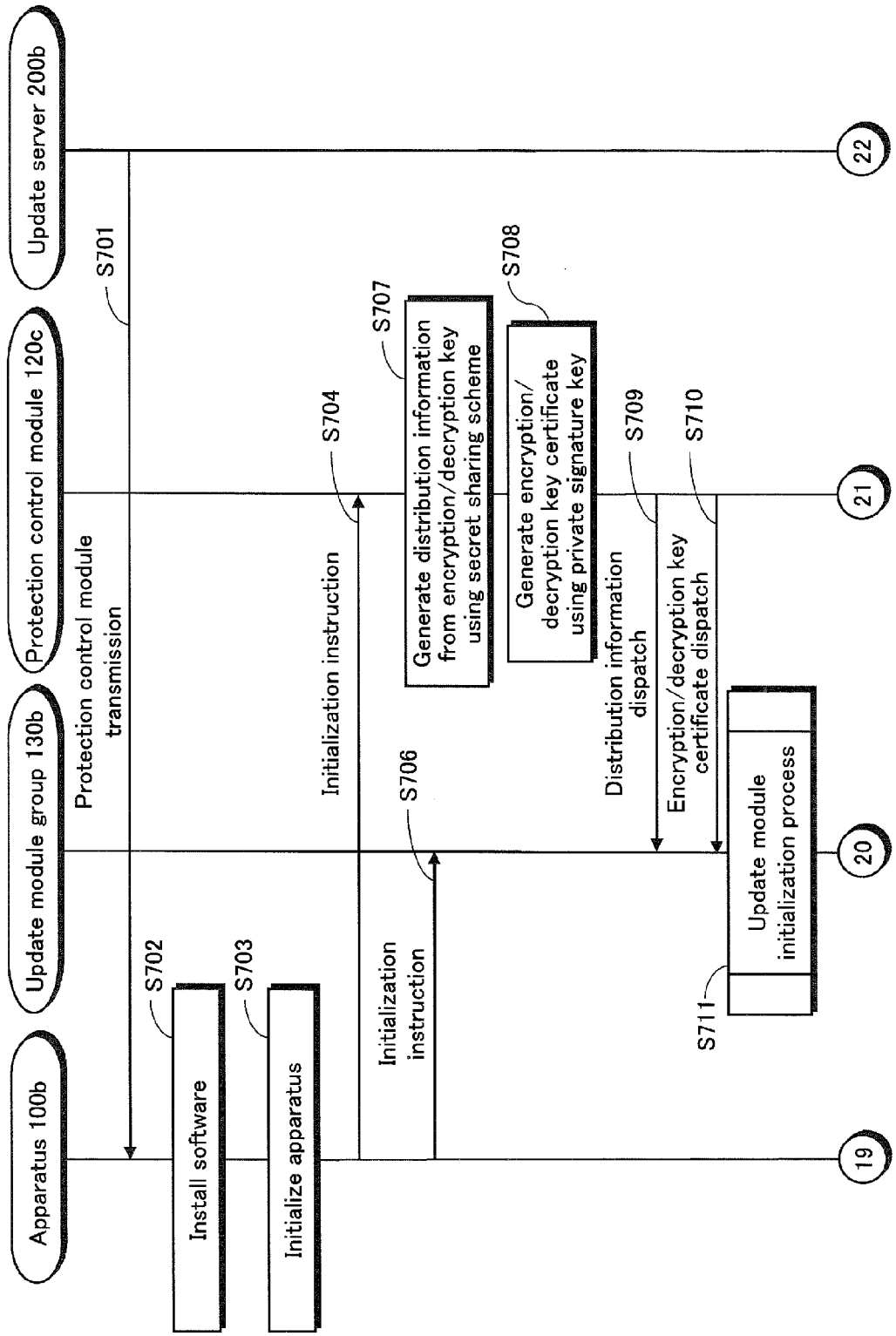
FIG. 90 is a sequence diagram showing the initial setup process pertaining to Embodiment 9.
Figure 91:
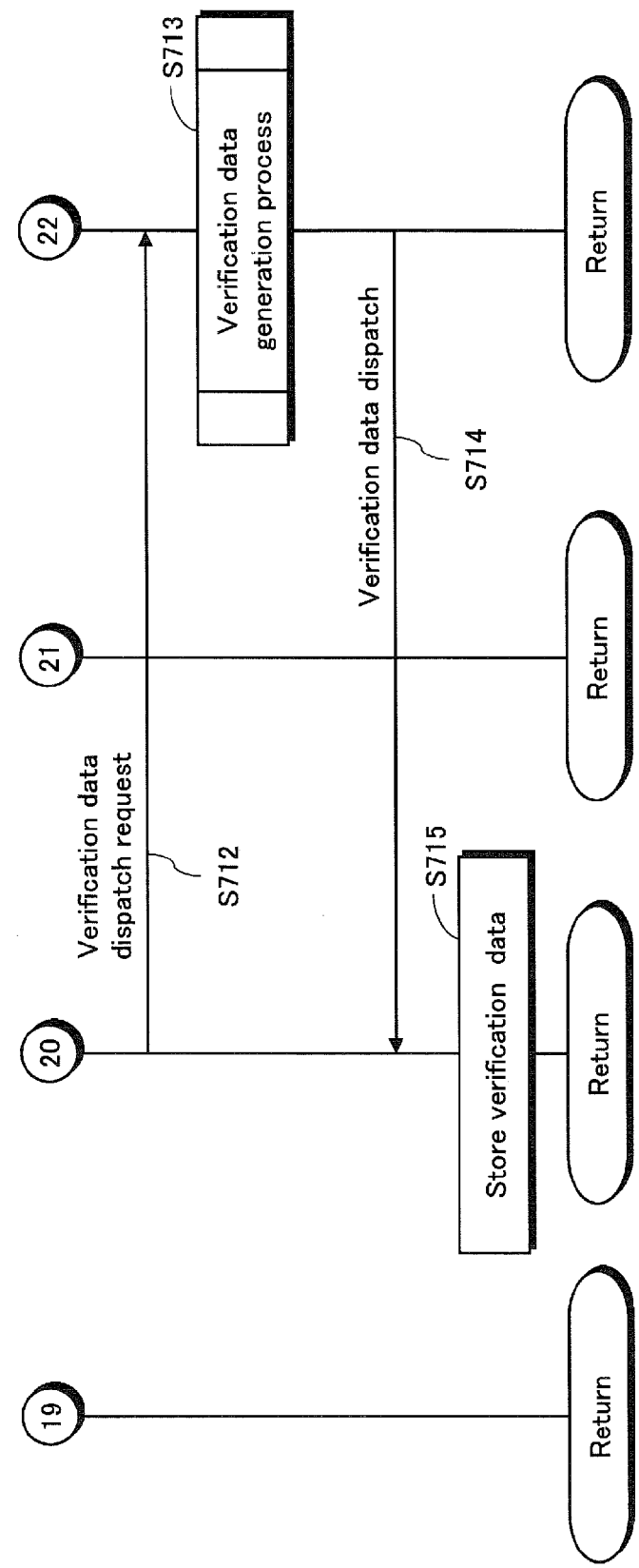
FIG. 91 is a sequence diagram showing the initial setup process pertaining to Embodiment 9.

FIGS. 90 and 91 are sequence diagrams showing the initial setup process pertaining to Embodiment 9.

The initial setup process of Embodiment 9 is identical to that of Embodiment 5 (FIG. 68). Step S713 of the verification data generation process by the update server 200b differs from that of Embodiment 5.

(2) Verification Data Generation Process

Figure 92:
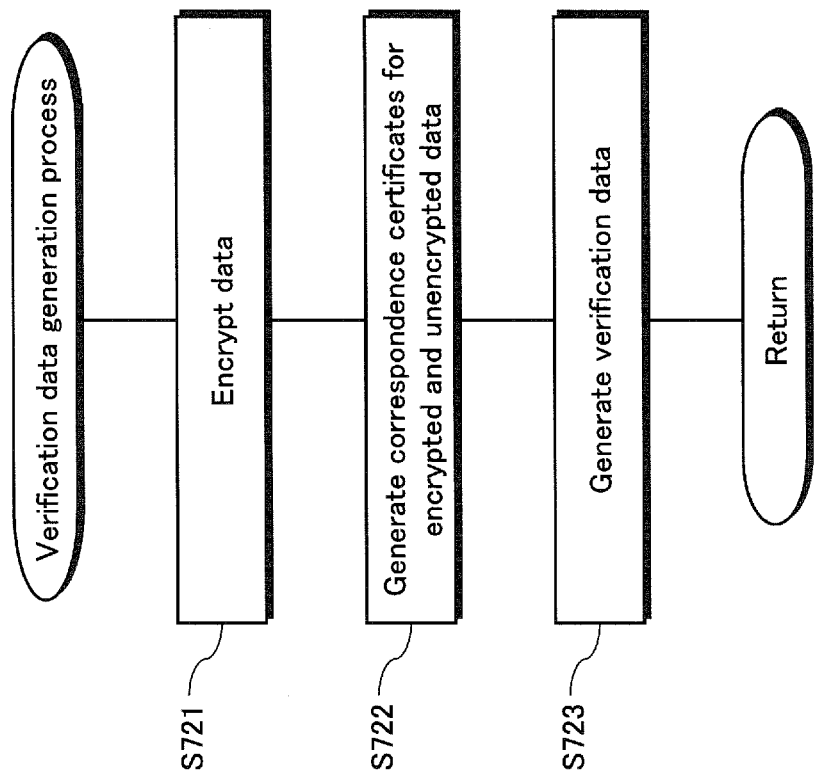
FIG. 92 is a flowchart showing the verification data generation process pertaining to Embodiment 9.

FIG. 92 is a flowchart showing the verification data generation process pertaining to Embodiment 9.

The update server 200b generates an arbitrary number of data pieces and encrypts each of the data pieces so generated with the encryption/decryption key of protection control module 120c (step S721).

Then, the update server 200b generates, for each of the data pieces previously generated, correspondence certificates for plain-text data and the corresponding encrypted data (step S722).

Finally, the update server 200b generates verification data made up of identification information for each of the data pieces, the encrypted data pieces, and the correspondence certificates (step S723).

(3) Detection Process Operations

Figure 93:
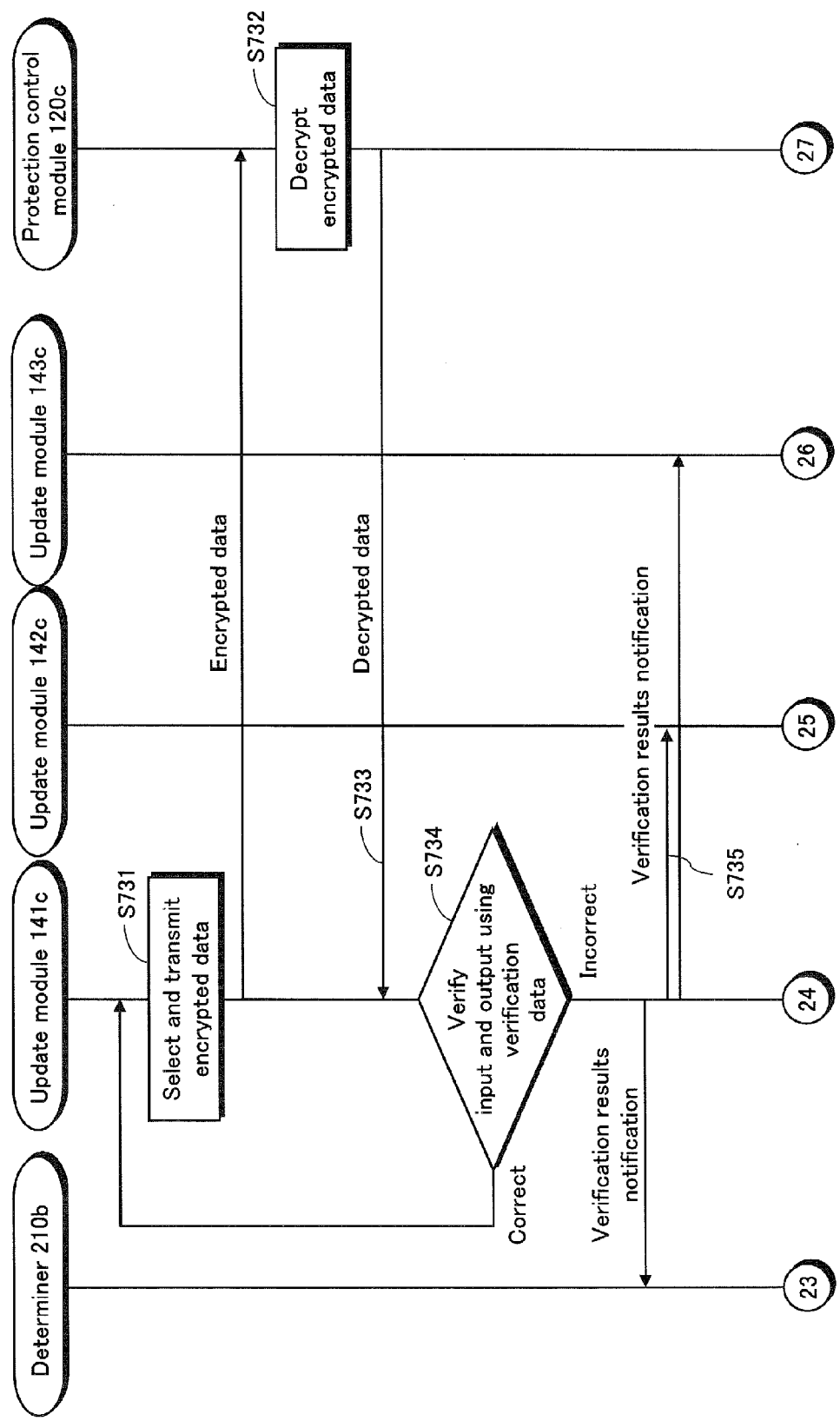
FIG. 93 is a sequence diagram of the detection process pertaining to Embodiment 9.
Figure 94:
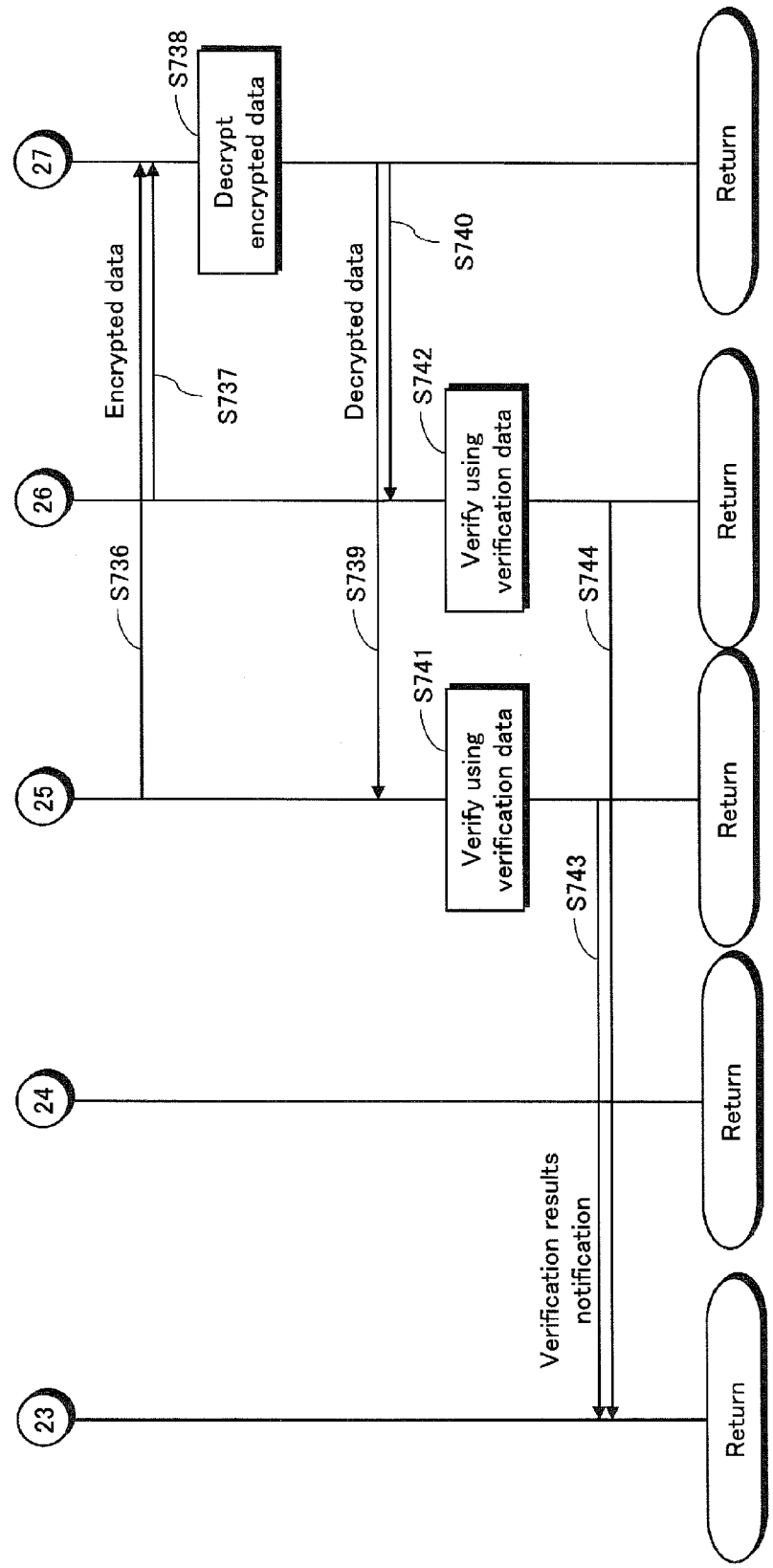
FIG. 94 is a sequence diagram of the detection process pertaining to Embodiment 9.

FIGS. 93 and 94 are sequence diagrams showing the detection process pertaining to Embodiment 9.

Update module 141c selects one encrypted piece of data from the verification data already held thereby to transmit to the protection control module 120c (step S731).

The protection control module 120b uses the encryption/decryption key to decrypt the encrypted data so received (step S732). The protection control module 120c transmits the decrypted data to update module 141c (step S733).

FIGS. 93 and 94 show only update module 141c performing the detection process on the protection control module 120c. However, update modules 142c and 143c also perform identical processes.

Update module 141c uses the verification data and the received decrypted data to verify whether or not the input/output correspondence for the decryption process of the protection control module 120c is correct (step S734).

If the input and output data for the decryption process are incorrect (Incorrect in step S734), then update module 141c judges that the protection control module 120c is compromised and notifies the determiner 210b as well as update modules 142c and 143c of the verification results (step S735).

If the input and output data of the decryption process are correct (Correct in step S734), then update module 141c does not notify the determiner 210b and the other update modules of the verification results.

Afterward, update module 141c verifies the protection control module 120c at an arbitrary time. Update module 141c may also verify the protection control module 120c regularly, or else whenever applications are executed thereby. Alternatively, information describing the verification timing may be preemptively given to update module 141c by the update server 200b.

Upon receiving verification results to the effect that the protection control module 120c has been compromised, update modules 142c and 143c select one piece of encrypted data from the verification data already held thereby and transmit the selected data to the protection control module 120c (steps S736 and S737).

The protection control module 120c respectively decrypts the received encrypted data using the encryption/decryption key (step S738), then transmits the decrypted data to the appropriate update module 142c or 143c (steps S739 and S740).

Update modules 142c and 143c use the verification data and the received verification data to verify whether or not the input/output correspondence for the decryption process of the protection control module 120c is correct (steps S741 and S742).

Subsequently, update modules 142c and 143c transmit the verification results to the determiner 210b (steps S743 and S744). Finally, the determiner 210b receives the verification results.

(4) Subsequent-Round Preparation Process

Figure 95:
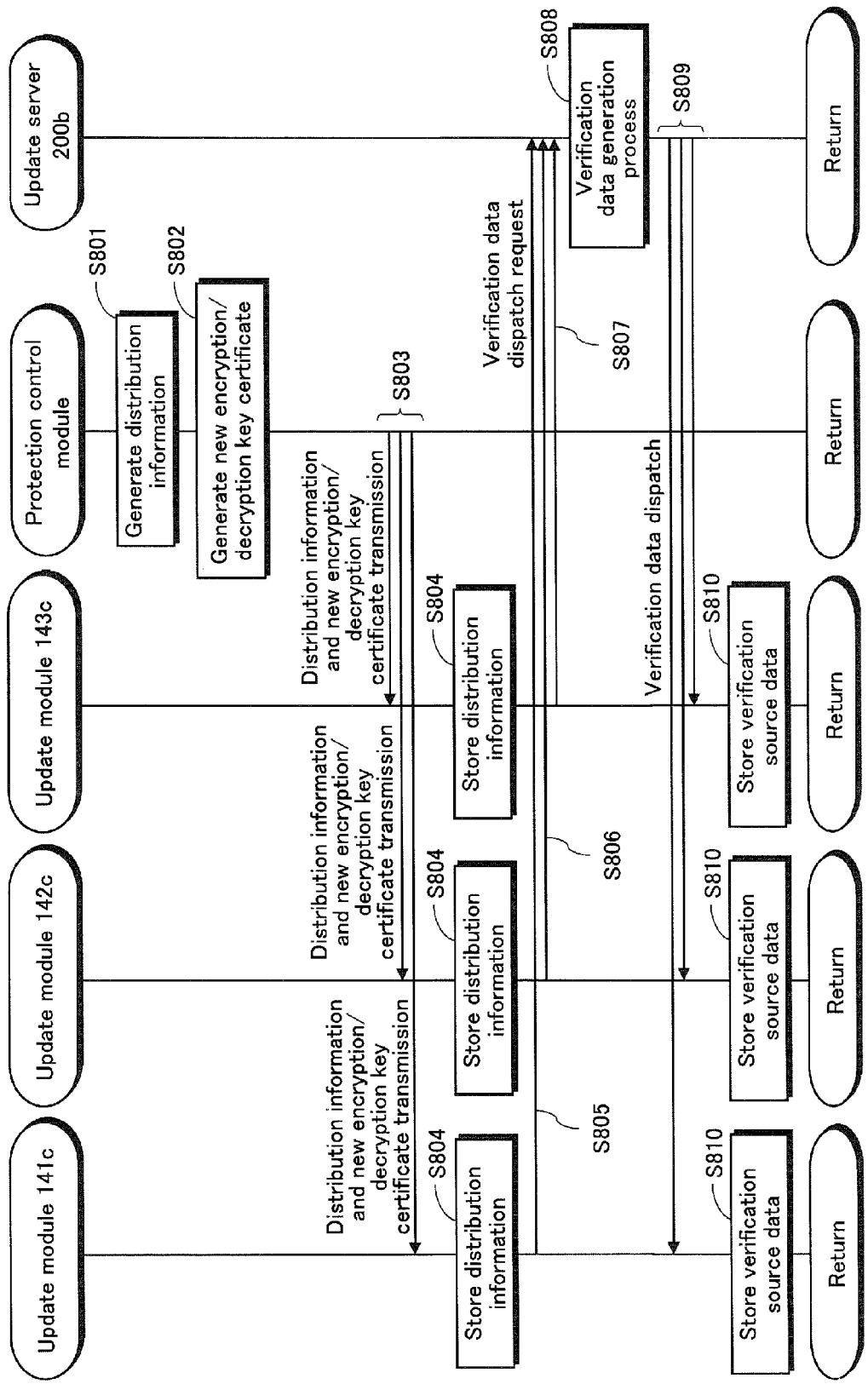
FIG. 95 is a sequence diagram of the subsequent-round preparation process pertaining to Embodiment 9.

FIG. 95 is a sequence diagram showing the subsequent-round preparation process pertaining to Embodiment 9.

The process of steps S801 through S814 is identical to that of Embodiment 5 (FIG. 75). The following explanations begin at step S802.

After obtaining the distribution information, each update module transmits a verification data dispatch request to the update server 200b (steps S805, S806, and S807).

The update server 200b generates the verification data (step S808). The verification data generation process in the subsequent-round preparation process is slightly different from that of the initial setup process. The update server 200b uses the new encryption/decryption key generated in the update process to decrypt the arbitrary data. Then, a correspondence certificate is generated for the correspondence between the plain-text data and the encrypted data. The structure of the verification data is identical to that of the verification data 1500 shown in FIG. 89.

The update server 200b transmits the verification data so generated to each update module (step S809). The update modules then receive and store the verification data (step S810).

(5) Verification Data Update Process

In Embodiment 9, verification data generated by the update server 200b from arbitrary data are used for the protection control module 120c detection process.

If the detection process is repeated, then the protection control module 120c stores therein the input/output data of the decryption process, and as such, the possibility exists that these data may be illicitly transmitted to the update modules. Should this occur, then the update modules will be unable to perform the protection control module 120c detection process correctly.

As such, in Embodiment 9, by updating the verification data, more types of encrypted data are used for verification and thus, a higher-security system can be built. The verification data update process may be performed either regularly or irregularly.

Figure 96:
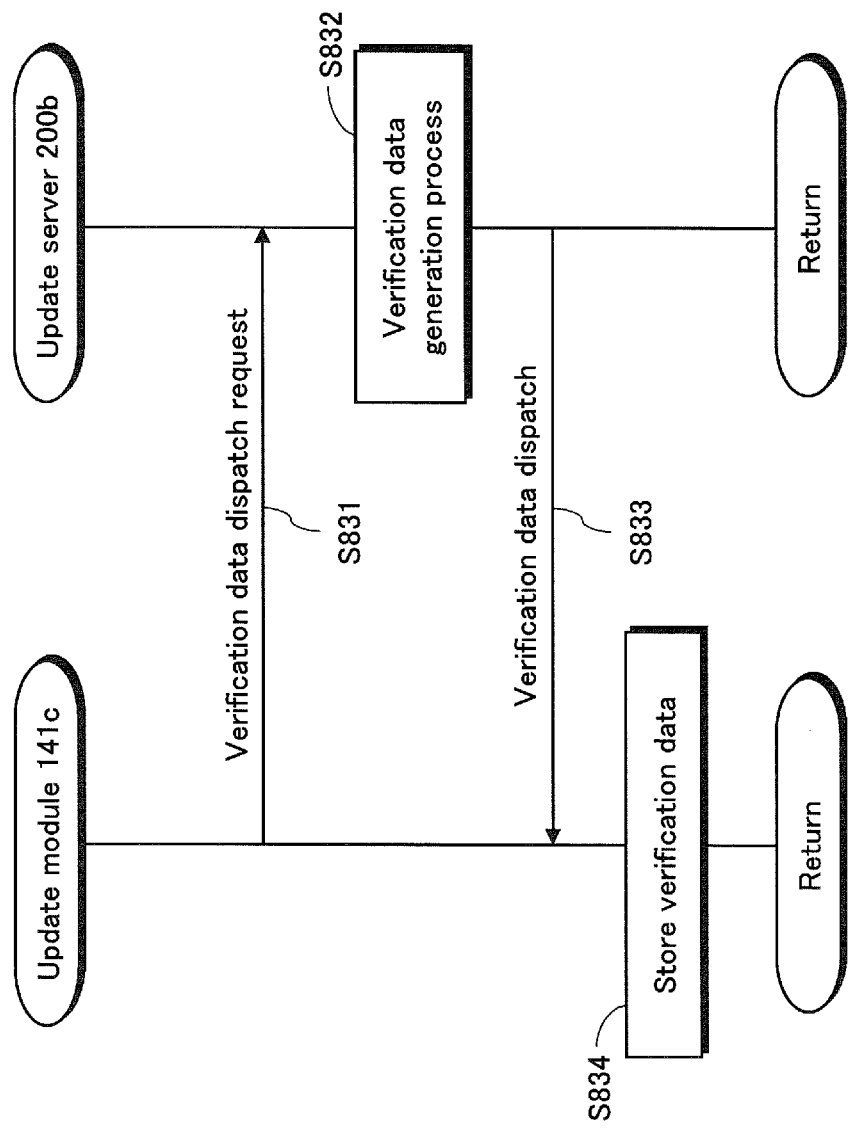
FIG. 96 is a sequence diagram of the verification data update process pertaining to Embodiment 9.

FIG. 96 is a sequence diagram showing the verification data update process. A specific example follows in which update module 141c is used. However, update modules 142c and 143c behave identically.

In order to update the verification data, update module 141c transmits a verification data dispatch request to the update server 200b (step S831).

The update server 200b generates the verification data (step S832).

The verification data generation process in the verification data update process is identical to that of the subsequent-round preparation process. The update server 200b transmits the verification data so generated to update module 141c (step S833).

Update module 141c then receives and stores the verification data (step S834).

4. Embodiment 9 Effects

In Embodiment 9, the update modules arbitrarily select encrypted data from the verification data for use in verification. Therefore, the protection control module 120c is highly unlikely to perform unauthorized operations. Thus, the security of the system can be enhanced.

[Embodiment 10]

Finally, Embodiment 10 of the present invention is presently explained. The following explanations use the same reference numbers as Embodiment 5.

1. Outline

Much like Embodiment 6, Embodiment 10 performs the detection process by splitting the application decryption process performed by the protection control module 120c into a plurality of decryption sub-processes. Embodiment 10 is further characterized by the order in which the decryption sub-processes are executed.

2. Configuration

In Embodiment 10, ordering information indicating the order of the decryption sub-processes is used. The ordering information indicates the order of the decryption sub-processes and, for any non-final sub-process, the update module that will perform verification of the next decryption sub-process.

For example, given update modules 141c, 142c, and 143c with the respective identification information ID1, ID2, and ID3, if the decryption sub-processes are to be performed by update modules 141c, 142c, and 143c in that order, then the ordering information may indicate (ID1, ID2, ID3).

3. Operations (Detection Process Operations)

Figure 97:
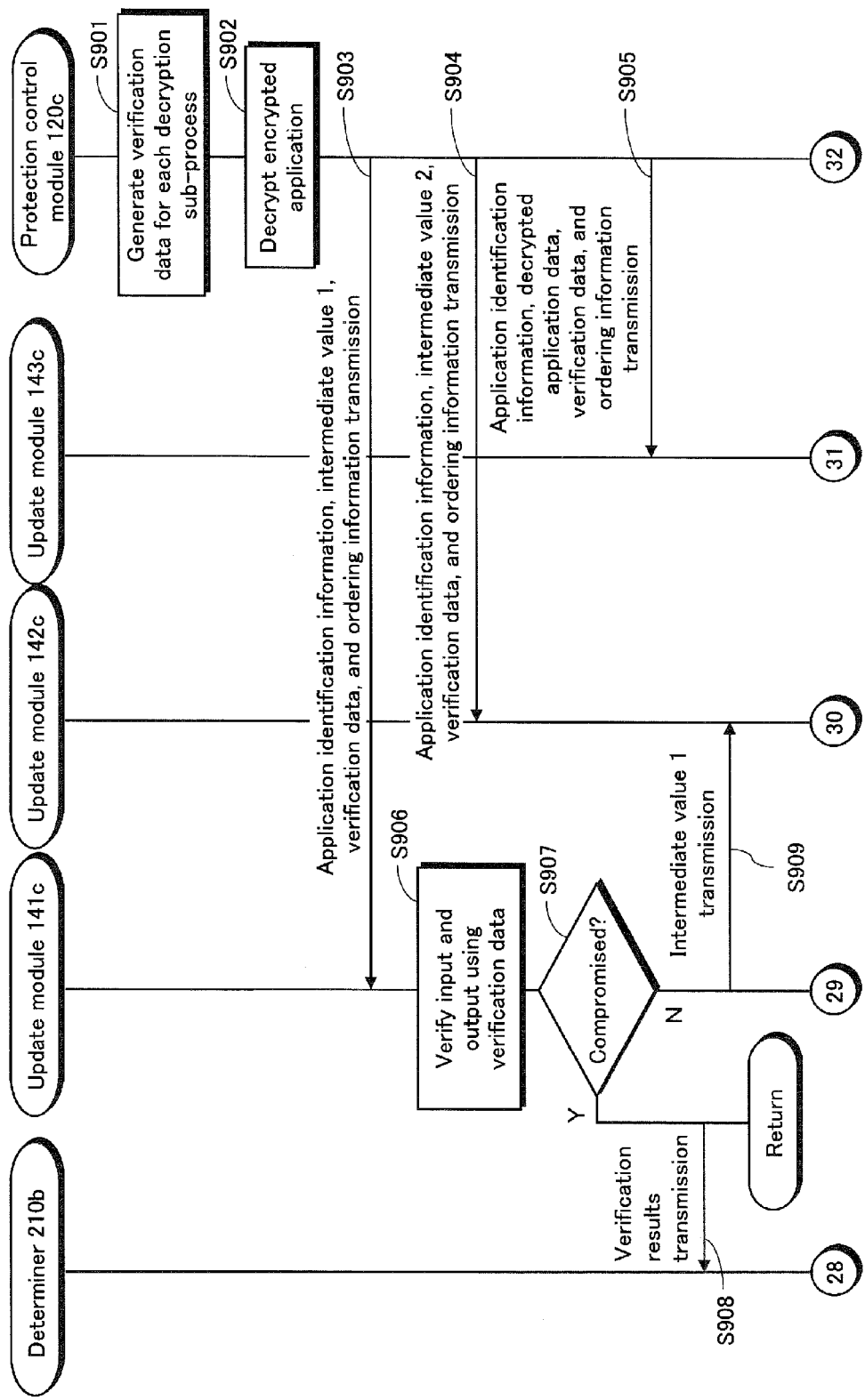
FIG. 97 is a sequence diagram of the detection process pertaining to Embodiment 10.
Figure 98:
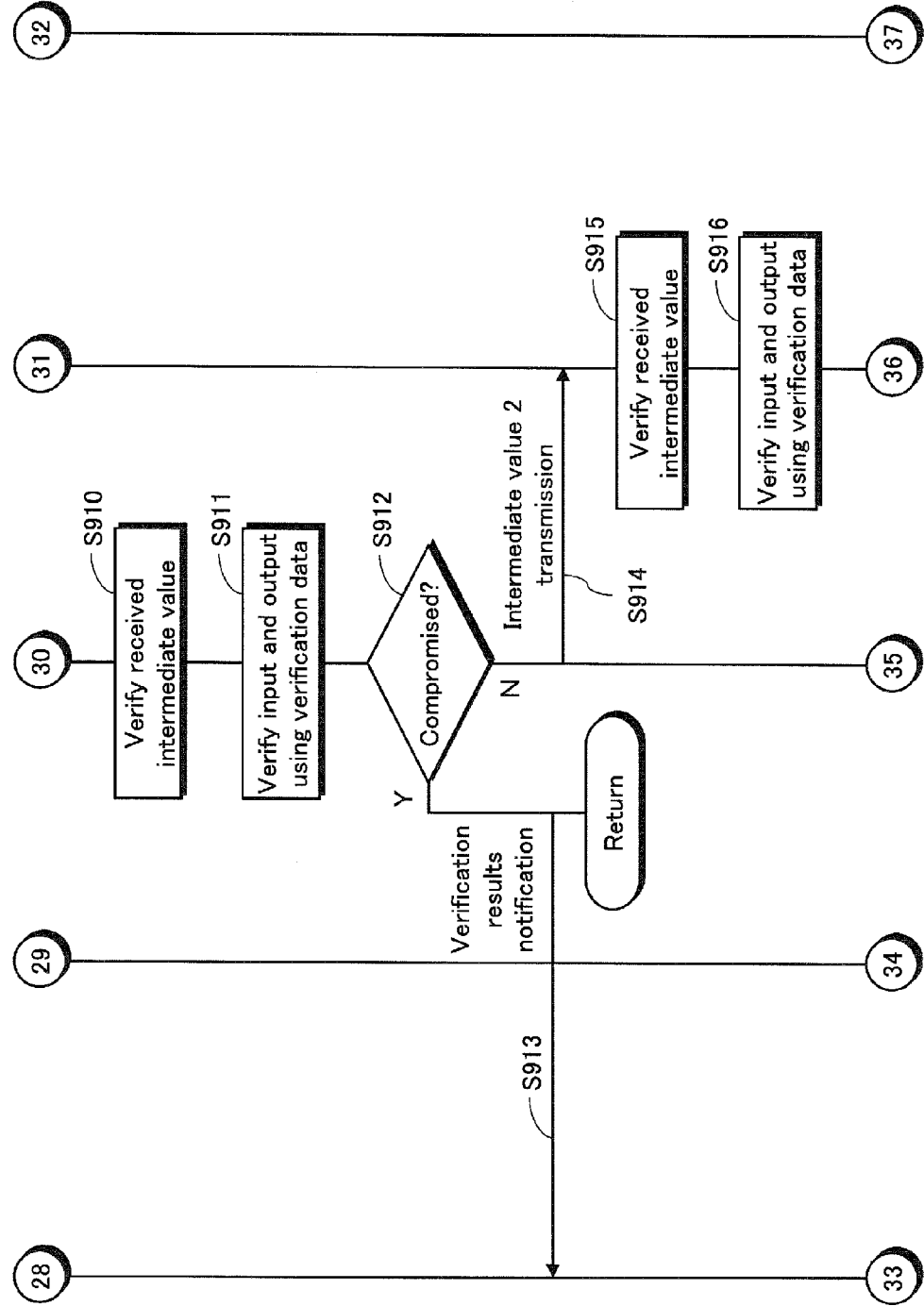
FIG. 98 is a sequence diagram of the detection process pertaining to Embodiment 10.
Figure 99:
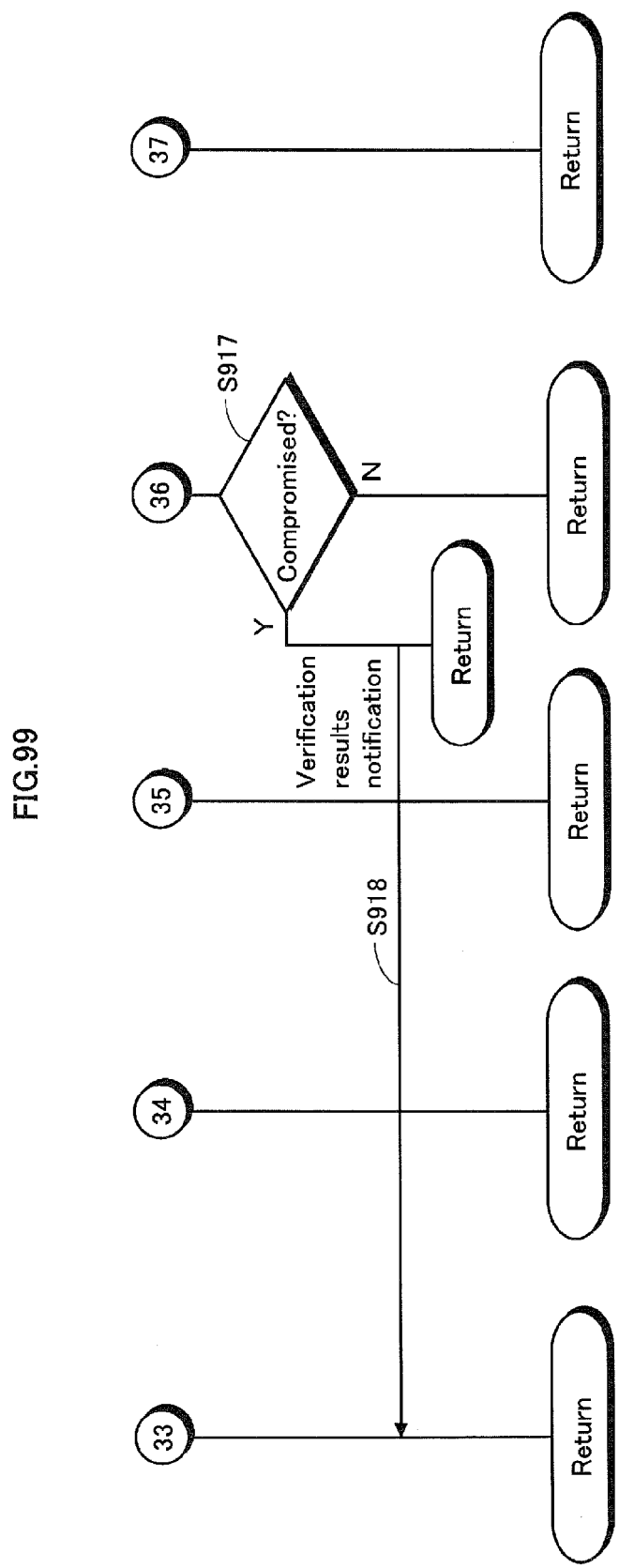
FIG. 99 is a sequence diagram of the detection process pertaining to Embodiment 10.

FIGS. 97 through 99 are sequence diagrams showing the detection process pertaining to Embodiment 10.

The process of steps S901 and S902 is identical to that of Embodiment 6 (FIG. 80). The following explanations begin at step S903.

The protection control module 120c selects one of the update modules (in this example, update module 141c) and transmits thereto the application 110 identification information, intermediate value 1, the verification data for decryption sub-process 1, and the ordering information (step S903).

The protection control module 120c selects one of the update modules other than the previously selected update module (in this example, update module 142c) and transmits thereto the application 110 identification information, intermediate value 2, the verification data for decryption sub-process 2, and the ordering information (step S904).

The protection control module 120c further selects one of the update modules other than the previously-selected two update modules (in this example, update module 143c) and transmits thereto the application 110 identification information, the decrypted application data, the verification data for decryption sub-process 3, and the ordering information (step S905).

Update module 141c uses the verification data so received to verify whether or not the input/output correspondence of decryption sub-process 1 is correct (step S906). If the input-output correspondence for the decryption sub-process is judged to be incorrect, then the protection control module 120c is judged to be compromised (Y in step S907) and the determiner 210b is notified to this effect (step S908).

If the protection control module 120c is judged to not be compromised (N in step S907), then update module 141c transmits intermediate value 1 to the next update module 142c in accordance with the update module identification information included in the ordering information, without notifying the determiner 210b.

Update module 142c verifies whether or not the intermediate value 1 received from update module 141c matches the intermediate value 1 included in the verification data received from the protection control module 120c (step S910).

Next, update module 142c uses intermediate value 2 and the verification data received from the protection control module 120c to verify whether or not the input/output correspondence of decryption sub-process 2 is correct (step S911). If the intermediate values 1 do not match in step S901, or else if the input/output correspondence for decryption sub-process 2 is not correct in step S911, then update module 142c judges the protection control module 120c as compromised.

If the protection control module 120c is compromised (Y in step S912), then update module 142c notifies the determiner 210b to such effect (step S913). If the protection control module 120c is not compromised (N in step S912), then update module 142c transmits intermediate value 2 to the next update module 143c in accordance with the update module identification information included in the ordering information, without notifying the determiner 210b (step S914).

Update module 143c verifies whether or not the intermediate value 2 received from update module 142c matches the intermediate value 2 included in the verification data received from the protection control module 120c (step S915).

Next, update module 142c uses intermediate value 2 and the verification data received from the protection control module 120c to verify whether or not the input/output correspondence of decryption sub-process 3 is correct (step S916). If the intermediate values 2 do not match in step S915, or else if the input/output correspondence for decryption sub-process 3 is not correct in step S916, then update module 143c judges the protection control module 120c as compromised.

If the protection control module 120c is compromised (Y in step S917), then update module 143c notifies the determiner 210b to such effect (step S918). If the protection control module 120c is not compromised (N in step S917), then the detection process ends without the determiner 210b being notified.

3. Embodiment 10 Effects

In Embodiment 10, ordering information can be used to verify whether or not the decryption sub-processes are performed in the correct order.

Also, each of the update modules verifies whether or not the output data of the decryption sub-process matches the data included in the verification data. Thus, illegal operations performed by the protection control module 120c or by other update modules can be discovered.

[Other Variations]

The present invention was described above according to the Embodiments. However, the present invention is, of course, not limited to the above-described Embodiments. The present invention also encompasses the following cases.

(1) In the above-described Embodiments, when tampering is detected in a detection module or in an update module through mutual surveillance within the detection module group or update module group, the determiner promptly notifies the detection module to stop the detection process.

However, the present invention is not limited in this manner. A compromised detection module or update module may be invalidated, or else the compromised module may be removed from later detection processes for the protection control module.

(2) In the above-described Embodiments, the decryption process by the protection control module is verified at application execution time. However, the present invention is not limited in this manner. The application encryption process may also be validated. In such a case, steps S41 and S42 of the detection process sequence diagram from FIG. 16 are changed so that the applications are by the split application splitter before encryption, and the split applications are encrypted by the decryption loader. The process remains unchanged from step S43 onward. Accordingly, the protection control module can be confirmed to be performing encryption correctly, thus protecting the applications.

Alternatively, the protection control module may be verified during the encryption process performed when applications are being added and the encryption process performed when applications are re-encrypted.

(3) In the above-described Embodiments, the detection modules transmit block information to the other detection modules and confirm whether or not all of the blocks have been verified. However, the present invention is not limited in this manner. The detection modules may preemptively come to hold all of the block information.

Alternatively, the detection modules may select a piece of block information and request that the protection control module transmit the block corresponding thereto.

Also, each detection module may share the piece of block information respectively selected thereby and confirm whether or not the protection control module transmits the blocks corresponding to the block information selected by the other detection modules.

(4) In the above-described Embodiments, the protection control module transmits blocks and verification data corresponding thereto to the detection modules, which perform verification, every time an application is executed. However, the present invention is not limited in this manner. After step S42, the protection control module may accumulate blocks and transmit the accumulated blocks and corresponding verification data upon receiving a request from a detection module.

Accordingly, the number of occasions on which the detection process is performed by the detection modules can be reduced.

Alternatively, mutual surveillance can be performed by the detection module group before the detection process. The detection process can then be performed on the protection control module using detection modules deemed valid.

Also, the protection module may share a key with the detection modules when the blocks accumulate within, and use this shared key to encrypt and hold the blocks. Furthermore, the public key held by the authenticator in the protection control module may also encrypt the blocks.

As another alternative, keys from several detection modules may be used to encrypt a single block. The protection control module may select which detection module keys to use, or else the management device may make the selection and instruct the protection control module accordingly. Further still, a certificate may be affixed to certify that the selection was made by the management device.

(5) The analysis/determination process of the above-described Embodiments involves using the detection results from the detection modules to determine the presence of tampering in the protection control module.

However, the present invention is not limited in this manner. The detection module group may perform mutual surveillance and the determination regarding the presence of tampering in the protection control module may be made using detection results from valid detection modules only. Also, if an illegal detection module is detected through mutual surveillance, the detection process may be repeated by the valid detection modules, only.

(6) In the above-described Embodiments, the protection control module and the detection modules are installed on the same apparatus. However, these may also be installed on separate apparatuses. In such a case, for instance, the protection control module may be installed on a device belonging to a certificate-issuing authentication authority, while the detection modules are installed on an inspection device. Such an inspection device may be used by a system that detects whether or not the certificates are issued correctly.

(7) In the above-described Embodiments, a specific example is given in which encrypted plain-text data is split into three blocks and each such block is verified by a respective one of the detection modules.

However, the present invention is not limited in this manner. The application data may be split into k blocks, and each detection module may have up to k−1 blocks transmitted thereto for verification. The application data cannot be recovered unless k blocks are obtained and thus, even if a block were leaked by one of the detection modules, the application data could not.

(8) In the above-described Embodiments, the decrypted plain-text application data is split into three blocks such that the application data can be recovered therefrom.

However, the present invention is not limited in this manner. The application data may also be split into m blocks such that the application data can be recovered from a k-block subset thereof.

At this point, the protection control module selects a block-transmitting detection module and transmits up to k−1 blocks as well as verification data corresponding thereto to the selected detection module. The detection module uses the up to k−1 blocks and verification data so received for verification.

A specific example is given below. Using the (k,m) threshold scheme as the splitting method, the application data may be split into m blocks and be recoverable from k of these blocks. The (k,m) threshold scheme is discussed on pages 214 through 216 of Non-Patent Literature 1.

In the (k,m) threshold scheme, y-axis segments are used that form a (k−1)-degree polynomial f(x), which is the application data. In the polynomial f(x) where x=1 ... m, m pieces of information form data blocks. Any k blocks among the m blocks are sufficient to uniquely define the polynomial f(x), and thus uniquely define the y-axis segments that are the application data. Here, the judgment information is k. Also, if the RSA encryption public key n (where n=pq) is 1189 (=29*41), then the judgment information is 1189. Here, if the application data is measured and split into five blocks at 7, 11, 13, 17, and 19, then the application data can be recovered using the Chinese remainder theorem so as to exceed 1189, for instance using (7, 11, 17) or (7, 13, 19).

Figure 100:
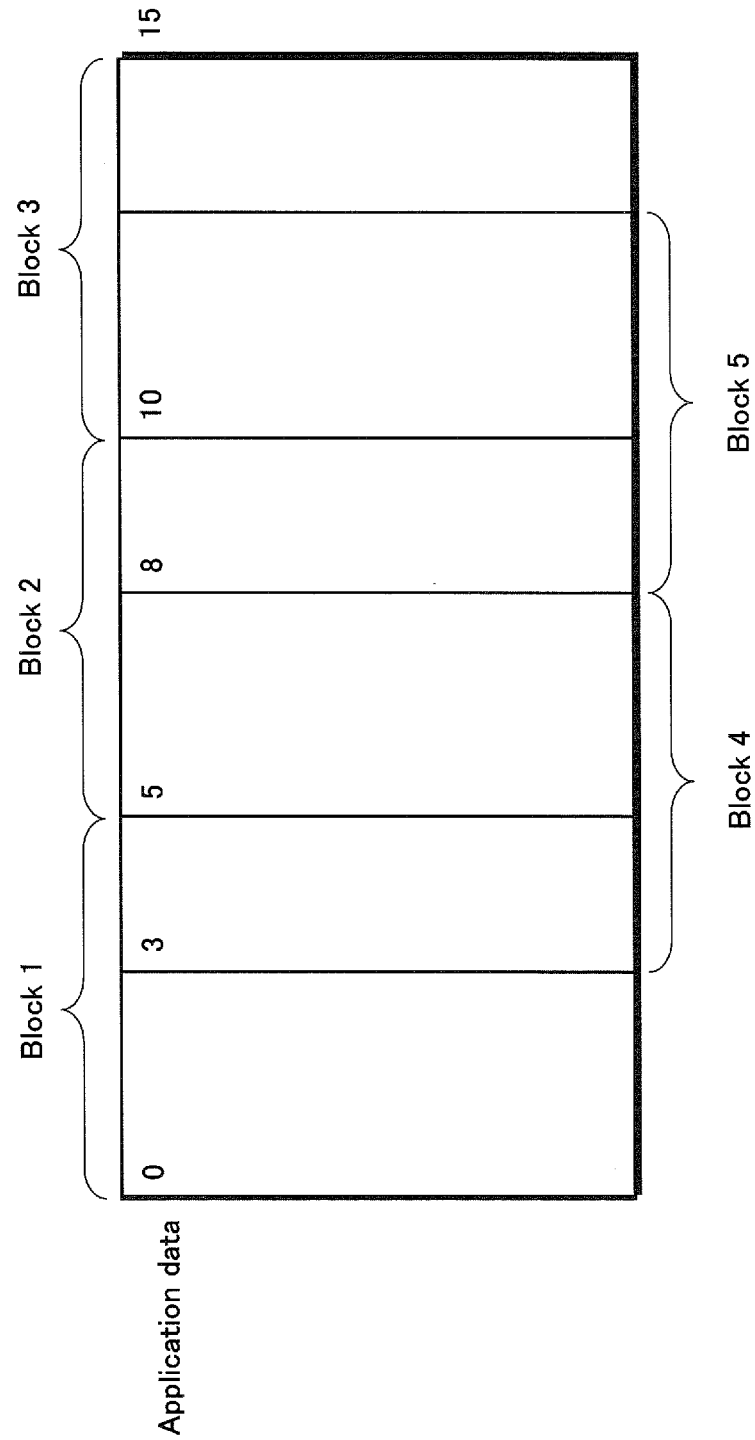
FIG. 100 is a diagram explaining the specifics of the application division method pertaining to Variation 8.

If the application data is split into blocks of uniform size (for instance, 5-byte blocks), then splitting may occur as shown in FIG. 100. Block 1 spans bytes 0 through 5, block 2 spans bytes 5 through 10, block 3 spans bytes 10 through 15, block 4 spans bytes 3 through 8, and block 5 spans bytes 8 through 13.

Here, the judgment information is ((1,2,3), (1,3,4,5)).

The protection control module decides which blocks to transmit to the detection modules from the judgment information. For example, if the protection control module has decided to use the judgment information (1,3,4,5) for verification, then the protection control module selects blocks, 1, 3, 4, and 5 from the blocks split by the application splitter, and then transmits each block and verification data corresponding thereto to a respective one of the detection modules. The detection modules use the received blocks and verification data to perform verification. Furthermore, the detection modules confirm whether the blocks 1, 2, and 3 or 1, 3, 4, and 5 have been verified using the block information of the other detection modules according to the judgment information.

(9) In the above-described Embodiments, the detection process may involve generating control information preset by the management device to decide which block is to be transmitted to which module, and transmitting the control information so generated from the management device to the protection control module.

Also, the detection modules may be decided using a predetermined decision algorithm. The decision algorithm may, for example, involve generating a random number and accordingly deciding on a detection module that will perform the detection process. Here, all of the detection modules have a common decision algorithm generating the same random number at the same time. The detection module so decided upon requests that the protection control module transmit the blocks and the verification data.

(10) The above-described Embodiments may, instead of the application decryption process or the application encryption process by the protection control module, verify a signature generation process, a signature verification process, a process that executes copyright protection functions (rights management such as content rights updates), a process that executes online banking (management of electronic values such as e-money and the like), and so on.

Here, the management device preemptively generates verification data for the process to be verified and transmits these to the protection control module.

(11) In the above-described Embodiments, the verification data includes a decryption process certificate for all of the applications. However, the present invention is not limited in this manner. The verification data may include a decryption process certificate only for the application being verified.

(12) In the above-described Embodiment 2, the blocks are considered deleted if tampering is not detected by mutual surveillance. However, the block deletion confirmation method is not limited in this manner. For example, block deletion may be confirmed by confirming whether or not the data are stored in the verification data holder.

Alternatively, block deletion may be confirmed by having the detection modules hold a graph that is drawn up whenever the block deleting program therein is run, and then confirming the graph.

(13) During the verification source data generation process of the above-described Embodiments, when the verification source data is generated, the management device may transmit the additional applications held thereby to the protection control module and have the protection control module generate encrypted applications. The protection control module may then return the encrypted applications to the management device, which generates the verification source data.

Alternatively, the apparatus may install the additional applications from a recording medium, encrypt the installed applications with the encryption/decryption key, and transmit the encrypted applications to the management device.

(14) In the above-described Embodiments, the verification source data is updated when applications are added to the apparatus. However, the present invention is not limited in this manner Verification source data updates may also be performed regularly or irregularly.

For example, when additional applications are added to the download server, the verification source data may be updated before the additional applications are installed onto the apparatus. Accordingly, there is no need to connect the apparatus to the management device when additional applications are installed on the former.

(15) In the above-described Embodiments, the verification source data generation process is performed when applications are added to the apparatus. However, the present invention is not limited in this manner Verification source data for the data of all applications that may be added to the apparatus may be preemptively generated.

(16) During the verification source data generation process of the above-described Embodiments, the management device may authenticate the protection control module. The authentication method may involve verifying the protection control module decryption process, or else may involve a challenge and response.

(17) Obfuscation technology may be combined with the programs of the above-described Embodiments so as to obfuscate the decryption process and the decryption sub-processes. Accordingly, even if, hypothetically, a detection module were to perform illegal operations, the information in the protection control module could not be leaked without additional difficulties.

(18) In the initial setup process of the above-described Embodiments, verification source data is generated by the management device after the protection control module is installed onto the apparatus and then transmitted thereto.

However, the present invention is not limited in this manner. The protection control module may be installed onto the apparatus with the verification source data preemptively embedded within the verification source data holder thereof.

Alternatively, during the update process, the newly-updated protection control module may be transmitted to the apparatus with verification source data similarly embedded into the verification source data holder thereof.

(19) During the detection process of the above-described Embodiments, the verification data, application identification information, and decrypted application data are transmitted to the detection modules by the protection control module whenever applications are executed. However, the present invention is not limited in this manner.

For instance, a control module, which controls execution commands used when the user executes applications, may be installed onto the apparatus so that when an execution command is detected thereby, the control module notifies a detection module that an application is to be executed and the detection module so notified requests transmission of the verification data and the decrypted application data from the protection control module.

Alternatively, the detection modules themselves may watch for application execution and request transmission of the verification data and the decrypted application data from the protection control module at application execution time.

(20) During the detection process of the above-described Embodiments, the detection modules may judge the protection control module as compromised if the application identification information, blocks, and verification data are not transmitted thereto from the protection control module.

(21) In the above-described Embodiments, the protection control module may transmit blocks in which one or more bits of information have been deleted from the smallest blocks permitting application data recovery to the detection modules as data for verification.

Here, the protection control module may transmit the data for verification to a single detection module. Alternatively, the protection control module may transmit data for verification to each of the detection modules so that all of the detection modules are able to recover the application data using the data for verification transmitted thereto.

(22) In the above-described Embodiments, the detection modules may be programs with the sole function of verifying the protection control module.

(23) In the above-described Embodiments, the protection control module is updated. However, the present invention may also update modules other than the protection control module.

The following example of a detection module update process is given for a case where detection module 133 is updated.

The update software distributor multiply encrypts a new, updated detection module using a plurality of keys, and then transmits this module to the other detection modules in the detection module group. Detection module 133 is updated with the new, updated detection module so received.

(24) The update modules of the above-described Embodiments may comprise (a) only the structural elements required for the detection process (only the controller and the verifier), or (b) only the structural elements required for the update process (the controller and the updater), or (c) only the structural elements required for the invalidation process (the controller and the updater).

(25) In the above-described Embodiments, when the update modules perform tamper detection on other update modules or the protection control module, the tamper detection process may be performed not on the entire module but rather on a part thereof, such as a specific function or key.

Alternatively, the data that is subjected to tamper detection may be split into blocks of uniform size such that tamper detection is performed on each such block, or else a function or key may be split and tamper detection similarly performed on each such block. Furthermore, the blocks may be subjected to tamper detection in order from the start of the data, or else in random order.

(26) In the above-described Embodiments, the update modules and the protection control module may be stored in a tamper-resistant region, and may be operated in a region that is protected against attackers.

If an update module comprising only the structural elements necessary for the surveillance process is stored in a tamper-resistant region, then other modules may unconditionally accept notifications made by this update module, as well as update and invalidation processes performed thereby. Alternatively, notifications received from such an update module may be treated as more important than notifications from other modules, and may be used for update and invalidation process determination.

Also, the protection control module may be executed in protected mode (in a tamper-resistant region) with the update modules in normal mode (in a non-tamper-resistant region)

(27) In the above-described Embodiments, the module invalidator is within the update server and the access control module is within the apparatus. However, the present invention is not limited in this manner. The module invalidator and the access control module may both be within the apparatus or else may both be within the update server. If both are within the apparatus, both may be stored in a tamper-resistant region.

(28) In the above-described Embodiments, the initial setup process for the apparatus may be performed after shipping from the factory. Alternatively, the initial setup process for the apparatus may be performed more than once.

(29) In the above-described Embodiments, the verification certificate, the authentication key certificate, and the correspondence certificate are all generated using the private signature key held by the update software distributor. However, the present invention is not limited in this manner. Each certificate may also be generated using a different respective key. Alternatively, each certificate may be issued by a certificate-issuing device other than the update software distributor.

(30) The initial setup process and the subsequent-round preparation process of the above-described Embodiments involve distribution information held by the update modules. However, the present invention is not limited in this manner. The distribution information may be held by the application, or else by the update module and the application in tandem.

(31) In the tamper-detection process of the above-described Embodiments, when the update modules detect tampering in the protection control module, the determiner and all of the other update modules are notified to such effect. However, the present invention is not limited in this manner. The determiner alone may be notified, or else any one of the other update modules may be notified, Also, in the above-described Embodiments, when the update modules do not detect tampering in the protection control module make no notification to the determiner. However, the determiner may be notified to the effect that no tampering was found.

(32) During the detection process of the above-described Embodiments, each update module may share the detection results with the other update modules. If any update module does not share detection results, the update module may be determined to be illegal and then be invalidated.

(33) In the analysis/determination process of the above-described Embodiments, whether or not to update the protection control module is determined according to tampering information. However, the present invention is not limited in this manner. The judgment may be made according to the number of update modules reporting tampering. Alternatively, the analysis/determination operations involve determining whether or not to update and whether or not to invalidate the protection control module. However, the present invention is not limited in this manner. Determination of whether or not to stop the apparatus may also be performed.

(34) In the mutual authentication process of the above-described Embodiments, the update modules authenticate the update software distributor and, afterward, the update software distributor authenticates each update module. However, the order of authentication may be reversed. The update software distributor may authenticate each update module and the update modules may authenticate the update software distributor afterward.

Alternatively, the challenge data used in the mutual authentication process may have the same value for all of the update modules, or else the update modules may be split into groups such that the challenge data have different values for each group.

(35) During the mutual authentication process of the above-described Embodiments, each update modules individually authenticates the update software distributor.

However, the present invention is not limited in this manner. Each update module may notify the other update modules of the signature verification results, or else the update modules may share verification results. The update software distributor may be deemed valid by an update module if the authentication results of the update module itself and those received from the other update modules are such that, for example, authentication was successful for more than half of the update modules, and may be deemed invalid otherwise.

(36) During the mutual authentication process of the above-described Embodiments, determination of whether or not to perform the restoration process is made according to whether or not more than half of the necessary update modules are valid.

The determination of whether or not to perform the restoration process may instead be made according to whether the number of illegal update modules is less than a permitted predetermined tolerance.

Alternatively, if the number of valid update modules is deemed to be insufficient for the restoration process, then the illegal update modules may be invalidated instead of stopping the apparatus.

(37) During the mutual authentication process of the above-described Embodiments, each update module transmits a public authentication key and an authentication key certificate to the update software distributor with the response data. However, the present invention is not limited in this manner. The response data, the public authentication key, and the authentication key certificate may each be transmitted at different times. Alternatively, the public authentication key and the authentication key certificate may be transmitted when a request therefor is made by the update software distributor.

The update software distributor may receive the public authentication keys and the authentication key certificates from all of the update modules, or else may receive these only from the number of update modules necessary for the restoration process.

(38) In the above-described Embodiments, two surveillance processes are executed during a single decryption process (surveillance 3-1, 3-2, 5-1, and 5-2). However, the present invention is not limited in this manner. Any number of surveillance processes may be performed as long as the decryption process goes on.

Alternatively, the surveillance processes may be performed not only during the decryption process but also during reception of the keys and of the updated protection control module, or during the detection process, the mutual authentication process, and so on.

Also, the surveillance process may be performed regularly during a fixed interval, or else may be performed for a random-length interval, or for an interval indicated by the update server.

Furthermore, each update module may receive synchronization information indicating the time at which the surveillance process is to be executed from an external server and perform the surveillance process according to the synchronization information so received. Thus, each update module can be made to perform the surveillance process at the same time as the other update modules while improving the precision with which illegal update modules can be detected.

(39) In the above-described Embodiment 6, the decryption process is split into a plurality of decryption sub-processes. However, the present invention is not limited in this manner. The applications may be multiply encrypted such that the multiply-encrypted applications are decrypted.

An example is here given of a triply-encrypted application. Decryption sub-process 1 decrypts the triply-encrypted application to obtain a doubly-encrypted application. Decryption sub-process 2 decrypts the doubly-encrypted application to obtain an encrypted application. Decryption sub-process 3 decrypts the encrypted application to obtain a plain-text application.

(40) During the detection process of the above-described Embodiment 6, each decryption sub-process is verified by a single update module. However, the present invention is not limited in this manner. Each decryption sub-process may also be verified by several update modules.

Figure 101:
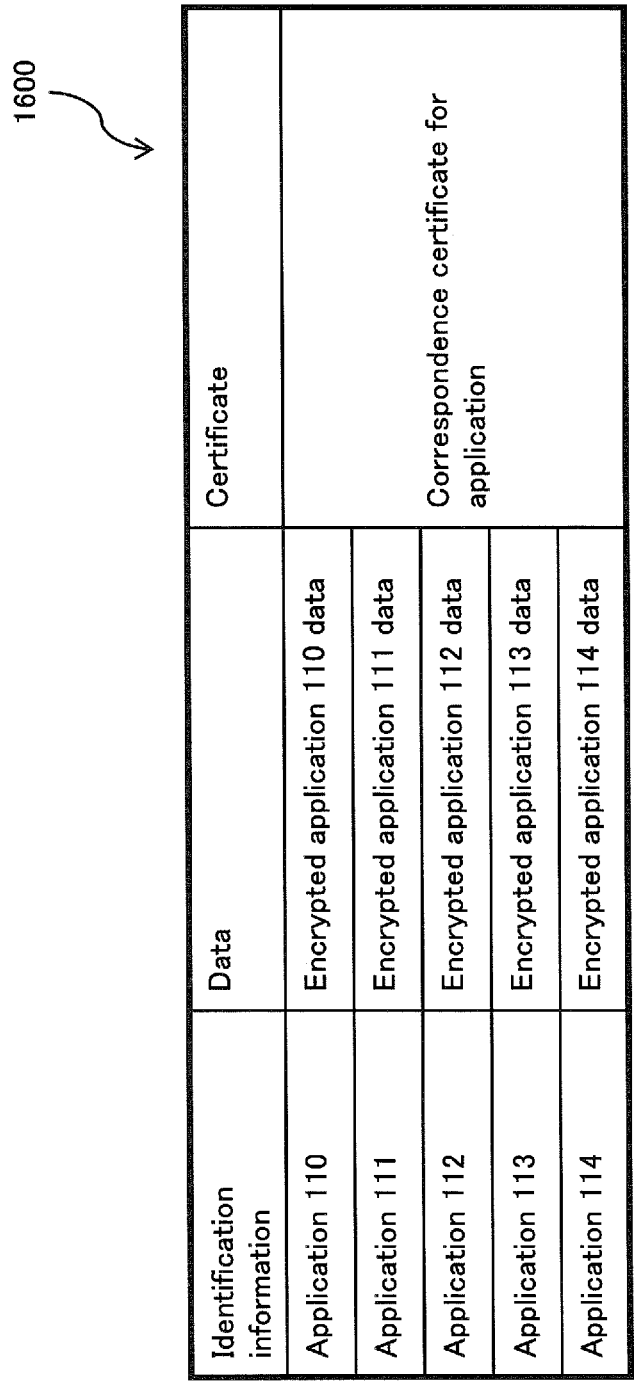
FIG. 101 is a diagram showing the structure of verification source data 1600 pertaining to Variation 41.

(41) The verification source data of the above-described Embodiments 5 and 6 includes a correspondence certificate for each application. However, the structure of the verification source data is not limited in this manner. For example, the verification source data used by Embodiments 5 and 6 may have the structure shown in FIG. 101.

The verification source data 1600 comprises identification information for each application, encrypted application data and verification values corresponding thereto, as well as a certificate.

The encrypted data of several applications may be generated by the update software executor executing the protection control module to encrypt each application.

The certificate is a signature generated by combining the encrypted data of each application as input data with the output data from normal operations of the protection control module and using the private signature key of the update server on the combined data.

(42) The detection process of the above-described Embodiment 8 may treat the protection control module as a single program and perform tamper detection on a predetermined portion of the data thereof. Then, each update module may perform tamper detection on a different portion of the protection control module.

Alternatively, the data of the protection control module may be split and tamper detection always performed on each block by more than one update module.

Also, after tamper detection, each update module may delete the tamper detection target data and perform mutual tamper detection to confirm that the target data was deleted by all of the update modules.

(43) In the above-described Embodiments 4 through 10, the update modules may be programs with the sole function of verifying the protection control module.

(44) In the above-described Embodiments, the decryption process is split into three decryption sub-processes. However, the present invention is not limited in this manner. The decryption process may also be split into two sub-processes, or else into four or more sub-processes. The decryption process may be split into any units. Splitting may be done at each function included within the decryption process, or else at each operation instruction therein. The functions and instructions may be split into blocks, as well.

(45) The detection process of the above-described Embodiment 6 may involve verification data held by the protection control module instead of by the update modules. The protection control module may decrypt encrypted data transmitted thereto by the update modules and transmit the verification data to the update modules along with the decrypted data.

(46) The above-described Embodiments may be combined in any manner such that the detection process for the protection control module includes both (a) verification of the application decryption process, and (b) verification that uses random data generated by the update server.

(47) Each of the above-described modules may specifically be an individual computer program, or else a module embedded in an operating system, or else a driver called by the operating system, or else an application program.

(48) Each of the above apparatuses may be, specifically, a computer system composed of a microprocessor, ROM, RAM, a hard disk unit, a display unit, a keyboard, a mouse, and so on. Computer programs are stored in RAM or on the hard disk unit. The microprocessor is operated according to the instructions in the computer programs, thus accomplishing the functions of each apparatus. These computer programs are made up a set of code instructions for the computer that indicate how to accomplish predetermined functions.

(49) Each of the above-described apparatuses may be realized in whole or in part as a single system LSI (Large Scale Integration). A system LSI is a highly multi-functional LSI manufactured by integrating a plurality of functional elements onto a single chip. Specifically, the system LSI forms a computer system and includes therein the microprocessor, ROM, RAM, and so on. The RAM stores computer programs therein. The microprocessor is operated according to the instructions in the computer programs, thus accomplishing the functions of the system LSI.

Alternatively, each of the functional elements that make up the above-described apparatuses may be realized as an individual chip, or else all functional elements or a subset thereof may be realized on one chip.

Also, integrations other than the presently-discussed system LSI, such as IC, LSI, super LSI and ultra LSI are possible. The integrated circuit method is not limited to LSI but may also be a private circuit or a general purpose processor. After LSI manufacture, either a FPGA (Field Programmable Gate Array) or a reconfigurable processor may be used.

Furthermore, should progress in the field of semiconductors or emerging technologies lead to replacement of LSI with other integrated circuit methods, then such technology may of course be used to integrate the functional blocks. Applications to biotechnology are also plausible.

(50) The above-described apparatuses may, in whole or in part, be realized as a detachable IC card or as stand-alone modules. Such IC cards or modules form computer systems and include therein the microprocessor, ROM, RAM, and so on. Such IC cards or modules may also include the above-described highly multi-functional LSI. The microprocessor is operated according to the instructions in the computer programs, thus accomplishing the functions of the IC cards or modules. The IC cards or modules may also be made tamper-resistant.

(51) The present invention may also be a method indicating the above. Alternatively, the present invention may be a computer program that realizes such a method on a computer.

Also, the present invention may be a computer program recorded on a computer-readable recording medium, such as a floppy disc, hard disk, CD-ROM, MO, DVD, DVD-ROM, DVD-RAM, BD (Blu-ray Disc), semiconductor memory, or the like.

Furthermore, the present invention may be a computer program transmitted over electronic communication lines, wired or wireless communication lines, a network such as the Internet, data broadcasting means, or similar.

The present invention may also be a computer system comprising a microprocessor and a memory, where the memory stores therein a computer program according to which the microprocessor is operated.

Finally, the present invention may be realized by a stand-alone computer system to which the program has been transferred through the use of a recording medium, or through the use of a network or similar.

(52) The present invention includes all combinations of the above-described Embodiments and Variations.

(Summary)

As described above, the present invention comprises an information processing device that includes a protection control module operable to verify whether or not tampering has occurred in a predetermined application and a plurality of detection modules, the protection control module comprising a decrypter operable to decrypt the application and a transmitter operable to transmit the data output by the decrypter as data for verification, wherein at least two of the detection modules among the plurality of detection modules each include a receiver operable to receive the data for verification from the protection control module, a verification data holder storing verification data therein, and a primary verifier operable to verify the protection control module according to the data for verification and the verification data, the verification data indicates a correspondence between the input and output data expected to result from normal operations of the decrypter, and the at least two detection modules verify the protection control module using the same data for verification.

Also, the present invention comprises an information processing device that includes a protection control module operable to verify whether or not tampering has occurred in at least a primary application and a secondary application among a plurality of applications, and detection modules, the protection control module comprising a verification data storage unit, a decrypter operable to decrypt the encrypted primary and secondary applications, a verification data generator operable to generate verification data, and a transmitter operable to transmit the verification data and the data output by the decrypter as data for verification, and the detection modules comprising a receiver operable to receive the data for verification and the verification data from the protection control module and a primary verifier operable to verify the protection control module according to the verification data and the data for verification, the verification data including the data of the primary application and the secondary application in encrypted form, a primary verification value and a secondary verification value each indicating a correspondence between the input and output data expected to result from normal encryption of the respective primary and secondary applications by the decrypter, and a concatenated verification data value generated by concatenating all of the verification data values including at least the primary and secondary verification data values, wherein, when the protection control module decrypts the primary application, the verification data consists of verification source data in which the primary verification value and the data of any application other than the primary application have been deleted, and when the protection control module decrypts the secondary application, the verification data consists of verification source data in which the primary verification value and the data of any application other than the primary application have been deleted.

[Industrial Applicability]

The present invention is applicable to the manufacturing and sales industries of management devices or update servers providing information processing devices and software therefor, and specifically to technology for detecting illegal software operating on an information processing device and for safely updating such illegal software.

[List of Reference Symbols]
1 illegal module detection system
2 illegal module detection system
100,100b apparatus
120, 120a, 120b, 120c protection control module
130 detection module group
130b update module group
131, 131a, 132, 132a, 133, 133a detection module
140 access control module
141, 141c, 142, 142c, 143, 143c update module
200 management device
200b update server
210, determiner
220, 220a verification source data distributor
230 communicator
240, 240c update software distributor
250 module invalidator
301 receiver
302 transmitter
303 controller
304 decryption loader
305 tamper detector
306 analytic tool detector
307 encryption/decryption key holder
308 verification source data holder
309 verification data generator
310 application splitter
321 encryption/decryption key splitter
322 certificate generator
323 encryption/decryption key recoverer
401 receiver
402 transmitter
403 controller
404 verifier
405 MAC value generator
406 MAC value table updater
407 verification data holder
410 updater
411 distribution information holder
412 authenticator
420 verification source data holder
501 receiver
502 transmitter
503 instruction generator
504 module identifier
601 receiver
602 transmitter
603 controller
604 authenticator
605 certificate generator
606 private signature key holder
607 encryption key holder
608 data splitter
609 application holder
610 verification source data generator
611 protection control module holder
620 encryption key generator
621 encryption processor
622 detection module selector
801 receiver
802 transmitter
803 controller
804 updater
805 verifier
806 MAC value generator
807 MAC value table updater
808 distribution information holder
810 detector
811 verification data holder
901 receiver
902 transmitter
903 controller
904 decryption loader
905 tamper detector
906 analytic tool detector
907 encryption/decryption key holder
908 encryption/detection key generator
909 encryption/decryption key splitter
910 certificate generator
911 encryption/decryption key recoverer
912 verification data generator
913 verification source data generator
1001 receiver
1002 transmitter
1003 access information holder
1101 receiver
1102 transmitter
1103 instruction generator
1104 module specifier
1201 receiver
1202 transmitter
1203 encryption key generator
1204 encryption processor
1205 authenticator
1206 update module selector
1207 controller
1208 certificate generator
1209 private signature key holder
1210 update software holder
1211 encryption key holder
1220 update software executor
1221 application holder
1222 verification source data generator
1301 receiver
1302 transmitter
1303 access information acquisition key holder
1304 update module selector

The invention claimed is;
1. An information processing device comprising:
a processor;
a protection control module operable to protect applications using the processor; and
a plurality of detection modules, wherein the protection control module includes:
- a decrypter operable to take an application in encrypted form as input data, to decrypt the input data, and to output decryption results as output data
- a splitter operable to split the output data into at least k blocks (where k≥2); and
- a distributor operable to distribute the k blocks among the detection modules, wherein each of the detection modules includes:
- a verifier operable to determine whether or not each block distributed thereto is correct by using (i) the distributed block, (ii) verification data generated according to the input data and a block value expected to result from normal operation of the decrypter, and (iii) the input data; and
- a transmitter operable to transmit verification results to an external management device, and wherein at least one of the detection modules includes an updater operable to update the protection control module when the external management device determines that tampering has occurred in the protection control module.

2. The information processing device of claim 1,
wherein the protection control module holds therein block information indicating a method for splitting the output data,
wherein the splitter splits the output data with respect to the block information, and
wherein the splitter further transmits to each of the detection modules (i) verification data corresponding to each block distributed thereto, and (ii) the input data.

3. The information processing device of claim 2,
wherein each of the detection modules further includes a verification confirmer operable to obtain the blocks distributed to other detection modules, and to confirm whether or not the verifier of the other detection modules have performed verification correctly according to judgment information pre-assigned thereto.

4. The information processing device of claim 3,
wherein the splitter splits the output data into k blocks by dividing values of the output data by k divisors, the k divisors being co-prime,
wherein the block information indicates the number k and the k divisors, and
wherein the judgment information indicates the product of the k divisors.

5. The information processing device of claim 1,
wherein each of the detection modules deletes each block distributed thereto after verification by the verifier, and confirms whether or not another detection module has deleted the blocks distributed thereto.

6. The information processing device of claim 5,
wherein each of the detection modules includes a mutual surveillance unit operable to perform tamper verification on the other detection module, and
wherein if tampering is detected by the mutual surveillance unit, the detection module determines that the blocks have not been deleted by the other detection module, and if tampering is not detected, the detection module determines that the blocks have been deleted by the other detection module.

7. An information processing device comprising:
a processor;
a protection control module operable to protect applications using the processor; and
a plurality of detection modules, wherein the protection control module includes:
- a decrypter operable to execute a decryption process made up of k sub-processes on an application in encrypted form; and
- a distributor operable to distribute k pieces of verification target data that are the respective output data of the k sub-processes to the detection modules, and wherein each of the detection modules includes a verifier operable to determine whether or not the verification target data distributed thereto is correct by using (i) the distributed verification target data, (ii) input data for each of the sub-processes corresponding to the verification target data, and (iii) verification data generated according to the input data and output data expected to result from normal operation of the decrypter.

8. The information processing device of claim 7,
wherein the protection control module includes:
- a plurality of applications;
- a verification source data holder holding k pieces of verification source data therein; and
- a verification data generator operable to generate k pieces of verification data from the k pieces of verification source data for distribution to the detection modules, wherein the k pieces of verification source data include, for each of the applications, the following (i), (ii), and (iii) corresponding to each of the k sub-processes: (i) an application in encrypted form, (ii) a verification value indicating a correspondence between input data and output data for the sub-process as expected from normal operations of the decrypter, and (iii) a concatenated data verification value generated from the concatenated data of a plurality of verification values, and wherein the verification data generator generates k pieces of verification data from the k pieces of verification source data by deleting therefrom verification values corresponding to an application being decrypted by the decrypter as well as the data of all other applications in encrypted form.

9. The information processing device of claim 8,
wherein the verifier of each of the detection modules
- generates a verification value from the verification target data and from the data of the applications in encrypted form included in the received verification data,
- generates combined data by combining the verification value so generated and the verification values included in the received verification data,
- generates a combined data verification value from the combined data, and
- verifies whether or not there is a match between the combined data so generated and the combined data verification value included in the received verification data.

10. The information processing device of claim 7,
wherein the protection control module generates ordering information indicating a processing order for the k sub-processes, and transmits the ordering information so generated to each of the detection modules, and
wherein the verifier of each of the detection modules verifies the verification target data according to the processing order indicated by the ordering information received thereby.

11. The information processing device of claim 10,
wherein each of the detection modules includes:
- a verification target data receiver operable to receive verification target data from the detection module that performs a verification process as part of the sub-process immediately preceding the sub-process verified thereby; and
a verification target data transmitter operable, when verification by the verifier is successful, to identify the detection module that performs the verification process as part of the next sub-process with reference to the ordering information, and to transmit verification target data thereto, and
wherein the verifier performs the verification process using the verification target data received by the verification target data receiver.

12. The information processing device of claim 11, wherein
each of the detection modules further includes:
an input data verifier operable to verify whether or not there is a match between the verification target data received by the receiver and the input data; and
a notifier operable, when the verification target data and the input data do not match, to make an outside notification to this effect.

13. The information processing device of claim 7,
wherein each of the detection modules includes a transmitter operable to transmit verification results to an external management device, and
wherein at least one of the detection modules includes an update module operable, when the external management device determines that tampering has occurred in the protection control module, to update the protection control module.

14. An illegal module detection system comprising an information processing device and a management device,
wherein the information processing device includes:
a protection control module operable to protect applications; and
a plurality of detection modules,
wherein the protection control module includes:
a decrypter operable to take an application in encrypted form as input data, to decrypt the input data, and to output decryption results as output data;
a splitter operable to split the output data into at least k blocks (where k≥2); and
a distributor operable to distribute the k blocks among the detection modules,
wherein each of the detection modules includes:
a verifier operable to determine whether or not each block distributed thereto is correct by using (i) the distributed block, (ii) verification data generated according to the input data and block values expected to result from normal operation of the decrypter and (iii) the input data; and
a transmitter operable to transmit verification results to the management device,
wherein at least one of the detection modules includes an updater operable to update the protection control module when the management device determines that tampering has occurred in the protection control module, and
wherein the management device includes:
a verification source data generator operable to generate verification source data from the input data and from each data block expected to result from normal operation of the decrypter; and
a transmitter operable to transmit the verification source data to the information processing device.

15. An illegal module detection system comprising an information processing device and a management device,
wherein the information processing device includes:
a protection control module operable to protect applications; and
a plurality of detection modules,
wherein the protection control module includes:
a decrypter operable to execute a decryption process made up of k sub-processes on the applications in encrypted form; and
a distributor operable to distribute k pieces of verification target data that are the respective output data of the k sub-processes to the detection modules,
wherein each of the detection modules includes a verifier operable to determine whether or not the verification target data distributed thereto is correct by using (i) the distributed verification target data, (ii) input data for each of the sub-processes corresponding to the verification target data, and (iii) verification data generated according to the input data and output data expected to result from normal operation of the decrypter, and
wherein the management device includes:
a verification source data generator operable to generate verification source data from the input data for the sub-processes and from the output data expected to result from normal operation of the decrypter for each of the sub-processes; and
a transmitter operable to transmit the verification source data so generated to the information processing device.

16. An illegal module detection method performed by an information processing device,
wherein the information processing device includes:
a protection control module operable to protect applications; and
a plurality of detection modules,
wherein the illegal module detection method comprises steps performed by the protection control module of:
a decryption step of taking an application in encrypted form as input data, decrypting the input data, and outputting decryption results as output data;
a splitting step of splitting the output data into at least k blocks (where k≥2); and
a distribution step of distributing the k blocks among the detection modules,
wherein the illegal module detection method comprises steps performed by each of the detection modules performs of:
a verification step of determining whether or not each block distributed thereto is correct by using (i) the distributed block, (ii) verification data generated according to the input data and a block value expected to result from normal operation of the decryption step, and (iii) the input data; and
a transmission step of transmitting verification results to an external management device, and
wherein the illegal module detection method comprises an updating step performed by at least one of the detection modules of updating the protection control module when the external management device determines that tampering has occurred in the protection control module.

17. An integrated circuit comprising:
a processor;
a protection control module operable to protect applications using the processor; and
a plurality of detection modules, wherein the protection control module includes:
    a decrypter operable to execute a decryption process made up of k sub-processes on an application in encrypted form; and
    a distributor operable to distribute k pieces of verification target data that are the respective output data of the k sub-processes to the detection modules, wherein each of the detection modules includes:
    a verifier operable to determine whether or not the verification target data distributed thereto is correct by using (i) the distributed verification target data, (ii) input data for each of the sub-processes corresponding to the verification target data, and (iii) verification data generated according to the input data and output data expected to result from normal operation of the decrypter; and
    a transmitter operable to transmit verification results to an external management device, and wherein at least one of the detection modules includes an updater operable to update the protection control module when the external management device determines that tampering has occurred in the protection control module.

18. An illegal module detection method performed by an information processing device,
wherein the information processing device includes:
    a protection control module operable to protect applications; and
    a plurality of detection modules, wherein the illegal module detection method comprising steps performed by the protection control module of:
    a decryption step of executing a decryption process made up of k sub-processes on an application in encrypted form; and
    a distribution step of distributing k pieces of verification target data that are the respective output data of the k sub-processes to the detection modules, and wherein the illegal module detection method comprising a verification step performed by each of the detection modules of determining whether or not the verification target data distributed thereto is correct by using (i) the distributed verification target data, (ii) input data for each of the sub-processes corresponding to the verification target data, and (iii) verification data generated according to the input data and output data expected to result from normal operation of the decryption step.

19. An integrated circuit comprising:
a processor;
a protection control module operable to protect applications using the processor; and
a plurality of detection modules, wherein the protection control module includes:
    a decrypter operable to execute a decryption process made up of k sub-processes on an application in encrypted form; and
    a distributor operable to distribute k pieces of verification target data that are the respective output data of the k sub-processes to the detection modules, and wherein each of the detection modules includes a verifier operable to determine whether or not the verification target data distributed thereto is correct by using (i) the distributed verification target data, (ii) input data for each of the sub-processes corresponding to the verification target data, and (iii) verification data generated according to the input data and output data expected to result from normal operation of the decrypter.

20. A management method performed by a management device connected to an information processing device that verifies a plurality of data blocks, the information processing device having (i) a decrypter operable to decrypt data input thereto in encrypted form and output decryption results as output data, and (ii) a splitter operable to split the output data into the data blocks, the management method comprising steps performed by the management device of:
    a verification source data generation step of generating verification source data from the input data and from each data block expected to result from normal operation of the decrypter;
    a transmission step of transmitting the verification source data to the information processing device;
    a reception step of receiving verification results for each of the data blocks from the information processing device;
    a determination step of determining, from the verification results so received, whether or not tampering has occurred in the decrypter; and
    an update instructor operable, when the determination step results in an affirmative determination, to instruct the information processing device to update the decrypter.

21. A management method performed by a management device connected to an information processing device that verifies each of a plurality of sub-processes, the information processing device having a decrypter operable to decrypt data input thereto in encrypted form through the plurality of sub-processes, the management method comprising steps performed by the management device of:
    a verification source data generation step of generating verification source data from the input data for the sub-processes and from the output data expected to result from normal operation of the decrypter for each of the sub-processes; and
    a transmission step of transmitting the verification source data so generated to the information processing device.

* * * * *